United States Patent
Zinger et al.

(10) Patent No.: US 9,860,129 B2
(45) Date of Patent: Jan. 2, 2018

(54) SYSTEMS, METHODS AND DEVICES FOR NETWORKING OVER A NETWORK

(71) Applicant: Zulert Labs Inc., Gallatin Gateway, MT (US)

(72) Inventors: Vicheslav Zinger, Alexandria (AU); Gary Aitchison, Alexandria (AU)

(73) Assignee: ZULERT LABS INC., Gallatin Gateway, MT (US)

(*) Notice: Subject to any disclaimer, the term of this patent is extended or adjusted under 35 U.S.C. 154(b) by 0 days.

(21) Appl. No.: 14/428,281

(22) PCT Filed: Sep. 13, 2013

(86) PCT No.: PCT/AU2013/001046
§ 371 (c)(1),
(2) Date: Mar. 13, 2015

(87) PCT Pub. No.: WO2014/040135
PCT Pub. Date: Mar. 20, 2014

(65) Prior Publication Data
US 2015/0256401 A1 Sep. 10, 2015

Related U.S. Application Data

(60) Provisional application No. 61/700,593, filed on Sep. 13, 2012, provisional application No. 61/794,894, (Continued)

(51) Int. Cl.
*H04L 12/28* (2006.01)
*H04L 12/24* (2006.01)
(Continued)

(52) U.S. Cl.
CPC .......... *H04L 41/0893* (2013.01); *H04L 41/14* (2013.01); *H04W 40/246* (2013.01); *H04W 84/18* (2013.01)

(58) Field of Classification Search
None
See application file for complete search history.

(56) References Cited

U.S. PATENT DOCUMENTS

| 2005/0030968 A1 | 2/2005 | Rich et al. | |
| 2009/0010205 A1* | 1/2009 | Pratt, Jr. | G01D 21/00 370/328 |
| 2010/0150120 A1* | 6/2010 | Schlicht | H04W 4/20 370/338 |

FOREIGN PATENT DOCUMENTS

| EP | 1686735 | 8/2006 |
| WO | WO 2002/034004 | 4/2002 |

(Continued)

OTHER PUBLICATIONS

International Search Report dated Jan. 2, 2014 for PCT/AU2013/001046.

*Primary Examiner* — Phirin Sam
(74) *Attorney, Agent, or Firm* — Quarles & Brady LLP

(57) ABSTRACT

The present disclosure is related to systems, methods, and processor readable media for distributing digital data over networks. Certain embodiments relate to systems, methods, and devices used within such networks where at least a substantial portion of the interconnected devices are capable of interacting with one or more neighboring devices, and then to form such a network either with no gateway and/or control point, with a single gateway and/or control point or with a number of gateways and/or control points.

6 Claims, 51 Drawing Sheets

Related U.S. Application Data filed on Mar. 15, 2013, provisional application No. 61/832,466, filed on Jun. 7, 2013, provisional application No. 61/856,441, filed on Jul. 19, 2013.

(51) Int. Cl.
*H04W 40/24* (2009.01)
*H04W 84/18* (2009.01)

(56) References Cited

FOREIGN PATENT DOCUMENTS

| WO | WO 2003/063403 | 7/2003 |
|----|----------------|--------|
| WO | WO 2011/053146 | 5/2011 |

\* cited by examiner

| 0 | Time slot |
| 5,6 | Commands to nodes 5 and 6 – downlink, sent |
| 1 | Time slot |
| A5 | ACK from node 5 – uplink, received |

| Node 6 | Node 5 | Node 4 | Node 3 | Node 2 | Node 1 | | |
|---|---|---|---|---|---|---|---|
| | 5<br><br>6 | 4<br><br>5,6 | 3<br><br>5,6 | 2<br><br>5,6 | 1<br><br>5,6 | 0<br><br>5,6 | |
| | | | 5<br><br>4 | 4<br><br>4,3 | 3<br><br>4,3 | 2<br><br>4,3 | |
| | | | | | 5<br><br>2 | 4<br><br>1,2 | |
| | | | | | 6<br><br>A2 | 7<br><br>A2 | ACKs for nodes 2,1 |
| | | | 6<br><br>A4 | 7<br><br>A4 | 8<br><br>A4 | 9<br><br>A4 | ACKs for nodes 3,4 |
| | 6<br><br>A6 | 7<br><br>A6 | 8<br><br>A6 | 9<br><br>A6 | 10<br><br>A6 | 11<br><br>A6 | ACKs for nodes 5,6 |

FIG. 9

Channel 10

Channel is changed to 8

Interferer on channel 10

Base Station

Data for device 2

Pipeline
Sensors ▲

Key:

★ Temperature Sensor
● Humidity Sensor
◆ Air Pressure sensor
■ A/C Controller
⌒ Door open/Close
⌣ Window open/close

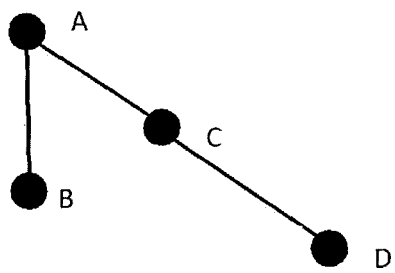
Fig. 60
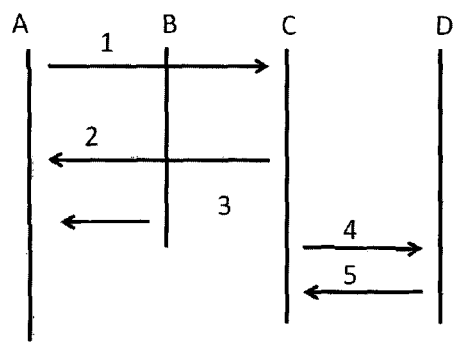
Fig. 61
| 110 | A(down) |  |
| --- | --- | --- |
| 115 |  | C(up) |
| 120 | C(down) | B(up) |
| 125 | D(up) |  |
Fig. 62
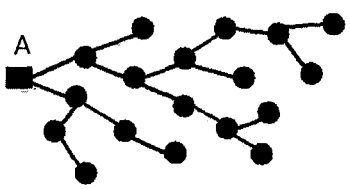
Fig. 63
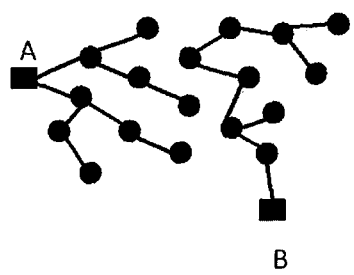
Fig. 64

SYSTEMS, METHODS AND DEVICES FOR NETWORKING OVER A NETWORK

CROSS REFERENCE TO RELATED APPLICATIONS

This application is the National Phase application of International Application No. PCT/AU2013/001046, filed Sep. 13, 2013, which designates the United States and was published in English, which claims priority to U.S. Provisional Application No. 61/700,593, entitled "SYSTEMS, METHODS AND DEVICES FOR NETWORKING OVER A NETWORK," filed on Sep. 13, 2012; U.S. Provisional Application No. 61/794,894, entitled "SYSTEMS, METHODS AND DEVICES FOR NETWORKING OVER A NETWORK," filed on Mar. 15, 2013; U.S. Provisional Application No. 61/832,466, entitled "SYSTEMS, METHODS AND DEVICES FOR NETWORKING OVER A NETWORK," filed on Jun. 7, 2013; and U.S. Provisional Application No. 61/856,441 entitled "SYSTEMS, METHODS, AND DEVICES FOR OBTAINING FEEDBACK INFORMATION TO REVEAL GROUP PREFERENCES," filed Jul. 19, 2013. Each of these applications are incorporated herein by reference in their entirety.

FIELD

Embodiments of the present disclosure relate generally to networks. Certain embodiments relate to systems, methods, and devices used within such networks where at least a substantial portion of the interconnected devices are capable of interacting with one or more neighboring devices to form such a network either with no gateway and/or control point, with a single gateway and/or control point or with a number of gateways and/or control points.

BACKGROUND

Networks are utilized in a number of application areas to route data and/or other information between devices/nodes within the network. For example, mesh networks are used in utility applications to route data and/or other information between utility meters, for example, electrical meters. Some networks allow for substantially continuous connections by retransmitting messages from device-to-device until a destination is reached and some networks allow for reconfigurations around broken or blocked paths by re-routing messages via other devices.

The traditional approach is to create a set of routers that may form a tree, where the leaves are access points. Those routers typically have to be able to maintain high speed links to serve a variety of demanding bandwidth and low-latency applications (such as video). The access point then uses Wi-Fi/WiMax/ZigBee to communicate with the end-devices. This approach may be suitable for applications like the deployment of surveillance cameras, etc.

A different set of emerging applications involves the interconnection of a large number of devices receiving and transmitting relatively small amounts of data. For example, devices that receive and transmit data packet sizes of between 1 bit to 64 bits. Spaces that have this form of problem are, for example, Smart Grid, Home Automation, Building Automation, networks of sensors and controllers and ad-hoc network applications. These types of networks are often referred to as mesh networks. There is a constraint on such mesh networks created by the limited bandwidth of many of the nodes in the mesh network. As routes through the mesh network become longer, the constraint of aggregating data originating from other nodes creates a rapidly decreasing capacity problem for the mesh network as a whole. This is often referred to as the multi-hop problem of mesh networks and represents a restriction on the use of wireless networks in certain application areas.

The access point approaches known in the art are constrained by resource limitations. The number of devices that an access point may manage is limited. Another limitation is the significant overhead associated with an actual payload. In a typical access point based network a node wanting to send 8 bits of data will have to send: 24 bits (minimum number of bits required to distinguish between devices) as a request to send data; the access point will send 32 bits back (24 bits of address plus 8 bits designating the channel/time slot/spreading sequence); then the device will send 32 bits (24 bits of destination address plus 8 bits of data, if source address is suppressed). The access point will then send 56 bits (24 bits of source address, 8 bits of data, 24 bits of destination address) to the next hop. Ignoring the physical layer overhead, such a system operates at $1/11$ of its actual bandwidth between access points and the device and at $1/7$ of the bandwidth between access points.

Accordingly, systems, methods, and devices for solving these and other problems disclosed herein within certain types of networks are desirable. The present disclosure is directed to overcome and/or ameliorate at least one of the disadvantages of the prior art as will become apparent from the discussion herein.

SUMMARY

Certain embodiments relate to a network system comprising: (a) a plurality of devices wherein a substantial portion of the plurality of devices are capable of one or more of the following: transmitting data and receiving data; (b) at least one gateway that is capable of one or more of the following: transmitting data to at least one of the plurality of devices; receiving data from at least one of the plurality of devices; transmitting data to at least one electronic computing device; and receiving data from at least one electronic computing device; wherein the at least one of the plurality of devices is positioned within a distance from the at least one gateway such that the distance allows communication between the at least one gateway and the at least one of the plurality of devices; wherein the distance between devices allows communication between at least one device and at least one other device; wherein a substantial portion of the plurality of devices are able to communicate with at least one other device within the network and the at least one gateway within the network is capable of handling at least 100, 500, 2000, 10,000, 100,000 or 1,000,000 devices without the need for additional infrastructure. A substantial portion of the plurality of devices means at least 60%, 70%, 80%, 85%, 90%, 95%, 98%, 99%, 99.5% or 99.8% of the devices in the network system. Additional infrastructure means one or more of the following: access points, bridges, hubs, hot spots, repeaters and routers. By minimizing the need for further infrastructure the costs for extending the network by additional devices is reduced. In certain embodiments, the ability for the network to handle at least 100, 500, 2000, 10,000, 100,000 or 1,000,000 devices without the need for additional infrastructure may be attributable to the networks ability to route packets with limited headers (or no headers). By limiting and/or avoiding headers the overall amount of data that may need to be transmitted and/or received by the devices within the network is reduced so that the net available bandwidth for moving the data within the network is significantly increased. For example, in certain embodiments, the devices may be configured to receive data at a predefined time (e.g., time slot X), append its own data at a predefined time (e.g., time slot Y), remain asleep for a predefined amount of time, and/or wake-up at a predefined time. Thus, limiting and/or avoiding the need for headers in the data being transmitted and/or received within the network. In certain embodiments, these predefined times may be known to the network.

Certain embodiments that might show in addition to the features of the before described embodiments or alternatively to them the following features relate to a network system comprising: (a) a plurality of devices wherein a substantial portion of the plurality of devices are capable of one or more of the following: transmitting data and receiving data; and (b) at least one gateway that is capable of one or more of the following: transmitting data to at least one of the plurality of devices; receiving data from at least one of the plurality of devices; transmitting data to at least one electronic computing device; and receiving data from at least one electronic computing device; wherein the distance between devices allows communication between at least one device and at least one other device; wherein a substantial portion of the plurality of devices are able to communicate with at least one other device within the network and the at least one gateway within the network is capable of handling at least 100, 500, 2000, 10,000, 100,000 or 1,000,000 devices without the need for additional infrastructure. A substantial portion of the plurality of devices means at least 60%, 70%, 80%, 85%, 90%, 95%, 98%, 99%, 99.5% or 99.8% of the devices in the network system. Additional infrastructure means one or more of the following: access points, bridges, hubs, hot spots, repeaters and routers. By minimizing the need for further infrastructure the costs for extending the network by additional devices is reduced. The ability for the network to handle at least 100, 500, 2000, 10,000, 100,000 or 1,000,000 devices without the need for additional infrastructure may be attributable at least in part to the networks ability to route packets with limited headers (or no headers). By limiting and/or avoiding headers the overall amount of data that may need to be transmitted and/or received by the devices within the network is reduced so that the net available bandwidth for moving the data within the network is significantly increased. For example, in certain embodiments, the devices may be configured to receive data at a predefined time (e.g., time slot X), append its own data at a predefined time (e.g., time slot Y), remain asleep for a predefined amount of time, and/or wake-up at a predefined time. Thus, limiting and/or avoiding the need for headers in the data being transmitted and/or received within the network. In certain embodiments, these predefined times may be known to the network.

Certain embodiments that might show in addition to the features of the before described embodiments or alternatively to them the following features, are to a network system comprising: (a) a plurality of devices wherein a substantial portion of the plurality of devices are capable of one or more of the following: transmitting data and receiving data; and (b) at least one gateway that is capable of one or more of the following: transmitting data to at least one of the plurality of devices; receiving data from at least one of the plurality of devices; transmitting data to at least one electronic computing device; and receiving data from at least one electronic computing device; wherein the distance between devices allows communication between at least one device and at least one other device; wherein a substantial portion of the plurality of devices are able to communicate with at least one other device within the network; wherein the network is capable of handling at least 100, 500, 2000, 10,000, 100,000 or 1,000,000 wireless devices; and wherein the plurality of devices, the at least one gateway and the at least one computing device form the network without the need for additional infrastructure. A substantial portion of the plurality of devices means at least 60%, 70%, 80%, 85%, 90%, 95%, 98%, 99%, 99.5% or 99.8% of the devices in the network system. Additional infrastructure means one or more of the following: access points, bridges, hubs, hot spots, repeaters and routers. By minimizing the need for further infrastructure the costs for extending the wireless network by additional devices is reduced.

Certain embodiments that might show in addition to the features of the before described embodiments or alternatively to them the following features are to a network system comprising: (a) a plurality of devices capable of transmitting and/or receiving data; (b) at least one gateway capable of transmitting and/or receiving data; and (c) at least one electronic computing device capable of transmitting and/or receiving data; wherein the ratio of available bandwidth to the net pay load of a substantial portion of the network system is between 50 to 200, 200 to 1000, 300 to 5000, 200 to 200,000, 200 to 2 million, 2 Million to 1 billion or 1 billion to 100 billion. A substantial portion of the network means at least 60%, 70%, 80%, 85%, 90%, 95%, 98%, 99%, 99.5% or 99.8% of the network system. The ability for the network to have a ratio of available bandwidth to the net pay load of between 50 to 200, 200 to 1000, 300 to 5000, 200 to 200,000, 200 to 2 million, 2 million to 1 billion or 1 billion to 100 billion may be attributable at least in part to the networks ability to route packets with limited headers (or no headers). By limiting and/or avoiding headers the overall amount of data that may need to be transmitted and/or received by the devices within the network is reduced so that the ratio of available bandwidth to the net pay load within the network is significantly increased. For example, in certain embodiments, the devices may be configured to receive data at a predefined time (e.g., time slot X), append its own data at a predefined time (e.g., time slot Y), remain asleep for a predefined amount of time, and/or wake-up at a predefined time. Thus, limiting and/or avoiding the need for headers in the data being transmitted and/or received within the network. In certain embodiments, these predefined times may be known to the network.

Certain embodiments that might show in addition to the features of the before described embodiments or alternatively to them the following features are to a network system for distributing digital data to and/or from a plurality of devices over a wireless mesh network comprising: (a) at least one electronic computing device for operating the mesh network; (b) at least one gateway device; and (c) a plurality of preconfigured routes within the network wherein the routes are comprised of one or more devices; wherein the system is configured such that a substantial portion of the plurality of preconfigured routes are capable of handling at least 50 hops between the at least one gateway and the series of devices making up a particular route. A substantial portion of the plurality of preconfigured routes means at least 60%, 70%, 80%, 85%, 90%, 95%, 98%, 99%, 99.5% or 99.8% of the routes. The ability for the network to handle such a large number of hops may be attributable at least in part to the networks ability to route packets with limited headers (or no headers) using a plurality of preconfigured routes.

Certain embodiments that might show in addition to the features of the before described embodiments or alternatively to them the following features are to network systems, wherein the system is capable of handling at least 50, 100, 200, 300, 500, 1000, 5000, 10,000 or 50,000 hops between the at least one gateway and the series of devices making up the at least one route without substantially increasing transmission overhead. Without substantially increasing transmission overhead means that the system is able to route packets with no or substantially no headers. This leads to the positive effect that the amount of additional data (e.g., headers, etc.) transmitted and/or received is not, or at least not significantly, increased when the data is moved from one device to another device and so forth via a path that includes such a large number of hops.

Certain embodiments that might show in addition to the features of the before described embodiments or alternatively to them the following features relate to network systems wherein a majority of the preconfigured routes between the at least one gateway and corresponding plurality of devices comprises at least 50, 100, 200, 300, 500, 1000, 5000, 10,000 or 50,000 hops. This leads to the positive effect that the amount of additional data (e.g., headers, etc.) transmitted and/or received is not, or at least not significantly, increased when the data is moved from one device to another device and so forth via a preconfigured route that includes such a large number of hops.

Certain embodiments that might show in addition to the features of the before described embodiments or alternatively to them the following features are to network systems, wherein the network is a substantially wireless network. Substantially wireless network means that at least 50%, 60%, 70%, 80%, 90%, 95%, 98% or 99% of the devices within the network may communicate via one or more wireless configurations. Substantially wireless network may also mean that between 50% to 100%, 50% to 99%, 50% to 70%, 60% to 90%, 70% to 95%, 95% to 100% or 95% to 99% of the devices within the network may communicate via one or more wireless configurations. Certain embodiments that might show in addition to the features of the before described embodiments or alternatively to them the following features are to network systems, wherein additional infrastructure includes one or more of the following: access points, bridges, hubs, hot spots, repeaters and routers.

Certain embodiments that might show in addition to the features of the before described embodiments or alternatively to them the following features are to methods for distributing digital data to and/or from a plurality of devices over a network comprising: receiving and/or transmitting digital data via at least one gateway in the network; generating one or more digital data packets from the digital data suitable for transmission over the network; and performing one or more of the following: transmitting the one or more digital data packets via the at least one gateway to a plurality of devices connected via a suitable topology; and receiving the one or more digital data packets from the plurality of devices connected via a suitable topology to the at least one gateway. Suitable topology means one or more of the following: mesh, tree and star topology.

Certain embodiments that might show in addition to the features of the before described embodiments or alternatively to them the following features are to methods further comprising receiving data from the plurality of devices via a transmitting of the data in a hopping fashion from one device to another device until the data is received at the least one gateway. Certain embodiments are to a plurality of devices where a portion of the devices performs one or more of the following: transmits at predefined times a predefined amount of data using a predefined resource; receives at predefined times a predefined amount of data using a predefined resource; and transmits at predefined times a predefined amount of data using a predefined resource and receives at predefined times a predefined amount of data using a predefined resource; thus allowing for one or more of the following: addressing and/or routing information to be substantially absent in the data transmitted to the portion of the devices and/or received from the portion of the devices; substantially avoiding interference and collisions within the network; enter into substantially low power consumption mode between predefined times. A portion of the devices means at least 30%, 40%, 50%, 60%, 70%, 80% or 85% of the devices in the network system. Addressing and/or routing information being substantially absent in the data transmitted may mean one or more of the following no source address, no destination address, no information regarding nodes the data (received packet) traveled through, no information regarding the intermediate destination of the data, no information regarding nodes reachable via an individual node, no information regarding nodes unreachable via the individual node, no information regarding number of hops to a second individual nodes, no information regarding number of hops from a third individual node, substantially no source address, substantially no destination address, substantially no information regarding nodes the data (received packet) traveled through, substantially no information regarding the intermediate destination of the data, substantially no information regarding nodes reachable via an individual node, substantially no information regarding nodes unreachable via the individual node, substantially no information regarding number of hops to a second individual nodes and substantially no information regarding number of hops from a third individual nod. Substantially avoiding interference and collisions within the network may mean one or more of the following: using frequency channel different to the frequency channel used by intentional, unintentional interferer or possible, offsetting the frequency channel used from the frequency channel used by intentional, unintentional or possible interferer, using different or substantially different CDMA sequence to that of intentional, unintentional or possible interferer, using different or substantially different frequency hopping sequence to that of intentional, unintentional or possible interferer, using different or substantially different FDD bins to that of intentional, unintentional or possible interferer, changing frequency channels on subsequent transmissions/receptions, alternating frequency channels on subsequent transmissions/receptions, changing frequency channels on one or more subsequent transmissions/receptions within a period, alternating frequency channels on subsequent transmissions/receptions within a period, changing CDMA sequence on subsequent transmissions/receptions, alternating CDMA sequence on subsequent transmissions/receptions, changing CDMA sequence on one or more subsequent transmissions/receptions within a period, alternating CDMA sequence on subsequent transmissions/receptions within a period, changing frequency hopping sequence on subsequent transmissions/receptions, alternating frequency hopping sequence on subsequent transmissions/receptions, changing frequency hopping sequence on one or more subsequent transmissions/receptions within a period, alternating frequency hopping sequence on subsequent transmissions/receptions within a period, changing FDD bins sequence on subsequent transmissions/receptions, alternating FDD bins on subsequent transmissions/receptions, changing FDD bins on one or more subsequent transmissions/receptions within a period and alternating FDD bins on subsequent transmissions/ receptions within a period. Enter into substantially low power consumption mode between predefined times may mean one or more of the following: consuming less than 1 micro Amp, consuming less than 100 nA, consuming less than 10 nA, consuming less than 5 micro VA, consuming less than 1 micro VA, consuming less than 500 nano VA, consuming less than 100 s. nano VA, consuming less than 1% of peak current consumption, consuming less than 1% of peak power consumption, consuming less than 0.5% of peak current consumption, consuming less than 0.5% of peak power consumption, consuming less than 0.1% of peak current consumption, consuming less than 0.1% of peak power consumption, consuming less than 0.01% of peak current consumption and consuming less than 0.01% of peak power consumption. In certain embodiments, the ability to avoid interference and collisions and the low power consumption may be attributable to the networks ability to route packets with limited headers (or no headers).

Certain embodiments that might show in addition to the features of the before described embodiments or alternatively to them the following features are to a plurality of devices where a portion of the devices performs one or more of the following: transmits at predefined times a predefined amount of data using a predefined resource; receives at predefined times a predefined amount of data using a predefined resource; and transmits at predefined times a predefined amount of data using a predefined resource and receives at predefined times a predefined amount of data using a predefined resource; thus allowing for one or more of the following: addressing and/or routing information to be substantially absent in the data transmitted to the portion of the devices and/or received from the portion of the devices; substantially avoiding interference and collisions within the network; and allowing the network to be scalable from 5, 10, 20 or 50 devices to 100, 500, 1000, 10,000, 50,000, 100,000, 500,000, 1,000,000 or 10,000,000 devices without substantial additional infrastructure. A portion of the devices means at least 30%, 40%, 50%, 60%, 70%, 80% or 85% of the devices in the network system. Addressing and/or routing information being substantially absent in the data transmitted may mean one or more of the following no source address, no destination address, no information regarding nodes the data (received packet) traveled through, no information regarding the intermediate destination of the data, no information regarding nodes reachable via an individual node, no information regarding nodes unreachable via the individual node, no information regarding number of hops to a second individual nodes, no information regarding number of hops from a third individual node, substantially no source address, substantially no destination address, substantially no information regarding nodes the data (received packet) traveled through, substantially no information regarding the intermediate destination of the data, substantially no information regarding nodes reachable via an individual node, substantially no information regarding nodes unreachable via the individual node, substantially no information regarding number of hops to a second individual nodes and substantially no information regarding number of hops from a third individual node means Substantially avoiding interference and collisions within the network may mean one or more of the following: using frequency channel different to the frequency channel used by intentional, unintentional interferer or possible, offsetting the frequency channel used from the frequency channel used by intentional, unintentional or possible interferer, using different or substantially different CDMA sequence to that of intentional, unintentional or possible interferer, using different or substantially different frequency hoping sequence to that of intentional, unintentional or possible interferer, using different or substantially different FDD bins to that of intentional, unintentional or possible interferer, changing frequency channels on subsequent transmissions/receptions, alternating frequency channels on subsequent transmissions/receptions, changing frequency channels on one or more subsequent transmissions/receptions within a period, alternating frequency channels on subsequent transmissions/receptions within a period, changing CDMA sequence on subsequent transmissions/receptions, alternating CDMA sequence on subsequent transmissions/receptions, changing CDMA sequence on one or more subsequent transmissions/receptions within a period, alternating CDMA sequence on subsequent transmissions/receptions within a period, changing frequency hopping sequence on subsequent transmissions/receptions, alternating frequency hopping sequence on subsequent transmissions/receptions, changing frequency hopping sequence on one or more subsequent transmissions/receptions within a period, alternating frequency hopping sequence on subsequent transmissions/receptions within a period, changing FDD bins sequence on subsequent transmissions/receptions, alternating FDD bins on subsequent transmissions/receptions, changing FDD bins on one or more subsequent transmissions/receptions within a period and alternating FDD bins on subsequent transmissions/receptions within a period means. Enter into substantially low power consumption mode between predefined times may mean one or more of the following: consuming less than 1 micro Amp, consuming less than 100 nA, consuming less than 10 nA, consuming less than 5 micro VA, consuming less than 1 micro VA, consuming less than 500 nano VA, consuming less than 100. nano VA, consuming less than 1% of peak current consumption, consuming less than 1% of peak power consumption, consuming less than 0.5% of peak current consumption, consuming less than 0.5% of peak power consumption, consuming less than 0.1% of peak current consumption, consuming less than 0.1% of peak power consumption, consuming less than 0.01% of peak current consumption and consuming less than 0.01% of peak power consumption. means. Additional infrastructure means one or more of the following: access points, bridges, hubs, hot spots, repeaters and routers. The ability for the network to be scalable from 5, 10, 20 or 50 devices to 100, 500, 1000, 10,000, 50,000, 100,000, 500,000, 1,000,000 or 10,000,000 devices without substantial additional infrastructure may be attributable at least in part to the networks ability to route packets with limited headers (or no headers).

Certain embodiments that might show in addition to the features of the before described embodiments or alternatively to them the following features are to a plurality of devices where a portion of the devices performs one or more of the following: transmits data and receives data and one or more of the following is predefined: transmission times, amounts of data, network resources used to transmit and/or receive; thus allowing for one or more of the following: addressing and/or routing information to be substantially absent in the data transmitted to the portion of the devices and/or received from the portion of the devices; substantially avoiding interference and collisions within the network; and the system is able to handle at least 50, 100, 200, 300, 500, 1000, 5000 or 10,000 hops between the series of devices making up the at least one route. The ability for the network to handle at least 50, 100, 200, 300, 500, 1000, 5000 or 10,000 hops may be at least in part able to the networks ability to route packets with limited or minimal addressing and/or routing information. By limiting and/or avoiding addressing and/or routing information the overall amount of data that may be transmitted and/or received by the devices within the network is reduced so that the net available bandwidth for moving the data within the network is significantly increased. This leads to the positive effect that the amount of additional data (e.g., headers, etc.) transmitted and/or received is not, or at least not significantly, increased when the data is moved from one device to another device via a route that includes such a large number of hops.

Certain embodiments that might show in addition to the features of the before described embodiments or alternatively to them the following features are to a plurality of devices where a portion of the devices performs one or more of the following: transmits data and receives data and one or more of the following is predefined: transmission times, amounts of data, network resources used to transmit and/or receive; thus allowing for one or more of the following: addressing and/or routing information to be substantially absent in the data transmitted to the portion of the devices and/or received from the portion of the devices; substantially avoiding interference and collisions within the network; and a ratio of the amount of data originating at the individual device and/or transmitted for use by the individual device to a bandwidth available at the at least one gateway to be between 10% to 0.00001%, 5% to 0.0001%, 1% to 0.001%, 0.1% to 0.0001%, 0.003% to 0.012%, 0.0003% to 0.0012%, 1% to 0.0003% or 0.00003% to 0.0015%.

Certain embodiments that might show in addition to the features of the before described embodiments or alternatively to them the following features are to a plurality of devices where a portion of the devices performs one or more of the following: transmits data and receives data and one or more of the following is predefined: transmission times, amounts of data, network resources used to transmit and/or receive; thus allowing for one or more of the following: addressing and/or routing information to be substantially absent in the data transmitted to the portion of the devices and/or received from the portion of the devices; substantially avoiding interference and collisions within the network; and a substantial portion of the plurality of devices perform substantially no networking related functions.

Also disclosed are computer programming instructions adapted to cause a processing system to carry out these methods which may be embodied within a non-transitory computer readable storage medium.

As well as the embodiments discussed in the summary, other embodiments are disclosed in the specification, drawings and claims. The summary is not meant to cover each and every embodiment; combination or variations are contemplated with the present disclosure.

BRIEF DESCRIPTION OF THE FIGURES

These and other features, aspects, and advantages of the present disclosure will be better understood with regard to the following description, appended claims, and accompanying figures where:

FIG. 9 illustrates in an exemplary six hop process, according to certain embodiments.

FIG. 60 depicts an exemplarily routing of a part of a network.

FIG. 61 depicts an exemplarily packet exchange in the part of the network shown in FIG. 60.

FIG. 62 depicts exemplarily resource allocation for devices on the network.

FIG. 63 depicts an exemplarily network.

FIG. 64 depicts the exemplarily network of FIG. 63 after addition of an additional gateway.

DESCRIPTION

Figure 1:
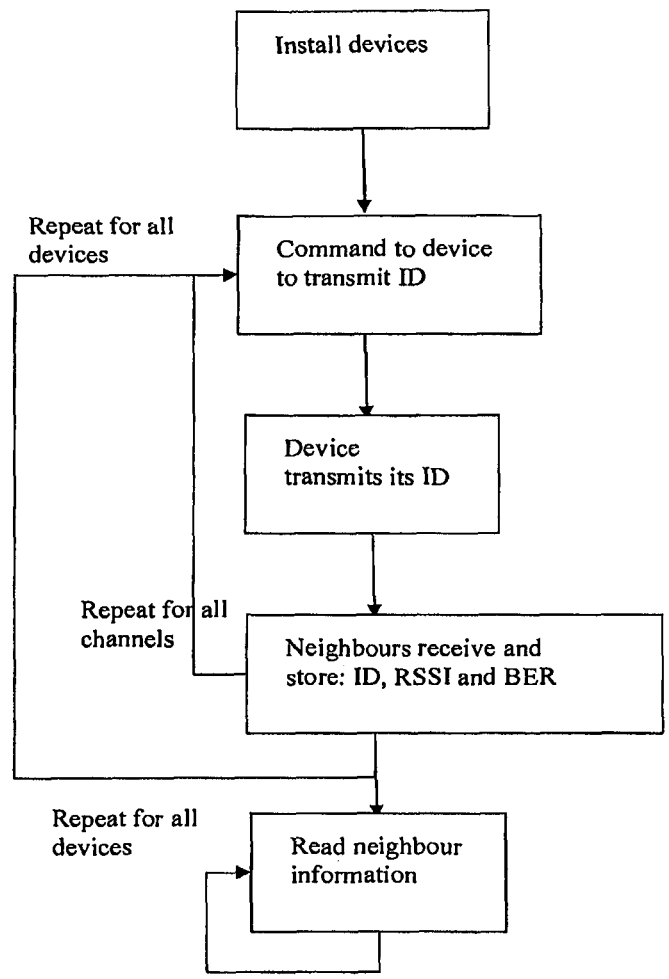
FIG. 1 shows an exemplary flow process for the initialization stage of the nodes in the network, according to certain embodiments.

The present disclosure is described in further detail with reference to one or more embodiments, some examples of which are illustrated in the accompanying drawings. The examples and embodiments are provided by way of explanation and are not to be taken as limiting to the scope of the disclosure. Furthermore, features illustrated or described as part of one embodiment may be used by themselves to provide other embodiments and features illustrated or described as part of one embodiment may be used with one or more other embodiments to provide further embodiments. The present disclosure covers these variations and embodiments as well as other variations and/or modifications.

The term "comprise" and its derivatives (e.g., comprises, comprising) as used in this specification is to be taken to be inclusive of features to which it refers, and is not meant to exclude the presence of additional features unless otherwise stated or implied.

In certain embodiments, the term "managing the network" may mean one or more actions that may be performed to create, maintain, operate, and/or obtain information about the network, including as needed or desired upgrading firmware on one or more of the following: one or more individual devices, one or more gateways, one or more access points and one or more routers.

In certain embodiments, the term "broken link" may refer to a link between at least one first participant and at least one second participant, where the link has existed or was assumed to exist, and is then considered to be of insufficient quality. Participant may be one or more of the following: a device, a gateway, a router, access point and some other participant.

The features disclosed in this specification (including accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features.

The subject headings used in the detailed description are included for the ease of reference of the reader and should not be used to limit the subject matter found throughout the disclosure or the claims. The subject headings should not be used in construing the scope of the claims or the claim limitations.

Certain embodiments disclosed herein may be mesh networks, wireless networks, networks that have both wired devices/nodes and wireless devices/nodes, networks that have both wired gateways and wireless gateways, networks that have wireless gateways, networks wherein a substantial portion of the devices and/or gateways are wireless, networks wherein a portion of the devices and/or gateways are wireless, or combinations thereof.

In certain embodiments, a central computer, or a plurality of computing devices, may be used to set the predefined times, the predefined resources and/or the predefined amounts of data. In certain embodiments, a central computer, at least two central computers, a cloud computing resource, one or more processors and/or a plurality of computing devices may be used to set the predefined times, the predefined resources and/or the predefined amounts of data.

In certain embodiments, predefined times may mean predefined time slots, predefined time slots within a period, predefined time intervals or predefined time frames. The computer devices that are used herein may be based on separate computers, handheld devices and/or cloud computing resources. In certain embodiments, the computer functions may be performed by at least one gateway, at least one access point, at least one router, and, in certain instances by one or more individual devices within the network or combinations thereof. Where the computing function is positioned relative to the network and/or system may vary significantly depending on the particular embodiment. For example, in certain embodiments, one or more functions performed by the central computer may be portioned or segmented among a number of computing devices. For example, in certain embodiments, the computing functions may be distributed such that route allocation, resource allocation, security functions, other desired function or combinations thereof may be divided between a number of computing devices. For example, a central computer, at least two central computers, a cloud computing resource, one or more processors and/or a plurality of computing devices may be used. Furthermore, the central computer, or the plurality of computing devices, may be used to configure one network, one system, at least one network, at least one system, multiple networks, multiple systems and so forth. The predefined time, predefined resource and/or predefined amount of data are typically determined at configuration stage or at reconfiguration (self-healing) stage.

The predefined time typically may be related to a time period, for example, one or more individual devices may be configured to perform certain actions at times equal to 10, 30, 50 and 80 msec in a period of 100 msec. This means that the individual device may perform those actions at times equal to 10, 30, 50, 80, 110, 130, 150, 180 msec and so forth. However, other ways of defining the predefined time are also possible; for example, next time is equal to current time plus 10 msec.

Time slot notation may be used instead of "predefined time." For example, if timeslot is 5 msec and current timeslot is 4 and the next action occurs at timeslot 7, then the devices may go to sleep and wake-up after 5*(7−4)=15 msec.

In certain embodiments that might show in addition to the features of the before described embodiments, or alternatively to them the following features, address information is substantially absent in the data transmitted or received means that the number of bits constituting address information is 0 bits, 1 bit, 2 bits, 3 bits or 5 bits. In certain embodiments, address information is substantially absent in the data transmitted or received which means that the average number of bits constituting address information is 0 bits, 1 bit, 2 bits, 3 bits or 5 bits. In certain embodiments, address information is substantially absent in the data transmitted or received which means that the number of bits constituting address information is 0 to 5 bits, 0 to 4 bits, 1 to 5 bits, 2 to 6 bits, 2 to 4 bits or 3 to 5 bits.

In certain embodiments that might show in addition to the features of the before described embodiments or alternatively to them the following features, communication may mean two way communications between two or more devices, wherein a first device is capable of transmitting first data and a second device is capable of receiving first data and the second device is capable of transmitting second data and the first device is capable of receiving second data. The first data and second data may be the same data, substantially the same data or different data.

In certain embodiments that might show in addition to the features of the before described embodiments or alternatively to them the following features, communication may mean one way communication between two or more devices, wherein a first device is capable of transmitting data and a second device is capable of receiving data.

FIGS. 16 to 25 depict network topologies of certain embodiments. These figures are exemplary and the depicted topologies may be easily expanded to larger and/or much larger networks. It is possible to have combinations of the depicted topologies in one system.

Figure 13:
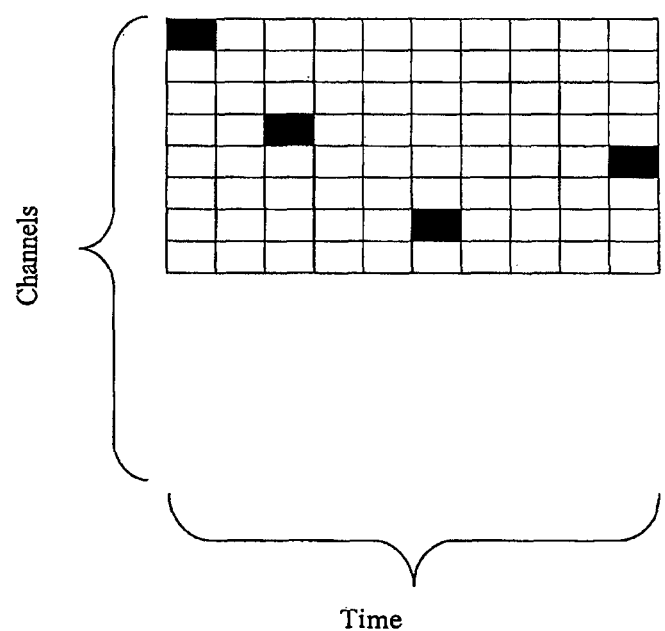
FIG. 13 illustrate an exemplary; substantially even resource allocation for a particular device, according to certain embodiments.

FIG. 13 illustrates exemplary resource allocation for an individual device. The allocation is done on the time-channel space; however, other resource spaces may be used. Examples are: time-CDMA codes, time-channel-CDMA code, time-TDD, time-channel-TDD, time-channel-frequency hopping sequence, time-channel-CMDA code-frequency hopping sequence, time-CDMA code offset or combinations of thereof.

Table 10 depicts an exemplary configuration table of an individual device. The individual device wakes-up, performs an action and goes to sleep until next predefined time (next action). RF channel is used as predefined resource in this example. The amount of bytes to be read is defined by offset and length column and the amount of bytes to be appended to transmitted data is defined by length column.

TABLE 10

| Period = 100 msec | | | | |
| --- | --- | --- | --- | --- |
| Time [msec] | RF channel | Action | Offset | Length (bytes) |
| 10 | 3 | Receive_down | 5 | 2 |
| 45 | 5 | Send_down | | |
| 67 | 4 | Receive_up | | |
| 76 | 6 | Append_data | | 3 |
| 87 | 7 | Maint_tx | | |
| 97 | 7 | Maint_rx | | |

In certain embodiments that might show in addition to the features of the before described embodiments or alternatively to them the following features, the address of individual devices and/or the routing information is established and/or derived based on a set of information pertaining to at least a portion of the system, and the set of information includes one or more of the following: one or more predefined times, one or more predefined amounts of data and one or more predefined resources. As an example, the central computer or processor will know that 3 bytes of data received at time=34 msec, at offset 7 was sent by device with ID of 0x13645343.

In certain embodiments that might show in addition to the features of the before described embodiments or alternatively to them the following features, more complex rules may be used, for example, the RF channel to be used in the next time slot may be calculated using a formula.

In certain embodiments that might show in addition to the features of the before described embodiments or alternatively to them the following features, the predefined rule may be expressed as a formula, for example next_RF_channel=(current_RF_channel+1) modulo 10; or as a set of computer instructions.

In certain embodiments that might show in addition to the features of the before described embodiments or alternatively to them the following features, a substantial portion of the individual devices transmit and/or receive for a predefined period of time. For example, the device may be instructed to transmit for 0.1 msec., 0.5 msec., 1 msec., 3 msec., 5 msec., 7 msec. or 10 msec. The amount of transmitted data is the function of selected data rate, which may vary depending on the quality of the RF link.

In certain embodiments that might show in addition to the features of the before described embodiments or alternatively to them the following features, the amount of data is substantially the same and/or variable. For example, the individual device may be preconfigured to append between 5 to 7 bits. The actual number of bits may be determined by the device.

In certain embodiments that might show in addition to the features of the before described embodiments or alternatively to them the following features, a resource is substantially the same and/or variable. For example, the device may be preconfigured to transmit at offsets between 1020 to 1030 in the CDMA code. The actual offset at which device transmits may be determined by the device.

In certain embodiments that might show in addition to the features of the before described embodiments or alternatively to them the following features, gateway is the device that connects at least one other device to another typically higher bandwidth media. Examples of gateway are:

LAN connected device connecting wireless devices, converting LAN packets into wireless protocol, for example, embedding data intended to a particular device in a particular offset in the particular time slot cellular base-station.

In certain embodiments that might show in addition to the features of the before described embodiments or alternatively to them the following features, access point is the device that is used to extend existing wireless network, for example, Wi-Fi access point.

In certain embodiments that might show in addition to the features of the before described embodiments or alternatively to them the following features, the intentional radiator is a device that intentionally uses the resource shared by a device on the network, for example, ZigBee device transmitting on the same RF channel.

In certain embodiments that might show in addition to the features of the before described embodiments or alternatively to them the following features, non-intentional radiator is a device that uses a different resource but creates interference on another resource, for example, device transmitting at RF channel number 6 and creating interference on channel number 7.

Figure 51:
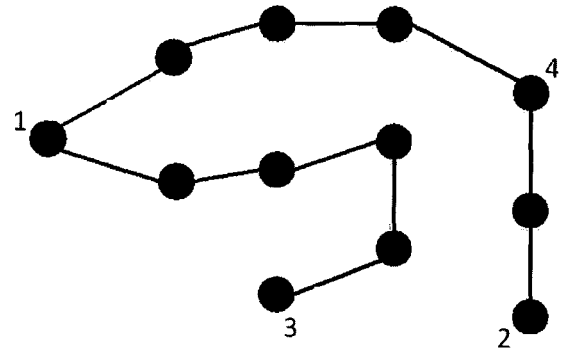
FIG. 51 shows a network where devices are preconfigured and there is no gateway, according to certain embodiments.

FIG. 51 illustrates certain embodiments that might show in addition to the features of the before described embodiments or alternatively to them the following features where the devices are preconfigured and there is no gateway. These embodiments may be used with one or more of the devices, systems and/or methods disclosed herein. In FIG. 51, device 1 originates data packets at predefined times or time slots, device 3 extracts the command based on its configuration.

Figure 52:
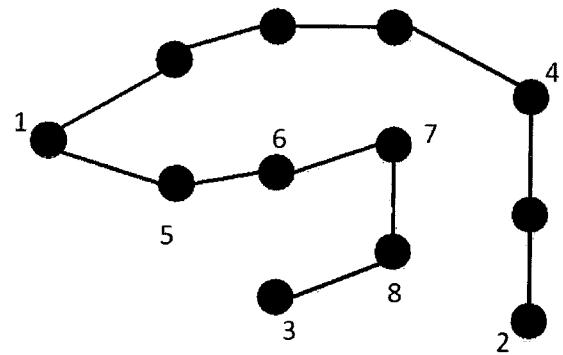
FIG. 52 illustrates a network where the routes are preconfigured and a portion of the plurality of devices forming the network may know sequence of the devices forming a route, according to certain embodiments.

FIG. 52 illustrates certain embodiments that might show in addition to the features of the before described embodiments or alternatively to them the following features wherein the routes within the network are preconfigured and a portion of the plurality of devices forming the network may know sequence of the devices forming a route, as an example, device 6 may know that its route is 1-5-6-7-8-3. In certain embodiments, the routes within the network may be substantially preconfigured. These embodiments may be used with one or more of the devices, systems and/or methods disclosed herein. In the exemplarily embodiment illustrated in FIG. 52, device 6 receives data from devices 1 and 5 and knowing the sequence may extract the data. Device 3 will receive data from devices 1,5,6,7. In another exemplarily embodiment (not illustrated), device 3 may be configured to receive data form device 5. Device 3 may be configured to know that device 5 is second in the route. In another exemplarily embodiment (not illustrated), the data transmitted by devices may be variable and delimited using delimiters. In another exemplarily embodiment, the delimiter may follow by a number of devices that had no data to send. For example, the network may have two delimiters: "D" and "H." Delimiter D is used when data is following and delimiter H is used when the device has nothing to send. Taking the route of FIG. 52 as an example, assume that only devices 6 and 8 have data to transmit, device 3 will receive the following packet: [H,2,D,data_6,H,data8], where data_6 is data from device 6 and data_8 is data from device 8. Device 3 may parse the data knowing the sequence of the devices on the route.

In another exemplarily embodiment (not illustrated), devices may be constantly listening on a channel and data packet may be transmitted at any time or suitable times. In another exemplarily embodiment (not illustrated), devices may be listening at least 50%, 60%, 70%, 80%, 90%, 95% or 99% of the time on a channel and data packet may be transmitted at suitably selected times, at transmission times that are not predetermined or combinations thereof.

In another exemplarily embodiment, signatures may be used to determine transmitting devices, for example, device 3 (in FIG. 52) will receive the following packet: [data_6,D, data_8, S6 XOR S8], where S6 is signature of device 6 and S8 is signature of device 8.

Figure 47:
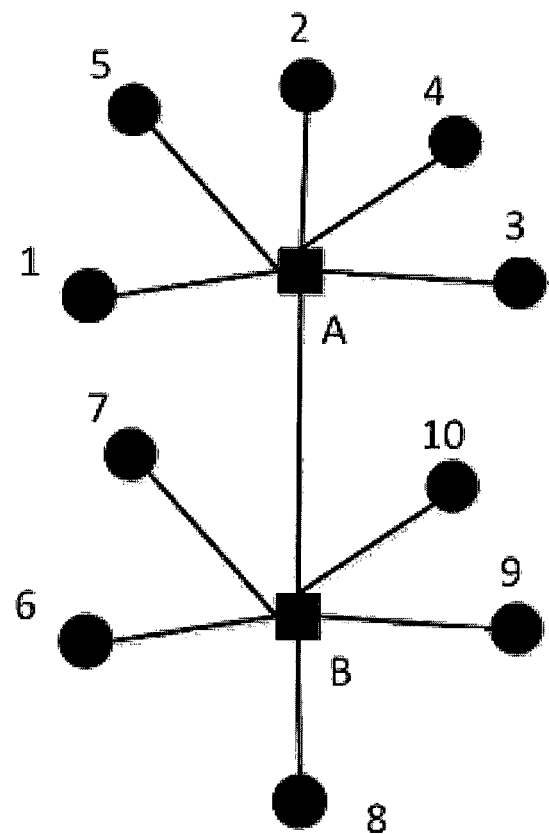
FIG. 47 shows interconnected star networks, according to certain embodiments.

FIG. 47 shows a network of the existing art, where two star interconnected networks are connected. The network is comprised of devices that are capable of transmitting and/or receiving information and routers. The purpose of the routers is to maintain and in some case create a network. In existing art, the network may only be created, maintained and information may flow through the network, if portion or substantial portion, for example 10%, 20%, 50%, 75%, 90%, 95%, 99.9% or 100%, of devices perform network related functions. For example, in existing art, in order to move an information form device 2 to device 8, device 2 needs to append source and/or destination address to the information. The router A then needs to interpret the packet and based on the information contained in the packet, forward the packet to router B. Router B needs to interpret the packet and based on the information contained in the packet, forward the packet to device 8.

In certain embodiments that might show in addition to the features of the before described embodiments or alternatively to them the following features, networking related functions may be one or more of the following:

parsing the received data and retrieving network related information, for example: sender address, destination address, number of hops, routing information and/or combinations thereof, acting based on the retrieved information, for example: storing the retrieved information, forwarding the retrieved information to another device, updating internal routing tables and/or combinations thereof, determining whether data received at an individual device of the plurality of devices needs to be stored at the individual device, based on data received, determining whether received data, or a portion of received data, at the individual device of the plurality of devices needs to be forwarded to another device of plurality of devices, based on received data, determining available routes, determining available routes by analyzing received data, determining available routes by sending data, determining available routes by receiving data, determining whether a transmitted packet was properly received, based at least in part, on subsequent reception of ACK or NACK, determining whether the transmitted packet was properly received, based at least in part, on failure to subsequently receive ACK or NACK, sending ACK based on successful reception, and sending NACK, or no data, based on unsuccessful reception.

In certain embodiments that might show in addition to the features of the before described embodiments or alternatively to them the following features, networking related functions may be something other than sending actual information (received or generated by a device) or sending actual information (received or generated by a device) followed by cryptographic signature.

In certain embodiments that might show in addition to the features of the before described embodiments or alternatively to them the following features, a ratio of the plurality of devices performing at least one networking related function to the plurality of devices performing substantially no networking related functions is between 0 to 0.00000001, 0 to 0.0000001, 0 to 0.000001, 0 to 0.00001, 0 to 0.0001, 0 to 0.001, 0 to 0.01 or 0 to 0.1.

Embedding and/or Altering Network Related Information

Figure 48:
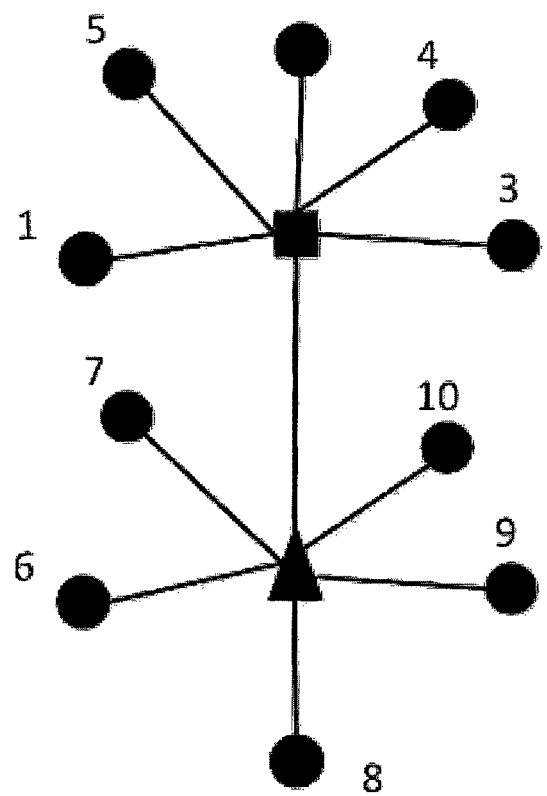
FIG. 48 shows a wireless network with access point, according to certain embodiments.
Figure 48:
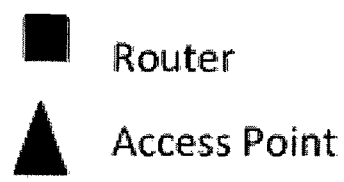

FIG. 48 shows a wireless network comprising of a router and an access point. The access point extends the network. For example, device 8 is connected to a sub-network formed by access point. The access point then routes the traffic coming to and/or coming from device 8.

Figure 49:
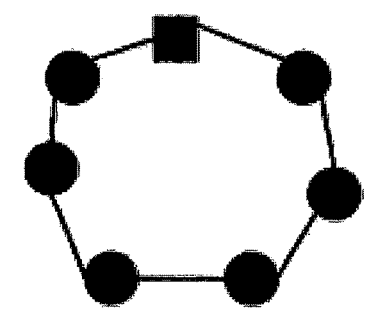
FIG. 49 shows ring topology network, according to certain embodiments.
Figure 49:
Figure 50:
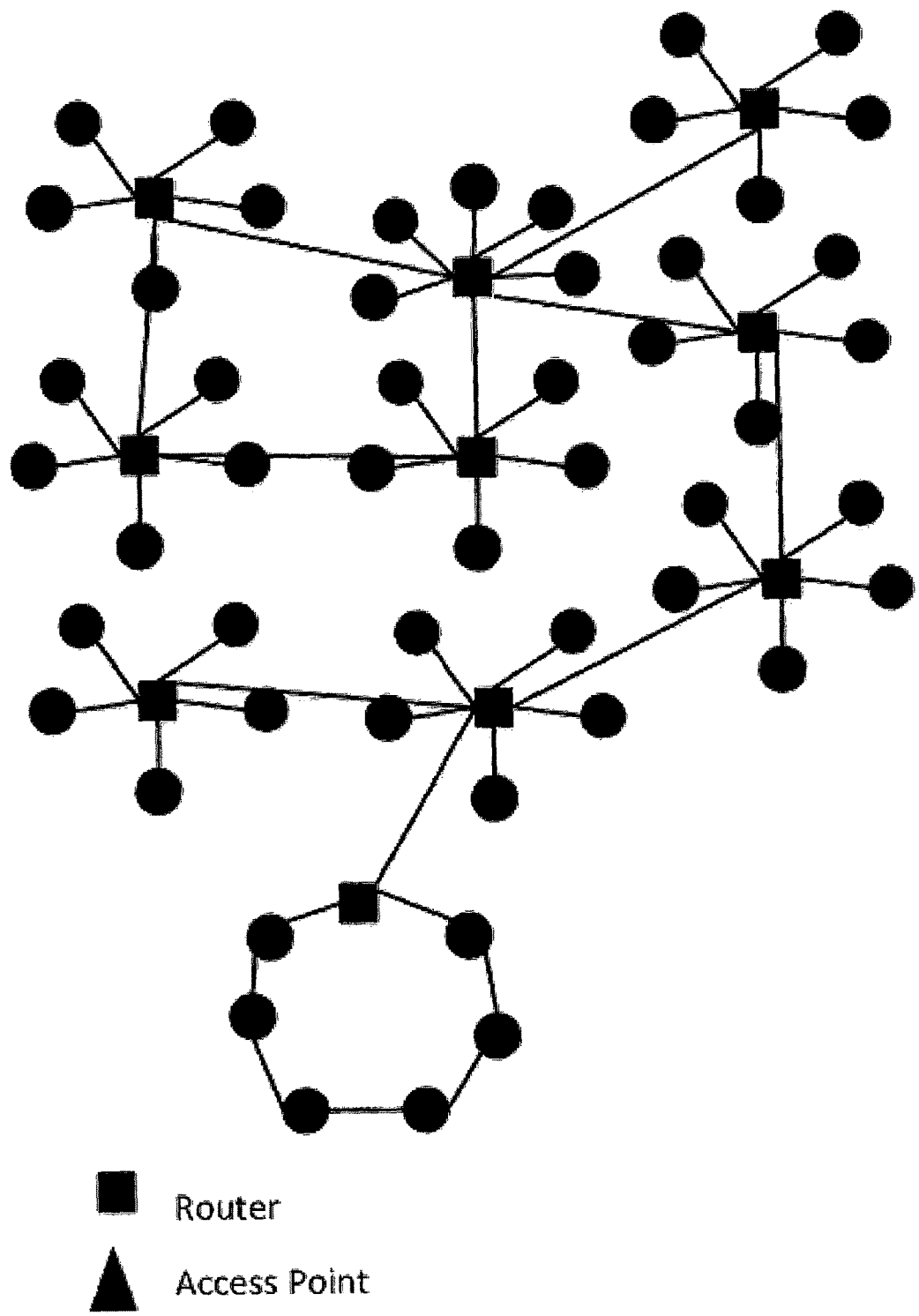
FIG. 50 shows larger scale network, according to certain embodiments.

FIG. 49 shows a ring topology network. The network may be wired or wireless. FIG. 50 shows a larger network with mixed star and ring sub-networks. This type of network may also be referred to as a tree. In the examples, depicted by FIGS. 47 to 50, the routers and access points are network infrastructure devices. In certain embodiments, network infrastructure devices may be one or more of the following: access point, bridge, hub, hot spot, repeater and router.

There are several embodiments where it is desirable to have a network of interconnected devices, wherein a substantial portion of the devices in the network are capable of interacting with at least one neighbouring device and form a mesh network with one or more of the following: no gateway and/or control point a single gateway and/or control point; a single gateway and a plurality of control points; a plurality of gateways and a single control point; or a plurality of gateways and/or control points. Typically, in certain embodiments of these networks at least 50%, 60%, 70%, 80%, 90%, 95%, 98% or 99% of the devices within the network may communicate via one or more wireless configurations. In certain embodiments, between 50% to 100%, 50% to 99%, 50% to 70%, 60% to 90%, 70% to 95%, 95% to 100% or 95% to 99% of the devices within the network may communicate via one or more wireless configurations. Various wireless and/or wired configurations may be used. In certain embodiments, a substantial portion of the devices in the network means that at least 60%, 70%, 80%, 85%, 90%, 95%, 98%, 99%, 99.5% or 99.8% of the devices in the network are capable of interacting with at least one neighbouring device. In certain embodiments, a substantial portion of the devices in the network means that at least 60%, 70%, 80%, 85%, 90%, 95%, 98%, 99%, 99.5% or 99.8% of the devices in the network are capable of interacting with at least two neighbouring devices. In certain embodiments, a substantial portion of the devices in the network means that at least 60%, 70%, 80%, 85%, 90%, 95%, 98%, 99%, 99.5% or 99.8% of the devices in the network are capable of interacting with at least one neighbouring device and forming a network; and the network formed may have one or of the following: no gateway and/or control point; a single gateway and/or control point; and a plurality of gateways and/or control points which are capable of interacting with the mesh network, either from a single control point or from a number of control points. In certain embodiments, a substantial portion of the devices in the network means that at least between 40% to 99.8%, 50% to 70%, 60% to 85%, 70% to 90%, 85% to 98%, 90% to 98%, 95% to 99.5%, 98% to 99.8% or 99% to 99.8% of the devices in the network are capable of interacting with at least one neighbouring device. In certain embodiments, a substantial portion of the devices means between 40% to 99.8%, 50% to 70%, 60% to 85%, 70% to 90%, 85% to 98%, 90% to 98%, 95% to 99.5%, 98% to 99.8% or 99% to 99.8% of the devices in the network are capable of interacting with at least one neighbouring device. In certain embodiments, a substantial portion of the devices means at least 60%, 70%, 80%, 85%, 90%, 95%, 98%, 99%, 99.5% or 99.8% of the devices in the network are capable of interacting with at least one neighbouring device. In certain embodiments, a substantial portion of a plurality of devices means: between 40% to 99.8%, 50% to 70%, 60% to 85%, 70% to 90%, 85% to 98%, 90% to 98%, 95% to 99.5%, 98% to 99.8% or 99% to 99.8% of the plurality of devices in the network are capable of interacting with at least one neighbouring device. In certain embodiments, a substantial portion of a plurality of devices means at least 60%, 70%, 80%, 85%, 90%, 95%, 98%, 99%, 99.5% or 99.8% of the plurality of devices in the network are capable of interacting with at least one neighbouring device. In certain embodiments, each of the devices in the network is capable of interacting with at least one neighbouring device.

Certain embodiments of the mesh networks disclosed herein may have one or more of the following attributes and/or advantages:

1. A substantial portion of the devices may be relatively inexpensive (less than, for example, $10, less than $8, less than $5, less than $2, less than $1 or combinations thereof).

2. A substantial portion of the devices may be power efficient (where ratio of transmit plus receive time to idle time is equal to, for example, 100, 200, 300, 400, 500, 1000, 5000, 10,000, 20,000, 60,000, 90,000, 120,000, 200,000 or 300,000).

3. A substantial portion of the devices may not need to transmit over longer distances (for example, more than 5 m, 10 m, 50 m, 100 m, 400 m, 1 km or combinations thereof). The distance recited herein is a linear distance.

4. A substantial portion of the devices may not need to deal with a complex array of simultaneous channels, for example they may not need to simultaneously receive on multiple channels or dynamically select a channel to receive or transmit on.

5. A substantial portion of the devices may have a ratio of transmit plus receive time to idle time, for example, between 100 to 300,000, 100 to 500, 200 to 1000, 500 to 2000, 1000 to 10,000, 1000 to 5000, 10,000 to 50,000, 40,000 to 120,000, 50,000 to 140,000, 80,000 to 200,000, 120,000 to 300,000 or 160,000 to 350,000.

6. The ability to dynamically and/or simply create an extended network, as extensions to the network, may be achieved by adding more nodes (devices) to the mesh rather than reconfiguring complex and/or powerful transmitters and receivers.

7. Provide self-healing networks, where a failure or a blockage in one network route may be corrected by rerouting through another part of the mesh.

8. Significant reduction in transmission overhead, which may be extensive in cases where small packets of data are sent, thus increasing available bandwidth. For example, the MAC overhead is 0%, less than 10%, less than 5% or less than 1%.

9. Significantly reduce infrastructure costs by eliminating and/or reducing the need for access points and/or routers. For example, the number of other infrastructure devices may be 0%, 0.01%, 0.1%, 0.5%, 1%, 3%, 5% or 10% of the devices on the network. Infrastructure devices means one or more of the following: access points, bridges, hubs, hot spots, repeaters and routers.

10. Significantly reduce infrastructure costs by eliminating and/or reducing the need for devices performing network related functions. For example, the number of devices performing networking related functions may be 0%, 0.01%, 0.1%, 0.5%, 1%, 3%, 5% or 10% of the devices on the network. Infrastructure devices means one or more of the following: access points, bridges, hubs, hot spots, repeaters and routers.

Certain embodiments of the technology of the present, disclosure overcomes and/or ameliorates at least one of the disadvantages of the prior art by managing the system as a whole, creating optimized routes, optimized channel allocation and optimized time slot allocation, eliminating or reducing amount of overhead information (such as addresses, ACK/NACK, routing information) or combinations thereof. Channel and time slot allocations are given as an example. Other forms of resources may be used, for example: spreading sequences, FDD sequences or combination of CDM, FDD, TDM and frequency channel resource slicing. Certain embodiments are also directed to significantly reducing the transmission overhead by suppressing source and destination headers and, in certain embodiments, suppressing request-channel allocation-transmission overhead. This solution is applicable to those networks where the data traffic originating and/or designated for a substantial portion of the nodes are relatively small (so that reducing or eliminating overhead is beneficial), and therefore the solution is applicable to the creation and/or maintenance of mesh networks that deal with large numbers of devices and/or sensors. In certain embodiments, this solution is particularly applicable to those mesh networks where the data traffic originating or designated for each node is relatively small (so that reducing or eliminating overhead is beneficial), and therefore the solution is especially applicable to the creation and maintenance of mesh networks that deal with a large number of devices and/or sensors. In certain embodiments, this solution is applicable to those mesh networks where the data traffic originating or designated for a substantial portion of the nodes is relatively small (so that reducing or eliminating overhead is beneficial), and therefore the solution is especially applicable to the creation and maintenance of mesh networks that deal with a large number of devices and/or sensors. Relatively small data traffic means transmitting and/or receiving packets of 1, 8, 16, 32, 128, 512, 1024 or 16384 bits of data. In certain embodiments, a substantial portion means that the number of nodes within the network is at least 50,000, 100,000, 300,000, 500,000, 700,000, 1,000,000, 1,500,000, 3,000,000, 5,000,000 or more. In certain embodiments, a substantial portion means the number of nodes within the network is between 25,000 to 500,000, 100,000 to 1 million, 250,000 to 600,000, 500,000 to 1 million, 500,000 to 2 million, 700,000 to 2 million, 800,000 to 5 million, 1 million to 10 million or 2 million to 15 million. In certain embodiments, a substantial portion of the nodes means between 40% to 99.8%, 50% to 70%, 60% to 85%, 70% to 90%, 85% to 98%, 90% to 98%, 95% to 99.5%, 98% to 99.8% or 99% to 99.8% of the nodes. In certain embodiments, a substantial portion of the nodes means at least 60%, 70%, 80%, 85%, 90%, 95%, 98%, 99%, 99.5% or 99.8% of the nodes. In certain embodiments, a substantial portion of a plurality of nodes means between 40% to 99.8%, 50% to 70%, 60% to 85%, 70% to 90%, 85% to 98%, 90% to 98%, 95% to 99.5%, 98% to 99.8% or 99% to 99.8% of the plurality of nodes. In certain embodiments, a substantial portion of a plurality of nodes means at least 60%, 70%, 80%, 85%, 90%, 95%, 98%, 99%, 99.5% or 99.8% of the plurality of nodes.

In the prior art, routers (or routing capable devices) would typically figure out the best route based on partial information available to them. In certain embodiments of the present disclosure, the system is managed as a whole in that routes are generated based on at least a substantial portion of the information. In prior art resources (i.e., time slot and frequency) are typically allocated based on random access. Certain embodiments disclosed herein allow the system to be managed as a whole which allows the system to fully utilize resources by eliminating peaks in demand.

The devices and/or sensors that may be used with certain embodiments includes, for example, current sensors, light sensors, humidity sensors, pressure sensors, gas sensors, chemicals sensors, proximity sensors, movement sensors, magnetic (hall effect) sensors, radiation sensors, cameras, scanners, sprinkles, heater controllers, pump controllers, air-conditioning controllers, water supply controllers or combinations thereof. In certain embodiments of the disclosed technology, a device may perform multiply functions, for example, the device may include one of more of the following: measure something, control another device (using dry contacts, wired or wireless communication protocol), monitor something, report measured data back, report anomalies, accept and execute control commands.

Certain embodiments are directed to network systems and/or methods wherein a portion, or a substantial portion, of the devices on the network are treated as a system, which may be automatically configured based on available resources and system requirements. As compared, for example, with known wireless networks that typically need to define MAC (and higher) level protocol and determine routing by network elements.

Certain embodiments that might show in addition to the features of the before described embodiments or alternatively to them the following features are directed to network systems and/or methods wherein the packet exchange and routing is done with zero overhead and no addresses are required. Others are directed to network systems and/or methods wherein the packet exchange and routing is done with zero to substantial little overhead and no addresses may be required, however, addresses may be used if so desired. Others are directed to network systems and/or methods wherein the packet exchange and routing is done with substantially zero overhead and no addresses are required.

Certain embodiments that might show in addition to the features of the before described embodiments or alternatively to them the following features are directed to network systems and/or methods wherein configuration may done based on network resources/realities (i.e., physical location of a plurality of the devices) and/or system requirements (comprised, for example, of a plurality of the devices).

Figure 26:
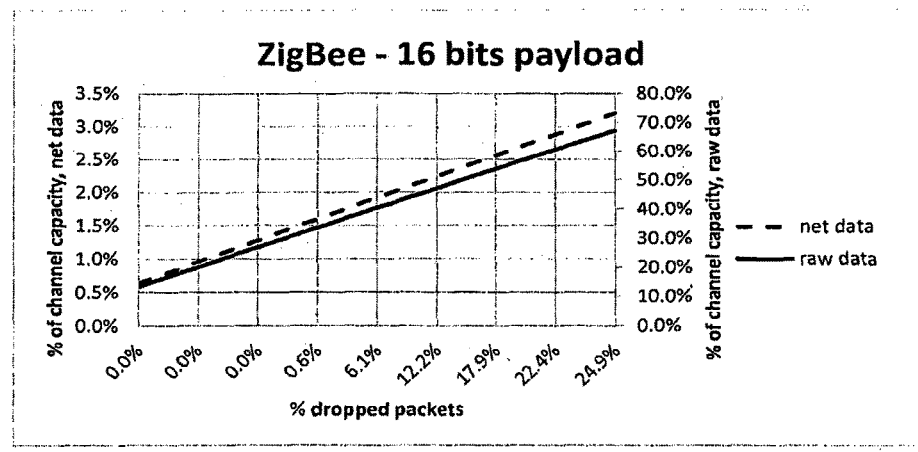
FIG. 26 is graph that shows the bandwidth (16 bits) efficiency of a system that uses ZigBee physical and MAC layer.
Figure 27:
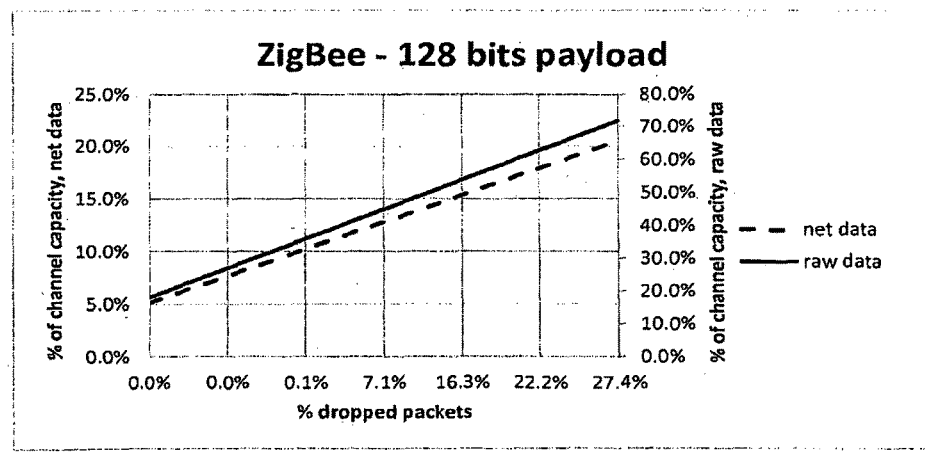
FIG. 27 are graphs that show the bandwidth (128 bits) efficiency of a system that uses ZigBee physical and MAC layer.
Figure 28:
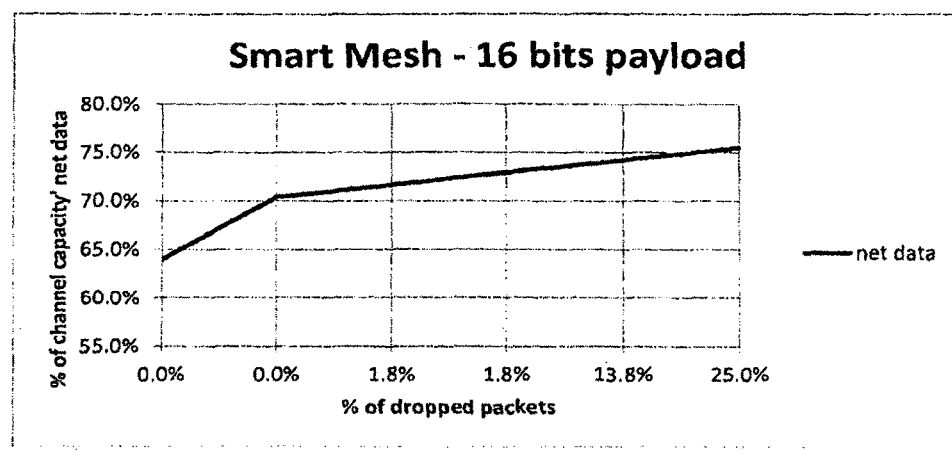
FIG. 28 is a graph that shows the bandwidth efficiency for 16-bit payload, according to certain embodiments.

Certain embodiments that might show in addition to the features of the before described embodiments or alternatively to them the following features are directed to network systems, systems and/or methods wherein centralized configuration, or substantially centralized configuration, ensures substantial interference free operation, resulting in increased effective bandwidth. In certain embodiments, the bandwidth utilization may be increased by 100%, 500%, 1000%, 20,000% or 35,000% over existing technologies. For example, as discussed herein, certain embodiments may result in the ability to substantially increase the amount of devices that may be handled by the network without increasing the infrastructure or insubstantially increasing the infrastructure. One of the advantages of the technology disclosed herein is the ability to use bandwidth in a much more efficient way. Another advantage is less need for infrastructure. FIG. 28 is a graph that shows the bandwidth efficiency for 16-bit payload, according to certain embodiments. In contrast, FIG. 26 and FIG. 27 are graphs that show the bandwidth efficiency of a system that uses ZigBee physical and MAC layer. The assumption is that short addressing is used. ZigBee was chosen as an example because it provides the lowest overhead compared to other protocols (WiFi, cellular). In embodiment this means that if tolerable packet loss is around 1% then the effective bandwidth for 16-bit payload is less than 2%.

Certain embodiments that might show in addition to the features of the before described embodiments or alternatively to them the following features are directed to network systems and/or methods wherein the peak data rate of the system may be less, substantial equal or more then system capacity. Centralized configuration smoothes the peak, allowing higher throughput. In those embodiments, the throughput may be increased by 10%, 30%, 50% or 100% compared to existing technologies.

Certain embodiments that might show in addition to the features of the before described embodiments or alternatively to them the following features are directed to network systems and/or methods wherein the system is substantially predictable and if links deteriorate, the system may behave in substantially predefined manner.

Certain embodiments that might show in addition to the features of the before described embodiments or alternatively to them the following features are directed to systems, network systems and/or methods wherein at least one configuration computer substantially determines the network configuration based on one or more of the following requirements: a portion of the nodes, a substantial portion of the nodes, or for each node based on one or more of the following: bandwidth; latency (from the device and to the device); Burst length; Periodicity; current consumption; battery life and data pattern (for example 10 bit every 10 seconds plus 20 bits every minute).

Certain embodiments that might show in addition to the features of the before described embodiments or alternatively to them the following features are directed to systems, network systems and/or methods wherein at least one configuration resource substantially determines a configuration of one or more of the following: the system, the network system, a portion of the system and a portion of the network system, based on one or more constraints and/or preferences.

In certain embodiments that might show in addition to the features of the before described embodiments or alternatively to them the following features, the at least one configuration resource used to the configuration is one or more of the following: at least one computer, at least one computing device, a plurality of computers, a plurality of computing devices, a plurality of computers, wherein a portion of the plurality of computers are capable to send and/or receive data from at least one computer or a plurality of computing devices where a portion of the plurality of computing devices are capable to send and/or receive data from at least one computing device.

In certain embodiments that might show in addition to the features of the before described embodiments or alternatively to them the following features, the constraints and/or preferences used to determine the configuration are one or more of the following: bandwidth; latency; Burst length; Periodicity; current consumption; battery life and data pattern (for example 10 bit every 10 seconds plus 20 bits every minute).

In certain embodiments, that might show in addition to the features of the before described embodiments or alternatively to them the following features the constraints and/or preferences are of one or more of the following: at least one individual device, at least one gateway, at least one access point, at least one base station and at least one router.

In certain embodiments that might show in addition to the features of the before described embodiments or alternatively to them the following features, the bandwidth constraint and/or preference may be one or more of the following: available bandwidth, available bandwidth on the up-link, available bandwidth on the down link, available bandwidth at the receiving device and bandwidth available at a particular time slot.

In certain embodiments that might show in addition to the features of the before described embodiments or alternatively to them the following features, the bandwidth constraint and/or preference may be expressed as one or more of the following: data rate, symbol rate, data rate on the up-link and data rate on the down link.

In certain embodiments that might show in addition to the features of the before described embodiments or alternatively to them the following features, the latency constraint and/or preference may be expressed as one or more of the following: minimal latency between data is being originated and data being delivered to the individual device, typical latency between data is being originated and data being delivered to the individual device, average latency between data is being originated and data being delivered to the individual device, minimal latency between data is being sent and data being delivered to the individual device, typical latency between data is being sent and data being delivered, to the individual device and average latency between data is being sent and data being delivered to the individual device. The latency may be expressed as one or more of the following: absolute time, relative time and number of timeslots.

In certain embodiments that might show in addition to the features of the before described embodiments or alternatively to them the following features, the burst length constraint and/or preference may be expressed as one or more of the following: period of time, amount of data, amount of data transmitted, amount data received and amount of symbols. The burst length may vary in time.

In certain embodiments that might show in addition to the features of the before described embodiments or alternatively to them the following features, the periodicity constraint and/or preference may be expressed as one or more of the following: period of time, number of timeslots and number of cycles. The periodicity may vary in time.

In certain embodiments, that might show in addition to the features of the before described embodiments or alternatively to them the following features the current consumption constraint and/or preference may be one or more of the following: worst case current consumption, best case current consumption, average current consumption and current consumption under given usage scenario.

In certain embodiments, that might show in addition to the features of the before described embodiments or alternatively to them the following features current consumption constraint and/or preference may be of an individual device or a portion of the devices.

In certain embodiments that might show in addition to the features of the before described embodiments or alternatively to them the following features, the battery life constraint and/or preference may be one or more of the following: worst case battery life, best case battery life, average battery life and battery life under given usage scenario.

In certain embodiments that might show in addition to the features of the before described embodiments or alternatively to them the following features, the battery life constraint and/or preference may be of an individual device or a portion of the devices.

In certain embodiments that might show in addition to the features of the before described embodiments or alternatively to them the following features, the data pattern constraint and/or preference may be expressed as one or more of the following: amount of data, amount of symbols transmitted and/or received, amount of time the data was transmitted and/or received and amount of resource that were or may be used to transmit and/or receive the data. The data pattern may vary in time.

In certain embodiments that might show in addition to the features of the before described embodiments or alternatively to them the following features, the data pattern constraint and/or preference may be of an individual device or a portion of the devices.

Certain embodiments that might show in addition to the features of the before described embodiments or alternatively to them the following features are directed to network systems and/or methods, wherein the network configuration is based for a portion of the nodes, a substantial portion of the nodes, or for each node on one or more of the following: channel allocation for transmit and/or receive; time slot allocation for transmit and/or receive (time slot may be variable); spreading sequence allocation for transmit and/or receive; frequency hopping sequence allocation; baud rate for each channel, time slot and/or spreading sequence. In certain embodiments, baud rate for each channel, time slot and/or spreading sequence may be selected to extend range and modulation scheme for each channel, time slot and/or spreading sequence.

In certain embodiments that might show in addition to the features of the before described embodiments or alternatively to them the following features, routing and configuration may be done to meet bandwidth constraints, data transmission requirements and/or other requirements. For example, if node B receives the information from node A and forwards it to node C, the network may be configured so that: node A makes a reading at time t. Node B receives packet from A, simultaneously makes its own reading, appends its own information to packet from A and forwards it to C and so forth.

Certain embodiments that might show in addition to the features of the before described embodiments or alternatively to them the following features are directed to network systems and/or methods wherein a portion of the nodes, a substantial portion of the nodes, or each node may be configured with its own, configuration. And in some applications this configuration may also determine, or substantially determine, network synchronisation.

Certain embodiments that might show in addition to the features of the before described embodiments or alternatively to them the following features are directed to network systems and/or methods wherein smart resource (may be channel, time slot, hoping sequence, spreading sequence, or combinations thereof) allocation ensures substantially interference free operation. The network may not need to be synchronised as network in whole, but only adjacent parts.

Certain embodiments that might show in addition to the features of the before described embodiments or alternatively to them the following features are directed to network systems and/or methods wherein a portion of the nodes, a substantial portion of the nodes, or each node may be configured with set of rules. The rules may take one or more of the following forms:

Receive packet at time slot X;
Append your own information and forward on slot Y;
Sleep for Z slots;
Wakeup every slot K and synchronise the clock;
Receive packet at slot A, remove B bits from the packet; and
Forward the packet to slot C This enables the system to route packets with no packet headers (destination or routing). Other rule forms may also be used. In certain embodiments, that might show in addition to the features of the before described embodiments or alternatively to them the following features the ability to route packets with no or substantially no headers enables the system to handle at least 50, 100, 200, 300, 500, 1000, 5000, 10,000 or 50,000 hops between the nodes (devices) without substantially increasing transmission overhead. For example, without predefining the time slot within which a particular node (device) may transmit packets, the packets may require destination and routing information. In this case, transmission overhead may increase with additional hops such that after 10, 20, 30, 40 or 50 hops, the amount of overhead results in failure of the network, inability to add significant numbers of additional hops to the network, and/or inability to add significant numbers of additional devices to the network.

In certain embodiments that might show in addition to the features of the before described embodiments or alternatively to them the following features, the ability to route packets with no, or substantially no, headers and/or routing information results in a ratio of available bandwidth to the net pay load of between 50 to 200, 200 to 1000, 300 to 5000, 200 to 200,000, 200 to 2 million, 2 million to 1 billion or one billion to 100 billion. For example, in networks where headers are required, the ratio of bandwidth to payload may be limited to 5, 10, 20, 30 or 40.

Certain embodiments that might show in addition to the features of the before described embodiments or alternatively to them the following features are directed to network systems and/or methods with zero (or minimal) overhead by packet aggregation; each subsequent node may append its data and forwards the packet. Because network configuration is known, data then may be extracted at the final destination and uniquely associated with the origin node.

Certain embodiments that might show in addition to the features of the before described embodiments or alternatively to them the following features are directed to network systems and/or methods wherein configuration may be done with an assistance of external (to the network) hardware. For example, this hardware may:

Instruct one node to transmit and other nodes to receive the test signal.

Query a portion of the nodes, a substantial portion of the nodes, or each node about signal quality.

Record those values for later use by routing and/or channel allocation programs.

In certain embodiments that might show in addition to the features of the before described embodiments or alternatively to them the following features, the location of the device may be recorded and used in routing and/or channel allocation and/or time slot allocation algorithm.

Certain embodiments that might show in addition to the features of the before described embodiments or alternatively to them the following features are directed to network systems and/or methods wherein to improve network reliability some, a substantial portion (or all) nodes may be configured to send substantially the same information (or the same information) via one or more different routes.

Certain embodiments are directed to network systems and/or methods wherein to improve network reliability some, a substantial portion (or all) nodes may be configured to use different routes in subsequent cycle.

Certain embodiments that might show in addition to the features of the before described embodiments or alternatively to them the following features are directed to network systems and/or methods wherein down link (typically from the controllers/gateways) may implement broadcasting. The packet may be transmitted with small address. The address identifies a neighbour that may see this transmission. So, for example, if system is configured so that 8 devices may listen to this broadcast package the header is 3 bits.

One exemplary implementation that might show in addition to the features of the before described embodiments or alternatively to them the following features, according to certain embodiments, assumes usage of the 2.4 GHz ISM spectrum. The spectrum is divided into 16 channels, around 5 MHz for each channel. The spectrum may also be divided in other suitable allocations as well. The transceiver operates at around 2.5 Mchips per second using CDM, operating at around 250 kbps. One or more of the channels are divided into time slots. Time slots may have variable length. The device is comprised of the transceiver, MPU and RAM. The MPU used is typically fairly basic to ensure minimal cost, for example 8051. However, other suitable MPUs or ASICs may be used. In this example, there are three stages: (1) Installation and initialization stage; (2) Configuration stage, and (3) Operational stage. It is possible to partition this process differently, for example: Installation, neighbor discovery and route generation, resource allocation and creation of configuration, upload of the configuration, operation, or combinations thereof.

Initialization Stage

The end-nodes (devices) are deployed in the field. In this example, individual device has a unique identification number stored in its internal memory (typically in FLASH). However, in other embodiments a substantial portion of the end-nodes may have a unique identification number. Device type and purpose are recorded typically at the time of installation and/or manufacturing (for example: current measuring sensor making readings every 5 minutes). In some embodiments, device GPS coordinates may be recorded.

Once devices are installed, devices and/or sensors may be in configuration mode. In this mode the device may listen on a specified channel. In certain embodiments, the device may listen on a specific channel for a portion of time, for example 400 msec every 4 seconds, 500 msec every 10 seconds, 1 second every 10 seconds, 1 second every 20 seconds, etc. In certain embodiments, the device may listen on at least one specific channel. External configuration device (typically attached to a computer) may issue a command to each device or sensor to transmit. In other exemplarily embodiment, neighboring device may issue the command to transmit. The device may transmit its ID. The rest of the devices (or a suitable number of the devices) may listen to that transmission and record received ID, RSSI and BER or other values representing channel quality. The configuration device reads the information from each device, a portion of the individual devices or a substantial portion of the individual devices. In certain embodiments, this reading is conducted after the devices (or a portion of the devices or a substantial portion of the devices) have transmitted their ID. The reading may also be conducted in other suitable ways: using different transceiver and/or using wired connection. Certain embodiments use the process depicted in the flow chart of FIG. 1. However, other suitable processes may also be used. For example, handheld computers, cloud computing resources or other suitable devices.

Configuration Stage

In certain embodiments in the configurations stage, a computer may process the network information obtained from the devices, for example, the list of neighbour IDs seen by the device. In this exemplary embodiment, for each neighbour the following information is recorded: (1) Channel number; (2) RSSI; and (3) BER. Other suitable parameters or combinations of parameter may also be used, for example: correlation peak, packet error rate, number of chips in error, signal to noise ratio, signal to noise and distortion ratio or combinations thereof.

In certain embodiments, this information, together with operational requirements of the device: (1) maximum time device may be in deep sleep mode—example: sensor has to measure current at least every minute; (2) size of the payload the devise has to send/receive; (3) maximum latency of the data, and (4) how often the data is sent—example: sensor measures current every minute but sends aggregated results every 5 minutes. Other suitable parameters or combinations of parameter may also be used, for example, preferred RF channels, time required to process command, time required to process maintenance information, MPU speed, memory size or combinations thereof.

In certain embodiments, the requirements may be more complex and/or may vary with time, for example; a sensor measures current every 10 minutes between 12 μm and 6 am, it measures current every 5 minutes between 6 am and 9 am, then it measures current every minute between 9 am and 6 μm, etc.

Network information and operational requirements may then be used to configure the system. Configuration includes, for example:

Calculating up-link and/or down link routes (they may be different);

Allocating resources to avoid interference and/or optimize usage of relevant resources: Resource allocation: channels, time slots, transmitting power, baud rate; and Optimizing resources: battery life, bandwidth.

Other suitable parameters or combinations of parameter may also be used, for example, allocating resources for network maintenance (adding new devices, self healing, etc.), allocating resources for retransmissions or combinations thereof.

In this exemplary embodiment, the configuration stage is comprised of following activities: (1) calculating up-link and down link routes; (2) resource allocation and (3) creating device configuration. Other suitable parameters or combinations of parameter may also be used in the configuration stage.

Calculating Up-Link and Down Link Routes

In calculating these routes it may be desirable to parallel the paths to/from the sink points/control points/gateways. This may be desirable because it reduces the impact of failure of one node (a node that fails may make a substantial portion of the nodes that follow it on the down link and/or up-link to fail until the network is reconfigured using self-healing methods). This may also be desirable because it spreads the load more evenly between nodes in the network. In calculating these routes the algorithm selects the less congested path or substantially less congest path. The algorithm also tries to select the shortest path. Other combinations may also be used, for example, existing or predicted RF interference; link quality between nodes, similarity in latency/how often the data is sent, MPU speed, memory size, type of transceiver, transmitter power, receiver noise figure/Low Noise Amplifier (LNA) gain, and/or receiver sensitivity.

The up-link and down link route calculation may be further divided into two algorithms: (1) a forward path calculation and (2) a up-link route calculation. Other types of routes are also possible: broadcast routes, retransmit routes, network maintenance routes or combinations thereof.

Figure 2:
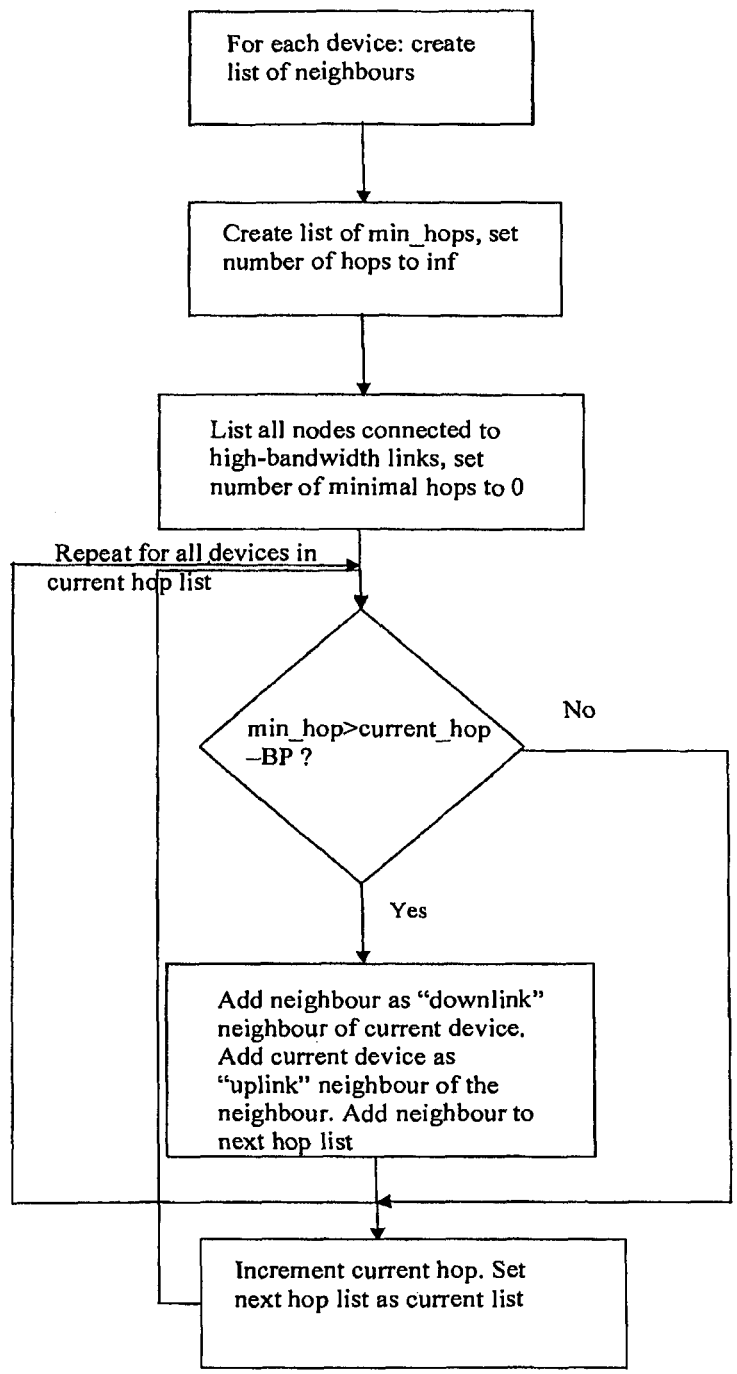
FIG. 2 illustrates an exemplary diagram of an up-link path calculation and process, according to certain embodiments.

The up-link path calculation and process is illustrated in FIG. 2. The number of permitted back hops (BH) may be defined as one. However, certain embodiments may be 1, 2, 3, 4, 5 or 6 back hops, if needed. For clarity, it is assumed that bandwidth is the only parameter to be optimized. The BH may be used as a measure of how much the selected path deviates from shortest path. Other parameters or combination of parameters may be optimized, for example: receive time, transmit time, transmit power, number of transitions from sleep to transmit and vice versa, number of transitions from sleep to receive and vice versa, baud rate, chip rate, number of frequency channels used and number of frequency bins used (in FDD case). Other parameters may be measured, for example: latency, propagation delay, probability of error at the gateway, probability of retransmission battery current required to relay the data or combinations thereof.

Figure 3:
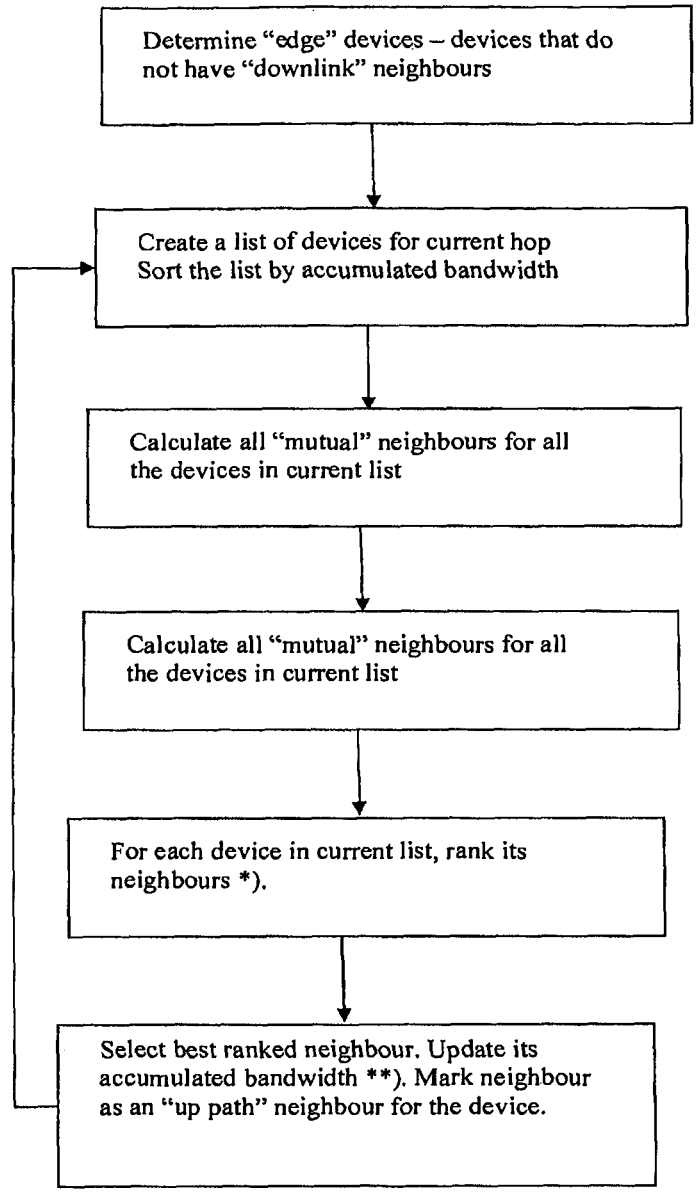
FIG. 3A is an exemplary diagram of a route calculation for up-link path and process, according to certain embodiments.
FIG. 3B is an exemplary diagram of a route calculation for down link path and process in accordance with certain embodiments.

FIG. 3A shows a route calculation (only up-link path calculation is shown), according to certain embodiments. In FIG. 3A ranking, for individual device in the current list, is done by assigning weights and summing one or more of the following: accumulated bandwidth, number of mutual neighbors and number of hops. One or more of the following additional parameters may also be used: accumulated latency/delay, channel quality, etc. Various combinations of parameters may be used. FIG. 3A further depicts certain embodiments where the process of updating the accumulated bandwidth of the best ranked neighbor by adding the accumulated bandwidth of the current device to the best ranked neighbor.

FIG. 3B shows a route calculation (only down link path calculation is shown), according to certain embodiments. In certain embodiments, one or more of the following, typically application dependent, parameters may be used for optimisation in addition to bandwidth which is shown in FIGS. 3A and 3B: Ramping transmitter/receiver up and down, it may be useful in certain embodiments, to minimise number of Tx to Rx transitions, latency on the up-link, latency on the down link, channel quality, existing interference on certain channels, transmitting power and battery or non battery operated devices (the traffic may be directed to go through non-battery powered devices).

Resource allocation: To avoid mutual interference, the extended neighbor list may be created for individual device (or a substantial portion of the devices): Neighbors that are too far to maintain proper communication link but still may be heard may be included in this list. Once up-link and down link paths are known, the resource allocation algorithm uses those paths, extended neighbor list and/or device operational requirements to allocate resource and create configuration for each device (or a substantial portions of the devices).

Up-link Resource Allocation

Figure 4:
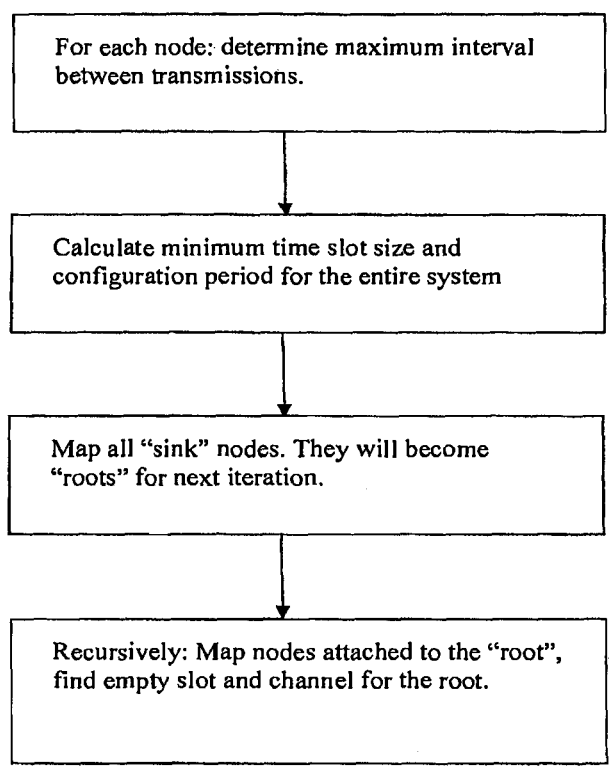
FIG. 4 is a flow chart that depicts parts of the up-link resource allocation algorithm, according to certain embodiments.

FIG. 4 is a flow chart that depicts the main parts of the up-link resource allocation algorithm, according to certain embodiments.

For each node (or a substantial portion of the nodes), the maximal interval is determined by minimum period and latency of the attached nodes. Configuration period is calculated by varying the maximum interval within given range (i.e., 10%). In other embodiments, the maximum interval may be varied by at least 5%, 6%, 7%, 8%, 9%, 10%, 12%, 15% or other suitable percents. In other embodiments, the maximum interval may be varied by between 5% to 15%, 8% to 12%, 1% to 5%, 10% to 20% or 20% to 50%. A slot is considered empty if none of the extended neighbors of the transmitting node or of the root is transmitting or receiving on the same channel at the same time (or substantially the same time). Channels (all or a substantial amount) are typically changing every hop (or on a substantial amount of the hops) on a given path. In other embodiments, channels may be kept the same along all paths, some paths or a substantial number of paths.

Down Link Resource Allocation

Depending on network requirements, there may be various strategies or combinations of strategies that may be used for resource allocation of a given system. For example, where the system is configured such that multiple devices may receive data at given time intervals (for example, controllers receive 8 bits of data every second). The issues are similar to the issues with up-link resource allocation. One difference is that allocation is done in opposite direction (towards the root). ACK/NACK may be embedded into up-link traffic. ACK and/or NACK may be embedded into the up-link data by the last device on the path. If last device on the path has received the data, it implies that the other devices on that path received their data correctly with probability of more than 95%, 97%, 99%, 99.99%, 99.999%, 99.9999%, 99.99999% or 99.999999%. Another example is where multiple devices that are normally idle and receive data with a given latency (for example, controllers that change their state few times a day, where the latency from the command to change state to the actual state change is 100 msec.).

In certain embodiments, some nodes may be elected to be a broadcast point. In these configurations, at least one channel may be reserved for the down link traffic. In this exemplary configuration, the broadcast nodes listen on that channel with the period estimated by minimal latency. They then, in turn, broadcast the message to the end-nodes. ACKs and/or NACKs may return on the same channel. In certain embodiments, ACK time slots may, be either defined in broadcast message or are predefined.

Operational Stage

Routing and Appending the Data

Figure 5:
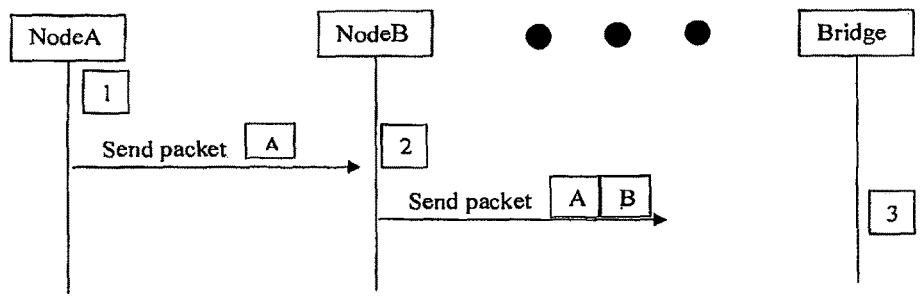
FIG. 5 illustrates an exemplary packet flow, according to certain embodiments.

FIG. 5 illustrates an exemplary packet flow, according to certain embodiments. The first step is to set a wake-up time for node A, (for example, wake-up at time t=20). Then the next step is to measure current, then send packet (for example, on channel 2, time slot 3) to node B and finally put node A into a sleep mode. The next step is to set a wake-up time for Node B, for example, wake up and listen on channel 2, time slot 3. Then synchronize clock based on received frame, measure current and append measured data and send, for example, on channel 3, time slot 5. The next step is to listen on a selected channel, for example, channel 4, time slot 6, add bridge/gateway unique ID to the received data, and then send as IP packet. Thereafter, at least one computer (for example, at least one central computer) receives the IP packet. Because the system configuration is known, it may parse the data. One advantage of such approach is that little overhead is added as the packet is routed to its destination. As an example, consider a 1000 hops route, where the devices on this route transmit 8 bits of data. Assume that the physical layer adds 6 bytes as preamble, delimiter and length and 2 bytes as CRC. The net overhead per device in this case is 8/1000=0.8%. In other embodiments, the overhead may be less than 30%, 20%, 10%, 5%, 1%, 0.1% or 0.01%. Another advantage is source/destination addresses may not be required. In prior art, a packet would normally have source and destination address, assuming 16 bit source and destination addresses, the device transmitting or receiving 8 bits of data will have MAC layer overhead (excluding physical layer overhead) of 32/8=400%. In certain embodiments of the present disclosure, the MAC overhead may be 0%, less than 10%, less than 5% or less than 1%.

Differential Data Transmission

Figure 6:
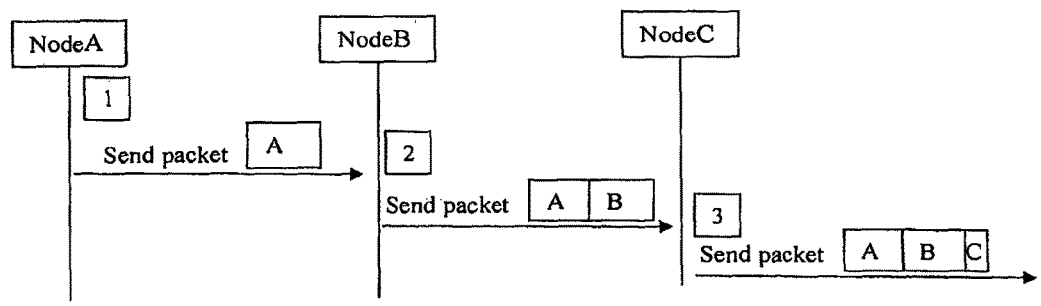
FIG. 6 illustrates an exemplary differential data transmission process, according to certain embodiments.

In certain embodiments, a plurality of the devices along the routing path may generate information that is sufficiently, substantially or largely similar. For example, temperature sensors in different parts of the room. At given points in time the temperature measured by a substantial portion of the sensors in the room may be around some average temperature reading. In such embodiments, sensors along the path may send only the difference from the designated sensor. One advantage of this approach is an improvement in bandwidth utilization. In certain the embodiments, the improvement may be at least 10%, 15%, 20%, 30% or 50% in bandwidth utilization. In certain the embodiments, the improvement may be between 10% to 50%, 10% to 15%, 20% to 60%, 20% to 40 or 40% to 50% in bandwidth utilization. FIG. 6 illustrates an exemplary differential data transmission process, according to certain embodiments. In FIG. 6, node A is a temperature sensor. The first step is to set a wake-up time for node A (for example, wake-up at time t=20). Then the next step is to measure temperature, here 10 bits, then send packet (for example, on channel 2, time slot 3) to node B and finally put node A into a sleep mode. Node B is a current sensor. The first step is to wake up node B and instruct it to listen for information sent from node A, for example, on channel 2, time slot 3. The next step is to synchronize the clock based on received frame, and then measure the current (10 bits) and then append the measured data and send on channel to node C, for example, channel 3, time slot 5. Node C is a temperature sensor in the same room as node A. The first step is to instruct node C to wake-up and listen on a channel, for example, channel 3, time slot 5. The next step is to synchronise the clock based on received frame; measure temperature on node C; extract measurement of node A (i.e. extract 10 bits starting from bit 16) and calculate the difference, encode as 4 bits. Node C then send the information via a packet on a channel, for example, channel 2, time slot 3 and then instructs node C to sleep. This way node C reports its temperature as a 4 bit value, instead of 10 bit value. When aggregated, for example, in pressure sensors on a pipe this may results in significant reduction in bandwidth requirements.

Embedding ACK/NACK into Packet Routing

Figures 7, 8:
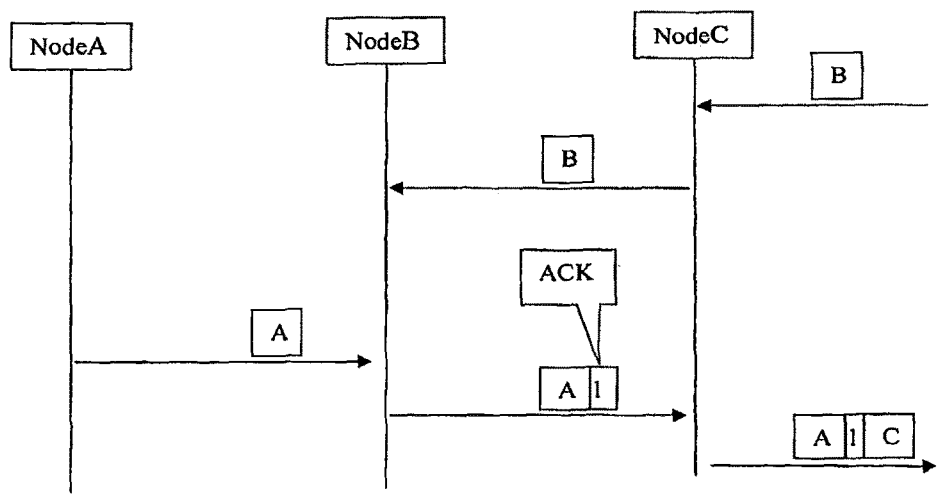
FIG. 7 illustrates an exemplary network interface schematic in accordance with certain embodiments.
FIG. 8 illustrates an exemplary format for accomplishing this, according to certain embodiments.

In certain embodiments, when command is sent to the controller it may be desirable to confirm delivery. In certain embodiments, ACK/NACK may be sent as one bit. In other embodiments, ACK/NACK may be sent as 1, 2, 3, 4, 5, 6, etc. This is possible if a command to a node on down link is followed by the packet going through the node on the up-link. The at least one configuration computer may take this bandwidth saving opportunity into account during the configuration stage. In certain embodiments, the bandwidth saving may be at least 50%, 49%, 45%, 30%, 20%, 15% or 12.5%. In certain embodiments, the bandwidth saving may be between 40% to 50%, 35% to 45%, 20% to 40% or 10% to 20%. FIG. 7 illustrates an exemplary process for embedding ACK, according to certain embodiments. In this example, commands are sent to nodes A, B and C. Node A receives the command correctly and as being the last node on the route embeds ACK as one bit into the data on the up-link. Node B receives the up-link packet from node A, sees that ACK is embedded and does not add its own ACK. Node C does the same. When a packet is received at central computer or other processor and data is parsed, the central computer or other processor sees that node C has responded with ACK, therefore nodes B and C also received their commands correctly.

FIG. 60 depicts an exemplarily routing of a part of a network. FIG. 61 depicts an exemplarily packet exchange in the part of the network. FIG. 62 depicts exemplarily resource allocation for devices on the network. The rows in FIG. 62 represent timeslots and columns represent RF channels. In another exemplarily embodiment rows may represent CDMA code or offset in pseudo random sequence and columns may represent frequency channels. This example illustrates embedding ACK into the following packet. Device A transmits packet 1, devices B and C receive packet 1. Packet 1 may contain indication of reception of previous packets sent from devices B and C and received by device A. Device C embeds ACK into packet 2 and sends packet 2. Device C embeds ACK into packet 3 and sends packet 3. Device C sends packet 4 to device D. Packet 4 may contain indication of reception of previous packet sent by device D and received by device C. One or more devices may store the packet for future retransmission if it does not receives ACK from the other devices. In certain embodiments, one or more devices may store the packet for future retransmission if it receives ACKs from 50%, 60%, 70%, 80%, 90%, 95% or 99% of its neighbours. In certain embodiments, the ACK may be one bit. In other embodiments, the ACK may be one symbol. In other embodiments, one bit of the packet may be replaced with the ACK bit. In certain embodiments, the ACK bit may replace a one signature bit. In certain embodiments, the ACK confirms reception of a recent packet. In other embodiments, the ACK confirms reception of 2, 3, 4 or 5 previous packets. In certain embodiments, the ACK confirms reception of at least 50%, 70%, 80%, 90% or 95% of the previous packets.

Suppressed ACK

Certain embodiments enable further conservation of bandwidth when a packet containing information for more than one node is sent and the confirmation is required. In certain embodiments, the bandwidth saving may be at least 50%, 49%, 45%, 30%, 20%, 15% or 12.5%. In certain embodiments, the bandwidth saving may be between 40% to 50%, 35% to 45%, 20% to 40% or 10% to 20%. These bandwidth savings are in addition to bandwidth savings from suppressed headers and addresses. For example, assume route with six hops. Information is ready for substantial portion (or all) the devices on the route at substantially the same time (or the same time). FIG. 8 illustrates an exemplary format for accomplishing this, according to certain embodiments. FIG. 9 illustrates what happens in an exemplary six hop process, according to certain embodiments.

In certain embodiments, the system may be configured in such a way that a substantial portion (or every) node receives its command with a delay of num_hops*time_slot_size. The ACK from the last node is received with substantially the same delay or the same delay. In this example, only the last node in the route generates ACK, the rest may forward it. In other examples, where the last node is not required to respond, in these cases other nodes up the chain may generate an ACK. When the gateway receives the ACK from the last node in the packet, it knows that a substantial portion (or all) of the nodes referenced in that packet successfully received the command. One advantage of this approach is that ACKs are not aggregating or the amount of aggregating of ACKs is reduced. In this example, the number of ACKs received is equal to amount of packets sent, not to the amount of devices the commands were sent to. So in this example, only 3 ACKs (each one may be just 1 bit) are received, compared to the traditional approach where 6 ACKs may be received. This allows a significant reduction in the bandwidth in large networks. For example, suppose there are 1000 controllers (designated n0 to n999), 100 m apart forming 100 km line. The command for each controller is 8 bit. The latency for receiving a command is 1.1 sec. The latency for receiving ACK is 2.1 sec. Commands for the controllers are issued at once (or substantially at once). The sec latency limits the sets the time slot to maximum of 1 msec. Assume the net rate of 100 kbps. This allows the packing of 12 commands in one time slot. The system may receive only 84 ACKs instead of 1000 ACKs. In certain embodiments, the bandwidth saving may be at least be at least 50%, 49%, 45%, 30%, 20%, 15% or 12.5%. In certain embodiments, the bandwidth saving may be between 40% to 50%, 35% to 45%, 20% to 40% or 10% to 20%. These provide further bandwidth savings in addition to those from suppressed headers and addresses.

Retransmission

The retransmission may be implemented in a number of ways or combinations of ways, for example, by local retransmission, consecutive nodes on the up-link are places two slots apart (first slot may be much shorter). A common resource (i.e., channel) may be allocated for retransmissions. Assume that node A is transmitting to node B. If node B does not receive a packet (or receives corrupted packet) it requests the retransmission on the reserved channel. Node A retransmits the packet on the reserve channel. Node B may use data from first and second transmissions to retrieve original data. Node B then forwards the received information. Another example is by centralized retransmission. The network is divided in two regions, for example, far end: no resource limitation and near end: multiple paths. With respect to multiple paths, in certain embodiments, the retransmission request is propagated down the tree (branching nodes are listening to broadcast from the parent node). The request contains channel and time slot for retransmission. The system reserves predefined resources (i.e., 5%, 8%, 10%, 12% or 15%) for retransmission (for example, reserving time slots on certain channel). With respect to the far end, in certain embodiments, always retransmit—energy insensitive applications or the NACK approach—energy sensitive applications. As an example, current meter may send its last measurement 3 times if it's located 100 (or 20, 40, 75, 200, 1000, 10,000) hops from the gateway. The battery powered device may only retransmit if it receives a NACK.

Store Ad Forward

In certain embodiments individual device may retransmit previously transmitted packet. In certain embodiments the individual device may retransmit previously transmitted packet if the individual device did not receive packet or partially received packet or received packet with at least one error or performed an error check that indicated that packet may contain at least one error or probability of containing at least one error is greater than predefined threshold. In certain embodiment, the individual device may retransmit the packet if at least one second individual device failed to receive the packet or the second individual device indicate that it failed to receive the packet or the second individual device failed to indicated that it successfully received the packet.

In certain embodiments individual device may not retransmit previously transmitted packet if predefined number of individual devices received the previously transmitted packet. In certain embodiments individual device may not retransmit previously transmitted packet if predefined percentage of individual devices received the previously transmitted packet.

In certain embodiments the first individual device may retransmit the previously transmitted packet. In certain embodiments second individual device may indicate successful or unsuccessful reception of at least one packet by embedding an indication into the next packet that may be originated by the second individual device and/or may be received by the first individual device.

Bandwidth Consideration

In certain embodiments, the system may be used in low-bandwidth application. Low-bandwidth applications may transmit and/or receive packets of 1, 8, 16, 32, 128, 512, 1024 or 16384 bits of data. Or they may transmit/receive with average baud rate of 0.016, 0.133, 0.266, 0.8, 1.6, 8, 32, 128, 512, 1024 or 16384 bits per second. In certain embodiments, the requirement for average data rate may be determined by whichever is smaller: the bandwidth available at gateway or the bandwidth available for a particular route. For example, if the available data rate (on the up-link) at gateway is 100 kbps and there are 10,000 devices that transmit then average data rate may be less than 10 bps. The gateway may have multiple, transceivers and may work in full duplex (on different channels) which increases the gateways capacity. With respect to the bandwidth available for a particular route, an example would be assumed that a substantial portion of the devices (or each device) is operating at around 100 kbps, half duplex and the route is 1,000 hops long. The average data rate may be less than 50 bps.

Certain embodiments are directed to adjusting the Configuration of the system in dense networks. Also the available bandwidth at gateway may limit the peak data rate of the network system. If there are large numbers of devices located in close proximity to other devices in the network, it may be more difficult to allocate resources within the network without creating potential interference issues. One approach to reduce this interference issue is to reduce the transmitting power of one or more of the devices. This reduces the number of neighbors seen by a device. The cost is increased due to the number of hops, however, the benefit is that the network may be adjusted to new requirements with a reduced need to alter the infrastructure (for example, installing additional access points).

Reuse of the Resources

Figure 10:
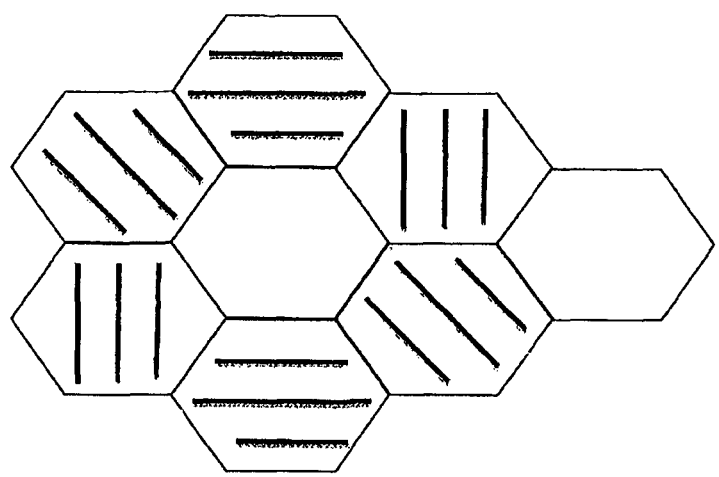
FIG. 10 illustrates a typical prior art and reuse of the resources.

Traditional access points and/or cellular systems have to use different resources (frequency channels, spreading sequences) in adjacent cells to avoid interference. This is illustrated in FIG. 10. Normally a reuse factor of 4 is used. In reality, however, a more complicated frequency planning is required due to non-homogenous propagation. The problem becomes even more difficult when cells are adjacent in 3D space. Multistory buildings complicate this problem even more as path loss and interference may be determined not only by 3D geometry but also by internal structure of the building. Installing large number of sensors in multistory building may either require complicated resource allocation or reducing system capacity to create redundant resources.

While number of nodes in traditional system may be limited by peak bandwidth, the centralised system configuration of certain disclosed embodiments leads to the advantage to enable the system to operate at average bandwidth closer to system capacity. Assume a system comprised of 1,000 devices. At peak, 100 devices may transmit simultaneously. To accommodate peak requirements, the traditional system will need to employ some form of collision resolution. Let's assume that collision resolution for 100 devices requires 150 time slots. It means that system is only capable of working at 66% of its capacity. In contrast, certain disclosed embodiments that use a centralized system that evenly distributes (or substantially evenly distribute) those devices, so that only one device may transmit at any given time, may operate at 90%, 95%, 98%, 99% or 100% capacity.

FIG. 63 depicts an exemplarily network, where the gateway is designated by rectangle and devices are designated by circles. The devices in the exemplarily network are connected to gateway A. FIG. 64 depicts the exemplarily network after addition of an additional gateway. In certain embodiments, the network may be automatically partitioned after addition of a gateway. In certain embodiments, the network may be partitioned after operator initiated request. In certain embodiments, the network may be partitioned if partitioning improves one or more of the following: individual latency, average latency, minimal latency, maximal latency, individual link quality and average link quality.

Figure 11:
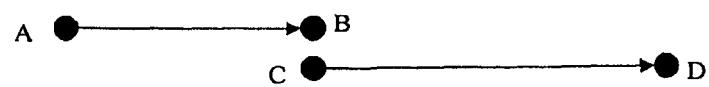
FIG. 11 illustrates interference issues that may occur when many devices are placed in close proximity to each other.
Figure 12:
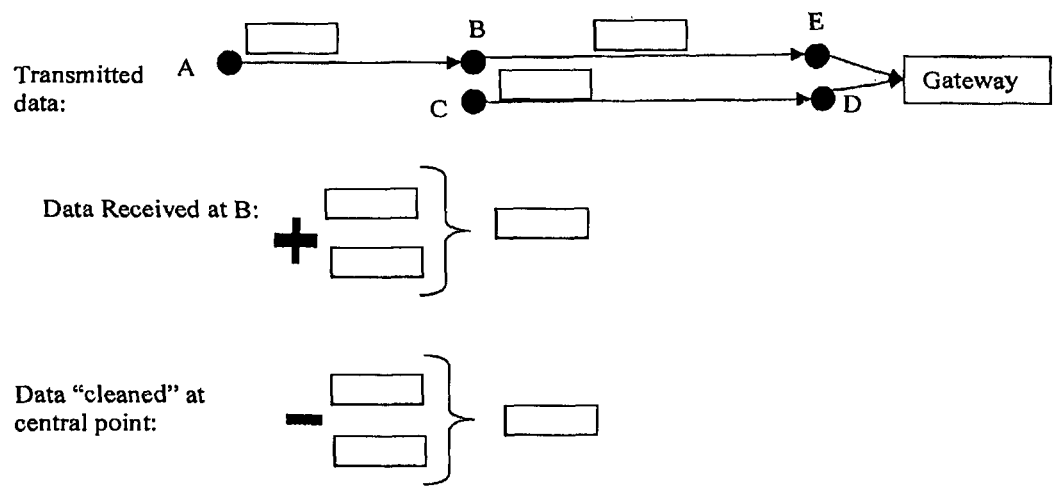
FIG. 12 illustrates a process for removing or reducing adjunct channel interference, according to certain embodiments.

When many devices are placed in close proximity to each other, they may create interference even if operating on different channels. Even if adjacent channel rejection is high (for example 60 dB), it may still limit device sensitivity, thus limiting the range or overall system bandwidth. FIG. 11 illustrates this problem: node A transmits to node B on channel 1, at the same time as C transmits to D on channel 2. Node C may jam node B as some power from channel 2 may appear on channel 1. FIG. 12 illustrates a process for removing or reducing adjunct channel interference, according to certain embodiments. In certain embodiments, interference between devices in the network may be reduced by having node A to transmit a preamble (say 4 symbols) followed by no signal followed by data. Node C transmits a preamble during no signal period. This allows node B to synchronize properly. This may also be achieved by node B cleaning the preamble by subtracting known interferer C. This may also be achieved by synchronizing node B previously. Node B forwards received raw data (without decoding). The central computer or other processor receives the raw data received at node B, knowing that it was received in presence of interferer C. It knows the data that was transmitted by C. It calculates how the data transmitted by C appeared on the adjacent channel (seen by B). The raw data received by B is then cleaned by subtracting the unintended jammer C.

Security

In certain embodiments, security may be a desirable feature within the network. In certain embodiments, a portion, substantial portion or each device may be provided with a sufficiently unique key. The key may be shared with the central computer or other processor (in case of symmetrical cypher) or pair of private—public keys (for asymmetrical cypher) may be used. A pseudo random key may be generated for each transmission/reception using the unique device key as a seed. Data may be encrypted using stream cypher. Data is decrypted at the central computer or other processor. Time delayed key generation may be used to further improve security. Other security structures or process may also be used.

In certain embodiments, it may be desirable to maintain a substantially secure link, a sufficiently secure link or a secure link between certain devices in the network and the central computer or other processor. Substantially secure link is a link that provides substantial data integrity and/or substantial data confidentiality and/or substantial data availability. In certain networks, it is desirable to maintain a secure link (either directly or indirectly) between at least 50%, 75%, 80%, 85%, 90%, 95%, 98%, 99% or 100% of the devices in the network and/or the central computer or other processor. In order to maintain secure links, information transmitted (by the device and central computer or other processor) may be encrypted and authenticated.

In certain embodiments, one or more of the following: the system, the network system, system participants, may detect at least one security threats and may fall into a predefined state upon detecting the at least one security threat.

In certain embodiments, the security threat may be detected by one or more of the following: receiving a predefined number of consecutive packets with incorrect authentication, receiving a predefined percentage of packets with incorrect authentication, not receiving predefined number of consecutive packets and not receiving a predefined percentage of packets.

In certain embodiments, falling back to the default state may include one or more of the following: erasing the configuration of an individual participant, advancing security keys, changing security keys and waiting to be reconfigured.

In certain embodiments, the central computer may perform one or more of the following actions upon detecting the security threat: remove a participant or plurality of participants from the network, advance their security keys, change their security keys and delaying participants' reconfiguration for a predefined period of time.

In certain embodiments, the central computer may be one or more of the following: a cloud computing resource, at least one computer, at least one computing device, a plurality of computers, a plurality of computing devices, a plurality of computers where a portion of the plurality of computers are capable to send and/or receive data from at least one computer and a plurality of computing devices where a portion of the plurality of computing devices are capable to send and/or receive data from at least one, computing device.

In certain embodiments, participant may be one or more of the following: a device, a gateway, a router, access point and some other participant.

For illustrative purposes, it is assumed that the device receives 8 bits of data and transmits 8 bits of data. Other packet sizes may be used and may vary with time.

Shared Keys and One Time Pads

The individual device, or plurality of devices, may be pre-programmed with a secret key and/or secret seed value used to derive the secret key. The individual device generates a one-time key (pad) for the received/transmitted data using Deterministic Random Bit Generator (DRBG). In certain implementations, a portion or a substantial portion DRBGs may be implemented as described in NIST SP 800-90A. DRGB may also be implemented as a shift register with feedback. The central computer or other processor generates the one-time key (pad) for the individual device for the data it sends to the individual device and/or receives from the individual device, thus generating symmetrical with the individual device key.

The following keys may be generated:

Kr—one-time key used to decrypt received data

Kt—one time key used to encrypt data that may be transmitted

Ks—one-time key used to sign the transmitted digest

Notations:

Vn=DRBG(K,IV), Vn—random value generated at n-th call to DRBG function. K—pre-programmed secret key. IV—initialisation value.

Sb=CMAC(M,K,R), Sb—signature on message M, M—message to be signed, K—secret key, R—one-time random value.

Sp=PRIVATE(Kpr, M, R), Sp—signature on the message, M—message, Kpr—private key, R—random value. The function performs private KPI operation on message digest.

Sp=PUBLIC(Kpb, S, R), Sp—result of public KPI operation on S, S—signature, R—random number.

Key K may be primary key and/or derived key.

In certain embodiments, CMAC is one of the implementations described in NIST SP 800-38B.

Configuration

In certain embodiments, at configuration stage the individual device is provided with 128-bit long (other lengths may be used) random numbers: IVr, Pit, IVu, IVd, IV. The individual device is also provided with public key (Kpb). The public key may be configured to be unique for a substantially portion of the down-routes or each down-route. Initial configuration upload may be performed over secure channel. The secure channel may be established by a suitable mechanism (for example, Deffie-Hellman). The data may be encrypted and authenticated.

In certain embodiments, the individual device may implement a master DRBG that uses the initially pre-programmed key and/or random value. The master DRBG then may be used to derive secret values that may be used as keys or as seed values for new set of DRBGs.

In certain embodiments, the central computer or other processor may implement a plurality of master DRBGs that use the initially pre-programmed keys and/or random values. The master DRBGs then may be used to derive secret values that may be used as keys or as seed values for new set of DRBGs. These DRBGs may run in parallel with the individual devices and may produce symmetric keys.

Down Link

With respect to encryption and message signing, at the time slots that the central computer or other processor sends data, the central computer or other processor generates one-time random key for the device Kd=DRBG(K,IVt). It then XORs the key with the data, Ed=Ksc XOR D. Where D is the data to be sent. The message is signed using private key.

Figure 37:
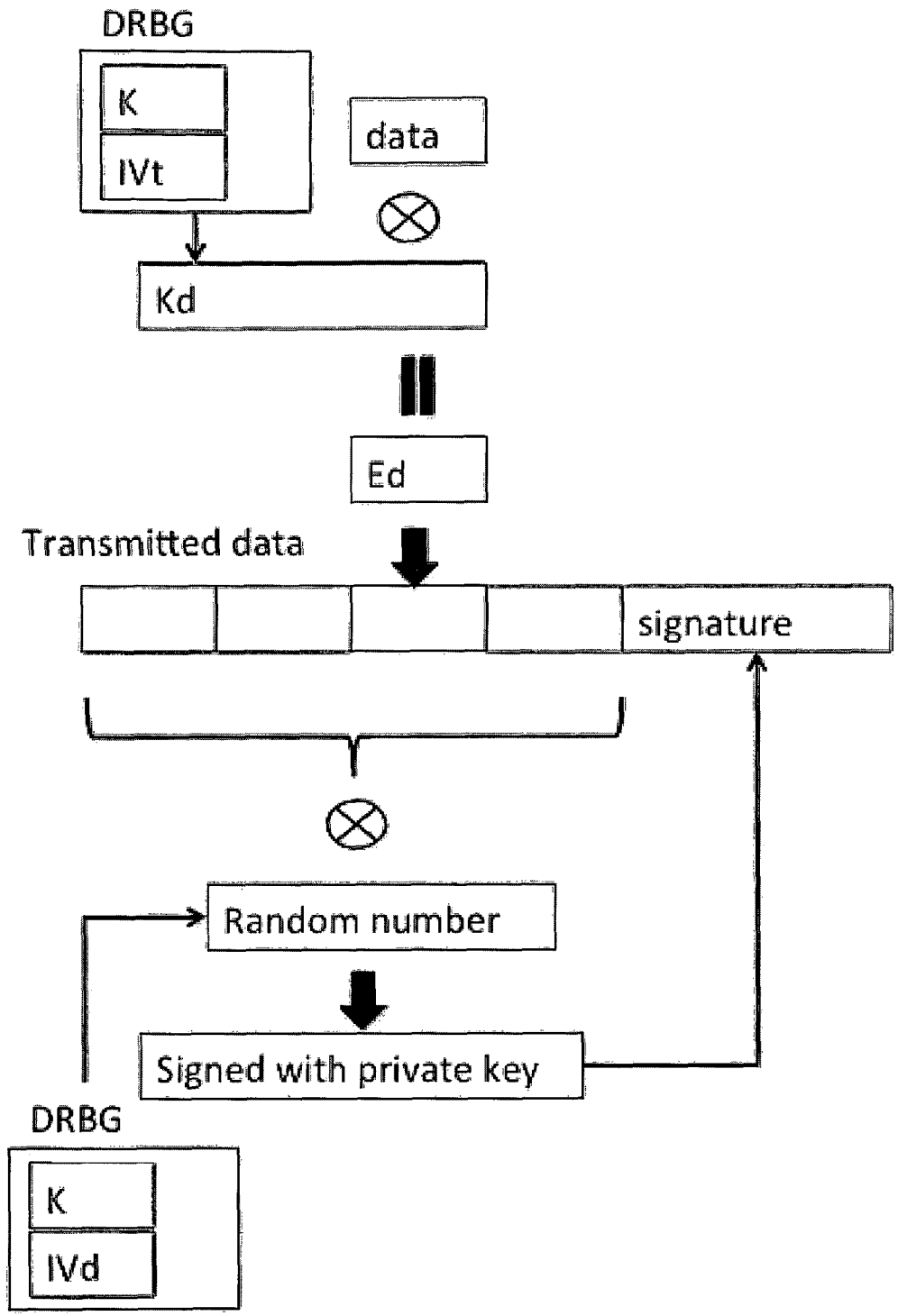
FIG. 37 depicts encryption and authentication-down link, sending data from the central computer, according to certain embodiments.
Figure 38:
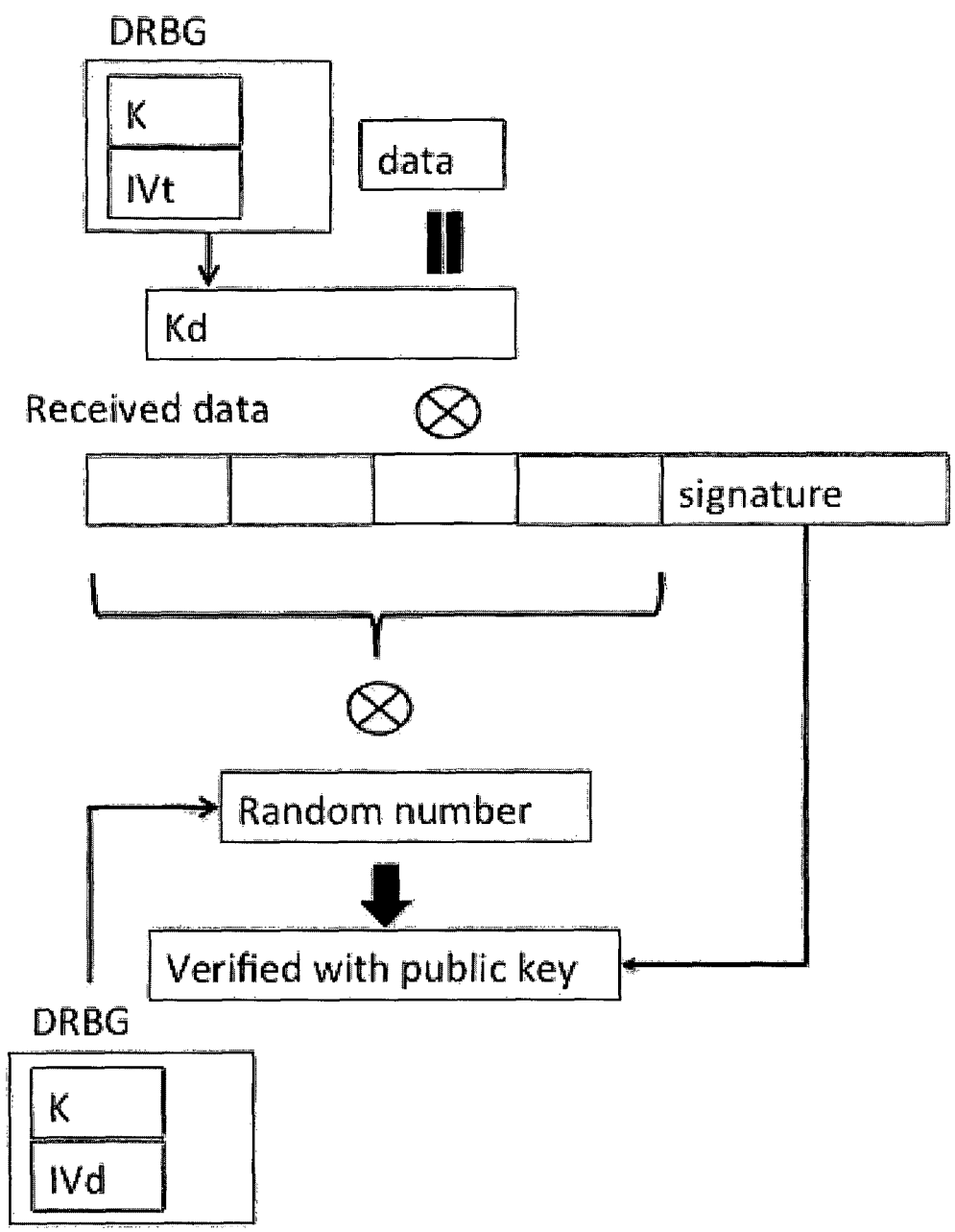
FIG. 38 depicts encryption and authentication-down link, receiving data, according to certain embodiments.

With respect to decryption and authentication, for the packet, the device generates one-time random key that is symmetrical to the one generated by the central computer or other processor Kd=DRBG(K,IVt). The device generates a random number R=DRBG(K,IVd). The device verifies message integrity and authenticity using route public key and random number R. If successful, the device then decrypts the message using the generated one-time key. After a predefined number of consecutive failures or a predefined percentage of failures over predefined number of packets, the device may fall into a predefined state, which in certain embodiments, may be: erasing its configuration and waiting for reconfiguration. FIG. 37 depicts encryption and authentication-down link, sending data from the computer or other processor, according to certain embodiments. FIG. 38 depicts encryption and authentication-down link, receiving data, according to certain embodiments.

Up-Link

Figure 39:
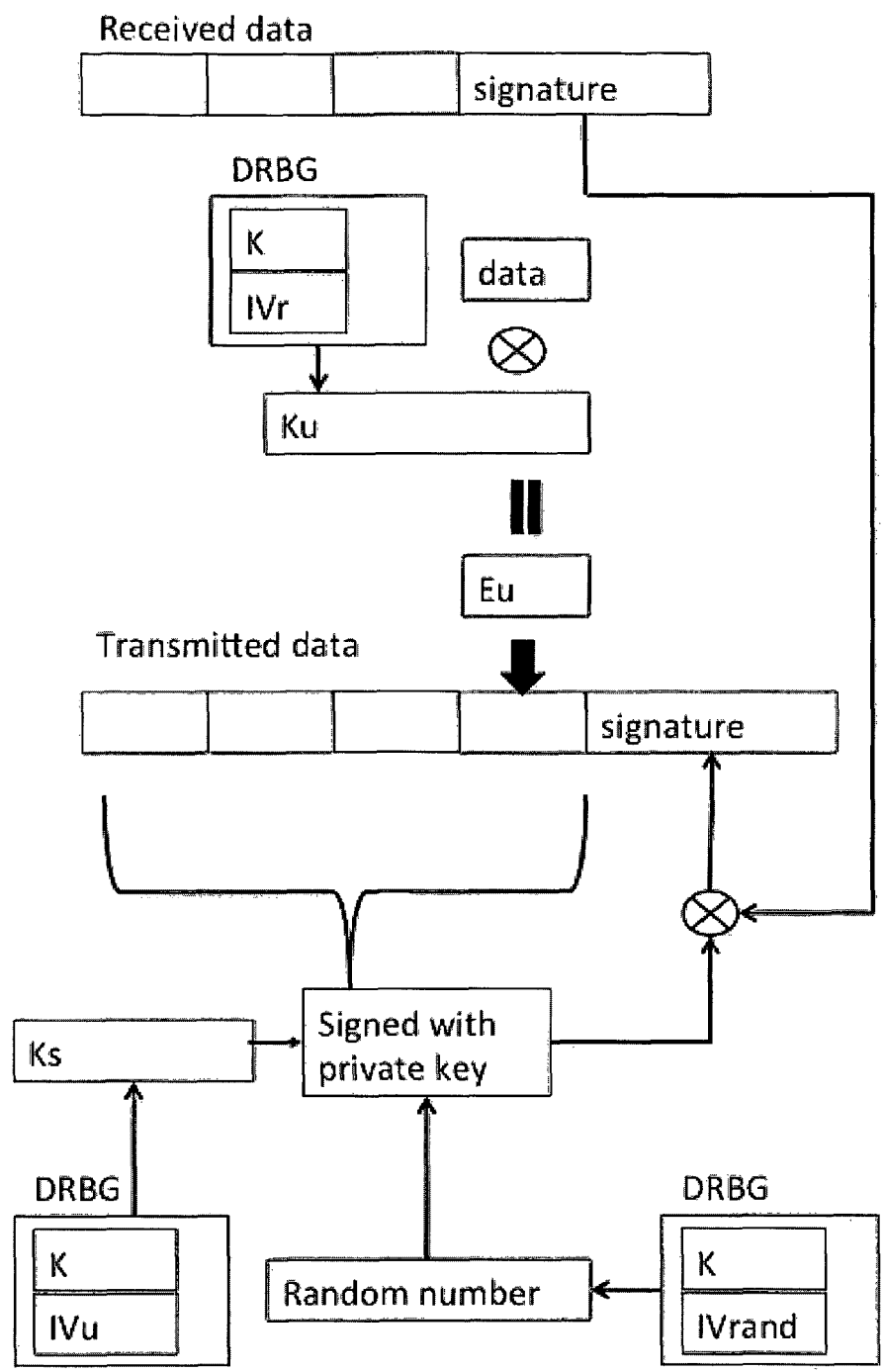
FIG. 39 shows the process of receiving the data from child device, appending data and forwarding the packet using the above security mechanism, according to certain embodiments.

For the packet, the device generates one-time random key Ku=DRBG(K,IVr). It then XORs the data with the key. The device that receives a packet on the up-link and appends its encrypted data. The device generates one-time random key Ks=DRBG(K,IVu), random value R=DRBG(K,IVrand). The devices computes S1=CMAC(D,Ks,R), where D is the data to be sent. S1 is XORed with received signature. The result replaces received signature. The central computer, or other processor, generates corresponding symmetrical keys and random numbers for the device on the route. It then verifies and decrypts the data and verifies its validity. After receiving a predefined number of invalid packets, where the predefined number of invalid packets may be consecutive or within a predefined number of packets, from one or more devices, the central computer or other processor may reconfigure the network as if those devices were dropped off the network. Those devices may be put in the black list and reconfigured after a predefined time. Devices in the black list may have a count of number of times they were reconfigured due to erratic behaviour. Bigger numbers may be used to increase time until the next reconfiguration. FIG. 39 shows the process of receiving the data from child device, appending data and forwarding the packet using the above security mechanism, according to certain embodiments.

Maintenance Commands and Responses

In certain embodiments, maintenance commands and/or responses to and from configured devices may be encrypted and authenticated in a substantially similar or the same way as data. In other embodiments maintenance commands and/or responses to and from configured devices may be encrypted and authenticated using other mechanism, for example those listed in NIST-SP-800-38(A, B and D).

Attacks

In certain embodiments, one of the attacks that may need to be addressed is a man-in-the-middle attack where the keys are known. It is reasonable to assume that in most devices, the keys may be stored in FLASH or RAM. It is therefore feasible to retrieve the keys and insert a malicious device that may facilitate man-in-the middle attack presenting itself as a genius device. One or more of the architectures disclosed herein make these types of attacks much less likely as data integrity and authenticity is much better guaranteed on up and down links and during device configuration. Encrypting data during configuration stage in some applications may only be necessary to obscure network architecture. In some cases it may be omitted.

Block Cypher Approach

In certain embodiments, it may be desired to implement the security using only block cypher. It may be desirable for one or more of the following advantages reasons: block cyphers typically require less computational resources than Public Key Cryptography, block cyphers may be used to implement DRBGs, certain functions may be implemented in hardware, for example AES.

In certain embodiments, block cypher may be used to perform at least a substantial portion of the operations. This approach may be beneficial as the cryptic operations may be performed fast using security coprocessor (for example, AES-128). A useful block cypher is one of the block cyphers approved by NIST. For illustrative purposes, the 128 bit block is assumed; other block sizes may also be used.

Notation:

Drk—historical data received from the individual device by central computer or other processor. If at the time slot the central computer receives 8 bits of data from the individual device k, Drc may be a record of last 1 byte, last 2 bytes, last 4 bytes, last 8 bytes or last 16 received bytes. If packet is not received or received in error, zero byte may be inserted.

Drc—historical data received by the individual device from central computer or other processor. If at the time slot the individual device k receives 8 bits of data, Drc may be a record of 1 byte, last 2 bytes, last 4 bytes, last 8 bytes or last 16 received bytes. If a packet is not received or received in error, zero byte may be inserted.

Rs—one-time random value.

Configuration

In certain embodiments, at configuration stage the individual device may be provided with 128-bit long (other lengths may be used) random numbers: IVr, IVt, IVs, IVts. Initial configuration upload may be performed over secure channel. The secure channel may be established by suitable mechanisms (for example, Deffie-Hellman or CMAC). The data may be encrypted and authenticated.

In certain embodiment, the individual device may derive keys and random values form at least one DRBG. The central computer or other processor may also derive keys and random values form at least one DRBG thus creating a symmetrical with the individual device keys. The symmetrical keys may be used for encryption and/or decryption of the configuration data. The configuration data may include maintenance data. The random values and symmetrical keys may be used to sign the data.

Down Link

In certain embodiments, at suitable time slots the central computer or other processor sends data, the central computer or other processor generates one-time random key for the relevant individual devices Ksc=DRBG(K,IVt). It then XORs last 8 bits of the key with 8 bits of data, Ed=Ksc XOR D. Where D is the data to be sent. The computer (or other processor) and the device generate one time random value. This value may be used as IV. The block may be signed using appropriate CMAC. If there are unused slots in a packet, a number of bytes from the signature may be embedded into those slots. Next packets may contain one or more bytes of the signature. The individual device verifies received command by verifying the signature. At least one correct byte from the signature may be received before the command is executed. The individual device may be configured to reject the command if it receives less than specified number of signature bytes. The individual device may be configured to reject the command if it receives at least one packet with incorrect signature.

Figure 40:
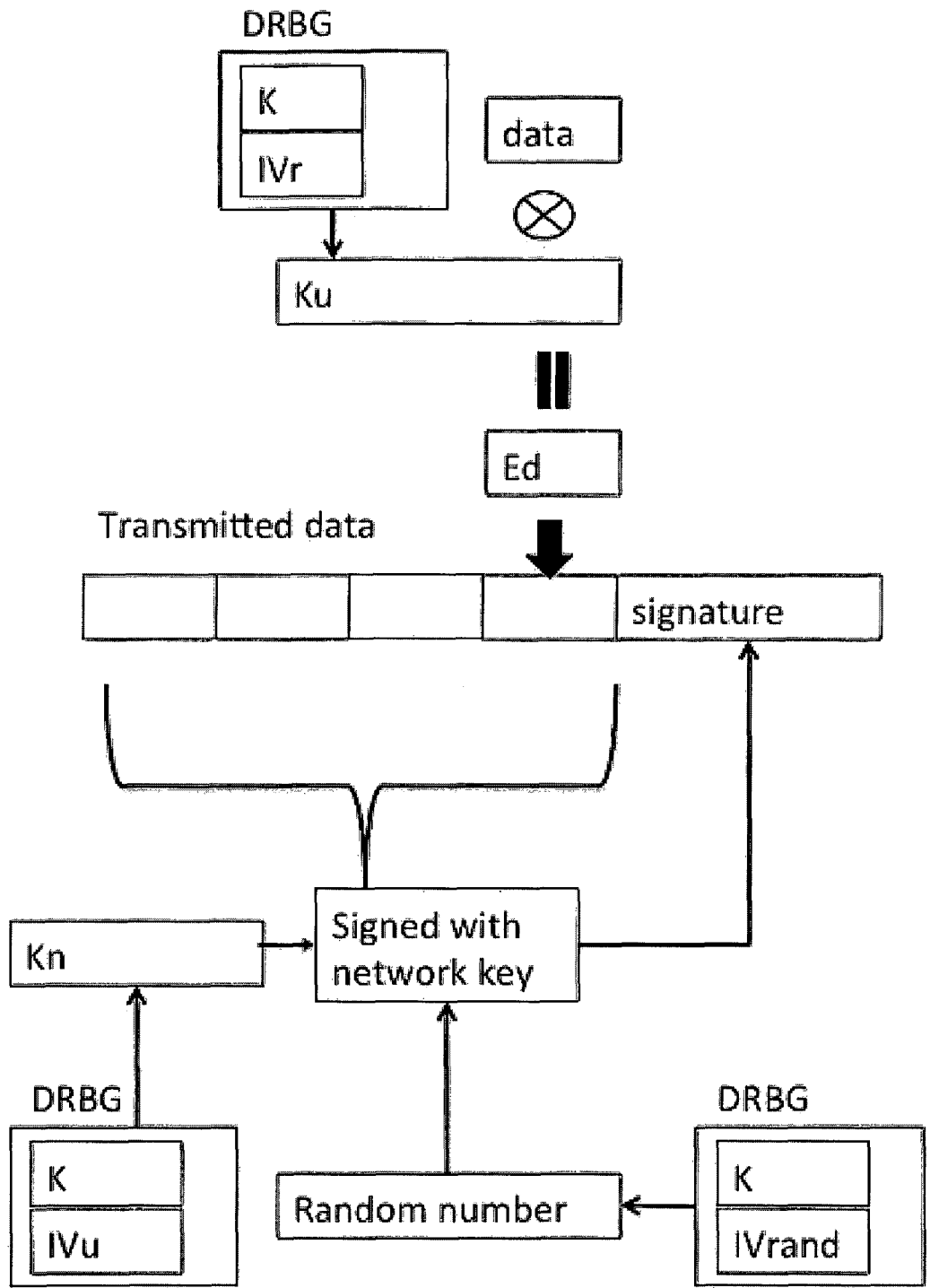
FIG. 40 depicts the process of receiving data on the down link and embedding the received data (signature of the received data) into the up-link signature, according to certain embodiments.
Figure 41:
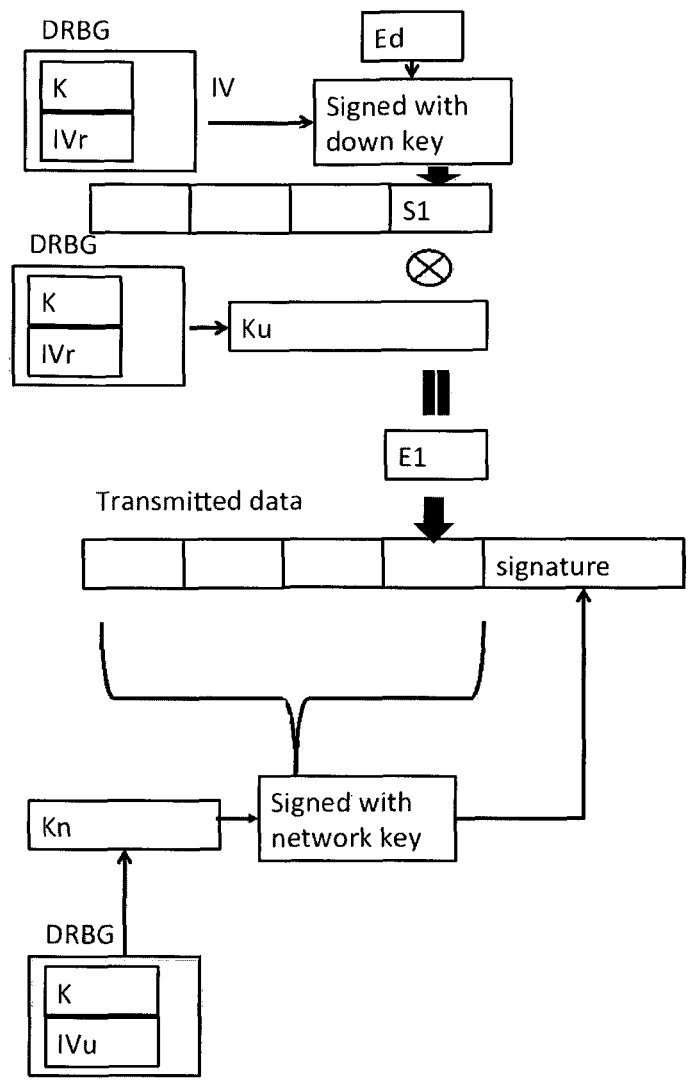
FIG. 41, depicts a device's security operations, according to certain embodiments.

If the individual device receives a predefined number of consecutive packets, or a predefined percentage of packets, with wrong signature, the individual device may fall back into default state or other predefined state, the individual device may disconnect from the network and may wait to be reconfigured. FIG. 40 and FIG. 41 depict the process of sending the command followed by signature bytes. It is also possible to have one time random dictionary. In this case, key may not be retrieved even if the data is known. Using dictionary may also increase number of bits that need to be guessed. If, for example, the device C has only four states (effectively requiring two bits) but 7 bit command is used and C is only reachable through B. Let's assume that the attacker retrieved B's keys. Let's assume the attacker knows that C is in state 00. To send a message, A generates one time random key, xors it with data (00) and sends to C. As B knows the state of C, it may retrieve the one time key. It may then encrypt erroneous information (11) with this key, forcing C into state 11. The attacker will then need to guess the first byte of the signature. If one time random dictionary is used, the attacker may need to guess 5 more bits.

Up-Link

Figure 42:
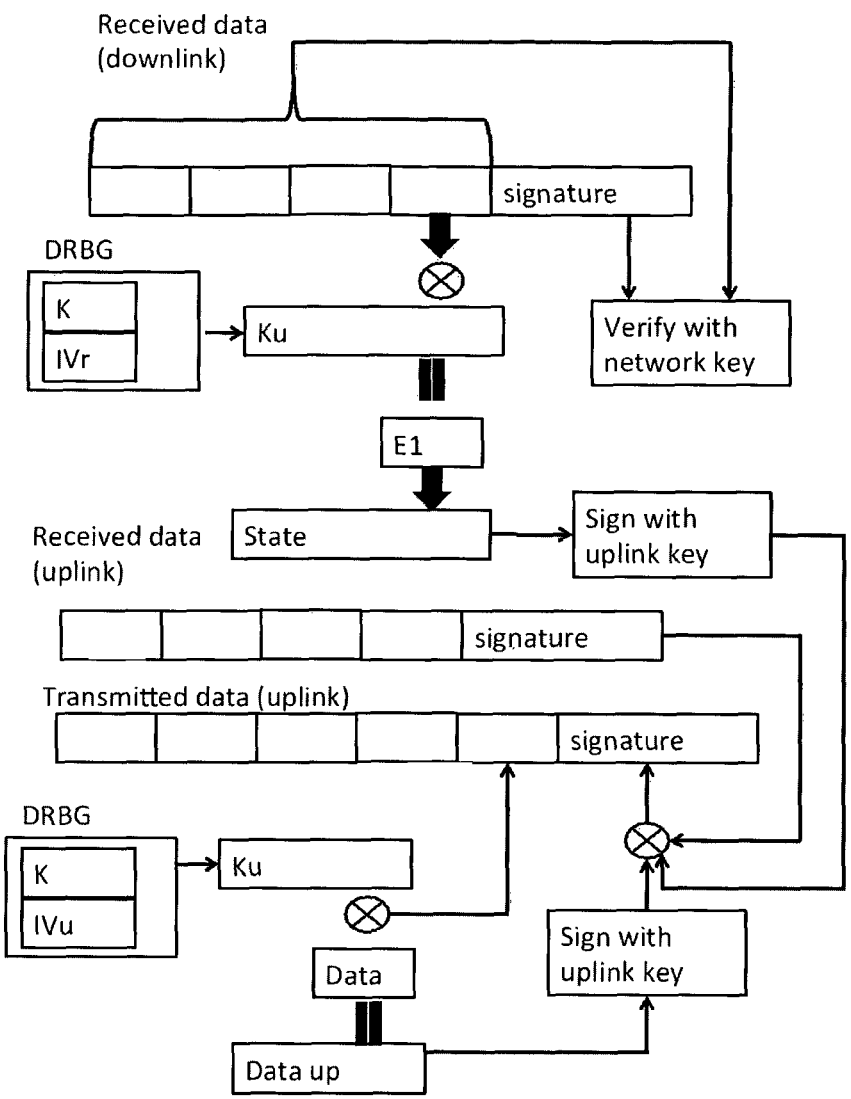
FIG. 42 depicts the process receiving data on the down link and embedding the signature of last received state into the signature of the up-link data, according to certain embodiments.

In certain embodiments, the process is similar to the one outlined herein except that Drc is embedded in the signature. FIG. 42 depicts the process of receiving data on the down link and embedding the received data (signature of the received data) into the up-link signature, according to certain embodiments. The central computer or other processor may verify that the data received by the individual device matches the data that was sent to the individual device. This also may eliminate the need for ACK. This ensures that central computer or other processor detects man-in-the-middle attack on the down link on the next up-link packet.

In certain embodiments, a substantial portion of the individual devices on a route may XOR signature on the data sent on the up-link with the received signature, thus forming a combined signature.

In certain embodiments, a substantial portion of the individual devices on a route may XOR signature on the data sent on the up-link with the signature on the historical data received on the down link and then with the received signature, thus forming a combined, signature.

In certain embodiments, the central computer or other processor may use the combined signature to detect broken link. The central computer or other processor may use other information to assist with detection of broken links, as further explained herein. In certain embodiments, the detection of broken links may be performed by a central computer, at least two central computers, a cloud computing resource, one or more processors and/or a plurality of computing devices.

In certain embodiments, the identity of sender device may be derived by matching the signatures on the received message and the received combined signature. For example depicted in FIG. 34, the central computer or other processor or a processor may derive that data labelled "6" was sent by device 6 by verifying that combination of signatures matches the received signature, also authenticating device 6 as the sender of data labelled "6."

In certain embodiments, the identity of sender device may be verified by matching the signatures on the received message and the received combined signature.

In certain embodiments, identity of the device may be one or more of the following: device address, MAC address, serial number, model name and/or number, manufacturer name and/or number, barcode, RFID number, unique ID number.

In certain embodiments, the network key may be used to sign down link data. The network key may be shared by one or more of the following: portion of the plurality of devices, a substantial portion of the plurality of devices, a portion of the devices on a route, a substantial portion of the devices on a route, a portion of the devices connected to a gateway, a substantial portion of the devices connected to a gateway, portion of the plurality of devices located in the same geographic area, portion of the plurality of devices having at least one common property, for example being a temperature sensor Synchronization If a device is rebooted or reconfigured it may need to be resynchronize to the network. In certain embodiments, the synchronization may be implemented in a number of ways, for example, dedicated sync may be propagated through the network with certain period (i.e., every few seconds) or propagated when individual device requires synchronization. The sync may contain the time slot it is transmitted on as well. The sync may contain the address or signature of the sending device. This address or signature may be Used to reject unintended sync packets. Another example is the device uses its own configuration to achieve synchronization. The device may listen on a channel carrying most traffic (from device's perspective). The device may receive a packet and based on packet length may map the time slots that it may be receiving on. Reception of subsequent packets may narrow the search down until the device finally founds the time slot it is receiving on. Another example is the time slot number may be embedded into the packet. In certain embodiments, combinations of resynchronize devices in the network may be used as well as other resynchronize processes.

Un-Even Bandwidth Allocation

Figure 14:
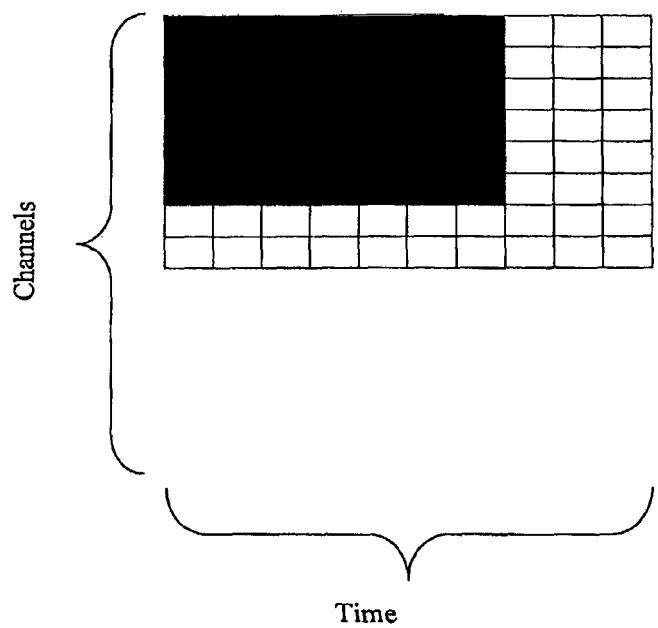
FIG. 14 illustrates an exemplary, uneven resource allocation for a particular device, according to certain embodiments.

In certain embodiments, the network system may be configured to accommodate devices with various bandwidth requirements. For example, devices transmitting 1 kbit every second and devices transmitting 1 bit every second. FIG. 13 illustrates an even resource allocation for a particular device, according to certain embodiments. FIG. 14 illustrates an uneven resource allocation for a particular device, according to certain embodiments. FIG. 14 also depicts a system where one device consumes majority of the system resources. In these examples, frequency and time division is assumed, however other methods and their combination may be used (i.e., CDM, TDM, OFDM, etc.)

Mesh Network Self-Configuration

Certain embodiments are directed to network systems that are capable, or substantially capable, of self-configuration. Network self-configuration is desirable as it does not require external resources (human and/or non-human) in certain embodiments. Embodiments may be self-configuring, or substantially self-configuring, with limited, or reduced, need for external resources (human and/or non-human). Network self-configuration may also be used to extend existing network, stitch a number of networks together. It also provides basis for self-healing.

Self-healing is desirable in mesh networks as it improves robustness and/or reliability by rerouting traffic to take into account introduced changes. The changes may be in form of faulty device (or number of devices), change in link or links conditions (as a result of external factors or as a result planned changes, for example, changing location of some of the devices) or combinations of these factors or other factors.

In certain disclosed embodiments, to allow self-configuration, a certain percent of resources may be allocated for network maintenance. In certain exemplary embodiments, the amount of resources allocated for maintenance may be relatively low. In certain embodiments, the amount of allocated resources of the network for maintenance is typically less than 10%, 8%, 5%, 3%, 2%, 1%, 0.75%, 0.5%, 0.25%, 0.1%, 0.05%, 0.025%, 0.01%, 0.005%, 0.0025% or 0.00125%. In certain embodiments, the amount of allocated resources of the network for maintenance is typically in the range of 10% to 0.00125%, 5% to 0.5%, 3% to 0.25%, 2% to 0.2%, 1% to 0.00125%, 1% to 0.0025%, 0.5% to 0.00125% or 0.25% to 0.00125%.

In some embodiments, the self-healing may be improved by planning resource allocation in a way that some, a substantial portion or all of the links may be corrected by reconfiguring one or minimal amount of devices.

In some embodiments, it may be beneficial to have a network where nodes comprising the network are completely or substantially unaware of network structure. This may be beneficial because it allows to repair broken links by rerouting traffic by updating configuration in only one or substantially small portion of devices.

In exemplary embodiments, the self-configuration process is originated and managed by at least one central computer, at least one controller or other processor. In certain embodiments, the self-configuration process may be originated and managed by a central computer, at least two central computers, a cloud computing resource, one or more processors, a plurality of computing devices or combinations thereof. In other embodiments, the self-configuration process may be originated by adding new devices, change in parameters of the device on the network (for example, changing time between succeeding measurements); removal of the device from the network, change in RF conditions (presence of interferer, change in link quality). For example, the resources allocated for network maintenance are certain time slots on predefined channel. These time slots may change as network configuration is changing. Other forms of resources may be allocated for network maintenance, for example: spreading codes and/or frequency bins in FDD. For example, a spreading code may be reserved for network maintenance. In this example, these maintenance slots are used to communicate with new (un-configured) devices. The new devices may or may not be aware of the existence of those time slots. In this example, there are two types of maintenance time slots: transmit slot (MT) and receive slot (MR). However, other types of maintenance time slots may be used, for example, transmit and receive time slot, where devices use CSMA to transmit.

In this exemplary, a set of commands are used to exchange information between devices. Other methods or commands and other formats may be used. For example, devices may "publish" themselves at preprogrammed intervals, or a state machine may be used instead of command-response method. The commands are:

PUBLISH—this is the request to the device transmit its address or signature, so that other devices may measure the link quality between them and the transmitting device.

READ_RSSI_TABLE—this is the request to read link qualities obtained by listening to the transmitting devices.

WRITE—this is the request to write new configuration.

READ_CRC—this is the request to read CRC of written data. Other ways, or combinations of ways, of checking validity of the data may be employed instead of CRC, for example, hash and/or signature.

ACTIVATE—this is the request to switch to a new configuration.

In this exemplary, to send data to the devices inside existing network, unused bytes are used to carry information. The maintenance command is embedded in down link. The response is carried using unused bytes in the packet and/or unused bytes. Table 1 depicts embedding maintenance command into down link.

TABLE 1

| Parsing | Dev 0 | Dev 3 | Dev 1 | Dev 7 | Dev 5 | Dev 2 | Dev 4 | Dev 6 | Dev 8 |
|---|---|---|---|---|---|---|---|---|---|
| Data1 | C | 0 | 0 | C | 0 | 0 | 0 | C | 0 |
| Data2 | C | M0 | M1 | C | M2 | M3 | M4 | C | M5 |

Parsing shows the parsing rule for given down link, in this example, byte 0 is intended to device 0, byte 1 is intended to device 3, etc. C—designates command to certain device. In this example, commands are sent to devices 0, 6 and 7. Mn—designates byte number n of maintenance command. Data1—is data that would be sent if there is no maintenance command to be sent. Data2—is data that contains maintenance command embedded in it. Other data sizes than byte may be used, i.e., 10 bits, 16 bits, etc.

The maintenance commands for devices configured on the network in this example are:

PUBLISH—the device transmits the devices' address or signature during next time slot MT.

RELAY—the device transmits the data that follows RELAY command during time slot MT.

READ_RSSI—this is a request to read link quality between this device and other device.

WRITE—this, is the request to write new configuration.

READ_CRC—this is the request to read CRC of written data.

Other ways of checking validity of the data may be employed instead of CRC, for example, hash and/or signature. For example, hash value may be generated using SHA-1 algorithm (or any other hash value generating algorithm) and/or a signature may be generated, preferably (but not limited to) using methods outlined in NIST-SP-800-38B.

ACTIVATE—this is the request to switch to a new configuration.

Figure 29:
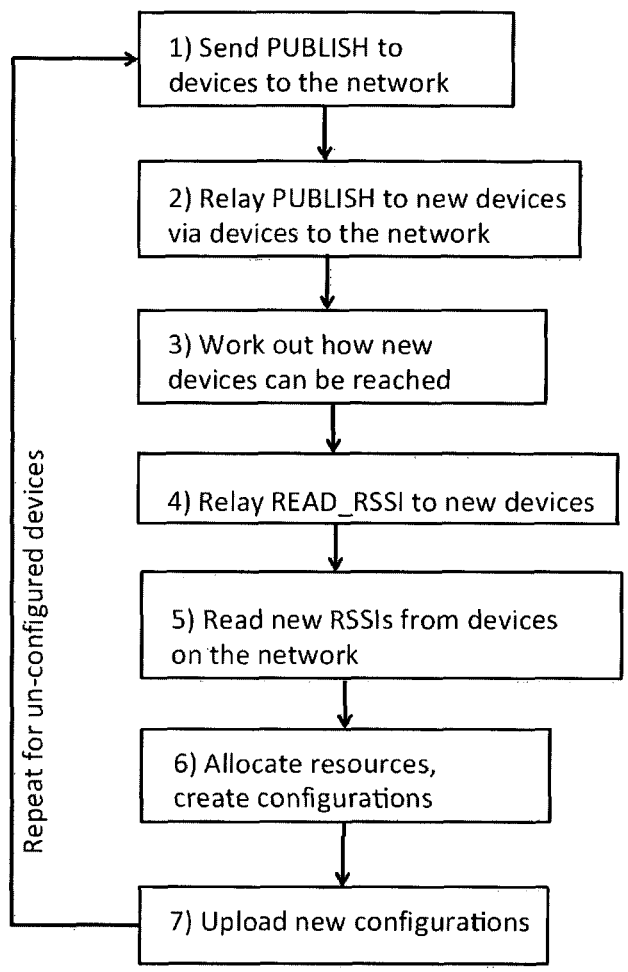
FIG. 29 depicts a flow chart of the self-configuration process, according to certain embodiments.

FIG. 29 depicts a flow chart of the self-configuration process, according to certain embodiments. Other processes for self-configuration may be used that are not limited to the flow chart depicted in FIG. 29. For example, network topology may be inferred based on device location in addition or instead of received signal strength. Or relay devices (used to talk to new devices) may be selected based on location or other information (for example, order of installation).

In this example, new devices are listening on the maintenance channel and record link quality for a substantial portion of, a suitable portion of, or all the devices that they have heard publishing themselves. New device publish itself on the next (or otherwise defined) timeslot. Existing devices (devices configured on the network) are listening on the MR slot and record link quality for the devices they may hear. Device that relays the request, forward the data received on MR time slot back to the central controller. Once information regarding new neighbours is available, it is passed to resource allocator and a new configuration is generated.

In this example, devices are activated in the following order: first new devices, then existing devices starting from most remote from gateway devices (measured by number of hops). Other activation orders may also be used. In other embodiments, devices may be configured in random order. Once device is activated, it synchronizes to the newly configured network and waits for START command. This is done to prevent erratic behaviour while certain of the devices may not be switched to a new configuration.

Another exemplary alternative way of activation is as follows: After receiving activation command, device stores the new configuration, but keeps operating using an old configuration. After activation command has been sent to a substantial portion, a suitable portion or all of the devices that need to be reconfigured, the devices may operate using the old configuration until it misses (or receives incorrect) a packet. After that, it may switch to a new configuration and wait for the sync packet on down link. The device is programmed with an ID of the parent device. The sync packet contains sync signature and device ID.

In this example, the network is fully functional during reconfiguration stage (apart from activation stage, where existing devices may disappear from the network and then reappear in new configuration).

Figure 30:
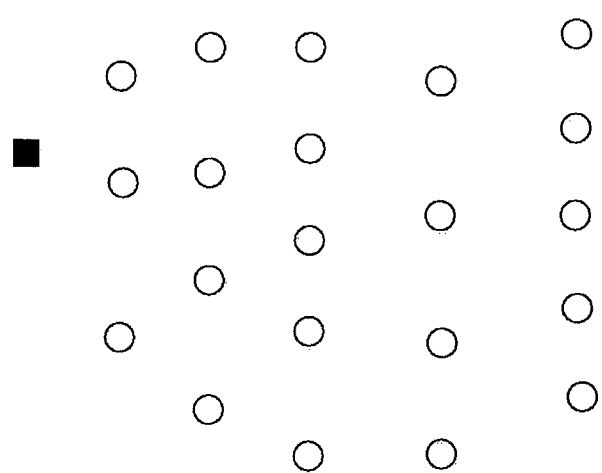
FIG. 30 depicts the process of configuring the network from scratch, according to certain embodiments.
Figure 31:
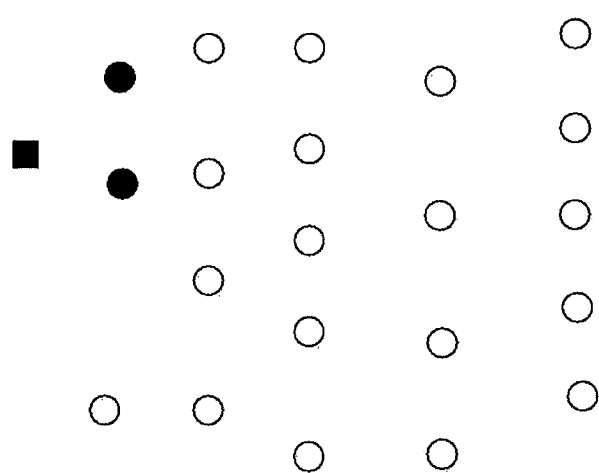
FIG. 31 depicts the first round of self-configuration, according to certain embodiments.
Figure 32:
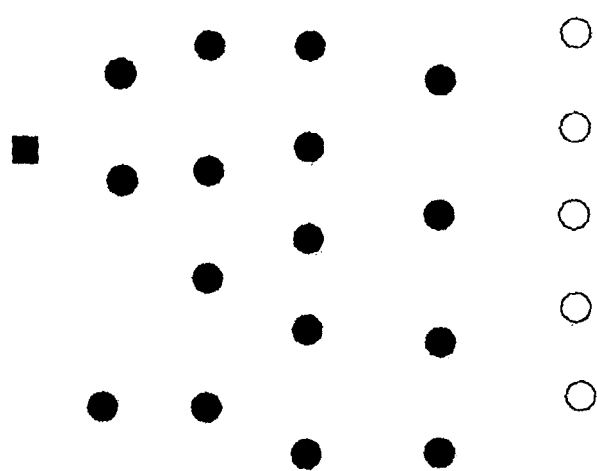
FIG. 32 depicts the process of adding more devices to the existing network, according to certain embodiments.

FIG. 30 depicts the process of configuring the network from scratch, according to certain embodiments. Initially, the network is comprised of only one device—the gateway (square). FIG. 31 illustrates the first round of self-configuration where the devices within one hop from the gateway are added to the network, according to certain embodiments. Filled circles represent devices on the network; empty circles represent new devices that are not yet configured. FIG. 32 shows the process of adding more devices to the existing network, according to certain embodiments.

Forward Configuration

Figure 33:
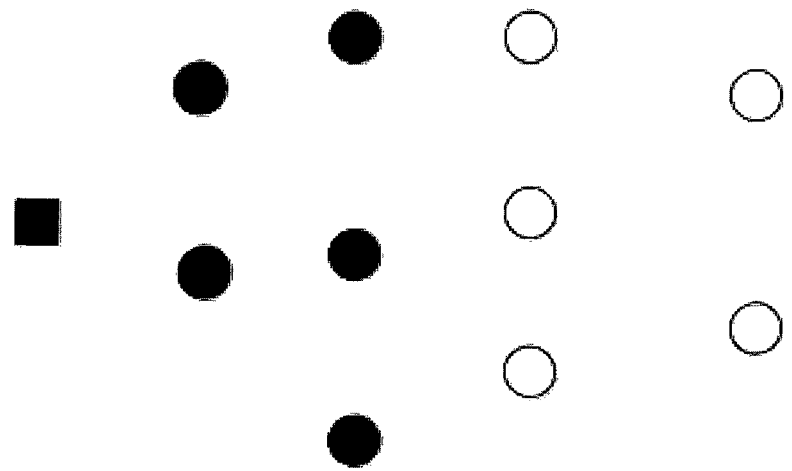
FIG. 33 illustrates down link during configuration, according to certain embodiments.
Figure 33:
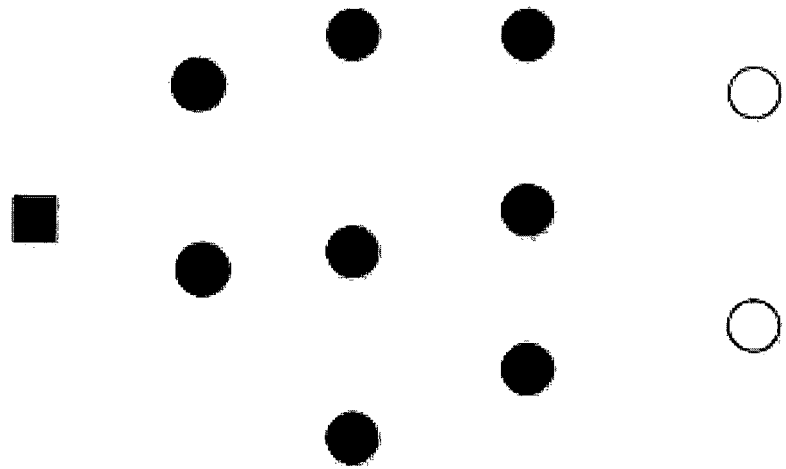

In certain embodiments, in order to reduce one or more of the following: the amount of maintenance traffic, speed-up configuration and self-healing process, it may be desirable to configure (or change configuration) of only new (or affected) nodes. This may be accomplished if nodes are basically unaware of the network topology. In certain embodiments, the nodes do not need to be aware of the network topology to correctly process down link, as the nodes are configured to extract the relevant information from the packet. In certain embodiments, a substantial portion of the nodes are configured to extract the relevant information from the packet. In certain embodiments, each node may be configured to extract the relevant information from the packet. So new devices may be added to the packet, as depicted in FIG. 33.

In order to reduce the amount of maintenance traffic and speed-up configuration and self-healing process, it may be desirable to configure (or change configuration) only new (or affected) nodes. This may be accomplished if nodes are completely unaware of network topology. The nodes do not need to be aware of network topology to correctly process down link, as each node is configured to extract only relevant information from the packet. So new devices may be simply added to the packet, as depicted in FIG. 33.

Figure 34:
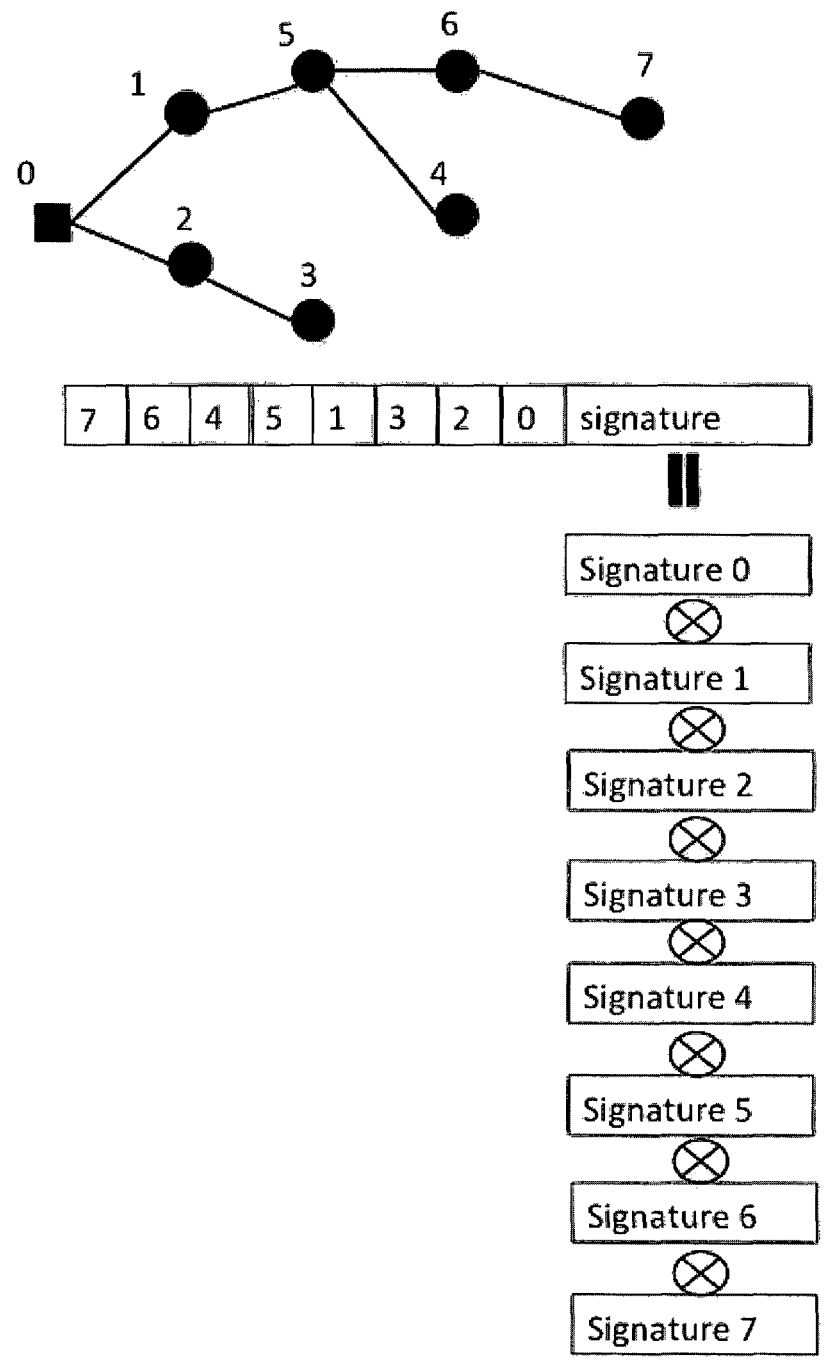
FIG. 34 shows an exemplary up-link packet (with no broken links) sent from the gateway towards central computer, according to certain embodiments.
Figure 35:
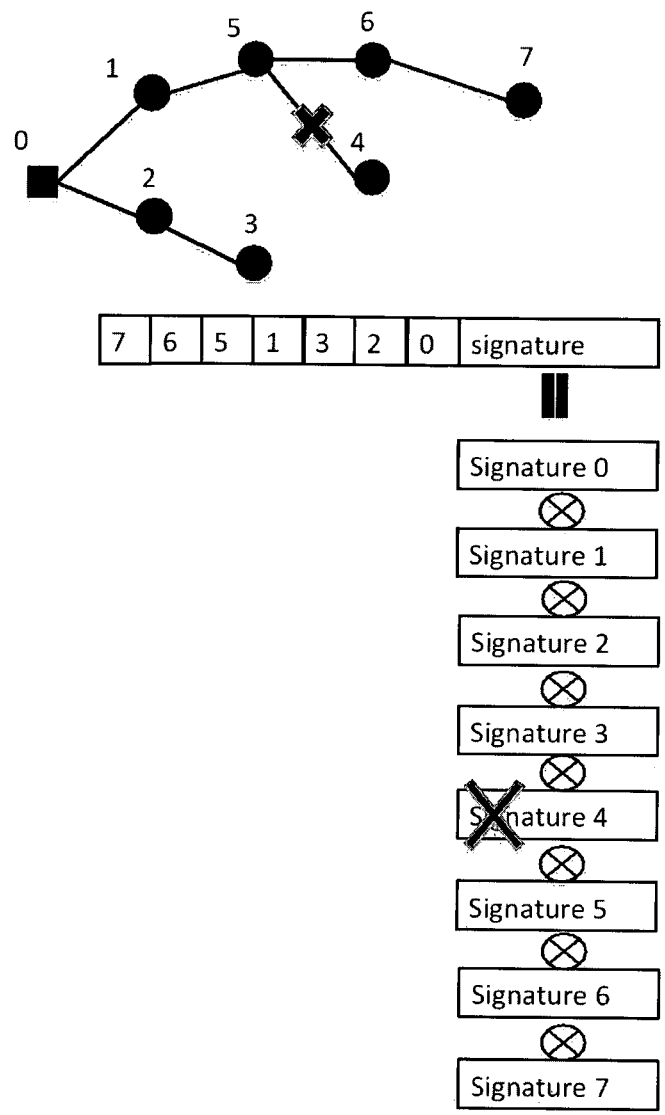
FIG. 35 depicts the process of detecting the broken link (missing nodes), according to certain embodiments.

In certain embodiments, the up-link may be handled by working out the correct set of signatures. FIG. 34 shows an exemplary up-link packet sent from the gateway towards central computer or other processor, according to certain embodiments. FIG. 34 illustrates an up-link packet with no broken links. The signature may be made up by XORing individual signatures. FIG. 35 depicts the process of detecting the broken link (missing nodes), according to certain embodiments. In FIG. 35, the process shows the up-link packet with one broken link. The missing nodes may be determined by excluding the nodes to match the received signature. One implementation may be to try out combinations of broken links until the correct signature is achieved. Other implementations may include: random walk, sorting potential broken links based on link quality and/or past experience. For example: if link between node 5 and 6 is broken, then data from both 6 and 7 may be missing. The packet length may also be used in determination of broken links. For example, if link between node 5 and 6 is broken and each devices transmits 1 byte, the received packet length may be 6 bytes instead of 8. Knowing that packet length is 6 bytes in this case may be used to narrow down the search, for example, link between 1 and 3 cannot be broken, as it would result in packet length of 4 bytes. To limit the computational complexity the amount of broken links may be limited to predefined number. For example, the number of broken links may be limited to 2, 4, 8, 20 or 100. In other embodiments, the number of broken links may be limited to 0.01%, 0.1%, 1%, 2%, 5% or 20% of total links in the network. In other embodiments, the number of broken links may be limited to 0.01%, 0.1%, 1%, 2%, 5%, 20% or 50% of selected links in the network.

Figure 36:
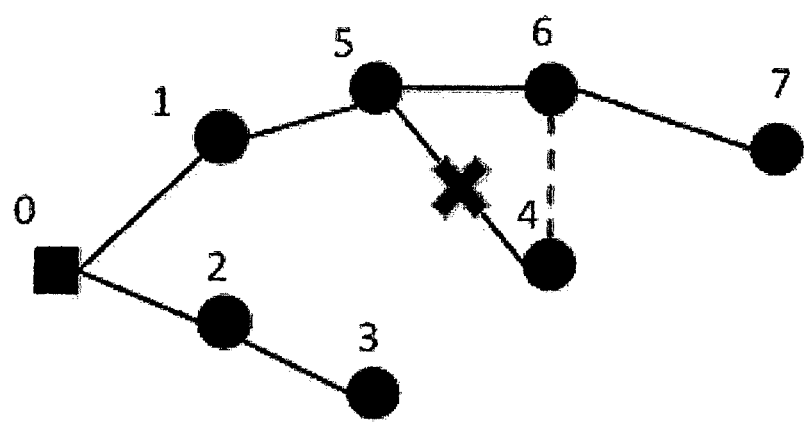
FIG. 36 depicts the process of repairing the broken link, according to certain embodiments.

FIG. 36 depicts the process of repairing the broken link, according to certain embodiments. Tables 2 and 3 show resource allocation before and after the link is repaired, according to certain embodiments. The rows correspond to time slots and columns correspond to frequency channels. In this case only node 4 needs to be reconfigured.

TABLE 2

Resource allocation Number 1

| | | |
|---|---|---|
| 0d | | |
| | 2d | 1d |
| 5d | | 3d |
| | 4d | 6d |
| 7d | | |
| | 4u | 7u |
| 6u | 3u | |
| | 5u | 2u |
| 1u | | |
| | 0u | |

TABLE 3

Resource allocation number 2

| | | |
|---|---|---|
| 0d | | |
| | 2d | 1d |
| 5d | | 3d |
| | | 6d |

TABLE 3-continued

Resource allocation number 2

| | | |
|---|---|---|
| 7d | | |
| | 4d | |
| | 4u | |
| | | 7u |
| 6u | 3u | |
| | 5u | 2u |
| 1u | | |
| | 0u | |

Self-Healing

Figure 44:
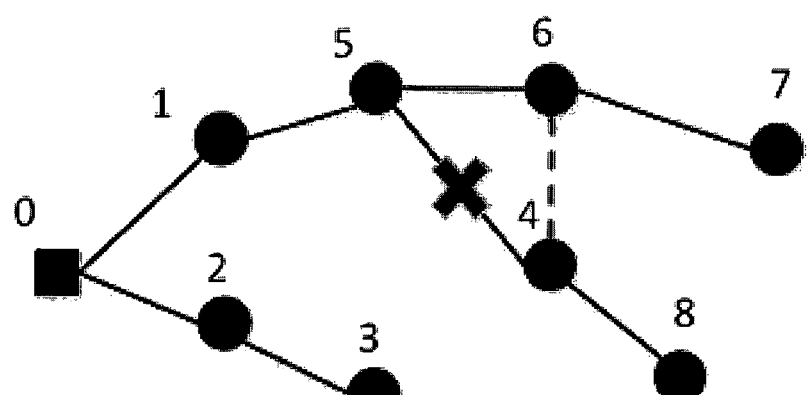
FIG. 44 depicts self-healing by rerouting to avoid broken link, according to certain embodiments.

In certain embodiments, the self-configuration process may be used as part of a self-healing process for the network. For example, the central computer/controller or other processor detects devices that have dropped off the network (as it ceased to receive data from those devices). The devices, in turn, detect that they have ceased to be part of the network (as they have ceased to receive data). The device may erase its configuration after an unsuccessful attempt to resynchronise to the network. From this point, the device may reappear as new device to the network and the central computer or other processor may proceed with self-configuration. Alternatively, the device may wait for the link to be repaired. The device may wait for a predefined time or a predefined number of time slots or a combination of them. Then it may erase its configuration. For example, if link between device 4 and device 5 is broken, as shown in FIG. 44, device 8 will also drop off the network. Device 8 then waits for the link to be repaired. The link is repaired by reconfiguring device number 4.

Addressing Methods

In certain embodiments, the device may be addressed by predefined byte or word offset within timeslot, for example, device receives 100 bytes and extracts bytes from 6 to 8. In another embodiment, the device may be addressed by predefined bit offset within timeslot, for example, device receives 100, bytes and extracts bites from 72 to 84. In another embodiment, the device may be addressed by combining predefined offset within timeslot with very short, short or full address, for example, device receives 100 bytes and extracts bytes from 6 to 8 if byte 5 matches its address. Another example: device receives 100 bytes and extracts bites from 82 to 94 if bit 81 equals to 1. Other embodiments may use offsets in spreading sequence and/or in frequency hopping sequence by itself or in combination with offset within timeslot.

Selective Data Transmission

In certain embodiments, selective data transmission may be beneficial, for example, in cases where: the change in state (the necessity to provide an updated information) of the devices is less frequent; only one (or a few) devices may transmit new information simultaneously; and/or a portion of the network or the entire network needs to operate at low duty cycle (for example, to prolong the battery life). In selective data transmission, the device may transmit very short messages (for example, 1, 2, 3 or 4 bits) indicating the OK (or good) status. There may be predefined messages (e.g., type of messages that may contain variable payload). The device may report change in its state (including not receiving data from devices routed through it) by sending a message. The central computer, or other processor, may acknowledge the change and optionally specify a period of time during which the device is not allowed to transmit the change in its state. This may prevent unstable events from cluttering the network. In certain embodiments, it is possible that several devices may append their messages up to predefined length. The length may be the same across all the devices or different for each device, different for a substantial portion of the devices or different for some devices. For example, device located 50 hops from the gateway may append data if the packet it received from its predecessor is less than 10 bytes; the device located 10 hops from gateway may append data if the packet it received from its predecessor is less than 80 bytes.

For example, a series of sensors along the pipeline. In this exemplary, the following assumptions are made:

250 kbps channels

Sensor every 50 meters

Average RF link distance: 200 m

Sensor receives and transmits one timeslot (up-link and down link) every 30 seconds.

Maximum bytes per time slot: 110

Timeslot: 4 msec

Typical battery life (CR2450): 7 years

Pipeline: 500 km long (2,500 hops, 10,000 sensors)

Delay: 10-40 sec (from the actual event)

Table 4 below depicts the process of OK status propagating through the network. The X indicates ok status. Device A sends "ok." Device B receives it, recognises it as "ok" packet and if its own state is "ok" as well, sends "ok" packet further. Table 5 shows reporting of disconnected node (sub-route), the address of the node that did not receive the packet together with the time-slot of missed packet (required to identify node A) is propagated through the network. Device B did not receive packet from A, therefore it sends a packet containing address of B and possibly and error code. The central computer or other processor works out that device A did not send data. Table 6 shows a propagation of a change of status of device A. Device C has changed status as well and appends its status to the packet. The change is acknowledged on down link, preventing A and C to report new status again (allowing other nodes to report their statuses if changed).

TABLE 4

Devices along one route, status OK

| Time slots | 0 | | | 1 | | | 2 | | ... | 75000 | | |
|---|---|---|---|---|---|---|---|---|---|---|---|---|
| Device A | X | | | | | | | | | X | | |
| Device B | | | | | X | | | | | | | |
| Device C | | | | | | | | X | | | | |

TABLE 5

Devices along one route, missed 3 packets in a row from A

| Time slots | 0 | | | 1 | | | 2 | | ... | 75000 | | |
|---|---|---|---|---|---|---|---|---|---|---|---|---|
| Device A | | | | | | | | | | | | |
| Device B | | | | | B | | | | | | | |
| Device C | | | | | | | | B | | | | |

TABLE 6

Devices along one route, A and C reporting new status

| Time slots | 0 | | | 1 | | | 2 | | ... | 75000 | | |
|---|---|---|---|---|---|---|---|---|---|---|---|---|
| Device A | A | | | | | | | | | X | | |
| Device B | | | | | A | | | | | | | |
| Device C | | | | | | | | A | C | | | |

RF Scanning

Figure 43:
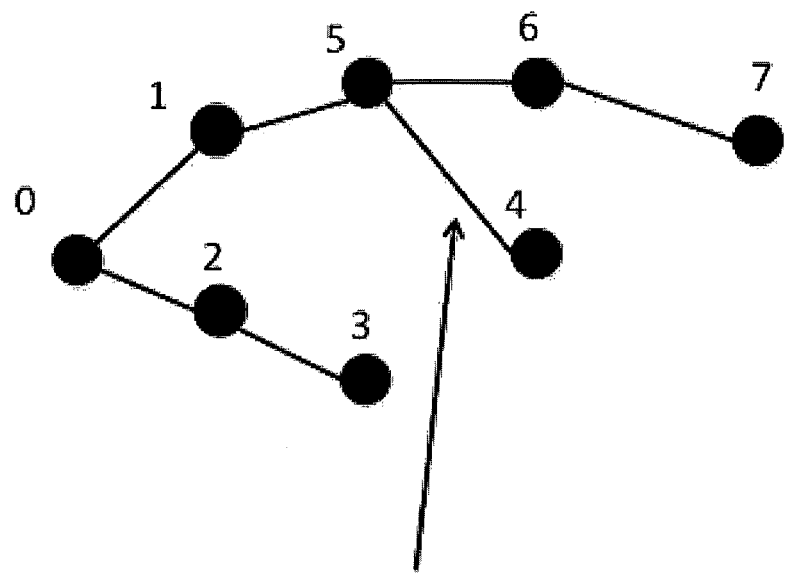
FIG. 43 depicts the process of changing channels to avoid interference, according to certain embodiments.
Figure 43:
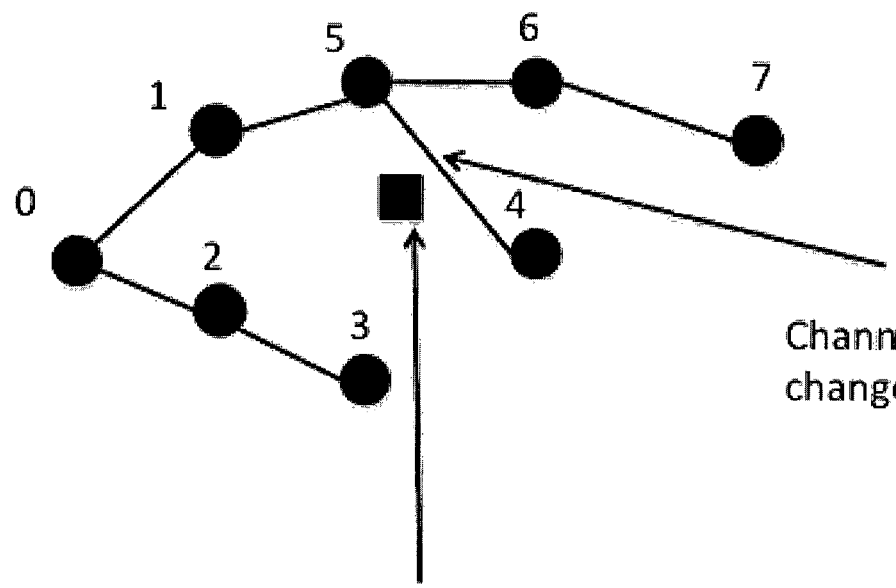

The device may periodically scan RF channels. This information is then conveyed to the central computer or other processor. The central computer or other processor may use this information to allocate or re-allocate resources to avoid or minimize interference. FIG. 43 depicts the process. Initially device 4 was transmitting to device 5 on channel 10. During periodic scan, device 5 detected interference on channel 10. The central computer or other processor reallocated resources and changed the channel to be channel 5, thus avoiding interference.

In certain embodiments, the link quality is used as one (or the only one) of the parameters that determine path allocation. In multihop networks it may be desirable to have better quality links close to gateway. This may be desirable as it reduces overall packet loss in the system. In such embodiments, the weight assigned to link quality may increase as number of hops to gateway decreases.

Avoiding Interference by Delaying the Transmission

In certain embodiments, the device may delay its transmission if an interfering signal exists on the RF channel allocated or selected for the transmission, within bandwidth allocated or selected for the transmission. The device may sense the RF channel allocated or selected for the transmission and determine whether interference exists, the device then may delay the transmission until interference is removed, the device does not sense the interference, predefined waiting time has elapsed or combination thereof. For example, if device transmits at baud rate B, and the device has to transmit N bits, and the time slot is T seconds and transmitter turn on time is D, and W=T−D−N/B then the device may sense the RF channel and transmit when channel is free or after sensing the channel for W seconds. In certain embodiments, D may be zero. In certain embodiments, D may be receiver turn off time plus transmitter turn on time. In certain embodiments, D may be a sum of one or more of the following: receiver turn on time, receiver turn off time, transmitter turn on time and transmitter turn off time.

Synchronisation in Multi-Gateway Environment and Synchronisation of Adjacent Independent Networks It may be desirable or necessary to avoid or minimize interference between adjacent networks. In certain embodiments, this may be achieved by treating adjacent networks as parts of a bigger network. The gateways are synchronized and resources are allocated so that adjacent devices (connected to different gateways) do not interfere with each other.

Gateway Synchronization of at Least Two Networks

In certain embodiments, there may be at least two networks, wherein the networks have a plurality of devices. There may also be situations where you have multiple networks, for example, at least two, three, or four networks. The at least first network may have one or more of the following: a gateway, an access point and a router. The at least second network may have one or more of the following: a gateway, an access point and a router. In certain embodiments, one of the networks may not have one or more of the following: a gateway, an access point and a router. In these situations the network may be treated as part of another network that does have one or more of the following: a gateway, an access point and a router. A portion of the devices from the at least first network is located in such proximity to the portion of the devices from the at least the second network that the portion of the devices from the at least first network is capable of interfering with portion of the devices from the at least second network. The potential interference may be substantially minimized or sufficiently avoided by making the at least first network and the at least second network to operate synchronously or substantially synchronously, and by allocating resources used by at least a portion of the devices from the at least first network and at least a portion of the devices from the at least second network so that in a substantial amount of occasions resources used by at least a portion of the devices from the first network are different from the resources used by at least a portion of the devices from the second network.

There may be embodiments where it may be desirable to synchronize two or more networks. Network synchronization may be achieved by having at least one device from network A listen to one or more timeslots on network B; recording time offsets and conveying this data to the at least one other device from network A or a gateway A from Network A. The at least one gateway A from Network A, then adjusts its timing.

In certain embodiments, network synchronization may be used to significantly reduce or substantially avoid interference between a portion of the devices in one network and a portion of the devices in another network.

In certain embodiments, networks may contain none, one or more of the following: gateway, access point and a router.

In certain embodiments, the interference may be avoided, substantially avoided, substantially minimized or minimized by detecting and/or knowing adjacent devices and allocating resources so that interference is sufficiently addressed. For example, allocating different frequency channels to adjacent devices belonging to different networks.

In certain embodiments, the adjacent networks may be loosely synchronized. For example, the gateways may be in synch within suitable predefined time intervals (Tsync), for example 1, 10 or 20 seconds. Other suitable predefined time intervals may also be used. The predefined time interval may also be defined by a ratio of time slot to the time interval, wherein the ratio may be approximately 0.01%, 0.1%, 1%, 10% or 50%. The predefined time interval may also be defined by a ratio of time slot to the time interval, wherein the ratio may be between 0.01% to 50%, 0.1% to 10%, 0.01% to 5%, or 10% to 25%. Other suitable ratios may also be used. The predefined time interval (Tsync) may also be defined by a combination of time slot, clock drift and guard time, wherein the guard time may be approximately 0.01%, 0.1%, 1%, 10% or 50% of the time slot. The predefined time interval may also be defined by a combination of time slot, clock drift and guard time, wherein the guard time may be between 0.01% to 50%, 0.1% to 10%, 0.01% to 5%, or 10% to 25%. Other suitable guard times may also be used.

Conventional synchronization methods (for example, NTP) may also be used to keep the gateways in sync. The adjacent devices belonging to different networks may be assigned the same or similar frequency channel if their timeslots are apart by more than Tsync.

Short Sub-Networks

Figure 53A:
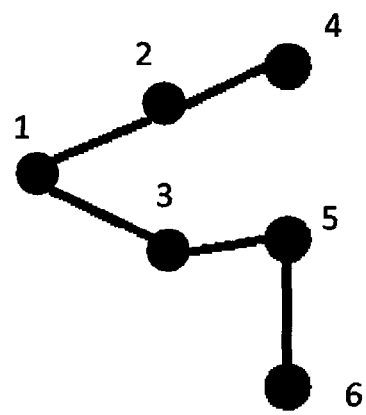
FIGS. 53A and 53B illustrate short-loop sub-networks, according to certain embodiments.
Figure 53B:
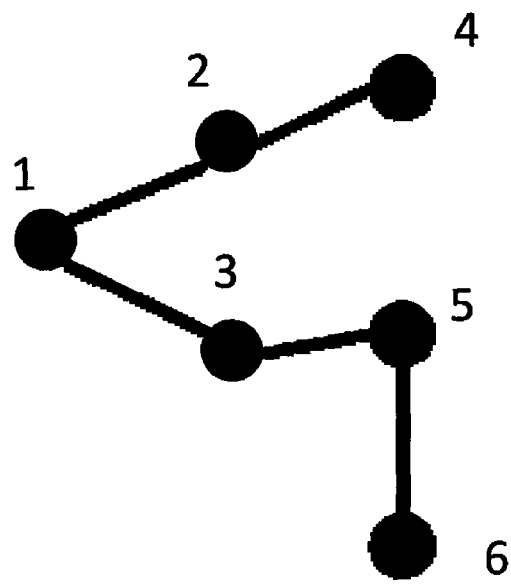

The network may be configured to have sub-networks. FIGS. 53A and 53B illustrate short sub-networks. FIG. 53A depicts a packet of data received at device 3. FIG. 53B depicts a second packet or modified packet of data received at device 6. Device 3 may send data to device 6. In this example, device 3 is configured to receive a packet that may contain data for usage by device 3, extract the received data, replace the received data, substitute the received data with new data intended for device 6 and send the data. Device 6 is configured to receive the data, retrieve the data from device 3, and retrieve the data addressed for device 6.

As illustrated in FIGS. 53A and B, device 3 may send data to device 6. In this example, device 3 is configured to receive a packet that may contain data for usage by device 3, extract the received data, replace the received data, substitute the received data with new data intended for device 6 and send the data. Device 6 is configured to receive the data, retrieve the data from device 3, and retrieve the data addressed for device 6. Device 6 is configured to receive the data, and retrieve the data from device 3.

In certain embodiments, device 3 may encrypt the data and device 6 may decrypt the data.

In certain embodiments, device 3 may encrypt the data using one time pad generated using dedicated DRBG and device 6 may decrypt the data using one time pad generated using dedicated DRBG.

In certain embodiments, device 3 may append a signature to authenticate the message in subsequent packets.

In certain embodiments, device 3 may be configured to extract the data sent by device 6.

In certain embodiments, short sub-networks may be beneficial as they may shorten data latency.

Figure 54:
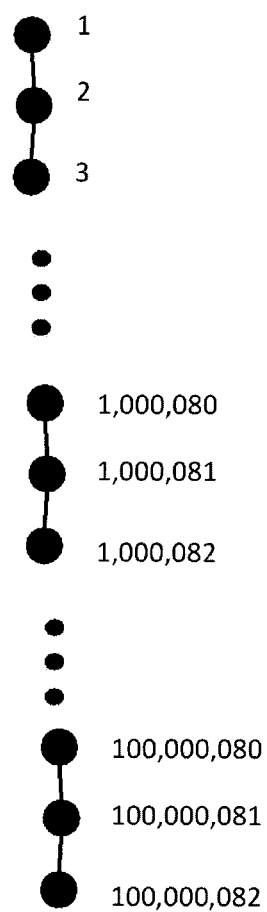
FIG. 54 illustrates a very large multihop network, according to certain embodiments.

FIG. 54 depicts a route in an exemplarily embodiment with 100,000,081 hops, according to certain embodiments. In this exemplarily embodiment, the period is 100 msec and the time slots are in msec. Device 1 is configured as shown in table 11, where n is from 0 to 833,338:

TABLE 11

| Time slot | Channel | Action |
|---|---|---|
| 0 | 5 | Rec maintenance |
| 5 | 5 | Send maintenance |
| 10 | 0 | Get data down (and process) |
| 15 | 1 | Send data down |
| 20 | 2 | Rec data up |
| 25 | 3 | Append measurement |
| 30 + n*20 | 2 | Get data down (pass through) |
| 35 + n*20 | 3 | Send data down |
| 40 + n*20 | 4 | Rec data up |
| 45 + n*20 | 5 | Append measurement |

Device 2 is configured as shown in table 12:

TABLE 12

| Time slot | Channel | Action |
|---|---|---|
| 0 | 5 | Rec maintenance |
| 5 | 5 | Send maintenance |
| 10 | 1 | Rec data up |
| 15 | 1 | Get data down (and process) |
| 20 | 2 | Append measurement |
| 30 + n*20 | 3 | Rec data up |
| 35 + n*20 | 3 | Get data down (pass through) |
| 40 + n*20 | 4 | Append measurement |
| 45 + n*20 | 1 | Send data down |

Device 1000080 is configured as shown in table 13:

TABLE 13

| Time slot | Channel | Action |
|---|---|---|
| 0 | 5 | Rec maintenance |
| 5 | 5 | Send maintenance |
| 10 | 0 | Get data down (and process) |
| 15 | 1 | Send data down |
| 20 | 2 | Rec data up |
| 25 | 3 | Append measurement |
| 30 + n*20 | 2 | Get data down (pass through) |
| 35 + n*20 | 3 | Send data down |
| 40 + n*20 | 4 | Rec data up |
| 45 + n*20 | 5 | Append measurement |

Device 1000081 is configured as shown in table 14:

TABLE 14

| Time slot | Channel | Action |
|---|---|---|
| 0 | 5 | Rec maintenance |
| 5 | 5 | Send maintenance |
| 10 | 1 | Rec data up |
| 15 | 1 | Get data down (and process) |
| 20 | 2 | Append measurement |
| 30 + n*20 | 3 | Rec data up |
| 35 + n*20 | 3 | Get data down (pass through) |
| 40 + n*20 | 4 | Append measurement |
| 45 + n*20 | 1 | Send data down |

Device 100000080 is configured as shown in table 15:

TABLE 15

| Time slot | Channel | Action |
|---|---|---|
| 0 | 5 | Rec maintenance |
| 5 | 5 | Send maintenance |
| 10 | 0 | Get data down (and process) |
| 15 | 1 | Send data down |
| 20 | 2 | Rec data up |
| 25 | 3 | Append measurement |
| 30 + n*20 | 2 | Get data down (pass through) |
| 35 + n*20 | 3 | Send data down |
| 40 + n*20 | 4 | Rec data up |
| 45 + n*20 | 5 | Append measurement |

Device 100000081 is configured as shown in table 16:

TABLE 16

| Time slot | Channel | Action |
|---|---|---|
| 0 | 5 | Rec maintenance |
| 5 | 5 | Send maintenance |
| 10 | 1 | Rec data up |
| 15 | 1 | Get data down (and process) |
| 20 | 2 | Append measurement |
| 30 + n*20 | 3 | Rec data up |
| 35 + n*20 | 3 | Get data down (pass through) |
| 40 + n*20 | 4 | Append measurement |
| 45 + n*20 | 1 | Send data down |

The modeled network is based on 100,000,082 wireless devices spread over the area so that individual device may communicate with at least one other device, equipped with 8051 base MPU and 64 KB of RAM, capable of transmitting and receiving data on 10 5 MHz RF channel, positioned approximately between 5 to 15 meters from each other, individual devices transmit at +4 dBm, and sensitivity of individual devices is −97 dBm, and the data sent to individual devices is 1 byte long and the data packet is 128 bytes (120 bytes of data plus 8 bytes of signature), only first 8 bytes are shown. The area covered may be substantially horizontal in nature or a combination of horizontal and vertical placement of the wireless devices depending on a particular embodiment.

Table 17 shows packets sent from device 1 on the down link, the number indicates the intended device:

TABLE 17

| timeslot | Data0 | Data1 | Data 2 | Data 3 | Data 4 | Data 5 | Data 6 | Data 7 |
|---|---|---|---|---|---|---|---|---|
| 15 | 1 | 2 | 3 | 4 | 5 | 6 | 7 | 8 |
| 35 | 121 | 122 | 123 | 124 | 125 | 126 | 127 | 128 |
| 55 | 241 | 242 | 243 | 244 | 245 | 246 | 247 | 248 |
| 75 | 361 | 362 | 363 | 364 | 365 | 366 | 367 | 368 |
| 95 | 1 | 2 | 3 | 4 | 5 | 6 | 7 | 8 |
| 115 | 121 | 122 | 123 | 124 | 125 | 126 | 127 | 128 |
| 135 | 241 | 242 | 243 | 244 | 245 | 246 | 247 | 248 |
| ⋮ | | | | | | | | |
| 166695 | 1000080 | 1000081 | 1000082 | 1000083 | 1000084 | 1000085 | 1000086 | 1000087 |
| 166715 | 1000200 | 1000201 | 1000202 | 1000203 | 1000204 | 1000205 | 1000206 | 1000207 |
| 166735 | 1000320 | 1000321 | 1000322 | 1000323 | 1000324 | 1000325 | 1000326 | 1000327 |
| 166755 | 1000440 | 1000441 | 1000442 | 1000443 | 1000444 | 1000445 | 1000446 | 1000447 |
| 166775 | 1000080 | 1000081 | 1000082 | 1000083 | 1000084 | 1000085 | 1000086 | 1000087 |
| 166795 | 1000200 | 1000201 | 1000202 | 1000203 | 1000204 | 1000205 | 1000206 | 1000207 |
| 166815 | 1000320 | 1000321 | 1000322 | 1000323 | 1000324 | 1000325 | 1000326 | 1000327 |
| ⋮ | | | | | | | | |
| 16666695 | 100000080 | 100000081 | 100000082 | 100000083 | 100000084 | 100000085 | 100000086 | 100000087 |
| 16666715 | 100000200 | 100000201 | 100000202 | 100000203 | 100000204 | 100000205 | 100000206 | 100000207 |
| 16666735 | 100000320 | 100000321 | 100000322 | 100000323 | 100000324 | 100000325 | 100000326 | 100000327 |
| 16666755 | 100000440 | 100000441 | 100000442 | 100000443 | 100000444 | 100000445 | 100000446 | 100000447 |

TABLE 17-continued

| timeslot | Data0 | Data1 | Data 2 | Data 3 | Data 4 | Data 5 | Data 6 | Data 7 |
|---|---|---|---|---|---|---|---|---|
| 16666775 | 100000080 | 100000081 | 100000082 | 100000083 | 100000084 | 100000085 | 100000086 | 100000087 |
| 16666795 | 100000200 | 100000201 | 100000202 | 100000203 | 100000204 | 100000205 | 100000206 | 100000207 |

The present example illustrates that large scale networks may be set up and used to collect data and/or communicate data over large number of hops without substantial additional infrastructure and/or additional overhead.

The number of hops in a route may be limited by one or more factors, for example, in certain embodiments, the number of hops in a route may be limited by the following factors: (1) latency—if timeslot is X msec and required latency is Y msec, then maximum number of hops is Y/X; and/or (2) link quality—if probability of packet error is F(SNRi), where F is a function and SNRi is Signal to Noise Ratio of link i, then probability of receiving a packet on N hops route is $\Pi_{i=0}^{N} F(SNR_i)$. In many applications in the prior art, the number of hops is quite limited which limits the number of devices in the route. Certain embodiments of the present disclosure provide technology that permits much larger numbers of hops due to the disclosed one or more factors, methods, techniques and/or solutions. For example, using one or more aspects of the technology disclosed the link quality limitation may be mitigated by increasing the signal to noise ratio. In an exemplarily embodiment of BPSK modulation, according to certain embodiments, increasing signal to noise ratio by a factor of 10 from 1% packet error rate means that number of hops may be more than 100,000,000.

The length of time provided for the timeslots may vary depending on a number of factors, for example, radio frequency, modulation, antenna diversity, distance between individual devices, sensitivity of individual devices and transmit power of individual devices or combinations thereof. Depending on the particular embodiment, the time slots may be in milliseconds, hundreds of microseconds, tens of microseconds, microsecond, hundreds of nanoseconds, tens of nanoseconds or combinations thereof.

Single Hop Networks

Certain embodiments disclosed herein are directed to what may be referred to as single hop networks. The single hop network may consist of an access point or base station and a plurality of devices capable of exchanging data with the access point and/or base station.

The system may use CDMA as physical layer.

The system may increase coding gain by lowering data rate, thus increasing coverage.

All of, or a substantial portion of, the devices may be configured to transmit and/or receive at predefined time or at predefined timeslot using predefined resource, in this exemplary embodiment of the CDMA code.

The amount of devices transmitting simultaneously may be determined by the amount of available codes.

Timeslots may be allocated to substantially eliminate the near-far problem. This may be done by allocating timeslots so that devices from which signals are received at the base station have the same level, substantially the same level or have levels such that level difference is small enough that it does not cause the near-far problem at the base station, transmit at the same time.

The data rate may be configured to be different depending on the link quality between device and the base station.

The Down Link:

A substantial portion of individual devices each configured to listen on the predefined time slot, extracting relevant to it data from predefined offset and amount of data.

The data may be extracted in other ways, for example, by specifying a bit map, for example the device is preconfigured to use bits 1, 3, 5, 7, 8, 9, 15, 16 and 17 from the data stream; it is also possible to configure the device to organize the bits in different order, for example, 3, 5, 7, 1, 17, 15, 16 and 8.

A substantial portion of individual devices each resynchronizes its clock using start of frame or any other point in the received symbol stream.

Up-Link:

A substantial portion of individual devices configured to transmit its data at predefined time using predefined resource at predefined baud rate; the amount of data to transmit may also be predefined. Other device configurations for a substantial portion of the individual devices are also disclosed, for example, one or more of the following: a substantially predefined time or a time window may be used; the amount of data may be defined by minimum and/or maximum amount of data to be transmitted; a pool of resources may be specified; and the data rate may be adjusted for each transmission, for example based on signal strength of last received or several last received transmissions.

Network Embodiments Benefits

The networks, systems and methods disclosed herein may result in one or more of the following features and/or advantages:

(1) allows for full or substantially full utilization of resources;
(2) simplifies base station implementation as number of required correlators may be significantly reduced, as number of correlators depends on allowable drift in devices' clock;
(3) resynchronization of devices may be done after reception of data on down link;
(4) simplifies device implementation as number of correlators may be significantly reduced, since the number of correlators depends on allowable drift in devices' clock; and
(5) lowering data rate also means that timeslots become longer thus reducing the ratio of guard time to time slot length.

Figure 45:
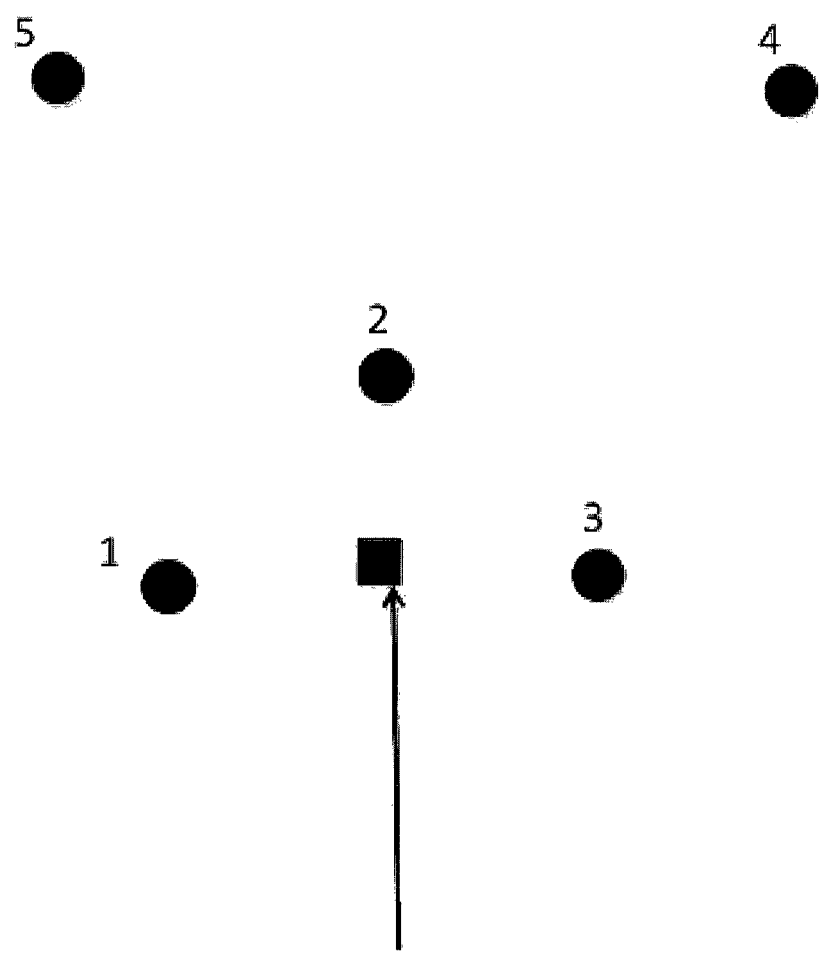
FIG. 45 depicts a one hop network, according to certain embodiments.

FIG. 45 depicts a typical one hop network, only 5 devices are shown for simplicity, however such a network may contain 100, 1000, 10,000 or more devices.

Figure 46:
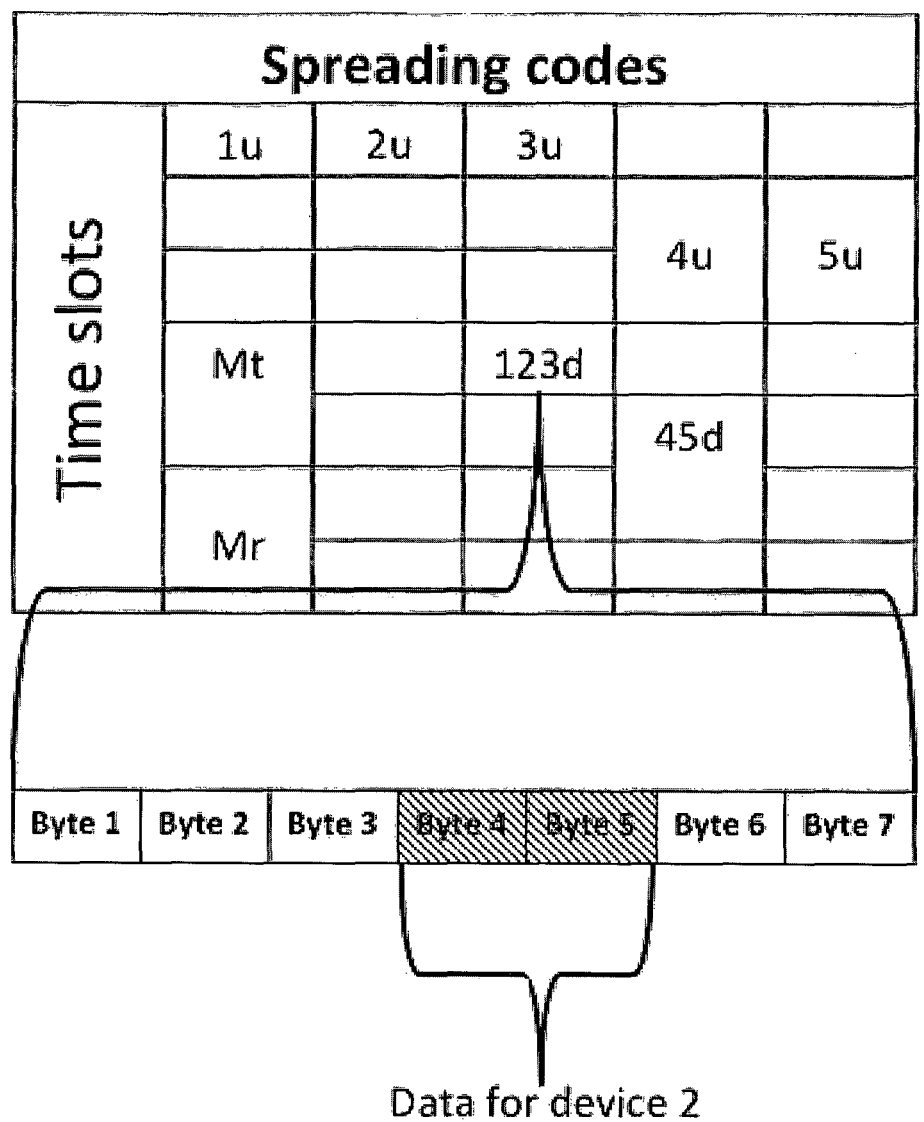
FIG. 46 shows resource allocation for one hop network, according to certain embodiments.

FIG. 46 shows an exemplary resource allocation for such a network, it also shows how the data is extracted; the time slots Mt and Mr are used for network maintenance in particular for adding new devices on the network.

Security:

In certain embodiments, an individual device and the central computer (or other processor), both generate one time random key every timeslot; this key may be used to encrypt decrypt the data.

In certain embodiments, the system may be partitioned so that only a portion of the devices may transmit simultaneously, devices within the portion of the devices use predefined back-off periods, so that back-off periods of a at least one device within the portion of devices are at least slightly different from at least one other device within the portion of devices, the substantial portion of the portion of devices back-off for a predefined back-off period in case of failure to receive an acknowledgement of successful transmission.

The use of pre-defined back-off periods may be beneficial as it allows a reduction in collision recovery time, especially in systems with many devices.

Figure 65:
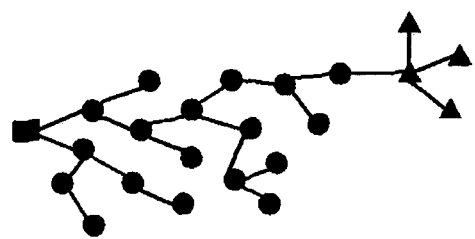
FIG. 65 depicts an exemplarily embodiment where another network, designated by triangles, is connected to a mesh network.

FIG. 65 depicts an exemplarily embodiment where another network, designated by triangles, is connected to a mesh network. In certain embodiments, the other network may be one or more of the following: a ZigBee network, a WiFi network, a Bluetooth network, a Low power Bluetooth network, a ModBus network, a BACNET network, a LON network, a RS232 network, a RS422 network and a power modem based network.

In certain embodiments, existing devices may be repurposed and may act as a gateway. In certain embodiments, existing devices may be one or more of the following: a smart phone, a tablet, a USB stick and a computer. In certain embodiments, the existing device may perform gateway functions in addition to its regular functions.

Energy Usage

Figure 58:
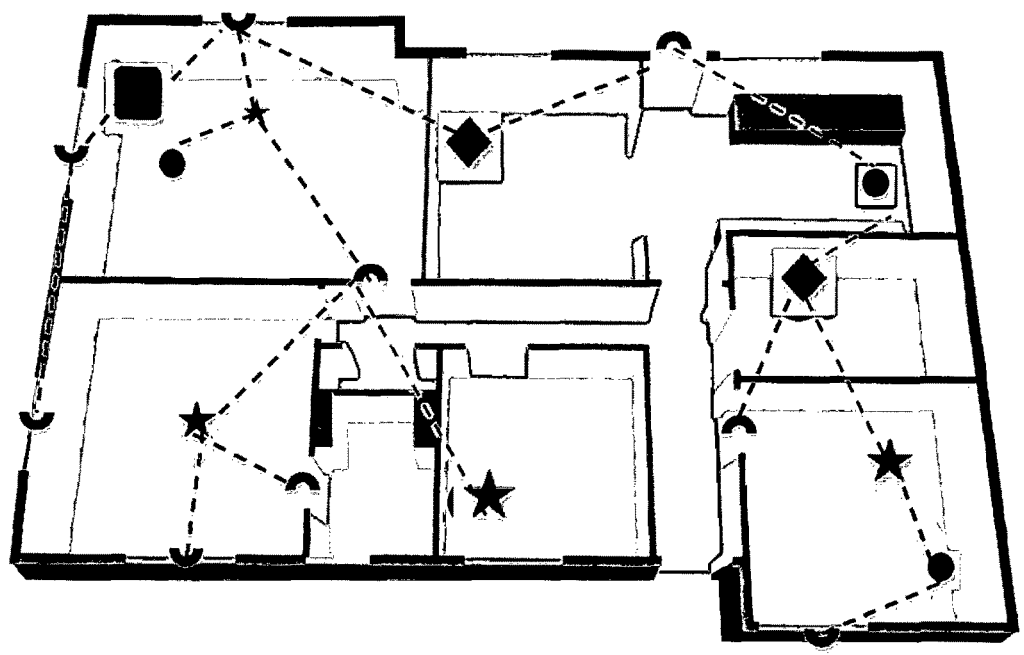
FIG. 58 depicts plurality of sensors and controllers deployed in a building floor, according certain embodiments.
Figure 59:
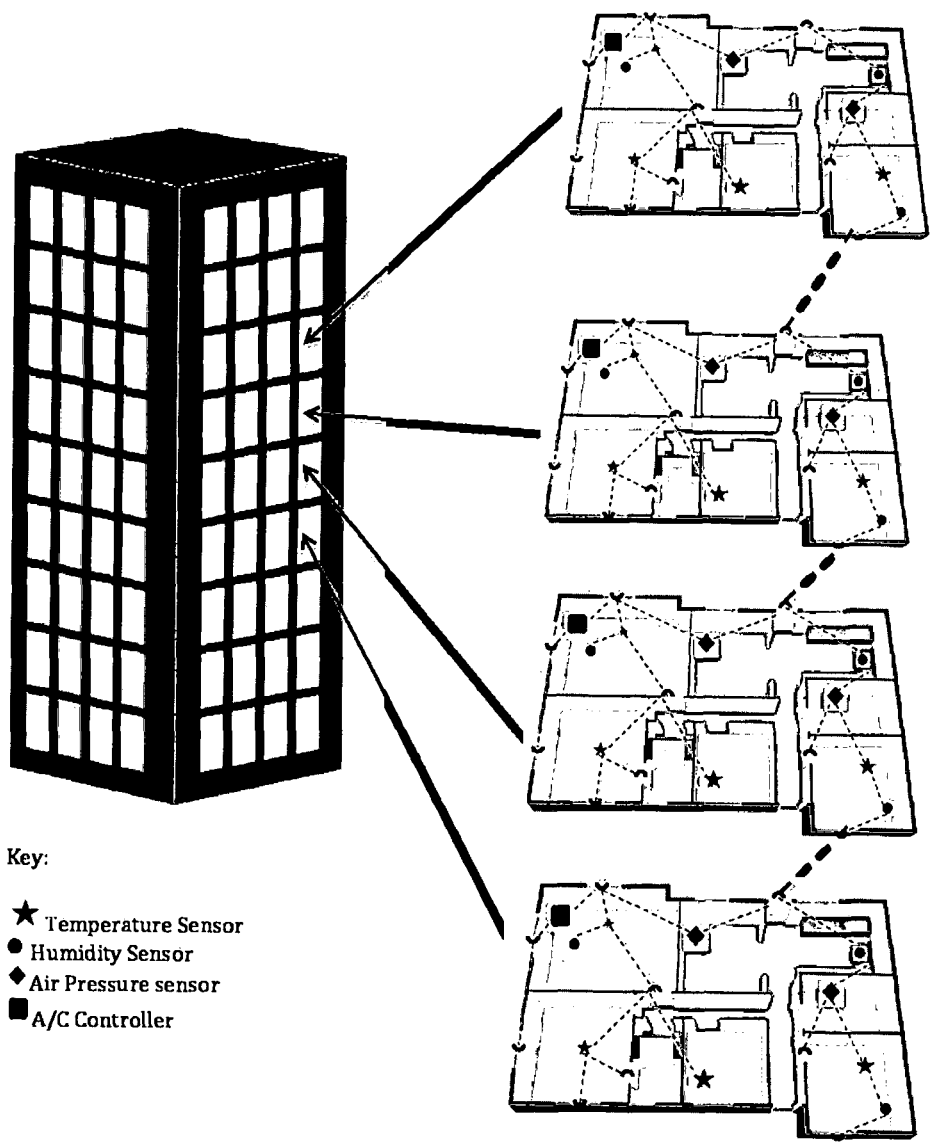
FIG. 59 depicts plurality of sensors and controllers deployed in multistory building, according to certain embodiments

Certain embodiments are directed to systems, methods and/or devices that may be used to manage energy usage related functions over an area that is being, managed. FIG. 58 depicts plurality of sensors and controllers deployed in a building floor. FIG. 59 depicts plurality of sensors and controllers deployed in multistory building. The area being managed may vary in size. The area being managed for energy usage may be a building, a portion of a building, a structure, a portion of a structure, an infra-structure, a portion of an infra-structure, a plurality of buildings, a plurality of structures, a plurality of infra-structures, a city, a portion of a city, a region, a portion of a region and so forth. Certain embodiments are directed to setting up and implementing a network of sensors and/or controllers over the area in which energy usage is to be managed, wherein the sensors (or a portion of the sensors) monitor one or more physical functions, and wherein the controllers (or a portion of the controllers) control at least in part the infra-structure that provides energy to the area. By collecting data regarding the one or more physical functions, the data collected may be used to provide instructions to not alter the energy usage, alter the energy usage in one or more portions of the area, increase energy usage in one or more portions of the area, decrease energy usage in or more portions of the area or combinations thereof. The instructions provided to one or more portions of the area being managed may vary depending on one or more factors, for example, the time of day, the occupancy level, weather conditions, energy prices, forecasted occupancy levels, forecasted weather conditions, forecasted energy prices. In certain embodiments, the data collected may be used to generate energy usage patterns and/or curves that allow for adjustments to the energy used in the area being monitored and in aggregate may result in substantial savings in energy cost or energy consumption. Certain embodiments may result in substantial savings in energy costs or energy consumption and substantially maintain and/or increased comfort (or perceived increased comfort) of the occupants of the area being managed. In certain embodiments, the data collected may be used to generate energy usage patterns and/or curves that allow for adjustments to the energy used in other similar areas and in aggregate result in substantial savings in energy cost or energy consumption. Again, the use of energy usage patterns and/or curves may result in substantial aggregated savings in energy costs or energy consumption and maintaining and/or increasing the comfort (or perceived comfort) of the occupants of the area being managed. In certain embodiments, the data collected may be combined with other information about the area being managed and/or the surrounding environment and used to generate energy usage patterns and/or curves that allow for adjustments to the energy used and in aggregate result in substantial savings in energy cost or energy consumption. Again, the use of energy usage patterns and/or curves combined with other information about the area may result in substantial aggregated savings in energy costs or energy consumption and maintaining and/or increasing the comfort (or perceived comfort) of the occupants of the area being managed. Such networks have been too expensive to date due to at least in part the cost of setting up, using and/or maintaining such a network of sensors and/or controllers. Using one or more aspects of the technology disclosed herein, such networks may be implemented and/or implemented in a cost effective manner.

Certain embodiments are directed to methods and/or systems, wherein a plurality of sensor devices and/or a plurality of controller devices are deployed over an area, for example, in a building, in a portion of a building and/or in a plurality of buildings. A substantial portion of the deployed plurality of sensors are configured to determine one or more physical functions and are capable of transmitting data and/or receiving data. This function may also be performed by one or more of the plurality of controllers, if desired. Data collected from the plurality of sensors and/or plurality of controllers may be transmitted via the network to a computer or processes. The data collected may be processed by a computer or processor and may be used to perform one or more of the following: increase energy usage in one or portions of a building, decrease energy usage in one or portions of a building, increase energy usage in one or portions of a plurality of buildings, decrease energy usage in one or more portions of a plurality of buildings, optimize energy usage at one building, optimize energy usage at a portion of a building, optimize energy usage in a plurality of buildings, optimize energy usage in a substantial portion of the building sites, provide recommendations or instructions as to how to adjust energy usage in one or more portions of a building, provide recommendations or instructions as to how to adjust energy usage in one or more portions of a plurality of builds, substantially maintain comfort of occupants, increase comfort of occupant and combinations thereof. In certain embodiments, the data collected may also be used minimize peak power and/or current consumption in one or more of the following: a building, portions of a building, one or more portions of a plurality of buildings, a plurality of buildings, an area being managed, one or more portions of an area being managed, a structure, a portion of a structure, one or more portions of a plurality of structures, a plurality of structures, a city, a portion of a city, a region, a portion of a region and so forth. The minimizing of peak power and/or current consumption may be implemented by providing recommendations or instructions as to how to adjust energy usage for one or more of the following: a building, portions of a building, one or more portions of a plurality of buildings, a plurality of buildings, an area being managed, one or more portions of an area being managed, a structure, a portion of a structure, one or more portions of a plurality of structures, a plurality of structures, a city, a portion of a city, a region, a portion of a region and so forth. In certain embodiments, the systems and/or methods may be used to optimize energy usage, minimize peak power, minimize current consumption or combinations thereof.

In certain embodiments, efficiency of energy usage and/or the load shape of usage may be used at least in part for optimizing the supply of power to an area or a portion of an area. For example, a building, portions of a building, one or more portions of a plurality of buildings, a plurality of buildings, an area being managed, one or more portions of an area being managed, a structure, a portion of a structure, one or more portions of a plurality of structures, a plurality of structures, a city, a portion of a city, a region, a portion of a region or combinations thereof. One cost effective investment in power supply may be is to invest in reducing the energy demand from a facility (so called "negative energy or negawatts"). There are several ways in which energy may be used more efficiently, for example, investment in more efficient capital assets that utilize the supplied power more efficiently (as in the replacement of existing lighting with LED lighting). Another way of adjusting the desired energy usage is based at least in part on the environment. For example, one or more of the following:

1. Whether or not people are present in the building (adjusting and/or fine tuning energy usage based at least in part on occupancy);
2. What the perceived preferences of the occupants are with respect to, for example, temperature and humidity (such preferences may be dependent on external temperature, the season, the pattern of weather in the prior few days, other factors or combinations thereof) (adjusting and/or fine tuning to occupant preferences);
3. Whether the trajectory of equipment usage lies within the efficient bands of operation of the equipment (adjusting and/or fine tuning the trajectory of set points so that equipment maintains operation inside efficient bands); and
4. Whether the building thermal mass and the external air environment may be used in conjunction to deliver energy savings by utilizing external conditions to adjust the thermal position of a building, and then using the building's thermal inertia to carry forward that position (tuning to external weather).

Certain embodiments of the present disclosure may deliver between 10% and 25%, between 5% and 15%, between 15% and 25%, between 10% and 30% savings in energy demand. Certain embodiments of the present disclosure may deliver at least 5%, 10%, 15%, 20% or 30% savings in energy usage.

Figure 55:
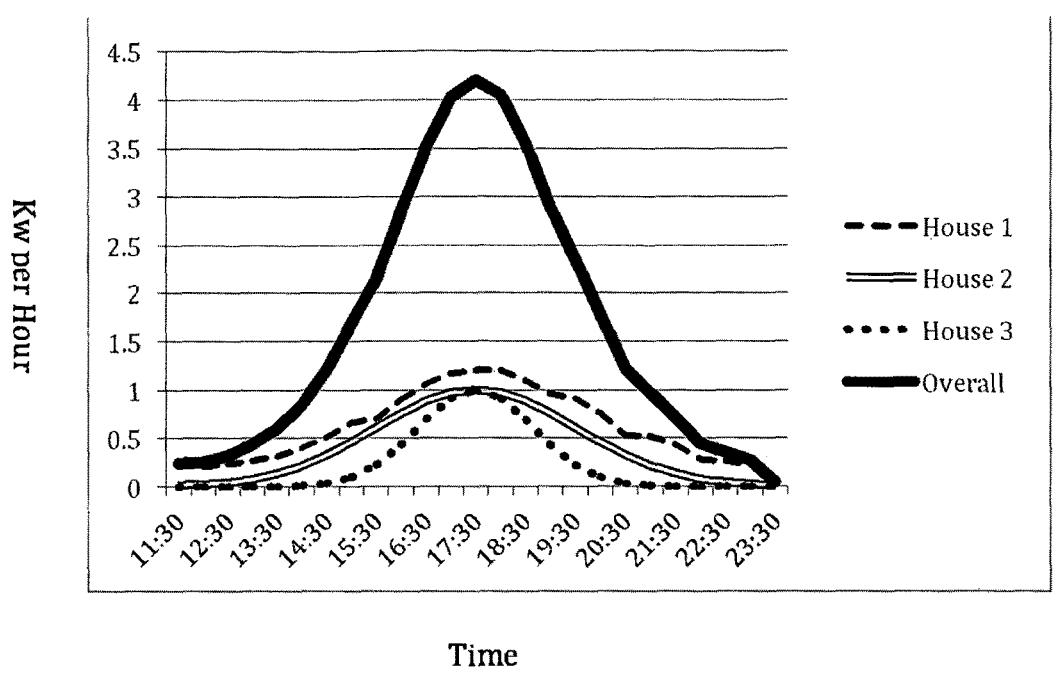
FIG. 55 shows an exemplary aggregated load curve.
Figure 56:
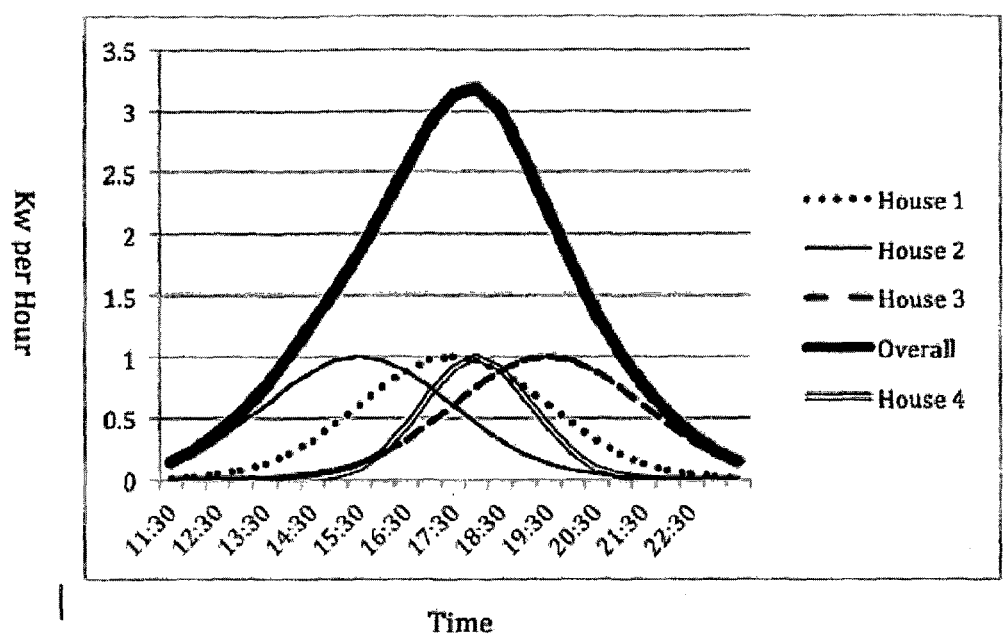
FIG. 56 shows an exemplary flatten aggregated load curve and individual load curves, according to certain embodiments.

Certain embodiments are directed to flattening out the load curve which provides an improvement in capital utilization efficiency. The peak energy demand may be reduced by 10% to 50%, 30% to 70%, 40% to 100%, 70% to 150% or 100% to 200%. FIGS. 55 and 56 depict exemplary load curves. FIG. 55 shows an exemplary typical aggregated load curve and FIG. 56 shows an exemplary flatten aggregated load curve and individual load curves where the peaks are shifted by using one or more of the disclosed embodiments.

Certain embodiments are directed to embodiments where the loads amongst groups of customers or users are adjusted. Traditionally the loads from customers or users have been regarded as a given, except in certain special cases, and therefore the power grid capital investment program took this load curve as more or less a fixed input. In some cases, customers or users participated in demand management schemes, whereby they reduced load demand under certain events. Certain embodiments are directed to the ability to adjust 10% to 20%, 20% to 50%, 30% to 80% or 50% to 100% of the individual loads amongst groups of customers or users. The ability to adjust individual loads allows the demand curve (an aggregated demand from a group or a portion of customers or users over time) to be treated as a substantially independent variable. Thus, the demand curve may be altered in favor of one or more portions of the system and/or the whole system. In certain embodiments, the demand curve' may be altered in substantially real time or some appropriate time period in order to reduce one or more of the following: average energy demand by 5% to 15%, 10% to 20%, 10% to 50%, 20% to 70% or 30% to 100%; and peak energy demand by 5% to 15%, 10% to 20%, 10% to 50%, 20% to 70%, 30% to 100%, 50% to 150% or 100% to 200%. In certain embodiments, the demand curve may be altered in substantially real time or some appropriate time period in order to reduce any combination of one or more of the following: average energy demand by any of 5% to 15%, 10% to 20%, 10% to 50%, 20% to 70% and 30% to 100%; and peak energy demand by any of 5% to 15%, 10% to 20%, 10% to 50%, 20% to 70%, 30% to 100%, 50% to 150% or 100% to 200%.

Certain embodiments are directed to applications where a plurality of controlling devices are capable of controlling a plurality of loads and the central computer or processor instructs the plurality of controlling devices to adjust at least one control setting based on at least one price signal, and/or adjust at least one future control setting based on the at least one received price signal. Thus, effectively changing the load curve shape. For example, the central computer or processor may reduce future energy consumption when the energy price reaches a certain prescribed level. Another example is where the central computer or processor may reduce future energy consumption when energy price is rising at certain prescribed slope.

Certain embodiments are directed to applications where a controlling device is capable of controlling a load and the central computer or processor instructs the controlling device to adjust at least one setting based on required adjustment in the supply.

Certain embodiments are directed to making a plurality of shifts in individual energy demands of customers or users and aggregating these shifts to produce a larger aggregating shift in overall energy demand. These shifts may be small shifts, medium shifts, large shifts or combinations thereof. Certain embodiments are directed to making no shift in energy demand, 0.01% to 0.2%, 0.1% to 1%, 0.5% to 5%, 4% to 10%, 5% to 20% or 10% to 30% shift in energy demand for a portion of the individual customers (or users), a substantial portion of the individual customers (or users) or for each individual customer in energy usage and aggregating these shifts to reduce overall energy usage. For example, a 1 KW shift in demand per customer is equivalent to a 1 GW power station when aggregated over 1 million customers.

Certain embodiments are directed to a plurality of sensors and a plurality of controllers configured to communicate with at least one computer or processor, wherein at least a portion of the controllers directly or indirectly control energy usage or energy consumption, and at least one computer or processor substantially optimize and/or adjust energy usage in one or more areas (such as one or more buildings), and aggregates individual energy usage or energy consumptions into an improved controllable load. For example, using one or more disclosed embodiments, the energy load over a group of buildings may be reduced by 5% to 15%, 10% to 20%, 15% to 40%, 20% to 70%, 50% to 100%, 80% to 150% or 100% to 200% by deploying one or more of the following in at least a portion of the group of buildings: sensors for temperature, humidity, occupancy, and current consumption; configuring at least a portion of the equipment used for controlling and/or monitoring the energy needs of the group of buildings; wherein a substantial portion of the sensors and/or controllers are capable of wireless communication.

Energy Consumption Reports

In certain embodiments, at least a portion of the received data from a plurality of sensors may be used to generate energy consumption reports. These energy consumption reports may be used to manage, or assist in the management of, the energy used in a building, a portion of a building, a structure, a portion of a structure, an infra-structure, a portion of an infra-structure, a plurality of buildings, a plurality of structures, a plurality of infra-structures, a city, a portion of a city, a region, a portion of a region and so forth. In certain embodiments, energy consumption reports may be produced either voluntarily and/or under regulatory compulsion. In certain embodiments, energy consumption reports may be normalized to prevailing weather conditions and/or other factors (including occupancy), and may be compared to other reports (for example, on other buildings or on the same building in prior periods). In certain embodiments, energy consumption reports may then be used in league tables—tables which attempt to compare like with like and also which compare current with past behavior.

In certain embodiments, energy consumption reports may be used to show regulatory conformance. In certain embodiments, energy consumption reports may be used to derive and/or detect behavioral change inside a building. In certain exemplary embodiments, behavioral change may be driven by occupants and/or building managers perceiving that their building is performing poorly in relation to other similar buildings, and thereby triggering behavioral responses that attempt to learn from and/or mimic the actions of those in a more favorable position in the league table. In certain embodiments, energy consumption reports may be used to identify underlying faults in the operation of the building's systems. In certain exemplary embodiments, if a building suddenly appears to diverge away from prior consumption intensity, when appropriately adjusted for external conditions, then it may be that something has malfunctioned within the building's systems. This may be highlighted and appropriate corrective action taken before the fault causes significant increases in energy demand.

Determining Occupancy

Certain embodiments are directed to systems, methods and/or devices, wherein sensor data collected is used to partially determine, substantially determine, determine, partially estimate, substantially estimate, estimate, partially predict, substantially predict and/or predict occupancy in a portion of a building, a building, individual rooms in a building, a plurality of buildings, one or more portions in a plurality of buildings, a structure, a portion of a structure, an infra-structure, a portion of an infra-structure or combinations thereof. For example, one cost effective action that a building manager may undertake to reduce energy usage in a building is to turn one or more energy using pieces of equipment off when people are not present and turn them on when they are present. This applies at the aggregate level, in terms of the portion of a building, a building, a plurality of buildings; one or more portions in a plurality of buildings, a structure, a portion of a structure, an infra-structure, a portion of an infra-structure or combinations thereof. In general, the more finely a building or managed area (and/or a number of buildings or a number of managed areas) is tuned to occupancy, the less energy is consumed. In certain embodiments, the understanding of occupancy patterns means that systems of chillers, air handling units and/or heating systems may be turned on in anticipation of the occupancy rate of the area being managed (for example, entire building) and turned off progressively in anticipation of occupancy diminishing. The understanding of occupancy patterns may also be applied at the aggregate level, in terms of the portion of a building, a building, a plurality of buildings, one or more portions in a plurality of buildings, a structure, a portion of a structure, an infra-structure, a portion of an infra-structure or combinations thereof.

In certain embodiments, the finer grained tuning of a building or area to each room and/or defined area may require a more detailed understanding of patterns of usage, and this detail may be used to ensure that appropriate sections under management are heated and/or cooled, and that these patterns adjust to predicted behavior of people inside the area being managed. Certain embodiments are directed to systems, methods and/or devices that may be used to provide this finer grain tuning by collecting sufficient data on occupancy. For example, occupancy in a building, a portion of a building, a structure, a portion of a structure, an infra-structure, a portion of an infra-structure, a plurality of buildings, a plurality of structures, a plurality of infra-structures, or combinations thereof. Certain embodiments of the present disclosure are directed to systems, methods and/or devices that provide sufficient fine tuned control via a plurality of sensors such that occupancy patterns may be determined and also sufficient control of one or more control systems via a plurality of control such that the building, areas of the building and/or individual rooms may be adjust in concert with one or more energy usage patterns.

Predicting Future Energy Usage

Certain embodiments are directed to systems, methods and/or devices, wherein the data collected may be used to create prediction tables of energy usage or may be used to predict future energy usage of an area. The data collected or portions of the data collected from sensors within the network may be combined with other information and evaluated via one or more of the following: optimization algorithm, prediction algorithm, linear regression and fuzzy logic algorithm. The predicted future energy usage instructions or recommendations may be applied to a portion of a building, a building, individual rooms in a building, a portion of a plurality of buildings, individual rooms in a plurality of buildings, a structure, a portion of a structure, an infra-structure, a portion of an infra-structure or combinations thereof. Energy use patterns may vary according to the time of day, the day of the week, the season, the external weather both in the present and in the recent past, and events that may be occurring within the area of interest. In energy supply systems, the cost of energy also may vary by the hour, by the season, by the day, according to weather events, other circumstances or combinations thereof In certain embodiments, future energy use predictions may be used to assist a party or a group of parties within a supply contract, to understand the likely cost implications of these predictions. Future energy use predictions may be used by the organization or the group of organizations to adjust their energy requirements and/or demand to mitigate predicted future cost implications.

In one exemplarily embodiment of future energy prediction, on a forecast hot day, an organization may predict its demand for cooling during the afternoon peak, it then may seek to reduce this peak cost by pre-cooling the building during the less expensive periods and may also seek to mitigate peak capacity charges that may be imposed if the building exceeds its previous peak demand.

In addition, a retailer of electricity may want to predict with sufficient accuracy the overall demand for electrical power so that it may purchase such power in the wholesale electricity markets. Knowing in advance the aggregate demand permits the use of hedge contracts and/or layered forward contracts to mitigate and/or eliminate the variability in price between the spot market price and the sale price to their customers. Certain disclosed embodiments may be used to assist the retailer of electricity in making such predicts.

Certain embodiments of the present disclosure are directed to providing such forecasts with higher accuracy. The higher accuracy may be achieved by one or more of the following: understanding the detailed origins of this demand, differentiating the impact of one or more independent or substantially independent variables (such as, for example, time, day, month, season, occupancy patterns, external temperature, external humidity etc.), performing more detailed the measurement of one or more independent or substantially independent variables, and performing correlation between one or more independent or substantially independent variables and the resultant demand.

Creating and Using Behavioral Patterns

Certain embodiments, are directed to systems, methods and/or devices, wherein data from the sensors is used at least in part to create one or more computer generated behavioral patterns for the area under management based at least in part on data collected from the sensors regarding site occupation and/or site occupation patterns. The one or more computer generated behavioral patterns may be applied to a portion of a building, a building, individual rooms in a building, a plurality of buildings, one or more portions of a plurality of buildings, a structure, a portion of a structure, an infra-structure, a portion of an infra-structure, one or more portions of a plurality of structures, one or more portions of a plurality of infra-structures or combinations thereof. For example, one determinant of energy savings is the occupancy patterns of the area being managed, so the system may be adjusted based at least in part on the presence of occupants, absence of occupants, anticipated presence of occupants, anticipate absences of occupants or combinations thereof.

In certain aspects, this may be somewhat more complicated, because it may be desirable to know about occupancy at one or more levels of granularity and to use the data collected on one or more levels of granularity to provide one or more levels of control over the ability to adjust energy usage at the one or more portions of the area being managed. For example, the plurality of controllers may allow control of energy usage down to a room level of granularity (or substantial at room level of granularity), and in these embodiments, it may be useful to provide occupancy data at that level of granularity. In certain embodiments, it may be useful to address intensity of occupation, and not just presence. This is because warm blood mammals generate heat and consume oxygen, and therefore more dense occupancy patterns (as in a meeting room or hall) may require more intense supply from heating and cooling systems than do areas of low occupancy density. In certain embodiments, some building systems or areas being managed (possibly excluding lighting) have inertia—they cannot reach a desired point instantly, and so it may be useful for these systems to anticipate the occupancy patterns and create optimal trajectories to reach the desired points with the occupancy patterns. In certain embodiments, it may be useful if the created optimal trajectories reach the desired points with the occupancy patterns simultaneously, substantially simultaneously or in an acceptable time period.

Certain embodiments are directed to systems, methods and/or devices that collect density data regarding occupancy, and correlates this with external data (such as time, day, month, season, room bookings and calendar appointments), and provide detailed predictions of occupancy patterns and then use these detailed predictions of occupancy patterns to adjust the settings and trajectories of building systems to maintain occupant comfort and reduce energy consumption.

Adjusting Environmental Conditions

Certain embodiments are directed to systems, methods and/or devices, wherein data is used to sufficiently optimize, to substantially optimize or to optimize environmental conditions of a portion of a building, a building, individual rooms in a building, a plurality of buildings, one or more portions of a plurality of buildings, a structure, a portion of a structure, an infra-structure, a portion of an infra-structure, one or more portions of a plurality of structures, one or more portions of a plurality of infra-structures or combinations thereof. In certain embodiments, this optimization may be achieved by determining neutral comfort bands. The neutral comfort bands may be determined by one or more of the following: taking into account individual variability in comfort perception, correlating occupants comfort level with perceived comfort and the external weather. The neutral comfort bands may change over season and over the external temperature. The neutral comfort bands may be further adjusted by noting that the behavioral response of outliers (groups or individuals who react at the far extreme of responses) often tend to regress to the norm when they are provided with continual feedback that their responses are outside of the normal range.

Certain embodiments are directed to systems, methods and/or devices that may be used to sufficiently optimize, substantially optimize or optimize the local environment inside an area being managed, by calibrating the target area of one or more buildings to the neutral comfort bands of the actual occupants and learning how the occupants react to changes in these conditions. The patterns of reaction and perception may be quite complex, and may vary from group to group.

Certain embodiments are directed to systems, methods and/or devices that may be used to minimize energy use, substantially minimize energy use or minimize energy use in the local environment inside an area by adjusting the daily load profile, and/or adjusting target settings, subject to the constraint that occupants remain substantially within neutral comfort bands.

Using certain disclosed embodiment, one or more of disclosed strategies may be applied to a large number of sites, and the resultant mix of environmental targets may be used to manage, or substantially manage, the overall load shape and predictability of the load curve, with resultant savings in energy purchase costs for the supplier. In certain embodiments, further savings in energy purchase costs may be achieved by promoting behavioral change of occupants by to creating comparative tables and/or performance graphs based on the variability amongst buildings. In certain embodiments, the savings in energy purchase costs may be between 2% to 10%, 5% to 15%, 10% to 30%, 20% to 70%, 50% to 150%, and 80% to 200%.

Patterns of Environmental Preferences of Occupants

Certain embodiments are directed to systems, methods and/or devices, wherein data is used to learn about and/or create pattern of environmental preferences of occupants of individual site and/or a plurality of sites. In certain aspects, these patterns of environmental preferences may be learned about and/or created for a portion of a building, a building, individual rooms in a building and/or a plurality of buildings and so forth. Occupant preferences may vary between individuals when they are asked to report on environmental comfort. Furthermore, individuals may be poor at estimating absolute levels, but may be individually quite consistent at reporting comparative preferences.

One aspect of improving and/or substantially maximizing the group comfort is to elicit preference choices from the occupants, and to associate these preference choices with a range of independent variables (such as external weather, season, time of day and so on). It may be useful in this process to ensure that responses are solicited from the whole group (or sufficiently representative samples of the group) as there may be an inherent bias in self reporting that emphasizes outliers in contrast to the average.

Certain embodiments are directed to obtaining preference patterns and reactions to current conditions by soliciting responses where the provision of the response has a sufficiently low transaction cost (in terms of time and effort). As transaction costs increase there may be a shift in the response patterns towards the average. This may not be desirable in certain embodiments.

Certain embodiments are directed to obtaining self-selected and/or self-initiated response patterns based on providing feedback responses that are positive, negative or neutral. The obtained probability curves (dependent on one or more independent variables) may be used to determine and/or predict underlying preferences based on assumptions regarding the likelihood of an individual providing a response based on their preferences.

Assuming that individuals in a population follow a normal distribution curve, the more data that may be assembled regarding the interaction of preferences with external conditions and with various reporting mechanisms, then the more potentially accurate the average predictions may be. This aggregated data may also be used to provide feedback to individual participants regarding how their preferences differ from the average, and research shows that this may tend to create an effect where the individual regresses to the norm in their own perceptions.

EXAMPLES

Application space may be partitioned by following dimensions:

Long/Fat—The devices may be placed in a line forming a long multi-hop network (i.e., pressure sensors on a pipe). Or the devices may be evenly distributed (location wise), i.e., sensors on the production floor.

Dense/sparse—the network may be dense (i.e., 10, 30, 40, 50, 60, 70, 90, 100, 120, 150, devices per 10 square meters or combinations thereof) or sparse—devices are place 50 m, 100 m 125 m, 150 m, 200 m or combinations thereof apart.

Amount of data per transmission—Devices may transmit small bursts of data (8 bit) or large bursts of data (1024 bits).

Period between transmissions—period between transmissions may be short (10 msec) or long (1 minute). Other time periods may also be used.

Energy sensitivity—Devices may be battery powered (energy sensitive) or not.

Alternative Implementations

In certain embodiments, different spectrum may be used. It may be divided into different number of channels. Instead of dividing spectrum into channels, other methods may be used. For example, CDMA-using different pseudorandom sequences; Frequency hopping—using different hopping sequences; OFDM—using different sub-bands; or combination of the methods disclosed herein (including division into channels).

Comparison to Existing Technologies

Figure 15:
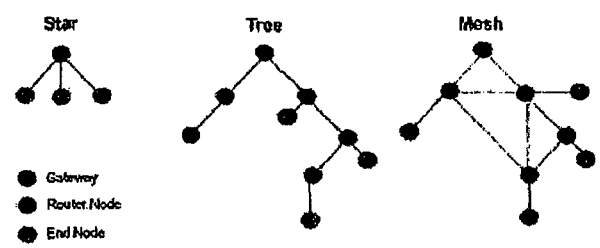
FIG. 15 illustrates certain existing wireless network categories.

At present, no existing products and/or protocols, achieve the result disclosed herein from economical and/or technological perspective. However, existing technologies may be modified to achieve comparable results as discussed herein. FIG. 15 illustrates typical existing wireless network categories.

In the art there are some basics forms of access for accessing network resources (to transmit) controlled by access point:

CSM—end node listens to the traffic and is allowed to transmit only when no other node is transmitting.

Random access—end node transmits its request to send data on predefined channel (resource). If unsuccessful, it retries after random period of time. The random period of time is increased after each consecutive unsuccessful attempt.

However, as discussed herein, there are limitations of these different topologies/technologies:

CSM access—typically all the end-nodes should see each other. Typical distance for wireless, device is 100 m. To cover one square kilometer, more than 120 access points may be required.

CSM and random access collision resolution—if N nodes are trying to transmit simultaneously, certain amount of time T is required before all the nodes may succeed. The problem is made worse by presence of higher layers that may typically timeout (if T is greater than timeout threshold) and try to re-establish the connection, thus consuming extra network resources.

Random access Near-Far problem—nodes that are closer to the access points may have better chances to get their request accepted than remote nodes. The problem, may be reduced by adjusting end-nodes power, but it constraints implementation to be TDMA (end-node has to receive and transmit on the same frequency to correctly predict the path loss in the up-link based on down-link).

Assume that request slot happen every 10 msec. Let's assume that a node initially generates a random number between 1 and 10. This number is doubled until a limit of 200 (2 seconds) is reached. The random number indicates how many request slots the node should miss before retransmission. Table 7 below gives simulation results for collision resolution assuming that nodes requests are uniformly distributed. Uniform distribution is the best case scenario. The simulation does not take into account additional node (that did not participate in collision) and are trying to transmit.

TABLE 7

| Number of nodes transmitting simultaneously | Number of re-tries for last node | Time until last node succeeds [seconds] |
| --- | --- | --- |
| 60 | 410 | 4.1 |
| 125 | 770 | 7.7 |
| 250 | 1150 | 11.5 |
| 500 | 2190 | 21.9 |
| 1000 | 9190 | 91.9 |
| 2000 | 488210 | 4,882.1 |

Table 8 below shows the results if maximum retry interval is set to 100 (1 sec). Table 8 suggests that access points may handle around 100 nodes in real life. It also shows that after certain number of nodes the system collapses due to the multihop problem. If routing nodes are sharing the same resources as access points, the available bandwidth is reduced (at best) by 2^number of hops. This basically limits the number of hops to 3-5 hops. To cope with these hop limitation nodes has to use full duplex dual-channel transceivers, which add to their cost.

TABLE 8

| Number of nodes transmitting simultaneously | Number of re-tries for last node | Time until last node succeeds [seconds] |
| --- | --- | --- |
| 50 | 320 | 3.2 |
| 100 | 460 | 4.6 |
| 200 | 820 | 8.2 |
| 400 | 2300 | 23 |
| 800 | 45080 | 450.8 |
| 1000 | 248880 | 2,488.8 |

Figure 16:
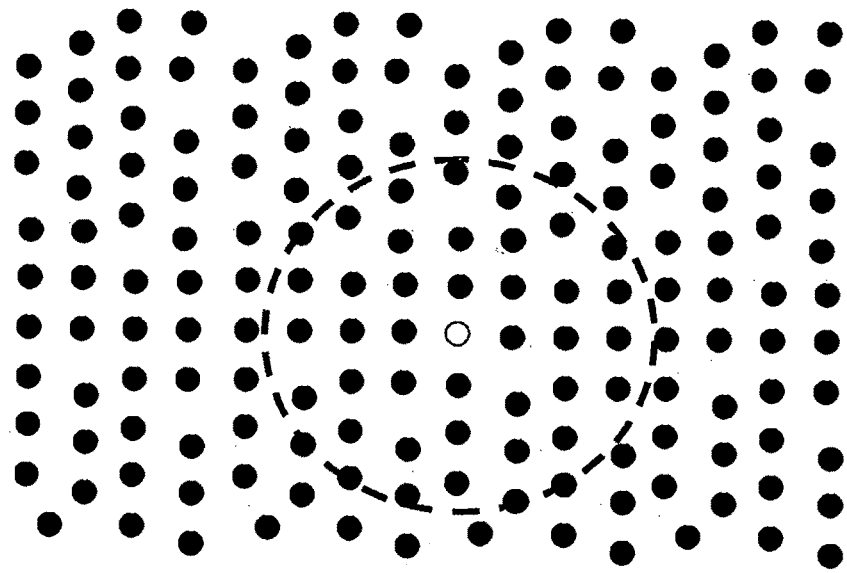
FIG. 16 shows a network with one access point (open circle) and a plurality of node (black out circle).
Figure 17:
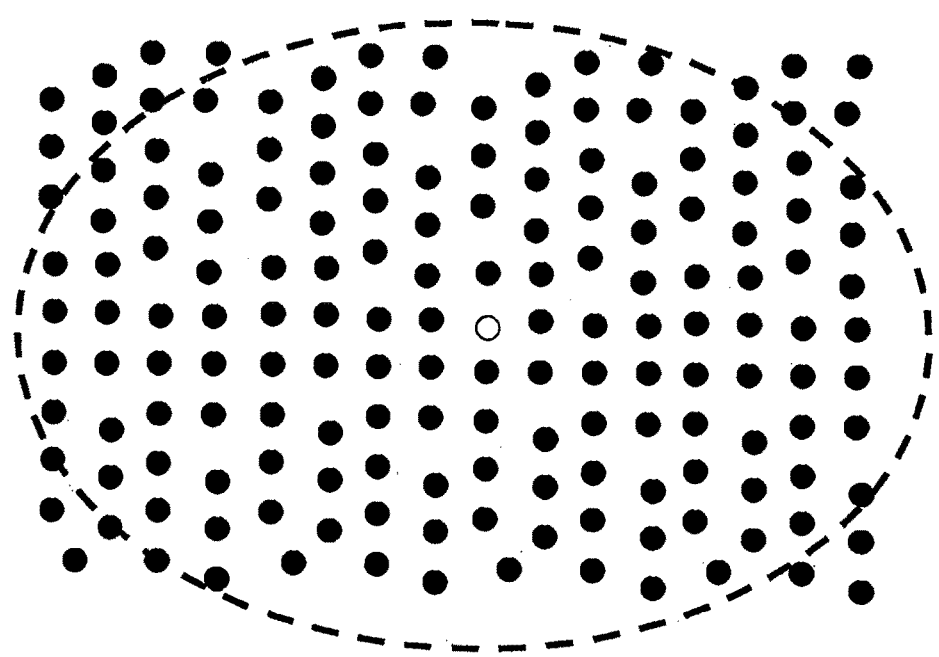
FIG. 17 shows an exemplary star network topology approach.
Figure 18:
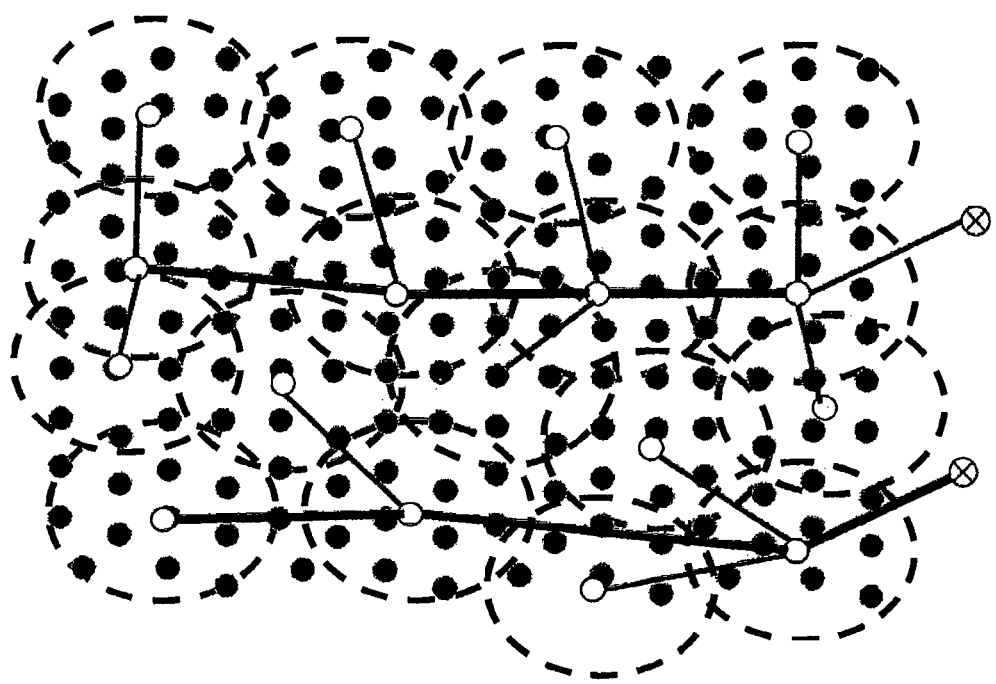
FIG. 18 shows a tree network topology approach where reduced transmitting power at the access point (open circle) and nodes (filled in circle) is used.
Figure 19:
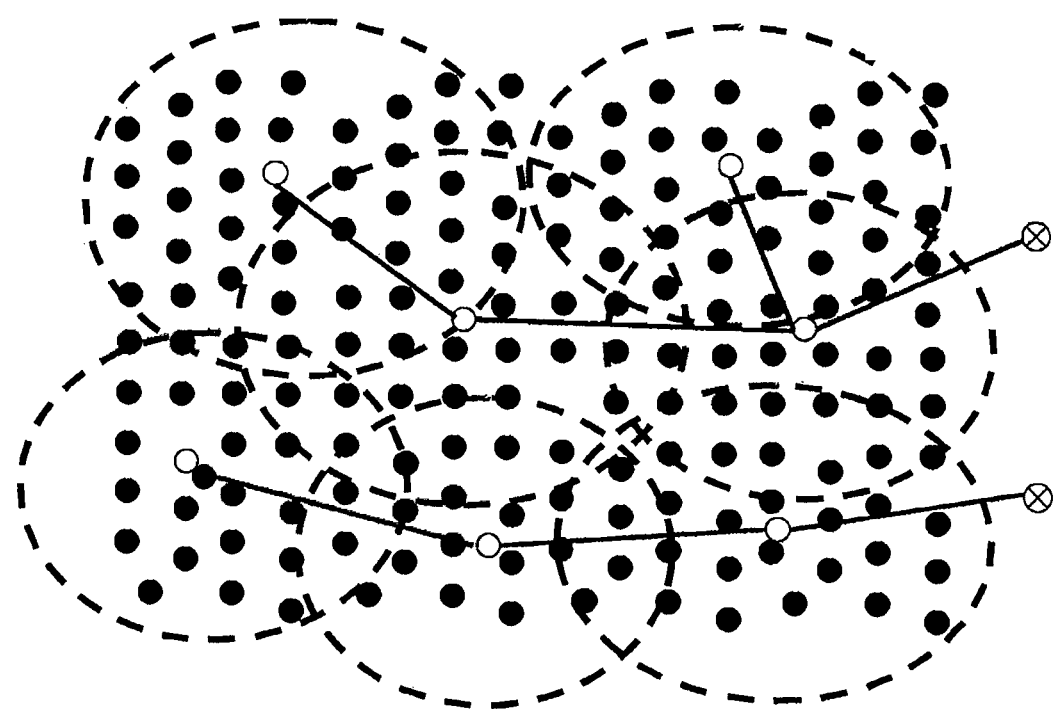
FIG. 19 shows another tree network topology approach.
Figure 20:
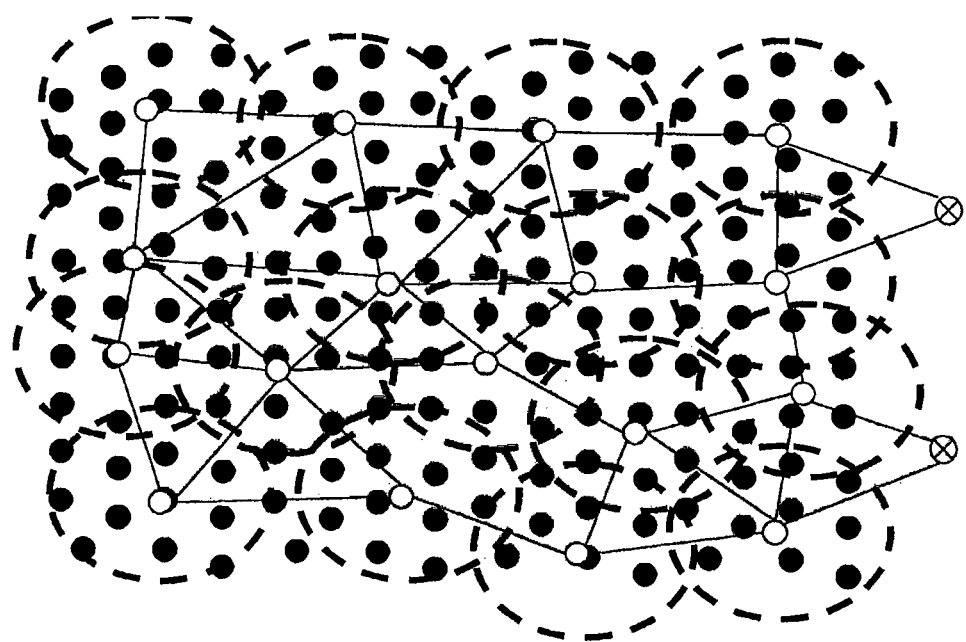
FIG. 20 shows a typical network topology approach where the transmitting power of the access points and end-nodes is reduced.
Figure 21:
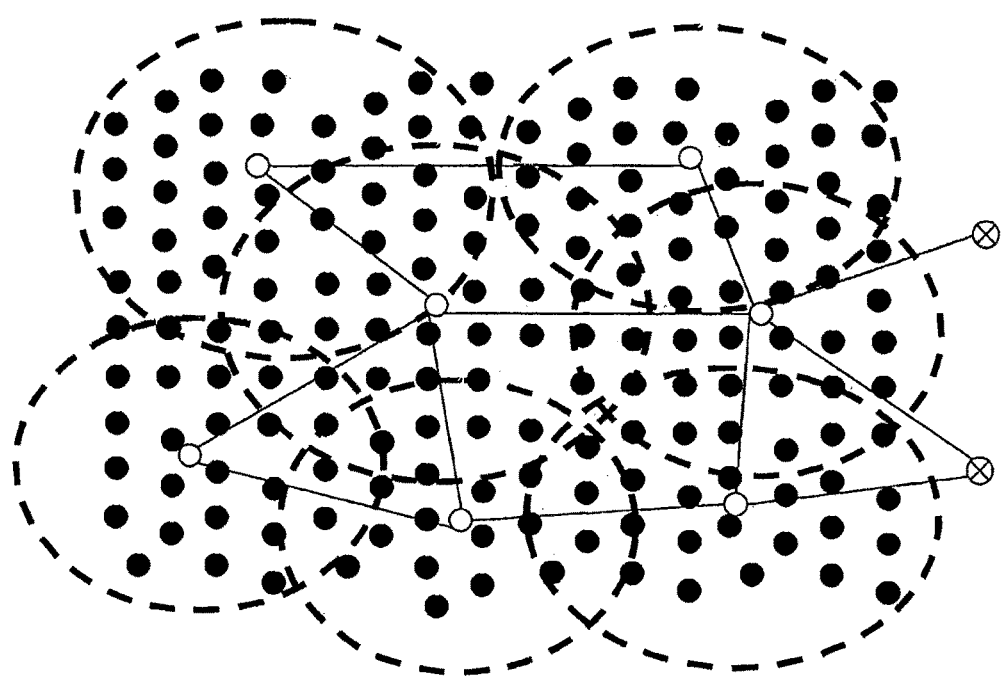
FIG. 21 shows another typical network topology approach.

FIG. 16 shows a network with one access point (open circle) and a plurality of node (filled in circle). The dotted line circle in FIG. 16 encircles the end-nodes that are visible to a particular node. Existing technology offers following approaches, for example, FIG. 17 shows a typical star network topology approach. FIG. 18 shows a typical tree network topology approach where reduced transmitting power at the access point (open circle) and nodes (filled in circle) is used. The gateways are the circles with and x in them. FIG. 19 shows another typical tree network topology approach. FIG. 20 shows a typical mesh network topology approach where the transmitting power of the access points and end-nodes is reduced. FIG. 21 shows another typical mesh network topology approach.

Due to the big number of access points required in these approaches, the implementation is expensive and cumbersome. For example, the access points would normally have around a 30% overlap to cover all the area. In FIG. 19, the second tree approach scenario, the network is limited to 5 hops. Assuming that each access point may handle up to 100 nodes, the maximum number of end-nodes per gateway is 500. In FIG. 18, the first tree approach scenario the access point on the trunk of the tree has to be sophisticated (and expensive) to maintain such a large number of hops.

Solutions Using Technology Disclosed

Figure 22:
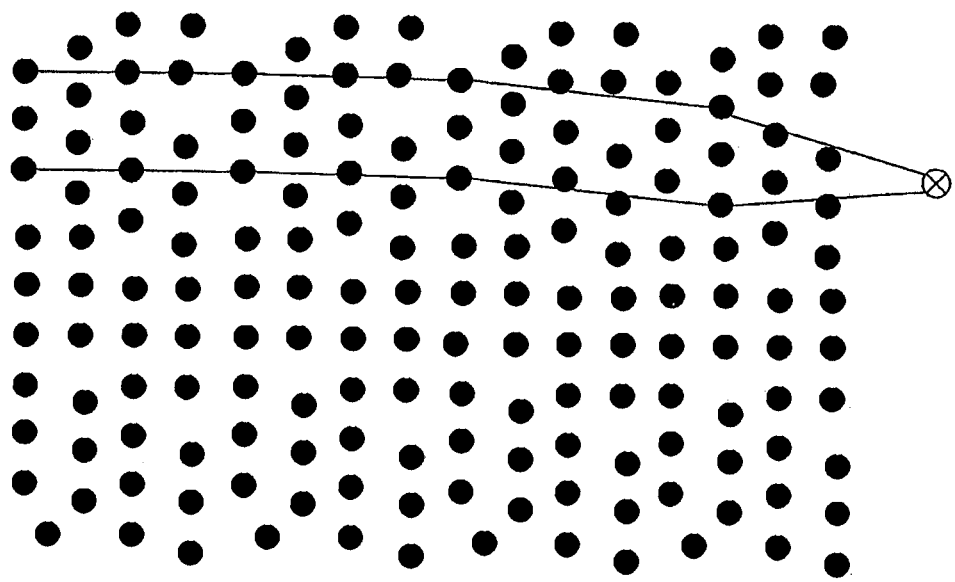
FIG. 22 illustrates a network system solution, according to certain disclosed embodiments.

For clarity, in the exemplary embodiments illustrated in FIGS. 22-25, figures show only selected path(s). FIG. 22 illustrates a network system solution, according to certain disclosed embodiments. FIG. 22 depicts two routes to the sink/gateway point. The filled in circles show nodes and the circle with an x shows a gateway. The nodes form a continuous network by relaying information in a prescribed manner. FIG. 22 provides an example of route selections. The number of hops is minimized and all (or substantial number of) routes approach shortest path to the gateway.

Figure 23:
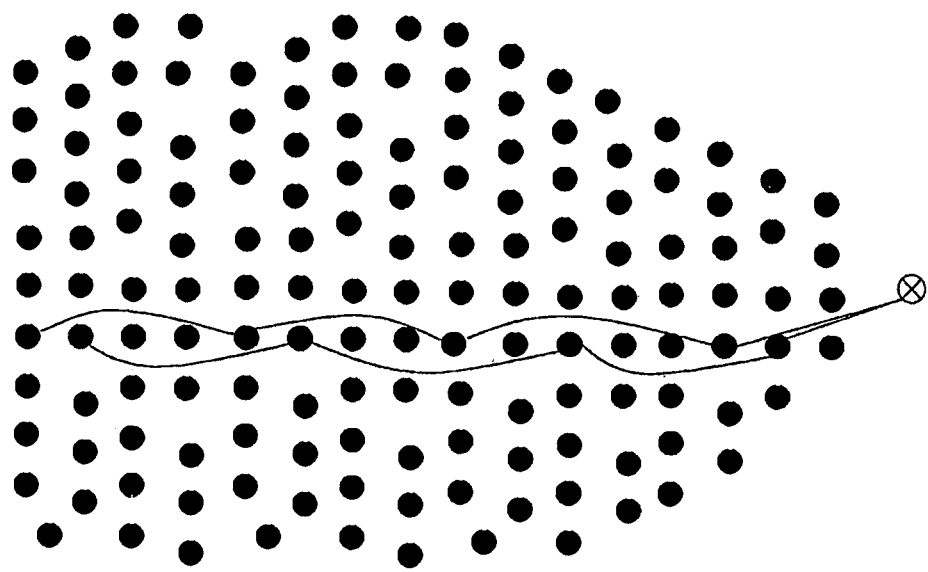
FIG. 23 illustrates a network system solution, according to certain disclosed embodiments.

FIG. 23 illustrates a network system solution, according to certain disclosed embodiments. FIG. 23 depicts routing in a dense network. Several devices are within communication range of each other. The filled in circles show nodes and the circle with an x shows a gateway. The nodes form a continuous network by relaying information in a prescribed manner. The network expands in this example as distance (in terms of number of hops) from the gateway increases. In this type of network the number of devices (combined with transmitted/received payload, required latency and time between transmissions) is limited by the bandwidth of the gateway. In such a network, it may be desirable to increase gateway bandwidth by incorporating multiple transceivers or transceivers capable of processing more channels (spreading sequences). In such case, the resource allocator may take into account mutual interference at the gateway due to adjacent channel interference and may allocate resources to avoid such interference.

Figure 24:
FIG. 24 illustrates a network system solution, according to certain disclosed embodiments.

FIG. 24 illustrates a network system solution, according to certain disclosed embodiments. The filled in circles show nodes and the circle with an x shows a gateway. The nodes form a continuous network by relaying information in a prescribed manner. FIG. 24 depicts a prolonged topology. The network may have from hundreds to tens of thousands devices forming a long (few kilometers to several hundred kilometers path). Devices may be located further apart (up to the maximum achievable distance given the baud rate and RF link budget). The baud rate may be lowered to achieve higher distance between devices. In this form of network number of devices would normally be limited by required latency.

Figure 25:
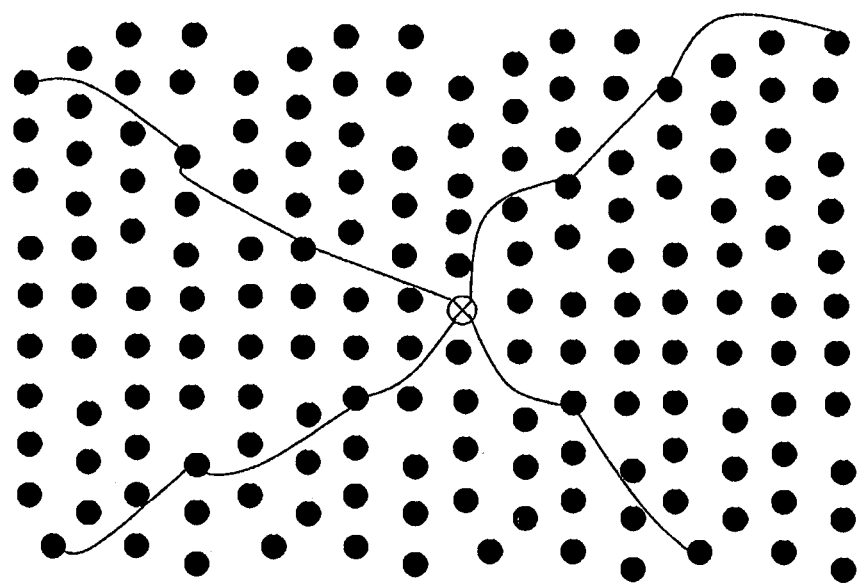
FIG. 25 illustrates a network system solution, according to certain disclosed embodiments.

FIG. 25 illustrates a network system solution, according to certain disclosed embodiments. The filled in circles show nodes and the circle with an x shows a gateway. The nodes form a continuous network by relaying information in a prescribed manner. FIG. 25 depicts a two dimensional network with gateway in the centre. This may be extended to a three dimensional network. This type of network may be found in multi-story buildings.

Modifications to the Existing Technologies

Existing technologies may improve their performance by implementing certain embodiments disclosed hereof: Random access problem with many nodes: the probability distribution of nodes requests for channel allocation has to be substantially uniform (or uniform). If probability of transmission is not sufficiently uniform, the system may utilize less bandwidth, or may have to limit number of devices per access points. The end-nodes may need to randomize as to the time of their request. For example, if a node wants to transmit at time 0, it may generate random number R (let's say between 0 and 100) and actually transmit at R msec.

Existing technologies may benefit from employing certain embodiments that are directed to a collision resolution approach where the access point may indicate that one or more collisions have happened. For example: special packet on paging channel indicating to end-nodes to set random value to maximum to assist with congestion resolution. For example, if 100 devices have transmitted at the same time (or substantially same time), the collision is detected at access points. Access points may broadcast a special packet designating that collision has happened. The devices then may generate a random number and either ceases to transmit until the collision is resolved or use back-off random timer to retransmit. The majority of device may elect to seize to transmit. This may prevent system from collapsing or reduce the chances of collapsing.

EXEMPLARY IMPLEMENTATIONS

Comparative Example 1

In this example, the network is made up of large number of end-nodes in relatively close proximity to each other, transmitting at low baud rate. In this embodiment, a large number of utility meters and controllers covering a factory need to be networked. The factory size is around 250×250 m and is a two storey buildings. The Sensor/controller density is around one per two square meters which equal around 31,250 end-nodes. The Sensor data packet size is around 16 bits. The sensor probing period is around 30 seconds. The controller data packet size is around 16 bits. The controller maximum latency is around 10 seconds. The controller's ratio is around 20%.

If this network is implemented using existing technologies:

Then using known star network approach—large cells connected to broadband network, using free spectrum. Such a network may typically require around 400 access points (cells), require around 400 gateways. The robustness of the network may be medium to high; however, failure of one access point may result in 70 nodes being unreachable until the access point is replaced.

Using known Tree approach topologies, then the access points need to share the same spectrum to interconnect. The required number of access points is around 400. The required number of gateways is around 67. The robustness is low; however, failure of one access point in the trunk may result in loss of a majority of end-nodes.

Using known backhaul mesh approaches, the router access points need to operate in different spectrums. The required number of access points is around 400. The required number of Routers is around 80. The required number of gateways is around 1. The robustness is medium-high, however, failure of one access point may result in 70 nodes being unreachable until the access point is replaced. Failure of router is tolerated by re-routing.

In comparison to the above, using certain disclosed embodiments, the network has substantially uniform distribution; good collision resolution; encryption does not substantially add to overhead using stream cipher. Stream cipher uses package tagging, typically 32 bits to achieve reasonable security. The network according to certain embodiments may require zero access points, zero routers, only one gateway and the robustness is high, for example, failure of one node may result in most cases in failure of just that node.

Comparative Example 2

In this example the network is a low density network covering large area, transmitting at low baud rate. In these embodiments there are a large number of fire sensors covering national park. The park around 100 mg×100 mg. The sensor/controller density is around one every 100 meters which results in about 1,000,000 end-nodes. The sensor data packet size is around 16 bits. The sensor probing period is around 60 seconds.

If this network is implemented using existing technologies:

Using a known star network approach, which involves large cells connected to broadband network, using free spectrum, the network requires around 100,000 access points (cells) and around 100,000 gateways. The robustness is high, however, the failure of one access point may result in 10 nodes being unreachable until access point is replaced Using know tree approaches that has no control on end-node operation. The access point's share the same spectrum to interconnect. The required number of access points is around 10,000. The required number of gateways is around 1600. The robustness is low; however, failure of one access point in the trunk may result in loss of majority of end-nodes.

Using known backhaul mesh approaches, the router access points operate in different spectrum. The required number of access points is around 10,000. The required number of routers is around 2000. The required number of gateways is around 1. The robustness is high; however, failure of one access point may result in 10 nodes being unreachable until access point is replaced. Failure of router is tolerated by re-routing.

In comparison to the above, using certain disclosed embodiments, the network requires no access point or router. The required number of gateways is 1 (5 integrated transceivers). The robustness is high and the failure of one node may result in most cases in failure of just that node Comparative Example 3

Example 3A. Sensors Covering Wide Area

Assumptions:
Area: 1001 cm×1000 km
Sensor transmits 16 bits every second (net data)
Effective range 300 m (outdoor assumption)
Number of sensors: 1,111,111.

One way of addressing the above network build out using existing technology is to build high towers with access points covering a wide area. These access points may be connected via backhaul wireless network operating at different frequency. For example:
Tower height: 100 m
Range (access point to device): 3 km
Number of devices per AP: 400
Number of towers required: 2778.
Price of access point+backhaul+installation: $20,000
Price of the device: $5
Total cost: $61,115,556
Note: this slightly violates the bandwidth constraint (ignoring the near-far problem): 400 devices*16 bits/2%=320 kbps. Available bandwidth is 250 kbps. So in reality number of required towers is actually higher.

If a mesh network is implementation, according to certain disclosed embodiments, then:
Number of access point (at the edge): 5
Price of AP: $1000
Price of the device: $5
Total cost: $5,560,556

Example 3B. Smart Metering and Control

Assumptions
Sensors and controllers installed in every household and industrial building. Sensors transmit 16 bits of data every 10 seconds
City area: 100 km by 100 km
Number of households: 1,600,000
Number of industrial buildings: 400,000
Devices (sensors and controllers) per household: 20
Devices (sensors and controllers) per industrial building: 200
Percent of sensors: 80%
If a ZigBee approach is used where ZigBee access points are wired together and connected to the cellular modem, than:
Number of access point per household: 3
Number of access point per industrial building: 20
Number of cellular modems per building: 1
Data per gateway—household (month): 324 MB
Data per gateway—industrial (month): 3,240 MB Cost of device: $2
Cost of access point (including installation): $1000
Cost of cellular router: $1000
Data cost per month—household: $60
Data cost per month—industrial: $150
Initial cost: $13,224,000,000
Running cost per month: $156,000,000
Total cost for 5 years: $22,584,000,000

If a weightless type implementation is used where the access points are installed at 20 m height throughout the city, access point is connected to existing wire (fiber) network, than:

Devices per access point: 2,343
Number of access point: 47,787
Coverage radius: 288 m
Cost of device: $3
Cost of access point (including installation): $20,000
Data cost per month: $30
Total cost for 5 years: $1,377,756,000

Note: the coverage radius may be increased by reducing the baud rate. However in this case, number of devices per access point has to go down, which in turn limits the effective coverage. The actual Weightless implementation does not use CS, so in reality bandwidth efficiency may be lower and below costs may be higher.

If a mesh network is implementation, according to certain disclosed embodiments, then:

Number of gateways: 956
Cost of gateway: $200
Cost of device: $2
Total cost for 5 years: $225,912,000

Table 9 below summarizes total cost for different applications.

TABLE 9

| Application | Implementation | | | |
| --- | --- | --- | --- | --- |
| | Standard Mesh | ZigBee | Wheightless | Smart Mesh |
| Sensors covering wide area | $61,115,556 | | | $ 5,560,556 |
| Smart metering | | $22,584,000,000 | $1,377,756,000 | $225,912,000 |

Example 4

Certain exemplary embodiments are directed to using low data rate mesh networks to trigger devices that use high bandwidth links. For example, this network may be used in peripheral security system comprised of some number of sensors connected together using a low cost network of certain disclosed embodiments. The system also has cameras connected to high bandwidth links B (for example UMTS). The cameras and link B are activated using the low cost network of certain disclosed embodiments typically only when there is an alarm or by remote request.

Example 5

Certain exemplary embodiments are directed to networks operating near system capacity. For example, a network where a number of devices frequently transmitting small amount of data. Another example is a network where the devices are transmitting at medium data rate. For example, system of 125,000 devices connected to one gateway, operating at 250 kbps, sending 8 bits of data every 5 seconds. Another example is a system of 1,000 devices connected to one gateway, operating at 250 kbps, sending 256 bits of data every 1.25 seconds.

Certain embodiments disclosed herein may be directed to a number of applications, some non-limiting examples are:

1. Large number of sensors, meters and/or controllers.

A Wireless network in the factory comprising one or more of the following:

Utility meters
Temperature sensors
Humidity sensors
Sensors related to factory specific equipment (i.e. counter, counting number of boxes passing through), and Controllers, including but not limited to:
Air-con controllers,
Boiler controllers,
Solar panel controllers, and
Factory specific controllers (i.e. drilling speed controllers).

A Sensor network in a car park comprising at least one of the following or combinations of the following:
Sensors located at each parking spot.
The network provides the driver with the closest available parking spot.

A plurality of parking sensors on at least one street comprising at least one of the following or combinations of the following:
Providing drivers with information regarding available spots,
Monitoring time limited parking,
Controllers.

Sensors and controllers spread in the agricultural field comprising at least one of the following or combinations of the following:
Sensors measuring moisture and/or certain chemicals, etc.;
Controllers on pipes or on Pipelines.

Sensors and controllers used in a building utilization monitoring comprising at least one or more of the following: monitoring the amount $CO_2$ and/or the change in $CO_2$ level in a plurality of rooms and/or sections of the building; and monitoring of the temperature in a plurality of rooms and/or sections of the building. The collected information may be used to determine the average utilization rates of office block sections and/or rooms by correlating one or more of the above measurements with the number of people in that vicinity. This information may be fed back into an occupancy management system that alerted the building manager to areas of the building that were being under or over utilized.

Figure 57:
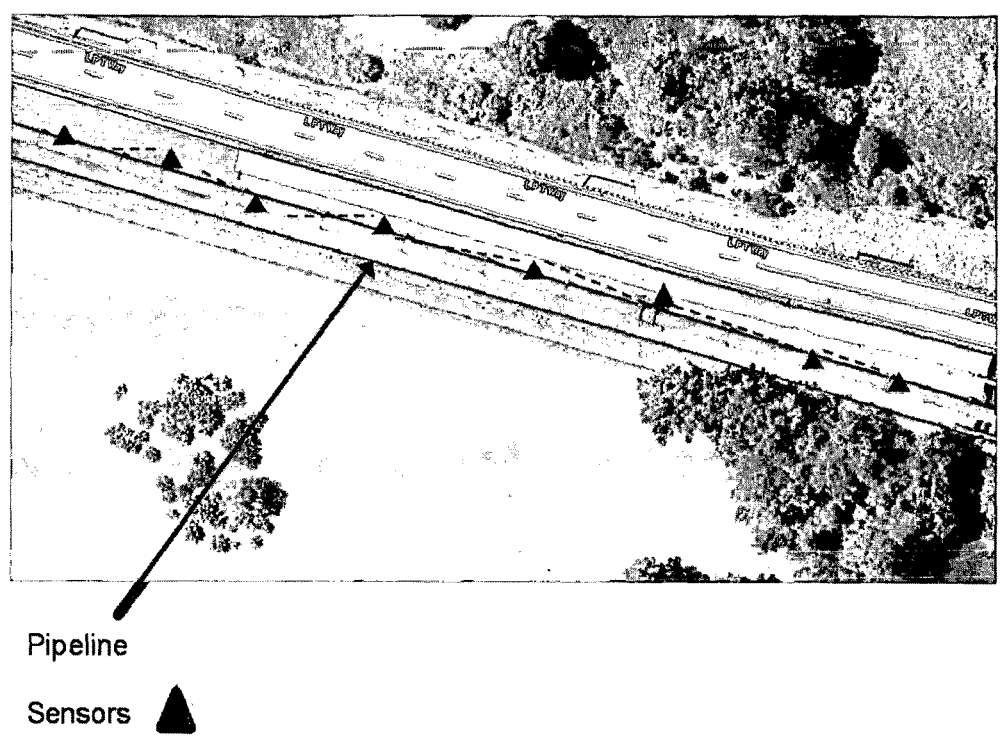
FIG. 57 depicts a pipeline monitored using wireless sensors, according to certain embodiments.

Certain embodiments are directed to systems and/or methods, wherein a plurality of devices are installed along one or more pipelines and the data collected from the plurality of devices is used to perform one or more of the following: perform routine checks, detect leaks and detect defects. FIG. 57 depicts a pipeline monitored using wireless sensors. There exist networks of pipelines that for example, carry gas, oil and water. Many of these pipelines are quite long, are often located in remote areas that make it difficult to access and/or inspect. There is a problem with defects, leaks and/or unauthorized access, which may have environmentally impacts, economically impacts and/or may endanger lives and installations.

Certain pipelines may use expensive communication lines strung along them in order to perform certain functions. Certain pipelines have known or little ability to remotely monitor the pipeline and typically rely upon visual inspection of the pipeline by humans. To accurately detect leaks it is important to have many sensors (that is, sensors that are spaced, for example, about 20-50 meters apart), but in existing systems this is a very expensive process because sensors use complex communication systems on board or nearby.

There is a need for less costly approaches to monitoring pipelines so that, for example, leaks may be rapidly and/or accurately located, and appropriate remedial action taken such as closing off certain valves. There is also a need for less costly approaches to monitoring pipelines so that, for example, repairs may be anticipated and accurately located such that appropriate remedial actions may be taken.

Certain embodiments are directed to systems and/or methods that use a plurality of low-cost sensors and/or a plurality of controllers that are deployed along a portion of the pipeline, a substantial portion of the pipeline or along the entire pipeline. One or more advantages of these embodiments are: tens, hundreds, thousands, tens of thousands or hundreds of thousands of the devices may form a network without the need for complex infrastructure; the devices used may be simple to install; and the devices used may be simple to configure. In addition, in certain embodiments, the systems and/or methods employed are able to address one or more points of failure—if one or several sensors fail, the system may reconfigure around the failure automatically or substantially automatically. Because the location of one or more of the plurality of sensor may be understood, the location of a leak may be identified to within half the spacing of the sensors.

Various types of leak sensor may be deployed. In certain embodiments, an acoustic sensor may be used that detects the characteristic sound of, for example, a leak emanating from the pipe. The sound to be monitored may depend on a number for factors, for example, the size of the pipe, the material in the pipe and/or the size and velocity of the leak itself.

Sensors and controllers used along a pipeline to monitor for gas leakage. For example, in this embodiment a series of $CO_2$ sensors and/or acoustic sensors may be placed at 10, 20, 50, 100 meter intervals or combinations of intervals along the pipeline. In certain embodiments, the plurality of sensors may be placed at one or more of the following intervals: sufficient intervals, suitable intervals, and combinations of distances such as 5, 10, 20, 25, 50, 100, 200, 300, 400 or 500 meters intervals along the pipeline. The sensors are able to report leakage and the sensor ID. Thus, enabling a location of the leak.

Certain embodiments may involve monitoring a pipeline for oil leakage. For example, a series of acoustic sensors may be positioned along the pipeline at intervals of 10, 20, 50, 100 meters or combinations of such intervals. Similarly, a series of chemical sensors may be placed on the ground at intervals of 10, 20, 50, 100 meters or combinations of such intervals. In certain embodiments, the plurality of sensors may be positioned at one or more of the following intervals: sufficient intervals, suitable intervals, and combinations of distances such as 5, 10, 20, 25, 50, 100, 200, 300, 400 or 500 meters intervals along the pipeline. The combined sensors are able to report an oil leak and the sensor ID. This would enable a location of the leak.

Certain embodiments may involve monitoring a pipeline for water or other fluid leakage. For example, a series of acoustic sensors may be positioned along the pipeline at intervals of 10, 20, 50 or 100 meters or combinations of such intervals. Similarly, a series of moisture or fluid sensors may be place on the ground at intervals of 10, 20, 50 or 100 meters or combinations of such intervals. In certain embodiments, the plurality of sensors may be positioned at one or more of the following intervals: sufficient intervals, suitable intervals, and combinations of distances such as 5, 10, 20, 25, 50, 100, 200, 300, 400 or 500 meters intervals along the pipeline. The combined sensors are able to report an oil leak and the sensor ID. This would enable detection of the location of the leak.

Certain embodiments may involve monitoring a pipeline for misplacement or misalignment of sections of the pipeline. For example, a series of IR and/or laser beam generators and related sensors may be positioned along the pipeline at appropriate intervals. If a segment of the pipeline becomes out of alignment then the adjacent sensors may report a loss of bean and the sensor is identified. This would enable detection of the location of the out of alignment portion of the pipeline. In certain embodiments, the plurality of sensors may be positioned at one or more of the following intervals: sufficient intervals, suitable intervals, and combinations of distances such as 5, 10, 20, 25, 50, 100, 200, 300, 400 or 500 meters intervals along the pipeline.

Certain embodiments may involve wide area fire detections systems. For example, a series of $CO_2$ sensors and/or temperature sensors may be positioned over a wide area (such as a national park or a forest) at intervals of 10, 20, 50, 100, 500, 1000 or 2000 meters or combinations of such intervals. In certain embodiments, the plurality of sensors may be spaced apart at one or more of the following intervals: sufficient intervals, suitable intervals, and combinations of distances such as 20, 50, 100, 200, 300, 500, 1000 or 2000 meters intervals in the area to be monitored. If the temperature and/or $CO_2$ level rises above a certain defined level, then a fire is assumed to be occurring and the location may be determined. This would enable determining the location of fires and permit early detection of such fires.

Certain embodiments may involve controlling a plurality of lighting devices such as controlling streetlights. For example, a controller may be embedded in, or associated with, a portion of the street lights within the network. These controllers may be embedded in, or associated with, a substantial portion of the lights, a portion of the lights, each light, every second light, every third light, every fourth light, a mixed combination of intervals of the lights, or combinations thereof within the network. Also a sensor may be embedded in, or associated with, a portion of the street lights within the network. These sensors may be embedded in, or associated with, a substantial portion of the lights, a portion of the lights, each light, every second light, every third light, every fourth light, a mixed combination of intervals of the lights, or combinations thereof within the network. Such a network may enable the network to reduce energy consumption and/or detect and locate a faulty light.

Certain embodiments may involve controlling a plurality of lighting devices such as controlling lights along a road such as a highway. For example, a controller may be embedded in, or associated with, a portion of the lights within the network. The controller may also be associated with, or positioned on, the light pole or structure to which the light is affixed. The controllers may be embedded in, or associated with, a substantial portion of the lights, a portion of the lights, each light, every second light, every third light, every fourth light, a mixed combination of intervals of the lights, or combinations thereof within the network. The sensors may be embedded in, or associated with, a substantial portion of the lights, a portion of the lights, each light, every second light, every third light, every fourth light, a mixed combination of intervals of the lights, or combinations thereof within the network. The sensors may also be associated with, or positioned on, the light pole or structure to which the light is affixed. Also the controllers and/or sensors may also be positioned at one or more of the following intervals: sufficient intervals, suitable intervals, and combinations of distances such as 200 m, 500 m, 1 km, 2 km or 3 km along the road to be monitored. In certain embodiments, these networks may be able to do one or more of the following: reduce or turn off the lights if there are no cars on the road; turn on or increase the lights as cars approach; turn off or reduce the lights after the car has passed; detect and locate faulty lights, and reduce energy costs.

Certain embodiments may involve controlling colour temperature in a plurality of lighting devices such as LEDs. For example, a controller may be embedded in, or associated with, a portion of the lights within the network. A portion of the lights within the network may mean at least 10%, 20%, 30%, 40%, 50%, 60%, 70% or 80% of the lights. The controller may also be associated with, or positioned on one or more of the following: the light pole, ceiling or structure to which the light is affixed. The controllers may be embedded in, or associated with, a substantial portion of the lights, a portion of the lights, each light, every second light, every third light, every fourth light, a mixed combination of intervals of the lights, or combinations thereof within the network. A substantial portion of the lights within the network may mean at least 50%, 60%, 70%, 80%, 90%, 95% or 98% of the lights. The sensors may be embedded in, or associated with, a substantial portion of the lights, a portion of the lights, each light, every second light, every third light, every fourth light, a mixed combination of intervals of the lights, or combinations thereof within the network. The sensors may also be associated with, or positioned on, the light pole or structure to which the light is affixed. The sensors may include one or more of the following: light sensor, movement sensor, IR temperature sensor, audio sensor, video sensor and proximity sensor. Also the controllers and/or sensors may also be positioned at one or more of the following intervals: sufficient intervals, suitable intervals, and combinations of distances such as 3 m, 10 m, 50 m, 100 m, 200 m, 500 m, 1 km, 2 km or 3 km. In certain embodiments, these networks may be able to do one or more of the following: change the colour of the emitted light; change the amount of emitted light; detect and locate faulty lights and reduce energy costs. In certain embodiments, colour temperature may be changed based on one or more of the following: time of day, time of the year, weather conditions, presence of individual person, absence of individual person, preference of individual person, preference of group of persons and type of clothing worn by individual person.

In certain embodiments, colour temperature may be changed in fitting room to match or substantially match clothing being fitted.

In certain embodiments, colour temperature may be changed in retail stores to match or substantially match goods on display.

Another exemplary embodiment is sensors located in close proximity to each other (few centimeters). For example, counters in retail stores (storage facilities, distribution centres, etc.), counting amount of boxes (cans, screws, etc.) on each shelf and/or counters incorporating REED IC—reporting if certain item was added and/or removed to and/or from the shelf.

High speed demand—response system: Flow and/or pressure sensors along a pipe (or multiple pipes). Sensors are located around 1 m from other sensors, transmitting every second. For example, a 10 km pipe, 100 hops may be required. The latency for 100 hops may be 0.5 sec. It is to be understood that the distance location between sensors and/or the transmitting time period may vary.

Fire/temperature sensors covering national park: Sensors spread, for example, around 100 m from other sensors, transmitting if temperature rises above predefined threshold. It is to be understood that the distance location between sensors may vary.

Non-homogenous networks—networks where devices may have different resource requirements (payload, latency, period between transmissions, etc.). For example, a peripheral security system: the system is comprised of number of cameras transmitting large packets of data (e.g., 30 kbits/s) and a large number of sensors transmitting small packets of data (e.g., 8 bits every second).

Other embodiments are bandwidth restricted systems, for example, underwater sensors.

Embodiments where one or more of the devices within the network may move. This would include devices that move in a predefined way, for example, a robot arm. This would also include devices with limited range of motion, for example, a robot that may move only inside a room.

Other types of sensors and or controller, for example, sensors and/or controllers in mining where wired infrastructure is expensive.

The exemplary approaches described may be carried out using suitable combinations of software, firmware and hardware and are not limited to particular combinations of such. Computer program instructions for implementing the exemplary approaches described herein may be embodied on a tangible, non-transitory, computer-readable storage medium, such as a magnetic disk or other magnetic memory, an optical disk (e.g., DVD) or other optical memory, RAM, ROM, or any other suitable memory such as Flash memory, memory cards, etc.

Other Exemplary Non-Limiting Embodiments

Further advantages of the claimed subject matter will become apparent from the following examples describing certain embodiments of the claimed subject-matter 1. A network system comprising:
(a) a plurality of devices wherein a substantial portion of the plurality of devices are capable of one or more of the following: transmitting data and receiving data; and
(b) at least one gateway that is capable of one or more of the following: transmitting data to at least one of the plurality of devices; receiving data from at least one of the plurality of devices; transmitting data to at least one electronic computing device; and receiving data from at least one electronic computing device;
wherein the at least one of the plurality of devices is positioned within a distance from the at least one gateway such that the distance allows communication between the at least one gateway and the at least one of the plurality of devices;

wherein the distance between devices allows communication between at least one device and at least one other device; and wherein the substantial portion of the plurality of devices are able to communicate with at least one other device within the network and the minimum infrastructure required for the gateway to handle at least 100, 500, 2000, 10,000, 100,000, or 1,000,000 devices is substantially the same. As recited in example 1 the ability for the network to handle at least 100, 500, 2000, 10,000, 100,000 or 1,000,000 devices without the need for additional infrastructure may be attributable to the networks ability to route packets with limited headers (or no headers), e.g., the devices may be configured to receive data at a predefined time (e.g., time slot X), append its own data at a predefined time (e.g., time slot Y), remain asleep for a predefined amount of time, and/or wake-up at a predefined time. By minimizing the need for further infrastructure the costs for extending the network by additional devices is reduced. By limiting and/or avoiding headers the overall amount of data (e.g., headers, etc.) that may need to be transmitted and/or received by the devices within the network is reduced so that the net available bandwidth for moving the data within the network is significantly increased.

2. A system comprising:
(a) a plurality of nodes wherein a portion of the plurality of nodes are capable of one or more of the following: transmitting data and receiving data; and
(b) at least one gateway that is capable of one or more of the following: transmitting data to at least one of the plurality of nodes; receiving data from at least one of the plurality of nodes; wherein the at least one of the plurality of nodes and the at least one gateway are in communication; and
wherein at least one node and at least one other node are in communication; wherein a portion of the plurality of nodes are able to communicate with at least one other node and the minimum infrastructure required for the gateway to handle at least 100, 500, 2000, 10,000, 100,000, or 1,000,000 nodes is substantially the same. As recited in example 2, the ability for the network to handle at least 100, 500, 2000, 10,000, 100,000 or 1,000,000 devices without the need for additional infrastructure may be attributable to the networks ability to route packets with limited headers (or no headers). By minimizing the need for further infrastructure the costs for extending the network by additional devices is reduced. By limiting and/or avoiding headers the overall amount of data that may need to be transmitted and/or received by the devices within the network is reduced so that the net available bandwidth for moving the data within the network is significantly increased.

3. A network system comprising:
(a) a plurality of devices wherein a substantial portion of the plurality of devices are capable of one or more of the following: transmitting data and receiving data;
(b) at least one gateway that is capable of one or more of the following: transmitting data to at least one of the plurality of devices; receiving data from at least one of the plurality of devices; transmitting data to at least one electronic computing device; and receiving data from at least one electronic computing device; and
(c) a substantial portion of the devices are arranged such that the distance between devices allows wireless communication between at least one device and at least one other device;
wherein the cost of deploying and/or maintaining the network of at least 100, 500, 2000, 10000, 100,000, 500,000, 1,000,000 or 5,000,000 devices is substantially proportional to the cost of the individual devices. By minimizing the need for further infrastructure the costs for extending the network with additional devices is reduced.

4. A network system comprising:
(a) a plurality of devices wherein a substantial portion of the plurality of devices are capable of one or more of the following: transmitting data and receiving data; and
(b) at least one gateway that is capable of one or more of the following: transmitting data to at least one of the plurality of devices; receiving data from at least one of the plurality of devices; transmitting data to at least one electronic computing device; and receiving data from at least one electronic computing device;
wherein the distance between devices allows communication between at least one device and at least one other device; and
wherein a substantial portion of the plurality of devices are able to communicate with at least one other device within the network and the at least one gateway within the network is capable of handling at least 100, 500, 2000, 10,000, 100,000 or 1,000,000 devices without the need for additional infrastructure. By minimizing the need for further infrastructure the costs for extending the network with additional devices is reduced.

5. A network system comprising:
(a) a plurality of devices wherein a substantial portion of the plurality of devices are capable of one or more of the following: transmitting data and receiving data; and
(b) at least one gateway that is capable of one or more of the following: transmitting data to at least one of the plurality of devices; receiving data from at least one of the plurality of devices; transmitting data to at least one electronic computing device; and receiving data from at least one electronic computing device;
wherein the distance between devices allows communication between at least one device and at least one other device;
wherein a substantial portion of the plurality of devices are able to communicate with at least one other device within the network;
wherein the network is capable of handling at least 100, 500, 2000, 10,000, 100,000 or 1,000,000 wireless devices; and
wherein the plurality of devices, the at least one gateway and the at least one computing device form the network without the need for additional infrastructure. By minimizing the need for further infrastructure the costs for extending the network with additional wireless devices is reduced.

6. A network system comprising:
(a) a plurality of devices wherein a substantial portion of the plurality of devices are capable of one or more of the following: transmitting data and receiving data; and
(b) at least one gateway that is capable of one or more of the following: transmitting data to at least one of the plurality of devices; receiving data from at least one of the plurality of devices;
transmitting data to at least one electronic computing device; and receiving data from at least one electronic computing device;
wherein the distance between devices allows communication between at least one device and at least one other device;
   wherein a substantial portion of the plurality of devices are able to communicate with at least one other device within the network; and
wherein a substantial portion of the plurality of devices are able to communicate with at least one other device within the network and the minimum infrastructure required for the gateway to handle at least 100, 500, 2000, 10,000, 100,000 or 1,000,000 devices is substantially the same. By minimizing the need for further infrastructure the costs for extending the network with additional devices is reduced.

7. A network system comprising:
(a) a plurality of devices capable of transmitting and/or receiving data;
(b) at least one gateway capable of transmitting and/or receiving data; and
(c) at least one electronic computing device capable of transmitting and/or receiving data; and wherein the ratio of available bandwidth to the net pay load of a substantial portion of the network system is between 50 to 200, 200 to 1000, 300 to 5000, 200 to 200,000, 200 to 2 million, 2 million to 1 billion or one billion to 100 billion.

8. A network system comprising:
(a) a plurality of devices capable of transmitting and/or receiving data;
(b) at least one gateway capable of transmitting and/or receiving data; and
(c) at least one electronic computing device capable of transmitting and/or receiving data; wherein the ratio of available channel capacity to the net pay load of a substantial portion of the network system is between 50 to 200, 200 to 1000, 300 to 5000, 200 to 200,000, 200 to 2 million, 2 million to 1 billion or one billion to 100 billion. As recited in example 8, the ability for the network to have a ratio of available channel capacity to the net pay load of between 50 to 200, 200 to 1000, 300 to 5000, 200 to 200,000, 200 to 2 million, 2 million to 1 billion or 1 billion to 100 billion may be attributable to the networks ability to route packets with limited headers (or no headers). By limiting and/or avoiding headers the overall amount of data that may need to be transmitted and/or received by the devices within the network is reduced so that the ratio of available channel capacity to the net pay load within the network is significantly increased.

9. A network system comprising:
(a) a plurality of devices capable of transmitting and/or receiving data;
(b) at least one gateway capable of transmitting and/or receiving data; and
(c) at least one electronic computing device capable of transmitting and/or receiving data;
wherein the ratio of a total data transmission to a net overhead of a substantial portion of the network system is between 50 to 200, 200 to 1000, 300 to 5000, 200 to 200,000, 200 to 2 million, 2 million to 1 billion or one billion to 100 billion.

10. A network system comprising:
(a) a plurality of devices capable of transmitting and/or receiving data;
(b) at least one gateway that is capable of transmitting and/or receiving data; and
(c) at least one route within the network;
wherein data is transmitted from the at least one gateway to a first device in the at least one route and then from the first device to a second device in the at least one route and so forth until a substantial portion of the devices forming the route have transmitted data;
wherein data is transmitted back to the at least one gateway along the at least one route by hopping from one device to another device along the route until the data is received at the at least one gateway and a substantial portion of the devices forming the route have transmitted data; and
wherein the system is capable of handling at least 50, 100, 200, 300, 500, 1000, 5000 or 10,000 hops between the at least one gateway and the series of devices making up the at least one route. This leads to the positive effect that the amount of additional data (e.g., headers, etc.) transmitted and/or received is not, or at least not significantly, increased when the data is moved from one device to another device and so forth via a path that includes such a large number of hops.

11. A network system comprising: a plurality of devices capable of transmitting and/or receiving data, wherein there is at least 50, 100, 200, 300, 500, 1000, 5000 or 10,000 hops between at least one device of the plurality of devices and at least one other device of the plurality of devices.

12. A network system comprising: a plurality of devices capable of transmitting and/or receiving data, wherein there is at least 50, 100, 200, 300, 500, 1000, 5000 or 10,000 hops between at least one device of the plurality of devices and at least one other device of the plurality of devices and a substantial portion of the hops are wireless hops. This leads to the positive effect that the amount of additional data (e.g., headers, etc.) transmitted and/or received is not, or at least not significantly, increased when the data is moved from one wireless device to another wireless device and so forth via a path that includes such a large number of hops.

13. A network system comprising: a plurality of devices capable of transmitting and/or receiving data, wherein there is at least 50, 100, 200, 300, 500, 1000, 5000 or 10,000 hops between at least one device of the plurality of devices and at least one other device of the plurality of devices and a ratio of a number of hops to available data is more than 1/1000, 1/100, 1/25, 1/10 or 1. This leads to the positive effects recited above.

14. A network system for distributing digital data to and/or from a plurality of devices over a wireless mesh network comprising:
(a) at least one electronic computing device for operating the mesh network;
(b) at least one gateway device; and
(c) a plurality of preconfigured routes within the network wherein the routes are comprised of one or more devices; wherein the system is configured such that a substantial portion of the plurality of preconfigured routes are capable of handling at least 50 hops between the at least one gateway and the series of devices making up a particular preconfigured route of the substantial portion of the plurality of preconfigured routes. This leads to the positive effects recited above.

15. A network system for distributing digital data to and/or from a plurality of devices over a wireless mesh network comprising:
(a) at least one electronic computing device for configuring the mesh network;
(b) at least one gateway device;
(c) a plurality of preconfigured routes within the network wherein the routes are comprised of one or more devices; wherein the systems are configured such that a substantial portion of the plurality of preconfigured routes are capable of handling at least 50 hops between the at least one gateway and the series of devices making up a particular preconfigured route of the substantial portion of the plurality of preconfigured routes. This leads to the positive effects recited above.

16. A network system for distributing digital data to and/or from a plurality of devices over a wireless mesh network comprising:
(a) at least one electronic computing device for operating the mesh network;

(b) at least one gateway device; and
(c) a plurality of preconfigured routes within the network wherein the routes are comprised of one or more devices; wherein the systems are configured such that a substantial portion of the plurality of preconfigured routes are capable of handling at least 50 hops between the at least one gateway and the series of devices making up a particular preconfigured route of the substantial portion of the plurality of preconfigured routes. This leads to the positive effects recited above.

17. A network system for distributing digital data to and/or from a plurality of devices over a wireless mesh network comprising:
(a) at least one electronic computing device for configuring the mesh network;
(b) at least one gateway device; and
(c) a plurality of preconfigured routes within the network wherein the routes are comprised of one or more devices; and
wherein the systems are configured such that a substantial portion of the plurality of preconfigured routes are capable of handling at least 50 hops between the at least one gateway and the series of devices making up a particular preconfigured route of the substantial portion of the plurality of preconfigured routes. This leads to the positive effects recited above.

18. A network system comprising:
(a) at least one electronic computing device for operating the network; and
(b) a plurality of devices capable of transmitting and/or receiving data;
wherein a substantial portion of the devices in the network are capable of interacting with at least one neighboring device and form a network with one or more of the following: no gateway and/or control point; a single gateway and/or control point; a single gateway and a plurality of control points; a plurality of gateways and a single control point; and a plurality of gateways and/or control points.

19. The network system of one or more of the above examples, wherein the ratio of available bandwidth to the net pay load is between 200 to 250,000, 300 to 5000, 1000 to 100,000, 50,000 to 1 million or 500,000 to 10 million.

20. The network system of one or more of the above examples, wherein the ratio of channel capacity to the net pay load is between 200 to 250000, 300 to 5000, 1000 to 100,000, 50,000 Co 1 million or 500,000 to 10 million.

21. The network systems of one or more of the above examples, wherein the system is a low-bandwidth application. Low-bandwidth means the data originated from or intended to an individual device is 0.1%, 0.05%, 0.01%, 0.005%, 0.0001%, 0.00005%, 0.00001% or 0.000001% of the available bandwidth.

22. The network systems of one or more of the above examples, wherein at least 85%, 90%, 95%, 98%, 99%, 99.5% or 99.8% of the devices in the network are capable of interacting with at least one neighboring device.

23. The network systems of one or more of the above examples, wherein the ratio of transmit plus receive time to idle time is between 100 to 300000, 100 to 500, 200 to 1000, 500 to 2000, 1000 to 10000, 1000 to 5000, 10,000 to 50,000, 40,000 to 120,000, 50,000 to 140,000, 80,000 to 200,000, 120,000 to 300,000 or 160,000 to 350,000.

24. The network systems of one or more of the above examples, wherein the substantial portion of the plurality of devices in the network are relatively inexpensive and/or power efficient.

25. The network systems of one or more of the above examples, wherein the substantial portion of the plurality of devices in the network cost less than 1 dollar, 3 dollars, 5 dollars, 10 dollars, 20 dollars or combinations thereof to manufacture.

26. The network systems of one or more of the above examples, wherein the substantial portion of the plurality of devices in the network have an average current consumption that is less than 30 micro-amps, 20 micro-amps, 10 micro-amps, 5 micro-amps, 3 micro-amps, 1 micro-amps, 0.5 micro-amps or combinations thereof.

27. The network systems of one or more of the above examples, wherein extensions to the network may be achieved by adding more devices to the network without the need to reconfigure complex and/or powerful central transmitters and/or receivers.

28. The network systems of one or more of the above examples, wherein transmission overhead is significantly reduced.

29. The network systems of one or more of the above examples, wherein MAC layer overhead is 0%, less than 1%, less than 5%, or less than 10%. This leads to the positive effects recited above.

30. The network systems of one or more of the above examples, wherein the system is preconfigured by creating one or more of the following: optimized routes and optimized resources.

31. The network systems of one or more of the above examples, wherein the optimized resource is one or more of the following: channel, time slot, CDMA sequence, frequency hopping sequence and FDD bins.

32. The network systems of one or more of the above examples, wherein transmission overhead is reduced by suppressing one or more of the following: source headers, destination headers and request-channel allocation-transmission overhead.

33. The network systems of one or more of the above examples, wherein the number of devices within the network is between 25,000 to 500,000; 100,000 to 1 million, 250,000 to 600,000, 500,000 to 1 million; 500,000 to 2 million; 700,000 to 2 million, 800,000 to 5 million, 1 million to 10 million or 2 million to 15 million. This leads to the positive effects recited above.

34. The network systems of one or more of the above examples, wherein the plurality of devices are one or more of the following: current sensors, light sensors, humidity sensors, pressure sensors, gas sensors, chemicals sensors, proximity sensors, movement sensors, magnetic sensors, radiation sensors, cameras, scanners, sprinkles, heater controllers, pump controllers, air-con controllers and water supply controllers.

35. The network systems of one or more of the above examples, wherein the plurality of devices perform one or more of the following functions: measure one or more physical parameters, control another device, monitor one or more physical parameters, report measured data back, report anomalies and accept and execute control commands.

36. The network systems of one or more of the above examples, wherein the one or more physical parameters is selected from one or more of the following: temperature, one or more temperatures, one or more temperature ranges, one or more temperature regions, electrical current, one or more electrical currents, one or more electrical ranges, light, light level, one or more light levels, one or more light regions, humidity, humidity level, one or more humidity level regions, pressure, pressure level, one or more pressure levels, one or more pressure levels, one or more pressure level regions, gas, one or more gases, one or more gas levels, chemicals, one or more chemicals, one or more chemical levels, proximity, one or more levels of proximity, movement, one or more levels of movement, magnetic level, one or more magnetic levels, one or more regions of magnetic levels, radiation, one or more levels of radiation, one or more regions of radiation levels, images, one or more images, visible light images, one or more visible light images, infra red images, one or more infra red images, heat level images, one or more heat level images, sound, one or more levels of sound, sound images, one or more sound images, scanners, sprinkles, heater controllers, pump controllers, air-con controllers and water supply controllers.

37. The network systems of one or more of the above examples, wherein the one or more physical parameters are temperature, light and movement.

38. The network systems of one or more of the above examples, wherein the one or more physical parameters is temperature and light.

39. The network systems of one or more of the above examples, wherein the one or more physical parameters is temperature, light and humidity.

40. The network systems of one or more of the above examples, wherein the one or more physical parameters is temperature, light and movement.

41. The network systems of one or more of the above examples, wherein the one or more physical parameters are temperature and humidity.

42. The network systems of one or more of the above examples, wherein the one or more physical parameters are temperature and air-pressure.

43. The network systems of one or more of the above examples, wherein the one or more physical parameters is noise level.

44. The network systems of one or more of the above examples, wherein the one or more physical parameters is soil moisture.

45. The network systems of one or more of the above examples, wherein the one or more physical parameters is CO2 level.

46. The network systems of one or more of the above examples, wherein the packet exchange and routing is done with zero overhead and no addresses are required.

47. The network systems of one or more of the above examples, wherein the packet exchange and routing is done with substantially no overhead and no addresses are required.

48. The network systems of one or more of the above examples, wherein the packet exchange and routing is done with substantially no overhead and substantially no addresses are required.

49. The network systems of one or more of the above examples, wherein a portion of the devices, a substantial portion of the devices, each device or each node may be configured with its own configuration.

50. The network systems of one or more of the above examples, wherein the net over head per device is less than 10%, 5%, 1%, 0.1% or 0.01%. This leads to the positive effects recited above.

51. The network systems of one or more of the above examples, wherein the system is capable of handling at least 50, 100, 200, 300, 500, 1000, 5000, 10,000 or 50,000 hops between the at least one gateway and the series of devices making up the at least one route without substantially increasing transmission overhead.

52. The network systems of one or more of the above examples, wherein the system is capable of handling at least 50, 100, 200, 300, 500, 1000, 5000, 10,000 or 50,000 hops between the at least one device of the plurality of devices and at least one other device of the plurality of devices without substantially increasing transmission overhead. This leads to the positive effects recited above.

53. The network systems of one or more of the above examples, wherein the network is a substantially wireless network.

54. The network systems of one or more of the above examples, wherein additional infrastructure includes one or more of the following: access points, bridges, hubs, hot spots, repeaters and routers.

55. A method for distributing digital data to and/or from a plurality of devices over a network comprising:
receiving and/or transmitting digital data via at least one gateway in the network; generating one or more digital data packets from the digital data suitable for transmission over the network; and
performing one or more of the following: transmitting the one or more digital data packets via the at least one gateway to a plurality of devices connected via a suitable topology; and receiving the one or more digital data packets from the plurality of devices connected via a suitable topology to the at least one gateway.

56. A method for distributing digital data to and/or from a plurality of devices over a network comprising:
receiving and/or transmitting digital data via at least one gateway in the network; generating one or more digital data packets from the digital data suitable for transmission over the network, wherein addressing and/or routing information is substantial absent from a substantial portion of the one or more digital data packets; and
performing one or more of the following: transmitting the one or more digital data packets via the at least one gateway to a plurality of devices connected via a suitable topology; and receiving the one or more digital data packets from the plurality of devices connected via a suitable topology to the at least one gateway.

57. The methods of one or more of the above examples, further comprising receiving data from the plurality of devices via a transmitting of the data in a hopping fashion from one device to another device until the data is received at the least one gateway.

58. The methods of one or more of the above examples, further comprising transmitting data from the at least one gateway to the plurality of devices via transmitting of the data in a hopping fashion from the at least one gateway to at least one first device and then to at least one second device and then to a series of other devices until the data is received by a substantial portion of the plurality of devices on the network that are preconfigured to receive the data.

59. The methods of one or more of the above examples, further comprising monitoring the plurality of devices to generate an alarm when one of the devices fails or re-routes traffic around a failed device.

60. The methods of one or more of the above examples, further comprising managing data traffic among the plurality of devices and the at least one gateway device, and separating the plurality of devices into one or more logical zones.

61. The methods of one or more of the above examples, wherein the at least one device is in a first logical zone and at least another device is in a second logical zone.

62. A method based on one or more of the disclosed embodiments or one or more combinations of the disclosed parameters.

63. The methods of one of the above examples, wherein the substantial portion of the plurality of devices are able to communicate with at least one other device within the network and the minimum infrastructure required for the gateway to handle at least 100, 500, 2000, 10,000, 100,000 or 1,000,000 devices is substantially the same.

64. A network system based on one or more of the disclosed embodiments or one or more combinations of the disclosed parameters.

A1. A network system comprising: (a) a plurality of devices wherein a substantial portion of the plurality of devices are capable of one or more of the following: transmitting data and receiving data; and (b) at least one gateway that is capable of one or more of the following: transmitting data to at least one of the plurality of devices; receiving data from at least one of the plurality of devices; transmitting data to at least one electronic computing device; and receiving data from at least one electronic computing device; wherein the at least one of the plurality of devices is positioned within a distance from the at least one gateway such that the distance allows communication between the at least one gateway and the at least one of the plurality of devices; wherein the distance between devices allows communication between at least one device and at least one other device; and wherein a substantial portion of the plurality of devices are able to communicate with at least one other device within the network and the at least one gateway within the network is capable of handling at least 100, 500, 2000, 10,000, 100,000 or 1,000,000 devices without the need for additional infrastructure. As recited in example A1 the ability for the network to handle at least 100, 500, 2000, 10,000, 100,000 or 1,000,000 devices without the need for additional infrastructure may be attributable to the networks ability to route packets with limited headers (or no headers), e.g., the devices may be configured to receive data at a predefined time (e.g., time slot X), append its own data at a predefined time (e.g., time slot Y), remain asleep for a predefined amount of time, and/or wake-up at a predefined time. By minimizing the need for further infrastructure the costs for extending the network by additional devices is reduced. By limiting and/or avoiding headers the overall amount of data that may need to be transmitted and/or received by the devices within the network is reduced so that the net available bandwidth for moving the data within the network is significantly increased.

A2. A network system comprising: (a) a plurality of devices wherein a substantial portion of the plurality of devices are capable of one or more of the following: transmitting data and receiving data; and (b) at least one gateway that is capable of one or more of the following: transmitting data to at least one of the plurality of devices; receiving data from at least one of the plurality of devices; transmitting data to at least one electronic computing device; and receiving data from at least one electronic computing device; wherein the distance between devices allows communication between at least one device and at least one other device; and wherein a substantial portion of the plurality of devices are able to communicate with at least one other device within the network and the at least one gateway within the network is capable of handling at least 100, 500, 2000, 10,000, 100,000 or 1,000,000 devices without the need for additional infrastructure. This leads to the positive effects recited above.

A3. A network system comprising: (a) a plurality of devices wherein a substantial portion of the plurality of devices are capable of one or more of the following: transmitting data and receiving data; and (b) at least one gateway that is capable of one or more of the following: transmitting data to at least one of the plurality of devices; receiving data from at least one of the plurality of devices; transmitting data to at least one electronic computing device; and receiving data from at least one electronic computing device; wherein the distance between devices allows communication between at least one device and at least one other device; wherein a substantial portion of the plurality of devices are able to communicate with at least one other device within the network; wherein the network is capable of handling at least 100, 500, 2000, 10,000, 100,000 or 1,000,000 wireless devices; and wherein the plurality of devices, the at least one gateway and the at least one computing device form the network without the need for additional infrastructure; This leads to the positive effects recited above.

A4. A network system comprising: (a) a plurality of devices capable of transmitting and/or receiving data; (b) at least one gateway capable of transmitting and/or receiving data; and (c) at least one electronic computing device capable of transmitting and/or receiving data; wherein the ratio of available bandwidth to the net pay load of a substantial portion of the network system is between 50 to 200, 200 to 1000, 300 to 5000, 200 to 200,000, 200 to 2 million, 2 million to 1 billion or one billion to 100 billion. As recited in example A4, the ability for the network to have a ratio of available bandwidth to the net pay load of between 50 to 200, 200 to 1000, 300 to 5000, 200 to 200,000, 200 to 2 million, 2 million to 1 billion or 1 billion to 100 billion may be attributable to the networks ability to route packets with limited headers (or no headers).). By limiting and/or avoiding headers the overall amount of data that may need to be transmitted and/or received by the devices within the network is reduced so that the ratio of net available bandwidth to the net pay loads within the network is significantly increased.

A5. A network system comprising: (a) a plurality of devices capable of transmitting and/or receiving data; (b) at least one gateway capable of transmitting and/or receiving data; and (c) at least one electronic computing device capable of transmitting and/or receiving data; wherein the ratio of available channel capacity to the net pay load of a substantial portion of the network system is between 50 to 200, 200 to 1000, 300 to 5000, 200 to 200,000, 200 to 2 million, 2 million to 1 billion or one billion to 100 billion. By limiting and/or avoiding headers the overall amount of data that may need to be transmitted and/or received by the devices within the network is reduced so that the ratio of available channel capacity to the net pay loads within the network is significantly increased.

A6. A network system comprising: (a) a plurality of devices capable of transmitting and/or receiving data; (b) at least one gateway that is capable of transmitting and/or receiving data; and (c) at least one route within the network; wherein data is transmitted from the at least one gateway to a first device in the at least one route and then from the first device to a second device in the at least one route and so forth until a substantial portion of the devices forming the route have transmitted data; wherein data is transmitted back to the at least one gateway along the at least one route by hopping from one device to another device along the route until the data is received at the at least one gateway and a substantial portion of the devices forming the route have transmitted data; and wherein the system is capable of handling at least 50, 100, 200, 300, 500, 1000, 5000 or 10,000 hops between the at least one gateway and the series of devices making up the at least one route. As recited in example A6, the ability for the network to handle at least 50, 100, 200, 300, 500, 1000, 5000 or 10,000 hops may be attributable to the networks ability to route packets with limited headers (or no headers). This leads to the positive effect that the amount of additional data (e.g., headers, etc.) transmitted and/or received is not, or at least not significantly, increased when the data is moved from one device and so forth to another device via a path that includes such a large number of hops.

A7. A network system for distributing digital data to and/or from a plurality of devices over a wireless mesh network comprising: (a) at least one electronic computing device for operating the mesh network; (b) at least one gateway device; and (c) a plurality of preconfigured routes within the network, wherein the routes are comprised of one or more devices;
wherein the systems are configured such that a substantial portion of the plurality of preconfigured routes are capable of handling at least 50 hops between the at least one gateway and the series of devices making up a particular route. This leads to the positive effects recited above.

A8. A network system for distributing digital data to and/or from a plurality of devices over a wireless mesh network comprising: (a) at least one electronic computing device for configuring the mesh network; (b) at least one gateway device; and (c) a plurality of preconfigured routes within the network wherein the routes are comprised of one or more devices; wherein the systems are configured such that a substantial portion of the plurality of preconfigured routes are capable of handling at least 50 hops between the at least one gateway and the series of devices making up a particular route. This leads to the positive effects recited above.

A9. A network system for distributing digital data to and/or from a plurality of devices over a wireless mesh network comprising: (a) at least one electronic computing device for operating the mesh network; (b) at least one gateway device; and (c) a plurality of preconfigured routes within the network, wherein the routes are comprised of one or more devices; wherein the systems are configured such that a substantial portion of the plurality of preconfigured routes are capable of handling at least 50 hops between the at least one gateway and the series of devices making up a particular route.

A10. A network system for distributing digital data to and/or from a plurality of devices over a wireless mesh network comprising: (a) at least one electronic computing device for configuring the mesh network; (b) at least one gateway device; and (c) a plurality of preconfigured routes within the network, wherein the routes are comprised of one or more devices; wherein the systems are configured such that a substantial portion of the plurality of preconfigured routes are capable of handling at least 50 hops between the at least one gateway and the series of devices making up a particular route.

A11. A network system comprising: (a) at least one electronic computing device for operating the network; and (b) a plurality of devices capable of transmitting and/or receiving data; wherein a substantial portion of the devices in the network are capable of interacting with at least one neighbouring device and form a network with one or more of the following: no gateway and/or control point; a single gateway and/or control point; a single gateway and a plurality of control points; a plurality of gateways and a single control point; or a plurality of gateways and/or control points.

A12. The network system of one or more of the above A examples, wherein the ratio of available bandwidth to the net pay load is between 200 to 250,000, 300 to 5000, 1000 to 100,000, 50,000 to 1 million or 500,000 to 10 million. This leads to the positive effects recited above.

A13. The network system of one or more of the above A examples, wherein the ratio of channel capacity to the net pay load is between 200 to 250,000, 300 to 5000, 1000 to 100,000, 50,000 to 1 million or 500,000 to 10 million. This leads to the positive effects recited above.

A14. The network systems of one or more of the above A examples, wherein the system is a low-bandwidth application.

A15. The network systems of one or more of the above A examples, wherein at least 85%, 90%, 95%, 98%, 99%, 99.5% or 99.8% of the devices in the network are capable of interacting with at least one neighbouring device.

A16. The network systems of one or more of the above A examples, wherein the ratio of transmit plus receive time to idle time is between 100 to 300,000, 100 to 500, 200 to 1000, 500 to 2000, 1000 to 10,000, 1000 to 5000, 10,000 to 50,000, 40,000 to 120,000, 50,000 to 140,000, 80,000 to 200,000, 120,000 to 300,000 or 160,000 to 350,000.

A17. The network systems of one or more of the above A examples wherein, substantial portion of the plurality of devices in the network are relatively inexpensive and/or power efficient.

A18. The network systems of one or more of the above A examples wherein extensions to the network may be achieved by adding more devices to the network without the need to reconfigure complex and/or powerful central transmitters and/or receivers.

A19. The network systems of one or more of the above A examples, wherein transmission overhead is significantly reduced.

A20. The network systems of one or more of the above A examples, wherein MAC layer overhead is 0%, less than 1%, less than 5% or less than 10%.

A21. The network systems of one or more of the above A examples, wherein the system is preconfigured by creating one or more of the following: optimized routes and optimized resources.

A22. The network systems of one or more of the above A examples, wherein the optimized resource is one or more of the following: channel, time slot, CDMA sequence, frequency hopping sequence and FDD bins.

A23. The network systems of one or more of the above A examples, wherein transmission overhead is reduced by suppressing one or more of the following: source headers, destination headers and request-channel allocation-transmission overhead.

A24. The network systems of one or more of the above A examples, wherein the number of devices within the network is between 25,000 to 500,000, 100,000 to 1,000,000, 250,000 to 600,000, 500,000 to 1 million, 500,000 to 2 million, 700,000 to 2 million, 800,000 to 5 million, 1 million to 10 million or 2 million to 15 million.

A25. The network systems of one or more of the above A examples, wherein the plurality of devices are one or more of the following: current sensors, light sensors, humidity sensors, pressure sensors, gas sensors, chemicals sensors, proximity sensors, movement sensors, magnetic sensors, radiation sensors, cameras, scanners, sprinkles, heater controllers, pump controllers, air-con controllers and water supply controllers.

A26. The network systems of one or more of the above A examples, wherein the plurality of devices perform one or more of the following functions: measure something, control another device, monitor something, report measured data back, report anomalies, and accept and execute control commands.

A27. The network systems of one or more of the above A examples, wherein the packet exchange and routing is done with zero overhead and no addresses are required.

A28. The network systems of one or more of the above A examples, wherein the packet exchange and routing is done with substantially zero overhead and no addresses are required.

A29. The network systems of one or more of the above A examples, wherein the packet exchange and routing is done with substantially zero overhead and substantially no addresses are required.

A30. The network systems of one or more of the above A examples, wherein a portion of the devices, a substantial portion of the devices, or each node may be configured with its own configuration.

A31. The network systems of one or more of the above A examples, wherein the net over head per device is less than 10%, 5%, 1%, 0.1% or 0.01%.

A32. The network systems of one or more of the above A examples, wherein the system is capable of handling at least 50, 100, 200, 300, 500, 1000, 5000, 10,000 or 50,000 hops between the at least one gateway and the series of devices making up the at least one route without substantially increasing transmission overhead.

A33. The network systems of one or more of the above A examples, wherein the network is a substantially wireless network.

A34. The network systems of one or more of the above A examples, wherein additional infrastructure includes one or more of the following: access points, bridges, hubs, hot spots, repeaters and routers.

A35. A method for distributing digital data to and/or from a plurality of devices over a network comprising: receiving and/or transmitting digital data via at least one gateway in the network; generating one or more digital data packets from the digital data suitable for transmission over the network; and performing one or more of the following: transmitting the one or more digital data packets via the at least one gateway to a plurality of devices connected via a suitable topology; and receiving the one or more digital data packets from the plurality of devices connected via a suitable topology to the at least one gateway.

A36. The method of example A33 further comprising receiving data from the plurality of devices via a transmitting of the data in a hopping fashion from one device to another device until the data is received at the least one gateway.

A37. The methods of one or more of the above A examples further comprising transmitting data from the at least one gateway to the plurality of devices via transmitting of the data in a hopping fashion from the at least one gateway to at least one first device and then to at least one second device and then to a series of other devices until the data is received by a substantial portion of the plurality of devices on the network that are preconfigured to receive the data.

A38. The methods of one or more of the above A examples further comprising monitoring the plurality of devices to generate an alarm when one of the devices fails or re-routes traffic around a failed device.

A39. The methods of one or more of the above A examples further comprising managing data traffic among the plurality of devices and the at least one gateway device and separating the plurality of devices into one or more logical zones.

A40. The methods of one or more of the above A examples, wherein the at least one device is in a first logical zone and at least another device is in a second logical zone.

A41. A method based on one or more of the disclosed embodiments or one or more combinations of the disclosed parameters.

A42. A network system based on one or more of the disclosed embodiments or one or more combinations of the disclosed parameters.

AA.1. A system comprising:
a plurality of devices where a portion of the devices performs one or more of the following: transmits at predefined times a predefined amount of data using a predefined resource; receives at predefined times a predefined amount of data using a predefined resource; transmits at predefined times a predefined amount of data using a predefined resource and receives at predefined times a predefined amount of data using a predefined resource; and addressing and/or routing information is substantially absent in the data transmitted to the portion of the devices and/or received from the portion of the devices. Using one or more predefined parameters leads to the positive effect that the system may limit and/or avoid the need for headers in the data being transmitted and/or received within the network.

AA.2. A system comprising: a plurality of devices where a portion of the devices performs one or more of the following: transmits at predefined times a predefined amount of data using a predefined resource; receives at predefined times a predefined amount of data using a predefined resource; transmits at predefined times a predefined amount of data using a predefined resource and receives at predefined times a predefined amount of data using a predefined resource; transmits at predefined times a predefined amount of data using a predefined resource and receives at predefined times a predefined amount of data using a predefined resource and transmits at predefined times a variable amount of data using a predefined resource and receives at predefined times a variable amount of data using a predefined resource; and addressing and/or routing information is substantially absent in the data transmitted to the portion of the devices and/or received from the portion of the devices. Using one or more predefined parameters leads to the positive effect that the system may limit and/or avoid the need for headers in the data being transmitted and/or received within the network.

AA.3. A system comprising: a plurality of devices where five or more of the devices perform one or more of the following: transmit at predefined times a predefined amount of data using a predefined resource; receive at predefined times a predefined amount of data using a predefined resource; transmit at predefined times a predefined amount of data using a predefined resource and receive at predefined times a predefined amount of data using a predefined resource; and addressing and/or routing information is substantially absent in the data transmitted to the five or more devices and/or received from the five or more devices.

AA.4. A system comprising: a plurality of devices where a portion of the devices individually perform one or more of the following: transmit at predefined times a predefined amount of data using a predefined resource; receive at predefined times a predefined amount of data using a predefined resource; transmit at predefined times a predefined amount of data using a predefined resource and receive at predefined times a predefined amount of data using a predefined resource; and addressing and/or routing information is substantially absent in the data transmitted to the portion of the devices and/or received from the portion of the devices. Using one or more predefined parameters leads to the positive effect that the system may limit and/or avoid the need for headers in the data being transmitted and/or received within the network. A portion of the devices means at least 30%, 40%, 50%, 60%, 70%, 80% or 85% of the devices in the network system.

AA.5. A system comprising: a plurality of devices where a substantial portion of the devices individually perform one or more of the following: transmit at predefined times a predefined amount of data using a predefined resource; receive at predefined times a predefined amount of data using a predefined resource; transmit at predefined times a predefined amount of data using a predefined resource and receive at predefined times a predefined amount of data using a predefined resource; and addressing and/or routing information is substantially absent in the data transmitted to the portion of the devices and/or received from the portion of the devices. A substantial portion of the devices means at least 60%, 70%, 80%, 85%, 90%, 95%, 98%, 99%, 99.5% or 99.8% of the devices in the network system. Using one or more predefined parameters leads to the positive effect that the system may limit and/or avoid the need for headers in the data being transmitted and/or received within the network.

AA.6. A system comprising: a plurality of devices where each device performs one or more of the following: transmits at predefined times a predefined amount of data using a predefined resource; receives at predefined times a predefined amount of data using a predefined resource; transmits at predefined times a predefined amount of data using a predefined resource and receives at predefined times a predefined amount of data using a predefined resource; and addressing and/or routing information is substantially absent in the data transmitted to each device and/or received from each device.

AA.7. A system comprising: at least 5, 10, 20 or 50 devices capable of transmitting and/or receiving data, wherein a substantial portion of the individual devices each transmits and/or receives at predefined times a predefined amount of data using a predefined resource, and an addressing and/or routing information is substantially absent in the data transmitted to each device and/or received from each device. A substantial portion of the devices means at least 60%, 70%, 80%, 85%, 90%, 95%, 98%, 99%, 99.5% or 99.8% of the devices in the network system. Using one or more predefined parameters leads to the positive effect that the system may limit and/or avoid the need for headers in the data being transmitted and/or received within the network.

AA.8. A system comprising: at least 5, 10, 20 or 50 devices of the system are capable of transmitting and/or receiving data, wherein each of those devices transmits and/or receives at predefined times a predefined amount of data using a predefined resource, and an addressing and/or routing information is substantially absent in the data transmitted to each device and/or received from each device. This leads to the positive effects recited above.

AA.9. A system comprising: a plurality of devices that are capable of transmitting and/or receiving data, wherein five or more of the devices transmit and/or receive at predefined times a predefined amount of data using a predefined resource, and addressing and/or routing information is substantially absent in the data transmitted to the five or more devices and/or received from the five or more devices. This leads to the positive effects recited above.

AA.10. A system comprising: a plurality of devices that are capable of transmitting and/or receiving data, wherein three or more of the devices perform one or more of the following: transmits and/or receives information at predefined times, transmits and/or receives a predefined amount of data, and transmits and/or receives using a predefined resource, wherein address and/or routing information is substantially absent in the data transmitted or received. Using one or more predefined parameters leads to the positive effect that the system may limit and/or avoid the need for headers in the data being transmitted and/or received within the network.

AA.11. A system comprising: a plurality of devices capable of transmitting and/or receiving data, wherein each device performs one or more of the following: transmits and/or receives information at one or more predefined times, transmits and/or receives one or more predefined amounts of data, and transmits and/or receives using one or more predefined resources, wherein address and/or routing information is substantially absent in the data transmitted or received. This leads to the positive effects recited above.

AA.12. A system comprising: a plurality of devices capable of transmitting and/or receiving data, wherein each device performs one or more of the following: transmits and/or receives information at one or more predefined times, transmits and/or receives one or more predefined amounts of data, and transmits and/or receives using one or more predefined resources, wherein address and/or routing information is substantially absent in the data transmitted or received and the address of each device and/or the routing information is determined for each device by one or more of the following: the predefined times, the predefined amount of data and the predefined resources.

AA.13. A system comprising: a plurality of devices, wherein a substantial portion of the individual devices perform one or more of the following: transmits data at one or more predefined times, receives data at one or more predefined times, transmits one or more predefined amounts of data, receives one or more predefined amounts of data, transmits using one or more predefined resources and receives using one or more predefined resources;

wherein address and/or routing information is substantially absent in the data transmitted and/or received, wherein the address of individual devices and/or the routing information is established and/or derived based on a set of information about at least a portion of the system, and the set of information includes one or more of the following: one or more predefined times, one or more predefined amounts of data and one or more predefined resources, and wherein the set of information is available for use at one or more of the following: individual devices, a central computer, a cloud computing resource and a plurality of computing devices.

AA.14. A system comprising: a plurality of devices, wherein a substantial portion of the individual devices perform one or more of the following: transmit data at one or more predefined times, receive data at one or more predefined times, transmit one or more predefined amounts of data, receive one or more predefined amounts of data, transmit using one or more predefined resources and receive using one or more predefined resources;

wherein the predefined resources are one or more of the following: frequency channel, spreading code sequence, starting position in spreading code, frequency hopping sequence, time slot and FDD bins;

wherein address and/or routing information is substantially absent in the data transmitted and/or received, wherein the address of individual devices and/or the routing information is established and/or derived based on a set of information pertaining to at least a portion of the system, and the set of information includes one or more of the following: one or more predefined times, one or more predefined amounts of data and one or more predefined resources, and wherein the set of information is available for use at one or more of the following: individual devices, a central computer, a cloud computing resource and a plurality of computing devices.

AA.15. A system comprising:

at least 5, 25, 50, 100, 500 or 1000 of devices, wherein a substantial portion of individual devices perform one or more of the following: transmits data at one or more predefined times, receives data at one or more predefined times, transmits one or more predefined amounts of data, receives one or more predefined amounts of data, transmits using one or more predefined resources and receives using one or more predefined resources;

wherein address and/or routing information is substantially absent in the data transmitted and/or received, wherein the address of the individual devices and/or the routing information is established and/or derived based on a set of information about at least a portion of the system, and the set of information includes one or more of the following: one or more predefined times, one or more predefined amounts of data and one or more predefined resources, and wherein the set of information is available for use at one or more of the following: individual devices, a central computer, a cloud computing resource and a plurality of computing devices. This leads to the positive effects recited above.

AA.16. A system comprising:

at least 500, 5000, 20,000 or 100,000 of devices, wherein a substantial portion of individual devices perform one or more of the following: transmits data at one or more predefined times, receives data at one or more predefined times, transmits one or more predefined amounts of data, receives one or more predefined amounts of data, transmits using one or more predefined resources and receives using one or more predefined resources;

wherein address and/or routing information is substantially absent in the data transmitted and/or received;

wherein the address of the individual devices and/or the routing information is established and/or derived based on a set of information about at least a portion of the system, and the set of information includes one or more of the following: one or more predefined times, one or more predefined amounts of data and one or more predefined resources; and wherein the set of information is available for use at one or more of the following: individual devices, a central computer, a cloud computing resource and a plurality of computing devices. This leads to the positive effects recited above.

AA.17. A system comprising:

at least 50,000, 500,000, 1 million or 5 million devices, wherein a substantial portion of individual devices perform one or more of the following: transmits data at one or more predefined times, receives data at one or more predefined times, transmits one or more predefined amounts of data, receives one or more predefined amounts of data, transmits using one or more predefined resources and receives using one or more predefined resources;

wherein address and/or routing information is substantially absent in the data transmitted and/or received;

wherein the address of the individual devices and/or the routing information is established and/or derived based on a set of information about at least a portion of the system, and the set of information includes one or more of the following: one or more predefined times, one or more predefined amounts of data and one or more predefined resources; and wherein the set of information is available for use at one or more of the following: individual devices, a central computer, a cloud computing resource and a plurality of computing devices. This leads to the positive effects recited above.

AA.18. A system comprising:

a plurality of devices where five or more of the devices perform one or more of the following: transmit at predefined times a variable amount of data using a predefined resource; receive at predefined times a variable amount of data using a predefined resource; and transmit at predefined times a variable amount of data using a predefined resource and receive at predefined times a variable amount of data using a predefined resource; and addressing and/or routing information is substantially absent in the data transmitted to the five or more devices and/or received from the five or more devices. This leads to the positive effects recited above.

AA.19. A system comprising:

a plurality of devices where five or more of the devices perform one or more of the following: transmit at predefined times a predefined amount of data using a variable resource; receive at predefined times a predefined amount of data using a predefined resource; and transmit at predefined times a predefined amount of data using a variable resource and receive at predefined times a predefined amount of data using a variable resource; and addressing and/or routing information is substantially absent in the data transmitted to the five or more devices and/or received from the five or more devices.

AA.20. A system comprising:

a plurality of devices where five or more of the devices perform one or more of the following: transmit at predefined times a variable amount of data using a variable resource; receive at predefined times a variable amount of data using a variable resource; and transmit at predefined times a variable amount of data using a variable resource and receive at predefined times a variable amount of data using a variable resource; and addressing and/or routing information is substantially absent in the data transmitted to the five or more devices and/or received from the five or more devices.

AA.21. A system comprising:

a plurality of devices where a portion of the devices individually perform one or more of the following: transmit at predefined times a variable amount of data using a predefined resource; receive at variable times a predefined amount of data using a predefined resource; and transmit at predefined times a variable amount of data using a predefined resource and receive at predefined times a variable amount of data using a predefined resource; and addressing and/or routing information is substantially absent in the data transmitted to the portion of the devices and/or received from the portion, of the devices.

AA.22. A system comprising:

a plurality of devices where a portion of the devices individually perform one or more of the following: transmit at predefined times a predefined amount of data using a variable resource; receive at predefined times a predefined amount of data using a variable resource; and transmit at predefined times a predefined amount of data using a variable resource and receive at predefined times a predefined amount of data using a variable resource; and addressing and/or routing information is substantially absent in the data transmitted to the portion of the devices and/or received from the portion of the devices.

AA.23. A system comprising:
a plurality of devices where a portion of the devices individually perform one or more of the following: transmit at predefined times a variable amount of data using a variable resource; receive at predefined times a variable amount of data using a variable resource; and transmit at predefined times a variable amount of data using a variable resource and receive at predefined times a variable amount of data using a variable resource; and addressing and/or routing information is substantially absent in the data transmitted to the portion of the devices and/or received from the portion of the devices.

AA.24. A system comprising:
a plurality of devices where each device performs one or more of the following: transmits at predefined times a variable amount of data using a predefined resource; receives at predefined times a variable amount of data using a predefined resource; and transmits at predefined times a variable amount of data using a predefined resource and receives at predefined times a variable amount of data using a predefined resource; and addressing and/or routing information is substantially absent in the data transmitted to each device and/or received from each device.

AA.25. A system comprising:
a plurality of devices where each device performs one or more of the following: transmits at predefined times a predefined amount of data using a variable resource; receives at predefined times a predefined amount of data using a variable resource; and transmits at predefined times a predefined amount of data using a variable resource and receives at predefined times a predefined amount of data using a variable resource; and addressing and/or routing information is substantially absent in the data transmitted to each device and/or received from each device.

AA.26. A system comprising:
a plurality of devices where each device performs one or more of the following: transmits at predefined times a variable amount of data using a variable resource; receives at predefined times a variable amount of data using a variable resource; and transmits at predefined times a variable amount of data using a variable resource and receives at predefined times a variable amount of data using a variable resource; and addressing and/or routing information is substantially absent in the data transmitted to each device and/or received from each device.

AA.27. A system comprising:
a plurality of devices that are capable of transmitting and/or receiving data; and the plurality of devices communicate within the network via multiple hops; wherein addressing and/or routing information is substantially absent in the data transmitted to the portion of the devices and/or received from the portion of the devices. This leads to the positive effects recited above.

AA.28. The system of one or more of the above AA examples, wherein the plurality of devices comprise: sensor devices and controller devices.

AA.29. The system of one or more of the above AA examples, wherein the plurality of devices is at least 5, 10, 20, 50 or 500 devices.

AA.30. The system of one or more of the above AA examples, wherein the portion of the devices is at least 5, 10, 20, 50 or 500 devices.

AA.31. The system of one or more of the above AA examples, wherein the plurality of the devices is at least 5, 10, 20, 50 or 500 devices and the portion of the devices is at least 5, 10, 20, 50 or 500 devices.

AA.32. The system of one or more of the above AA examples, wherein the routing information is determined for the individual devices by one or more of the following: the predefined times, the predefined amount of data and the predefined resources.

AA.33. The system of one or more of the above AA examples, wherein the address of individual devices and/or the routing information is established and/or derived based on a set of information about at least a portion of the system, and the set of information includes one or more of the following: one or more predefined times, one or more predefined amounts of data and one or more predefined resources.

AA.34. The system of one or more of the above AA examples, wherein the system further comprises a computer and the computer is one or more of the following: individual devices, a central computer, a cloud computing resource and a plurality of computing devices.

AA.35. The system of one or more of the above AA examples, wherein the predefined resources are one or more of the following: frequency channel, spreading code sequence, starting position in spreading code, frequency hopping sequence, time slot and FDD bins.

AA.36. The system of one or more of the above AA examples, wherein the address of individual devices and/or the routing information is established and/or derived based on a set of information pertaining to at least a portion of the system, and the set of information includes one or more of the following: one or more predefined times, one or more predefined amounts of data and one or more predefined resources.

AA.37. The system of one or more of the above AA examples, wherein the plurality of the devices is at least 5, 25, 50, 100, 500 or 1000 devices, and the substantial portion of individual devices perform one or more of the following: transmit at predefined times a predefined amount of data using a predefined resource; receive at predefined times a predefined amount of data using a predefined resource; and transmit at predefined times a predefined amount of data using a predefined resource and receive at predefined times a predefined amount of data using a predefined resource; and addressing and/or routing information is substantially absent in the data transmitted to the substantial portion of the devices and/or received from the substantial portion of the devices.

AA.38. The system of one or more of the above AA examples, wherein the plurality of the devices is at least 500, 5000, 20,000 or 100,000 of devices and the substantial portion of individual devices perform one or more of the following: transmit at predefined times a predefined amount of data using a predefined resource; receive at predefined times a predefined amount of data using a predefined resource; and transmit at predefined times a predefined amount of data using a predefined resource and receive at predefined times a predefined amount of data using a predefined resource; and addressing and/or routing information is substantially absent in the data transmitted to the substantial portion of the devices and/or received from the substantial portion of the devices.

AA.39. The system of one or more of the above AA examples, wherein the plurality of the devices is at least 50,000, 500,000, 1 million or 5 million devices and the substantial portion of individual devices perform one or more of the following: transmit at predefined times a predefined amount of data using a predefined resource; receive at predefined times a predefined amount of data using a predefined resource; and transmit at predefined times a predefined amount of data using a predefined resource and receive at predefined times a predefined amount of data using a predefined resource; and addressing and/or routing information is substantially absent in the data transmitted to the substantial portion of the devices and/or received from the substantial portion of the devices.

AA.40. The system of one or more of the above AA examples, wherein one or more of the predefined times, one or more of the predefined amounts of data and/or one or more of the predefined resources is calculated using a predefined set of rules and/or a predefined set of instructions.

AA.41. The system of one or more of the above AA examples, wherein one or more of the predefined times, one or more of the predefined amounts of data and/or one or more of the predefined resources is calculated using the predefined set of rules and/or the predefined set of instructions based at least in part on a predefined initial state and/or a seed value.

AA.42. The system of one or more of the above AA examples, wherein the amount of data originating at the individual device is equal to or less than 1 bit, 8 bits, 16 bits or 48 bits.

AA.43. The system of one or more of the above AA examples, wherein the amount of data originating at the individual device and/or transmitted for use by the individual device is equal to or less than 1 bit, 8 bits, 16 bits or 48 bits.

AA.44. The system of one or more of the above AA examples, wherein the amount of data originating at the individual device and/or transmitted for use by the individual device is equal to or less than 1 byte, 4 bytes, 16 bytes or 48 bytes.

AA.45. The system of one or more of the above AA examples, wherein the amount of data originating at the individual device and/or transmitted for use by the individual device is equal to or more than 1 bit, 8 bits, 16 bits or 48 bits.

AA.46. The system of one or more of the above AA examples, wherein the amount of data originating at the individual device and/or transmitted for use by the individual device is equal to or more than 1 byte, 4 bytes, 16 bytes or 48 bytes.

AA.47. The system of one or more of the above AA examples, wherein the amount of data transmitted and/or received at the individual device is at least 100 bytes, 1000 bytes, 16,000 bytes or 48,000 bytes.

AA.48. The system of one or more of the above AA examples, wherein the amount of data from a second device is appended to the data received from a first device and is transmitted to the third device.

AA.49. The system of one or more of the above AA examples, wherein the amount of data originating at a device is appended to the data received from at least 5, 25, 100, 500, 1000, 10,000 or 1,000,000 other devices at the device and the aggregated data from the devices is transmitted to at least one next device.

AA.50. The system of one or more of the above AA examples, wherein the amount of data originating at a device is appended to the data received from at least 5, 25, 100, 500, 1000, 10,000 or 1,000,000 other devices at the device and the aggregated data from the devices is transmitted to at least one gateway.

AA.51. The system of one or more of the above. AA examples, wherein the predefined amounts of data intended for a selected portion of the devices on the network is transmitted from the gateway to at least one first device, and the at least one first device performs one or more of the following: forwards the predefined amounts of data to at least one second device; extracts a predefined amount of data and forwards the predefined amounts of data to at least one second device; extracts a predefined amount of data, extracts a portion of the predefined amount of data and forwards the remaining portion of the predefined amounts of data to at least a second device; extracts a portion of the predefined amount of data and forwards at least a first, second or third portion of the remaining predefined amounts of data to at least a second, third or fourth device; extracts a portion of the predefined amount of data and forwards to one or more of the at least a first, second or third portions of the remaining predefined amounts of data to one or more other devices, wherein the structure and sequencing of the predefined amounts of data is modified.

AA.52. The system of one or more of the above AA examples, wherein a ratio of the amount of data originating at the individual device and/or transmitted for use by the individual device to a bandwidth available at the individual device is equal to or less than 10%, 5%, 1%, 0.1%, 0.01%, 0.0001% or 0.00001%.

AA.53. The system of one or more of the above AA examples, wherein a ratio of the amount of data originating at the individual device and/or transmitted for use by the individual device to a bandwidth available at the individual device is between 10% to 0.00001%, 5% to 0.0001%, 1% to 0.001%, 0.1% to 0.0001%, 0.003% to 0.012%, 0.0003% to 0.0012%, 1% to 0.0003% or 0.00003% to 0.0015%.

AA.54. The system of one or more of the above AA examples, wherein a ratio of the amount of data originating at the individual device and/or transmitted for use by the individual device to a bandwidth available at the at least one gateway is equal to or less than 10%, 5%, 1%, 0.1%, 0.01%, 0.0001% or 0.00001%.

AA.55. The system of one or more of the above AA examples, wherein a ratio of the amount of data originating at the individual device and/or transmitted for use by the individual device to a bandwidth available at the at least one gateway is between 10% to 0.00001%, 5% to 0.0001%, 1% to 0.001%, 0.1% to 0.0001%, 0.003% to 0.012%, 0.0003% to 0.0012%, 1% to 0.0003% or 0.00003% to 0.0015%.

AA.56. The system of one or more of the above AA examples, wherein the individual device originates amounts of data {Dk}, at times {Tk}, and the available data rate at the individual device is B, and $$R_t = \sum \frac{D_k}{T_{k+1} - T_k} / B,$$

and Rt is equal to or less than 10%, 5%, 1%, 0.1%, 0.01%, 0.0001% or 0.00001%.

AA.57. The system of one or more of the above AA examples, wherein {Dk} are amounts of data transmitted for use by the individual device, at predefined times {Tk}, and the available data rate at the individual device is B, and $$R_r = \sum \frac{D_k}{T_{k+1} - T_k} / B,$$

and Rr is equal to or less than 10%, 5%, 1%, 0.1%, 0.01%, 0.0001% or 0.00001%.

AA.58. The system of one or more of the above AA examples, wherein Rt and/or Rr are between 10% to 0.00001%, 5% to 0.0001%, 1% to 0.001%, 0.1% to 0.0001%, 0.003% to 0.012%, 0.0003% to 0.0012%, 1% to 0.0003% or 0.00003% to 0.0015%.

AA.59. The system of one or more of the above AA examples, wherein B is bandwidth available at the at least one gateway, and Rt and/or Rr are equal to or less than 10%, 5%, 1%, 0.1%, 0.01%, 0.0001% or 0.00001%.

AA.60. The system of one or more of the above AA examples, wherein B is bandwidth available at the at least one gateway, and Rt and/or Rr are between 10% to 0.00001%, 5% to 0.0001%, 1% to 0.001%, 0.1% to 0.0001%, 0.003% to 0.012%, 0.0003% to 0.0012%, 1% to 0.0003% or 0.00003% to 0.0015%.

AA.61. The system of one or more of the above AA examples, wherein the ratio of an aggregated amount of data transmitted and/or received at the at least one gateway to the available bandwidth at the at least one gateway is at least 10%, 25%, 50%, 75%, 90%, 95%, 98%, 99%, 99.5%, 99.9%, 99.99% or 99.999%.

AA.62. The system of one or more of the above AA examples, wherein the available bandwidth is approximately equal to or at least 1/128, 1/64, 1/16, 1/8, 1/4, 1/2 or 1 of the total bandwidth.

AA.63. The system of one or more of the above AA examples, wherein the available bandwidth is between 0.4% to 100%, 0.8% to 100%, 1.5% to 100%, 3.1% to 100%, 6% to 100%, 12% to 100%, 25% to 100%, 50% to 100%, 75% to 100%, 90% to 100%, 25% to 75%, 0.4% to 12%, 3.1% to 25% or 6% to 50% of the total bandwidth.

AA.64. The system of one or more of the above AA examples, wherein each device or the substantial portion of individual devices extract information that is transmitted for use at the individual device by using one or more predefined offsets and/or one or more predefined amounts of data.

AA.65. The system of one or more of the above AA examples, wherein a substantial portion of the individual devices transmit and/or receive for a predefined period of time.

AA.66. The system of one or more of the above AA examples, wherein the predefined period of time is at least 1 nanosecond, 10 nanoseconds or 100 nanoseconds.

AA.67. The system of one or more of the above AA examples, wherein the predefined period of time is at most 1 nanosecond, 10 nanoseconds or 100 nanoseconds.

AA.68. The system of one or more of the above AA examples, wherein the predefined period of time is at least 1 microsecond, 10 microseconds or 100 microseconds.

AA.69. The system of one or more of the above AA, examples, wherein the predefined period of time is at most 1 microsecond, 10 microseconds or 100 microseconds.

AA.70. The system of one or more of the above AA examples, wherein the predefined period of time is at least 1 millisecond, 10 milliseconds or 100 milliseconds.

AA.71. The system of one or more of the above AA examples, wherein the predefined period of time is at most 1 millisecond, 10 milliseconds or 100 milliseconds.

AA.72. The system of one or more of the above AA examples, wherein the predefined period of time is at least 1 second, 10 seconds or 100 seconds.

AA.73. The system of one or more of the examples, wherein the predefined period of time is at most 1 second, 10 seconds or 100 seconds.

AA.74. The system of one or more of the above AA examples, wherein the predefined period of time is at least 1 millisecond, 10 milliseconds or 100 milliseconds and an amount of data is variable.

AA.75. The system of one or more of the above AA examples, wherein the time period is predefined and the amount of data is variable.

AA.76. The system of one or more of the above AA examples, wherein the amount of data is substantially the same and/or variable.

AA.77. The system of one or more of the above AA examples, wherein a resource is substantially the same and/or variable.

AA.78. The system of one or more of the above AA examples, wherein one or more of the following: the predefined time for a substantial portion of the plurality of devices, the predefined amount of data for a substantial portion of the plurality of devices, the predefined resources for a substantial portion of the plurality of devices are determined by the central computer, the cloud computing resource and/or the plurality of computing devices.

AA.79. The system of one or more of the above AA examples, wherein the plurality of computing devices are at least a portion of the plurality of devices.

AA.80. The system of one or more of the above AA examples, wherein a substantial portion of the plurality of computing devices are capable of communicating with at least one other computing device.

AA.81. The system of one or more of the above AA examples, wherein one or more of the following: the predefined time for the substantial portion of the plurality of devices, the predefined amount of data for the substantial portion of the plurality of devices, the predefined resources for the substantial portion of the plurality of devices is determined based on one or more of the following: required and/or desired periodicity of data to be transmitted for each device or the substantial portion of the plurality of devices, required and/or desired amount of data to be transmitted and/or received for each device or the substantial portion of the plurality of devices required and/or desired resources for each device or the substantial portion of the plurality of devices.

AA.82. The system of one or more of the above AA examples, wherein one or more of the following: the predefined time for the substantial portion of the plurality of devices, the predefined amount of data for the substantial portion of the plurality of devices, the predefined resources for the substantial portion of the plurality of devices is determined based on one or more of the following: required and/or desired latency of data to be received from and/or transmitted to each device or the substantial portion of the plurality of devices, required and/or desired amount of data to be transmitted and/or received for each device or the substantial portion of the plurality of devices, required and/or desired resources for each device or the substantial portion of the plurality of devices.

AA.83. The system of one or more of the above AA examples, wherein one or more of the following: the predefined time for the substantial portion of the plurality of devices, the predefined amount of data for the substantial portion of the plurality of devices, the predefined resources for the substantial portion of the plurality of devices is determined based on one or more of the following:

minimal latency and/or period of data to be received from each device or the substantial portion of the plurality of devices;

minimal application specific latency and/or period of data to be received from each device or the substantial portion of the plurality of devices;

minimal latency and/or period of data to be transmitted to each device or the substantial portion of the plurality of devices;

minimal application specific latency and/or period of data to be transmitted to each device or the substantial portion of the plurality of devices;

maximal latency and/or period of data to be received from each device or the substantial portion of the plurality of devices;

maximal application specific latency and/or period of data to be received from each device or the substantial portion of the plurality of devices;

maximal latency and/or period of data to be transmitted to each device or the substantial portion of the plurality of devices;

maximal application specific latency and/or period of data to be transmitted to each device or the substantial portion of the plurality of devices;

required amount of data to be transmitted and/or received for each device or the substantial portion of the plurality of devices;

application specific amount of data to be transmitted and/or received for each device or the substantial portion of the plurality of devices;

required resources for each device or the substantial portion of the plurality of devices;

application specific resources for each device or the substantial portion of the plurality of devices;

required functionality of each device or the substantial portion of the plurality of devices; and application specific functionality of each device or the substantial portion of the plurality of devices.

AA.84. The system of one or more of the above AA examples, wherein one or more of the following: the predefined time for the substantial portion of the plurality of devices, the predefined amount of data for the substantial portion of the plurality of devices, the predefined resources for the substantial portion of the plurality of devices is determined based on a physical location of each device or the substantial portion of the plurality of devices.

AA.85. The system of one or more of the above AA examples, wherein one or more of the following: the predefined time for the substantial portion of the plurality of devices, the predefined amount of data for the substantial portion of the plurality of devices, the predefined resources for the substantial portion of the plurality of devices is determined based on a relative location of each device or the substantial portion of the plurality of devices, wherein the location is relative to one or more of the following: gateway, access point, neighboring devices, intentional interferer and non-intentional interferer.

AA.86. The system of one or more of the above AA examples, wherein one or more of the following: the predefined time for the substantial portion of the plurality of devices, the predefined amount of data for the substantial portion of the plurality of devices, the predefined resources for the substantial portion of the plurality of devices is determined based on a quality of the RF link and/or available RF links between the individual device and one or more of the following: the plurality of devices, a plurality of neighboring devices, a plurality of access points, a plurality of gateways and a plurality of devices that within a particular route.

AA.87. The system of one or more of the above AA examples, wherein the quality of the RF link is determined by one or more of the following; measuring RSSI (received signal strength indicator), measuring BER (bit error rate), measuring SER (symbol error rate), measuring PER (packet error rate) and predicting link quality based on a mathematical model.

AA.88. The system of one or more of the above AA examples, wherein the mathematical model is one or more of the following: RF propagation model, 3D RF propagation model, HATA propagation model, Okumura-HATA propagation model, two-ray propagation model, ground wave propagation model, sky wave propagation model, environmental attenuation model, point to point propagation model, terrain propagation model, city propagation model, ITU model, DAH model, and Walfisch and Bertoni model.

AA.89. The system of one or more of the above AA examples, wherein the substantial portion of the plurality of devices form a mesh network.

AA.90. The system of one or more of the above AA examples, wherein the plurality of devices form a mesh network.

AA.91. The system of one or more of the above AA examples, wherein the substantial portion of the plurality of devices are substantially fixed in their physical location.

AA.92. The system of one or more of the above AA examples, wherein the substantial portion of the plurality of devices are fixed in their physical location.

AA.93. The system of one or more of the above AA examples, wherein at least 40%, 60%, 80%, 90%, 95% or 98% of the plurality of devices are fixed in their physical location.

AA.94. The system of one or more of the above AA examples, wherein a portion the plurality of devices is configured to form a short loop sub-network and the first device in the short loop sub-network may replace portion of the data received on the down-link with new data and send the modified data, and a second device in the short loop sub-network may retrieve the data sent by the first device.

AA.95. The system of one or more of the above AA examples, wherein the first device in the short loop sub-network encrypts the new data and the second device in the short loop sub-network decrypts the new data.

AA.96. The system of one or more of the above AA examples, wherein the first device in the short loop sub-network uses substantially dedicated DRBG to encrypt the new data and the second device in the short loop sub-network uses substantially dedicated DRBG to decrypt the new data.

AA.97. The system of one or more of the above AA examples, wherein the first device in the short loop sub-network appends signature on the new data and the second device in the short loop sub-network verifies the signature on the new data.

AA.98. The system of one or more of the above AA examples, wherein the first device in the short loop sub-network appends signature on the new data and sends at least a portion of the appended signature in at least one of the following frames.

AA.99. The system of one or more of the above AA examples, wherein portion of the devices is configured to use a predefined resource based on mathematical formula.

AA.100. The system of one or more of the above AA examples, wherein portion of the devices is configured to use a predefined resource based on mathematical formula and mathematical formula includes cycle number.

AA.101. The system of one or more of the above AA examples, wherein portion of the devices is configured to use a predefined resource based on mathematical formula and mathematical formula includes time slot number.

AA.102. The system of one or more of the above AA examples, wherein portion of the devices is configured to use a predefined resource based on mathematical formula and mathematical formula includes cycle number and time slot number.

AA.103. The system of one or more of the above AA examples, wherein at least a substantial portion of the interconnections within the network are determined by one or more of the following: the central computer, the cloud computing resource, manually, and the plurality of computing devices.

AA.104. The system of one or more of the above AA, examples, wherein a substantial portion of a plurality of the routes within the network are determined by one or more of the following: the central computer, the cloud computing resource manually, and the plurality of computing devices.

AA.105. The system of one or more of the above AA examples, wherein at least a substantial portion of the interconnections within the network are determined by one or more of the following: the plurality of computing devices where none of the plurality of computing devices are in communication other computing devices; the plurality of computing devices where a substantial portion of the plurality of computing devices are in communication with a substantial portion of other computing devices; the plurality of computing devices where a portion of the plurality of computing devices are in communication with a portion of other computing devices; and the plurality of computing devices where the substantial portion of the plurality of computing devices are not in communication with other computing devices.

AA.106. The system of one or more of the above AA examples, wherein at least a substantial portion of the interconnections within the network are determined by one or more of the following: the central computer, at least two central computers, the central computer in communication with at least one other computer and at least two computers in communication with at least one other computer.

AA.107. The system of one or more of the above AA examples, wherein at least a substantial portion of the routes within the network are determined by one or more of the following: the plurality of computing devices where none of the plurality of computing devices are in communication other computing devices; the plurality of computing devices where the substantial portion of the plurality of computing devices are in communication with a substantial portion of other computing devices; the plurality of computing devices where a portion of the plurality of computing devices are in communication with a portion of other computing devices; and the plurality of computing devices where a substantial portion of the plurality of computing devices are not in communication with other computing devices.

AA.108. The system of one or more of the above AA examples, wherein at least a substantial portion of the routes within the network are determined by one or more of the following: the central computer, at least two central computers, the central computer in communication with at least one other computer and at least two computers in communication with at least one other computer.

AA.109. The system of one or more of the above AA examples, wherein at least one central computer and/or computing device is the cloud computing resource AA.110. The system of one or more of the above AA examples, wherein interconnections within at least a substantial portion of the network, are determined based on one or more of the following:
  quality of the available RF links between the substantial portion of the devices making up the network;
  quality of the available RF links between the substantial portion of the devices on at least one route;
  required battery life for the individual devices, or the substantial portion of individual devices;
  acceptable battery life for the individual devices, or the substantial portion of individual devices;
  whether the individual devices, or the substantial portion of individual devices is battery powered or have a constant supply of power;
  the number of hops between the individual devices, or the substantial portion of individual devices, and the at least one gateway;
  the number of hops in the selected or potential route;
  aggregated bandwidth in the selected or potential route;
  peak aggregated bandwidth in the selected or potential route;
  minimal application specific period, and/or latency in the selected or potential route;
  minimal required period and/or latency in the selected or potential route;
  maximal application specific period and/or latency in the selected or potential route;
  maximal required period and/or latency in the selected or potential route; and availability of alternative route.

AA.111. The system of one or more of the above AA examples, wherein routes within at least a substantial portion of the network are determined based on one or more of the following:
  quality of the available RF links between the substantial portion of the devices making up the network;
  quality of the available RF links between the substantial portion of the devices on at least one route;
  required battery life for the individual devices, or the substantial portion of individual devices;
  acceptable battery life for the individual devices, or the substantial portion of individual devices;
  whether the individual devices, or the substantial portion of individual devices is battery powered or have a constant supply of power;
  the number of hops between the individual devices, or the substantial portion of individual devices, and the at least one gateway;
  the number of hops in the selected or potential route;
  aggregated bandwidth in the selected or potential route;
  peak aggregated bandwidth in the selected or potential route;
  minimal desired period and/or latency in the selected or potential route;
  minimal required period and/or latency in the selected or potential route;
  maximal application specific period and/or latency in the selected or potential route;
  maximal required period and/or latency in the selected or potential route; and
  availability of alternative route.

AA.112. The system of one or more of the above AA examples, wherein network maintenance data is embedded into transmitted data and detected by the at least one receiving device.

AA.113. The system of one or more of the above AA examples, wherein network maintenance data is directed to one or more of the following: the individual device; at least one individual device; a portion of the individual devices; a substantial portion of the individual devices; individual devices on a particular route; individual devices on a portion of a particular routes; individual devices on at least a portion of the plurality of routes; and individual devices on a substantial portion of the plurality of routes.

AA.114. The system of one or more of the above AA examples, wherein in substantial amount of occasions a broken link is fixed by changing routing and/or updating configuration of one, two or substantially small number of devices.

AA.115. The system of one or more of the above AA examples, wherein substantially small number of devices is less than 10, 9, 8, 7, 6, 5, 4 or 3.

AA.116. The system of one or more of the above AA examples, wherein resources are allocated so that a broken link is avoided by rerouting and/or reconfiguring one or more devices in close proximity to the broken link.

AA.117. The system of one or more of the above AA examples, wherein the devices in close proximity to the broken link are no more than 10, 5, 3, 2, 1 or zero hops from the broken link.

AA.118. The system of one or more of the above AA examples, wherein the system includes at least one gateway.

AA.119. The system of one or more of the above AA examples, wherein the system includes one gateway.

AA.120. The system of one or more of the above AA examples, wherein the system includes at least one gateway that is configured by one or more of the following: the central computer, at least two central computers, the central computer in communication with at least one other computer and at least two computers in communication with at least one other computer.

AA.121. The system of one or more of the above AA examples, wherein the system includes at least one gateway and the at least one device in communication with the at least one gateway are configured by one or more of the following: the central computer, at least two central computers, the central computer in communication with at least one other computer and at least two computers in communication with at least one other computer.

AA.122. The system of one or more of the above AA examples, wherein the system includes at least one gateway and the plurality of devices in direct or indirect communication with the at least one gateway are configured by one or more of the following: the central computer, at least two central computers, the central computer in communication with at least one other computer and at least two computers in communication with at least one other computer.

AA.123. The system of one or more of the above AA examples, wherein the system includes at least two networks; the first at least one network includes at least one first gateway and a first collection of a plurality of devices in direct or indirect communication with the at least one first gateway; and the second at least one network includes at least one second gateway and a second collection of a plurality of devices in direct or indirect communication with the at least one second gateway; and the first at least one network and the second at least one network are configured by one or more of the following: the central computer, at least two central computers, the central computer in communication with at least one other computer and at least two computers in communication with at least one other computer such that interference between the first at least one network and the second at least one network is substantially reduced or eliminated.

AA.124. The system of one or more of the above AA examples, wherein the computer is capable of determining at least an approximate location of at least one first device of the plurality of devices, wherein the location is determined based on one or more of the following: a location of at least one second device of the plurality of devices and a quality of links within a portion of the network formed by the plurality of devices.

AA.125. The system of one or more of the above AA examples, wherein the computer is capable of determining at least an approximate location of a portion of the individual devices of the plurality of devices, wherein the location is determined based on one or more of the following: a location of at least one other device of the plurality of devices and a quality of links within a portion of the network formed by the plurality of devices.

AA.126. The system of one or more of the above AA examples, wherein the computer is capable of determining at least an approximate location of a substantial portion of the individual devices of the plurality of devices, wherein the location is determined based on one or more of the following: a location of at least one other device of the plurality of devices and a quality of links within a portion of the network formed by the plurality of devices.

AA.127. The system of one or more of the above AA examples, wherein the portion of the plurality of devices are one or more of the following: feedback devices, sensors and controllers.

AA.128. The system of one or more of the above AA examples, wherein the portion of the plurality of devices are associated with one or more of the following: feedback devices, sensors and controllers.

AA.129. The system of one or more of the above AA examples, wherein the substantial portion of the plurality of devices are one or more of the following: feedback devices, sensors and controllers.

AA.130. The system of one or more of the above AA examples, wherein the substantial portion of the plurality of devices are associated with one or more of the following: feedback devices, sensors and controllers.

AA.131. The system of one or more of the above AA examples, wherein the computer is capable of one or more of the following:

receiving data, wherein a received data is one or more of the following: a data originated by at least one sensor from a plurality of sensors, a data originated by at least one controller from a plurality of controllers, a collection of data originated by a portion of sensors from the plurality of sensors and a collection of data originated by a portion of controllers from the plurality of controllers;

creating a data to be sent to one or more of the following: a plurality of sensors and a plurality of controllers; and sending data to one or more of the following: a plurality of sensors and a plurality of controllers.

AA.132. The system of one or more of the above AA examples, wherein the computer is capable of performing one or more of the following: storing the received data, calculating data based on one or more of the following: the received data, the stored data, an external data and calculated data; analyzing one or more of the following: the received data, the stored data, the external data and the calculated data.

AA.133. The system of one or more of the above AA examples, wherein the data to be sent is created based on one or more of the following: the received data, the stored data, the calculated data, the external data and the result of analyzing the data.

AA.134. The system of one or more of the above AA examples, wherein the plurality of sensors and/or controllers are installed in at least one site.

AA.135. The system of one or more of the above AA examples, wherein the plurality of sensors and/or controllers are installed in a plurality of sites.

AA.136. The system of one or more of the above AA examples, wherein the system is used to manage energy of one or more of the following: individual sites, a plurality of sites, and a portion of the plurality of sites.

AA.137. The system of one or more of the above AA examples, wherein the system is used to manage energy of one or, more of the following: a building, a portion of a building, a structure, a portion of a structure, an infra-structure, a portion of an infra-structure, a plurality of buildings, a plurality of structures, a plurality of infra-structures, a city, a portion of a city, a region, a portion of a region.

AA.138. The system of one or more of the above AA examples, wherein the computer improves energy efficiency of one or more of the following: individual sites, the plurality of sites, and the portion of the plurality of sites.

AA.139. The system of one or more of the above AA examples, wherein the computer improves energy efficiency of one or more of the following: a building, a portion of a building, a structure, a portion of a structure, an infra-structure, a portion of an infra-structure, a plurality of buildings, a plurality of structures, a plurality of infra-structures, a city, a portion of a city, a region, a portion of a region.

AA.140. The system of one or more of the above AA examples, wherein the computer improves an aggregated energy efficiency of the portion of the plurality of sites.

AA.141. The system of one or more of the above AA examples, wherein the energy efficiency is improved during peak hours.

AA.142. The system of one or more of the above AA examples, wherein the computer reduces one or more of the following: peak energy consumption and peak current consumption, of one or more of the following: individual sites, the plurality of sites and the portion of the plurality of sites.

AA.143. The system of one or more of the above AA examples, wherein the computer reduces one or more of the following: peak energy consumption and peak current consumption, of one or more of the following: a building, a portion of a building, a structure, a portion of a structure, an infra-structure, a portion of an infra-structure, a plurality of buildings, a plurality of structures, a plurality of infra-structures, a city, a portion of a city, a region, a portion of a region.

AA.144. The system of one or more of the above AA examples, wherein the computer reduces one or more of the following: aggregated peak energy consumption and aggregated peak current consumption of the portion of the plurality of sites.

AA.145. The system of one or more of the above AA examples, wherein the computer generates instructions to a portion of the controllers that result in reduction of one or more of the following: aggregated peak energy consumption and aggregated peak current consumption, of the portion of the plurality of sites during peak hours.

AA.146. The system of one or more of the above AA examples, wherein the computer generates energy usage reports of one or more of the following: individual sites, the plurality of sites and the portion of the plurality of sites.

AA.147. The system of one or more of the above AA examples, wherein the computer generates energy usage reports of one or more of the following: a building, a portion of a building, a structure, a portion of a structure, an infra-structure, a portion of an infra-structure, a plurality of buildings, a plurality of structures, a plurality of infra-structures, a city, a portion of a city, a region, a portion of a region.

AA.148. The system of one or more of the above AA examples, wherein the computer monitors energy and/or current consumption in one or more of the following: individual sites, the plurality of sites and the portion of the plurality of sites.

AA.149. The system of one or more of the above AA examples, wherein the computer monitors energy and/or current consumption in one or more of the following: a building, a portion of a building, a structure, a portion of a structure, an infra-structure, a portion of an infra-structure, a plurality of buildings, a plurality of structures, a plurality of infra-structures, a city, a portion of a city, a region, a portion of a region.

AA.150. The system of one or more of the above AA examples, wherein the computer determines occupancy in one or more of the following: individual sites, the plurality of sites and the portion of the plurality of sites.

AA.151. The system of one or more of the above AA examples, wherein the computer determines occupancy in one or more of the following: a building, a portion of a building, a structure, a portion of a structure, an infra-structure, a portion of an infra-structure, a plurality of buildings, a plurality of structures, a plurality of infra-structures, a city, a portion of a city, a region, a portion of a region.

AA.152. The system of one or more of the above AA examples, wherein the computer creates at least one behavioral pattern for site occupants in one or more of the following: individual sites, the plurality of sites and the portion of the plurality of sites.

AA.153. The system of one or more of the above AA examples, wherein the computer creates at least one behavioral pattern for site occupants in one or more of the following: a building, a portion of a building, a structure, a portion of a structure, an infra-structure, a portion of an infra-structure, a plurality of buildings, a plurality of structures, a plurality of infra-structures, a city, a portion of a city, a region, a portion of a region.

AA.154. The system of one or more of the above AA examples, wherein the computer creates at least one pattern of environmental preferences of occupants one or more of the following: individual sites, the plurality of sites and the portion of the plurality of sites.

AA.155. The system of one or more of the above AA examples, wherein the computer creates at least one pattern of environmental preferences of occupants one or more of the following: a building, a portion of a building, a structure, a portion of a structure, an infra-structure, a portion of an infra-structure, a plurality of buildings, a plurality of structures, a plurality of infra-structures, a city, a portion of a city, a region, a portion of a region.

AA.156. The system of one or more of the above AA examples, wherein the data to be sent is created based on one or more of the following: the at least one behavioral pattern and the at least one pattern of environmental preferences.

AA.157. The system of one or more of the above AA examples, wherein the computer adjusts the energy consumption in one or more of the following: individual sites, the plurality of sites and the portion of the plurality of sites, based at least on a portion of the external data.

AA.158. The system of one or more of the above AA examples, wherein the computer adjusts the energy consumption in one or more of the following: a building, a portion of a building, a structure, a portion of a structure, an infra-structure, a portion of an infra-structure, a plurality of buildings, a plurality of structures, a plurality of infra-structures, a city, a portion of a city, a region, a portion of a region based at least on a portion of the external data.

AA.159. The system of one or more of the above AA examples, wherein the computer provides instructions to one or more devices of the plurality of device to adjust one or more physical outputs of the energy consumption in one or more of the following: individual sites, the plurality of sites and the portion of the plurality of sites, based at least on a portion of the external data.

AA.160. The system of one or more of the above AA examples, wherein the computer provides instructions to one or more devices of the plurality of device to adjust one or more physical outputs of the energy consumption in one or more of the following: a building, a portion of a building, a structure, a portion of a structure, an infra-structure, a portion of an infra-structure, a plurality of buildings, a plurality of structures, a plurality of infra-structures, a city, a portion of a city, a region, a portion of a region, based at least on a portion of the external data.

AA.161. The system of one or more of the above AA examples, wherein the external data may be one or more of the following: price, peak price, future price, meteorological forecast and occupancy forecast.

AA.162. The system of one or more of the above AA examples, wherein the plurality of sensors and/or controllers are installed along at least one pipeline.

AA.163. The system of one or more of the above AA examples, wherein the plurality of sensors and/or controllers are installed in a plurality of pipelines.

AA.164. The system of one or more of the above AA examples, wherein the computer detects defects in the pipeline.

AA.165. The system of one or more of the above AA examples, wherein the computer detects leaks in the pipeline.

AA.166. The system of one or more of the above AA examples, wherein the plurality of sensors and/or controllers are associated with streetlights.

AA.167. The system of one or more of the above AA examples, wherein the plurality of sensors and/or controllers are installed in a plurality of streetlights.

AA.168. The system of one or more of the above AA examples, wherein the computer manages the plurality of streetlights.

AA.169. The system of one or more of the above AA examples, wherein the computer manages the plurality of streetlights based on one or more of the following: ambient light at individual streetlight, ambient light in a region, energy price, meteorological forecast and visibility of the moon and time of the day.

AA.170. The system of one or more of the above AA examples, wherein the computer detects faults in the plurality of streetlights.

AA.171. The system of one or more of the above AA examples, wherein the computer manages the plurality of streetlights along the highway.

AA.172. The system of one or more of the above AA examples, wherein the computer detects a vehicle and turn the lights on in front of the vehicle.

AA.173. The system of one or more of the above AA examples, wherein the computer detects absence of the vehicle and turns the lights off in the absence of the vehicle.

AA.174. The system of one or more of the above AA examples, wherein the computer manages the plurality of streetlights based on one or more of the following: presence of humans in a street and presence of animals in the street.

AA.175. The system of one or more of the above AA examples, wherein the plurality of sensors and/or controllers are installed in agricultural field.

AA.176. The system of one or more of the above AA examples, wherein the plurality of sensors and/or controllers are installed in a plurality of agricultural fields.

AA.177. The system of one or more of the above AA examples, wherein the computer determines one or more of the following: amount of water, amount of nutrients and amount of chemical that are needed for at least a region in the agricultural field.

AA.178. The system of one or more of the above AA examples, wherein the computer determines one or more of the following: moisture, amount of nutrients and amount of chemical that are present in at least a region in the agricultural field.

AA.179. The system of one or more of the above AA examples, wherein one or more of the following: amount of water, amount of nutrients and amount of chemical that are needed for the at least region in the agricultural field is determined based on one or more of the following: one or more of the following: moisture, amount of nutrients, and amount of chemical, present in at least a region in the agricultural field, meteorological conditions, meteorological forecast, time of year, time of the day, type of soil, and type of crop.

AA.180. The system of one or more of the above AA examples, wherein the computer detects faults in irrigation system.

AA.181. The system of one or more of the above AA examples, wherein the computer determines at least an approximate location of a potential fire.

AA.182. The system of one or more of the above AA examples, wherein the plurality of sensors and/or controllers are installed in one or more of the following: forest, bush and farm.

AA.183. The system of one or more of the above AA examples, wherein a portion of the plurality of sensors and/or controllers are distributed so that the distance between adjacent sensors and/or controllers is at most 20 m, 30 m, 50 m, 100 m, or 200 m.

AA.184. The system of one or more of the above AA examples, wherein the plurality of sensors and/or controllers are distributed by dropping of an aircraft.

AA.185. The system of one or more of the above AA examples, wherein the plurality of sensors and/or controllers are installed in one or more of the following: car parks, at parking spots on a street, and along a road.

AA.186. The system of one or more of the above AA examples, wherein the computer determines occupancy of an individual parking spot.

AA.187. The system of one or more of the above AA examples, wherein the computer determines utilization of one or more of the following: car park, portion of the car park, region in the car park, and plurality of car parks.

AA.188. The system of one or more of the above AA examples, wherein the computer uses parking spot occupancy to assist in finding an available parking spot.

AA.189. The system of one or more of the above AA examples, wherein the computer adjusts the energy consumption based at least on a portion of the external data in one or more of the following: individual sites, the plurality of sites, and the portion of the plurality of sites.

AA.190. The system of one or more of the above AA examples, wherein the external data may be one or more of the following: price, peak price, future price, meteorological forecast and occupancy forecast.

AA.191. The system of one or more of the above AA examples, wherein the plurality of sensors, feedback devices and/or controllers are installed in at least one site.

AA.192. The system of one or more of the above AA examples, wherein acknowledgement of packet reception on the downlink is embedded into the next packet on the uplink.

AA.193. The system of one or more of the above AA examples, wherein acknowledgement of packet reception on the uplink is embedded into the next packet on the downlink.

AA.193. The system of one or more of the above AA examples, wherein acknowledgement of packet reception on the downlink is embedded into the next packet on the uplink and acknowledgement of packet reception on the uplink is embedded into the next packet on the downlink.

AA.194. A system comprising: a plurality of devices where a portion of the devices performs one or more of the following: transmits over power line at predefined times a predefined amount of data and receives over power line at predefined times a predefined amount of data; and addressing and/or routing information is substantially absent in the data transmitted to the portion of the devices and/or received from the portion of the devices.

AA.195. A method of controlling a plurality of water heaters in substantially real time comprising: collecting temperature data on a substantial portion of the water heaters in substantially real time; collecting data on energy grid load; and based on the collected information instructing one or more of the plurality of water heaters to perform one or more of the following functions: increase heating to one or more of the plurality of water heaters, decreasing heating to one or more of the plurality of water heaters and increase heating to a portion of the plurality of water heaters.

B.1. A network system comprising:
  a plurality of devices that are capable of transmitting and/or receiving data in which at least three portions of the plurality of devices form a network:
    a first portion of the plurality of devices transmits an amount of data to a second portion of the plurality of devices and the second portion of the plurality of devices receives the amount of data from the first portion of the plurality of devices;
    a third portion of the plurality of devices is capable of receiving the amount of data from the first portion of the plurality of devices without the first portion of the plurality of devices transmitting the amount of data to the third portion of the plurality of devices; and
    a substantial portion of the plurality of devices perform substantially no networking related functions; As recited in example B.1 the ability within the network for a substantial portion of the devices to not perform networking functions may be attributable to the networks ability to route packets with limited headers (or no headers), e.g., the devices may be configured to receive data at a predefined time (e.g., time slot X), append its own data at a predefined time (e.g., time slot Y), remain asleep for a predefined amount of time, and/or wake-up at a predefined time. By limiting the ability within the network for a substantial portion of the devices to perform networking functions the costs for extending the network by additional devices is reduced. By limiting and/or avoiding headers the overall amount of data that may need to be transmitted and/or received by the devices within the network is reduced so that the net available bandwidth for moving the data within the network is significantly increased.

B.2. A network system comprising:
  a plurality of devices that are capable of transmitting and/or receiving data in which at least three portions of the plurality of devices form a network, wherein a substantial portion of the plurality of devices use the ability of transmitting and/or receiving data to communicate with at least one other device of the plurality of devices further comprising:
    a first portion of the plurality of devices that is capable of transmitting an amount of data to a second portion of the plurality of devices and the second portion of the plurality of devices is capable of receiving the amount of data from the first portion of the plurality of devices;
    a third portion of the plurality of devices that is capable of receiving the amount of data from the first portion of the plurality of devices without the first portion of the plurality of devices transmitting the amount of data to the third portion of the plurality of devices; and
    a substantial portion of the plurality of devices perform substantially no networking related functions;

As recited in example B.2 the ability within the network for a substantial portion of the devices to not perform networking functions may be attributable to the networks ability to route packets with limited headers (or no headers), e.g., the devices may be configured to receive data at a predefined time (e.g., time slot X), append its own data at a predefined time (e.g., time slot Y), remain asleep for a predefined amount of time, and/or wake-up at a predefined time. By limiting the ability within the network for a substantial portion of the devices to perform networking functions the costs for extending the network by additional devices is reduced. By limiting and/or avoiding headers the overall amount of data that may need to be transmitted and/or received by the devices within the network is reduced so that the net available bandwidth for moving the data within the network is significantly increased.

B.3. A network system comprising:
  a plurality of devices that are capable of transmitting and/or receiving data in which at least three portions of the plurality of devices form a network:
    at least one first device of the first portion of the plurality of devices is capable of transmitting an amount of data to at least one second device of the second portion of the plurality of devices and the at least one second device of the second portion of the plurality of devices is capable of receiving the amount of data from the at least one first device of the first portion of the plurality of devices;
    at least one third device of the third portion of the plurality of devices is capable of receiving the amount of data from the at least one first device of the first portion of the plurality of devices without the at least one first device of the first portion of the plurality of devices transmitting the amount of data to at least one third device of the third portion of the plurality of devices; and a substantial portion of the plurality of devices perform substantially no networking related functions.

B.4. A network system comprising:

a plurality of devices that are capable of transmitting and/or receiving data in which at least three portions of the plurality of devices form a network:
- at least one first device of the first portion of the plurality of devices is capable of transmitting an amount of data to at least one second device of the second portion of the plurality of devices and the at least one second device of the second portion of the plurality of devices is capable of receiving the amount of data from the at least one first device of the first portion of the plurality of devices;
- at least one third device of the third portion of the plurality of devices is capable of receiving the amount of data from the at least one first device of the first portion of the plurality of devices without the at least one first device of the first portion of the plurality of devices transmitting the amount of data to at least one third device of the third portion of the plurality of devices; and
- a ratio of the plurality of devices performing at least one networking related function to the plurality of devices performing substantially no networking related functions is between 0 to 0.00000001, 0 to 0.0000001, 0 to 0.000001, 0 to 0.00001, 0 to 0.0001, 0 to 0.001, 0 to 0.01 or 0 to 0.1.

B.5. A network system comprising:

a plurality of networked devices that are capable of transmitting and/or receiving data; and the plurality of networked device's communicate within the network via multiple hops; wherein a substantial portion of the networked devices perform substantially no networking related functions.

B.6. A network system comprising:

a plurality of networked devices that are capable of transmitting and/or receiving data; wherein a substantial portion of the networked devices perform substantially no networking related functions and the substantial portion of the plurality of networked devices are connected in a wireless star topology.

B.7. A network system comprising:

a plurality of networked devices that are capable of transmitting and/or receiving data; wherein a substantial portion of the networked devices perform substantially no networking related functions and the substantial portion of the plurality of networked devices are connected in a wireless ring topology.

B.8. The network system of one or more of the above B examples, wherein the plurality of devices is at least 5, 10, 50, 100 or 500 devices.

B.9. the network system of one or more of the above B examples, wherein the first portion of the plurality of devices is at least 2, 5, 10, 50, 100 or 500 devices.

B.10. The network system of one or more of the above B examples, wherein the second portion of the plurality of devices is at least 2, 5, 10, 50, 100 or 500 devices.

B.11. The network system of one or more of the above B examples, wherein the third portion of the plurality of devices is at least 2, 5, 10, 50, 100 or 500 devices.

B.12. The network system of one or more of the above B examples, wherein the substantial portion of the plurality of devices communicate within the network system via multiple hops.

B.13. The network system of one or more of the above B examples, wherein the networking related functions are one or more of the following:

determining whether data received at an individual device of the plurality of devices needs to be stored at the individual device, based on data received;

determining whether data received, or a portion of received data, at the individual device needs to be forwarded to another device, based on received data;

determining available routes;

determining available routes by analyzing data received;

determining available routes by sending data;

determining available routes by receiving data;

determining whether a transmitted packet was properly received, based at least in part, on subsequent reception of ACK or NACK;

determining whether the transmitted packet was properly received, based at least in part, on failure to subsequently receive ACK or NACK;

sending ACK based on successful reception, and sending NACK, or no data, based on unsuccessful reception.

B.14. The network system of one or more of the above B examples, wherein a substantial portion of the plurality of devices perform no networking related functions.

B.15. The network system of one or more of the above B examples, wherein at least 95%, 98%, 99%, 99.5% or 100% of the plurality of devices perform no networking related functions. This leads to the positive effects recited above.

B.16. The network system of one or more of the above B examples, wherein the a portion of the plurality of devices communicate within the network system via at least 3, 5, 10, 50, 100, 200, 1000 or 5000 hops. This leads to the positive effects recited above.

B.17. The network system of one or more of the above B examples, wherein the substantial portion of the plurality of devices communicate within the network system via at least 1, 3, 5, 7, 9 or 11 routes and a substantial portion of the routes are at least 3, 5, 10, 50, 100, 200, 1000 or 5000 hops.

C.1. A system comprising:

a plurality of devices capable of transmitting and/or receiving data;

wherein a substantial portion of the devices individually perform one or more of the following: transmit and/or receive data at at least one predefined time, transmit and/or receive at least one predefined amount of data and transmit and/or receive using at least one predefined resource;

wherein one or more of the following:
- the at least one predefined time allocated to the substantial portion of the individual devices,
- the at least one predefined amount of data allocated to the substantial portion of the individual devices, and
- the at least one predefined resource allocated to the substantial portion of the individual devices, are allocated to substantially maximize a ratio of a net system throughput to an available system throughput; and wherein a ratio of an amount of data originating at an individual device and/or transmitted for use by the individual device to a bandwidth available at the individual device is equal to or less than 10%, 5%, 1%, 0.1%, 0.01%, 0.0001% or 0.00001%.

C.2. A system comprising:
  a plurality of devices capable of transmitting and/or receiving data;
  wherein a substantial portion of the devices individually perform one or more of the following: transmit and/or receive data at least one time, transmit and/or receive at least one amount of data and transmit and/or receive using at least one resource;
  wherein one or more of the following:
    the at least one time allocated to the substantial portion of the individual devices,
    the at least one amount of data allocated to the substantial portion of the individual devices, and
    the at least one resource allocated to the substantial portion of the individual devices,
  are allocated to substantially maximize a ratio of a net system throughput to an available system throughput, wherein one or more of the following: the at least one time, the at least one amount of data and the at least one resource is substantially predefined, predefined or variable; and
  wherein a ratio of an amount of data originating at an individual device and/or transmitted for use by the individual device to a bandwidth available at the individual device is equal to or less than 10%, 5%, 1%, 0.1%, 0.01%, 0.0001% or 0.00001%.

C.3. A system comprising:
  a plurality of devices capable of transmitting and/or receiving data;
  wherein a substantial portion of the devices individually perform one or more of the following: transmit and/or receive data at least one predefined time, transmit and/or receive at least one predefined amount of data and transmit and/or receive using at least one predefined resource;
  wherein one or more of the following:
    the at least one predefined time allocated to the substantial portion of the individual devices,
    the at least one predefined amount of data allocated to the substantial portion of the individual devices, and
    the at least one predefined resource allocated to the substantial portion of the individual devices,
  are allocated to substantially maximize a ratio of a net system throughput to an available system throughput; and
  wherein a ratio of an amount of data originating at a first portion of the devices and/or transmitted for use by the first portion of the devices to a total bandwidth of the network is equal to or more than 0.1%, 1%, 5%,10%, 30%, 50%, 75%, 90%, 95% or 99%; and
  wherein a ratio of an amount of data originating at a second portion of the devices and/or transmitted for use by the second portion of the devices to a total bandwidth of the network is equal to or less than 0.1%, 0.01%, 0.0001%, 0.00001 or 0.000001%.

C.4. The system of one or more of the above C examples, wherein the ratio of a net system throughput to the available system throughput is at least 50%, 75%, 90%, 95%, 98%, 99%, 99.5%, 99.9% or 99.99%.

C.5. The system of one or more of the above C examples, wherein the plurality of the devices is at least 5, 10, 20, 50 or 500 devices.

C.6. The system of one or more of the above C examples, wherein the substantial portion of the devices is at least 5, 10, 20, 50 or 500 devices.

C.7. The system of one or more of the above C examples, wherein the plurality of the devices is at least 5, 10, 20, 50 or 500 devices and the substantial portion of the devices is at least 5, 10, 20, 50 or 500 devices.

C.8. The system of one or more of the above C examples, wherein the at least one resource is one or more of the following: frequency channel, spreading code sequence, starting position in spreading code, frequency hopping sequence, time slot and FDD bins.

C.9. The system of one or more of the above C examples, wherein the plurality of the devices is at least 5, 25, 50, 100, 500 or 1000 devices, and the substantial portion of devices individually perform one or more of the following: transmit at predefined times a predefined amount of data using a predefined resource; receive at predefined times a predefined amount of data using a predefined resource; and transmit at predefined times a predefined amount of data using a predefined resource and receive at predefined times a predefined amount of data using a predefined resource; and addressing and/or routing information is substantially absent in the data transmitted to the substantial portion of the devices and/or received from the substantial portion of the devices.

C.10. The system of one or more of the above C examples, wherein the plurality of the devices is at least 5, 25, 50, 100, 500 or 1000 devices, and the substantial portion of devices individually perform one or more of the following: transmit at the least one predefined time the at least one predefined amount of data using the at least one predefined resource; receive at the at least one predefined time the at least one predefined amount of data using the at least one predefined resource; and transmit at the at least one predefined time the at least one predefined amount of data using the at least one predefined resource and receive at the at least one predefined time the at least one predefined amount of data using the at least one predefined resource; and addressing and/or routing information is substantially absent in the data transmitted to the substantial portion of the devices and/or received from the substantial portion of the devices.

C.11. The system of one or more of the above, C examples, wherein the plurality of the devices is at least 5, 25, 50, 100, 500 or 1000 devices, and the substantial portion of devices individually perform one or more of the following: transmit at the least one time the at least one amount of data using the at least one resource; receive at the at least one time the at least one amount of data using the at least one resource; and transmit at the at least one time the at least one amount of data using the at least one resource and receive at the at least one time the at least one amount of data using the at least one resource; and addressing and/or routing information is substantially absent in the data transmitted to the substantial portion of the devices and/or received from the substantial portion of the devices.

C.12. The system of one or more of the above C examples, wherein the plurality of the devices is at least 500, 5000, 20,000 or 100,000 of devices and the substantial portion of devices individually perform one or more of the following: transmit at predefined times a predefined amount of data using a predefined resource; receive at predefined times a predefined amount of data using a predefined resource; and transmit at predefined times a predefined amount of data using a predefined resource and receive at predefined times a predefined amount of data using a predefined resource; and addressing and/or routing information is substantially absent in the data transmitted to the substantial, portion of the devices and/or received from the substantial portion of the devices.

C.13. The system of one or more of the above C examples, wherein the plurality of the devices is at least 500, 5000, 20,000 or 100,000 of devices and the substantial portion of devices individually perform one or more of the following:

transmit at the least one predefined time the at least one predefined amount of data using the at least one predefined resource; receive at the at least one predefined time the at least one predefined amount of data using the at least one predefined resource; and transmit at the at least one predefined time the at least one predefined amount of data using the at least one predefined resource and receive at the at least one predefined time the at least one predefined amount of data using the at least one predefined resource; and addressing and/or routing information is substantially absent in the data transmitted to the substantial portion of the devices and/or received from the substantial portion of the devices.

C.14. The system of one or more of the above C examples, wherein the plurality of the devices is at least 500, 5000, 20,000 or 100,000 of devices and the substantial portion of devices individually perform one or more of the following: transmit at the least one time the at least one amount of data using the at least one resource; receive at the at least one time the at least one amount of data using the at least one resource; and transmit at the at least one time the at least one amount of data using the at least one resource and receive at the at least one time the at least one amount of data using the at least one resource; and addressing and/or routing information is substantially absent in the data transmitted to the substantial portion of the devices and/or received from the substantial portion of the devices.

C.15. The system of one or more of the above C examples, wherein the plurality of the devices is at least 50,000, 500,000, 10,000,000 or 50,000,000 devices and the substantial portion of devices individually perform one or more of the following: transmit at predefined times a predefined amount of data using a predefined resource; receive at predefined times a predefined amount of data using a predefined resource; and transmit at predefined times a predefined amount of data using a predefined resource and receive at predefined times a predefined amount of data using a predefined resource; and addressing and/or routing information is substantially absent in the data transmitted to the substantial portion of the devices and/or received from the substantial portion of the devices.

C.16. The system of one or more of the above C examples, wherein the plurality of the devices is at least 50,000, 500,000, 10,000,000 or 50,000,000 devices and the substantial portion of devices individually perform one or more of the following: transmit at the least one predefined time the at least one predefined amount of data using the at least one predefined resource; receive at the at least one predefined time the at least one predefined amount of data using the at least one predefined resource; and transmit at the at least one predefined time the at least one predefined amount of data using the at least one predefined resource and receive at the at least one predefined time the at least one predefined amount of data using the at least one predefined resource; and addressing and/or routing information is substantially absent in the data transmitted to the substantial portion of the devices and/or received from the substantial portion of the devices.

C.17. The system of one or more of the above C examples, wherein the plurality of the devices is at least 50,000, 500,000, 10,000,000 or 50,000,000 devices and the substantial portion of devices individually perform one or more of the following: transmit at the least one time the at least one amount of data using the at least one resource; receive at the at least one time the at least one amount of data using the at least one resource; and transmit at the at least one time the at least one amount of data using the at least one resource and receive at the at least one time the at least one amount of data using the at least one resource; and addressing and/or routing information is substantially absent in the data transmitted to the substantial portion of the devices and/or received from the substantial portion of the devices.

C.18. The system of one or more of the above C examples, wherein one or more of the following is calculated using a set of rules and/or a set of instructions: one or more predefined times, one or more of the predefined amounts of data and/or one or more of the predefined resources.

C.19. The system of one or more of the above C examples, wherein one or more of the following is calculated using a set of rules and/or a set of instructions: the at least one predefined time, the at least one predefined amount of data and/or the at least one predefined resource.

C.20. The system of one or more of the above C examples, wherein one or more of the following is calculated using a set of rules and/or a set of instructions: the at least one time, the at least one amount of data and/or the at least one resource.

C.21. The system of one or more of the above C examples, wherein the set of rules is predefined.

C.22. The system of one or more of the above C examples, wherein the set of instructions is predefined.

C.23. The system of one or more of the above C examples, wherein one or more of the following is calculated using the set of rules and/or the set of instructions based at least in part on an initial state and/or a seed value: one or more predefined times, one or more of the predefined amounts of data and one or more of the predefined resources.

C.24. The system of one or more of the above C examples, wherein one or more of the following is calculated using the set of rules and/or the set of instructions based at least in part on an initial state and/or a seed value: the at least one predefined time, the at least one predefined amount of data and the at least one predefined resource.

C.25. The system of one or more of the above C examples, wherein one or more of the following is calculated using the set of rules and/or the set of instructions based at least in part on an initial state and/or a seed value: the at least one time, the at least one amount of data and the at least one resource.

C.26. The system of one or more of the above C examples, wherein the initial state is predefined.

C.27. The system of one or more of the above C examples, wherein the seed value is predefined.

C.28. The system of one or more of the above C examples, wherein the amount of data originating at the device is equal to or less than 1 bit, 8 bits, 16 bits or 48 bits.

C.29. The system of one or more of the above C examples, wherein the amount of data originating at the device and/or transmitted for use by the device is equal to or less than 1 bit, 8 bits, 16 bits or 48 bits.

C.30. The system of one or more of the above C examples, wherein the amount of data originating at the device and/or transmitted for use by the device is equal to or less than 1 byte, 4 bytes, 16 bytes or 48 bytes.

C.31. The system of one or more of the above C examples, wherein the amount of data originating at the device and/or transmitted for use by the device is equal to or more than 1 bit, 8 bits, 16 bits or 48 bits.

C.32. The system of one or more of the above C examples, wherein the amount of data originating at the device and/or transmitted for use by the device is equal to or more than 1 byte, 4 bytes, 16 bytes or 48 bytes.

C.33. The system of one or more of the above C examples, wherein the amount of data transmitted and/or received at the device is at least 100 bytes, 1000 bytes, 16,000 bytes or 48,000 bytes.

C.34. The system of one or more of the above C examples, wherein the amount of data from a second device is appended to the data received from a first device and is transmitted to the third device.

C.35. The system of one or more of the above C examples, wherein the amount of data originating at a device from the plurality of the devices is appended to the data received from at least 5, 25, 100, 500, 1000, 10,000 or 1,000,000 other devices from the plurality of the devices forming aggregated data and the aggregated data is transmitted to at least one next device of the plurality of devices.

C.36. The system of one or more of the above C examples, wherein the amount of data originating at a device from the plurality of the devices is appended to the data received from at least 5, 25, 100, 500, 1000, 10,000 or 1,000,000 other devices from the plurality of the devices forming aggregated data and the aggregated data is transmitted to a gateway.

C.37. The system of one or more of the above C examples, wherein data intended for a selected portion of the plurality of devices is transmitted from the gateway to at least one first device from the plurality of devices, and the at least one first device performs one or more of the following:

forwards data to at least one second device from the plurality of devices;

extracts a predefined amount of data and forwards the predefined amount of data to at least one second device;

extracts a second predefined amount of data, extracts a portion of the second predefined amount of data and forwards a remaining portion of the second predefined amount of data to at least a second device;

extracts a portion of a third predefined amount of data and forwards at least a first, second or third portion of a remaining portion of the third predefined amount of data to at least a second, third or fourth device;

extracts a portion of a fourth predefined amount of data and forwards one or more of the following: a first portion, a second portion and a third portion of the remaining fourth predefined amount of data to one or more other devices from the plurality of devices, wherein structure and/or sequencing of the forwarded data is modified.

C.38. The system of one or more of the above C examples, wherein the ratio of the amount of data originating at the individual device and/or transmitted for use by the individual device to the bandwidth available at the individual device is equal to or less than 10%, 5%, 1%, 0.1%, 0.01%, 0.0001% or 0.00001%.

C.39. The system of one or more of the above C examples, wherein the ratio of the amount of data originating at the individual device and/or transmitted for use by the individual device to the bandwidth available at the individual device is between 10% to 0.00001%, 5% to 0.0001%, 1% to 0.001%, 0.1% to 0.0001%, 0.003% to 0.012%, 0.0003% to 0.0012%, 1% to 0.0003% or 0.00003% to 0.0015%.

C.40. The system of one or more of the above C examples, wherein the ratio of the amount of data originating at the individual device and/or transmitted for use by the individual device to the bandwidth available at the gateway is equal to or less than 10%, 5%, 1%, 0.1%, 0.01%, 0.0001% or 0.00001%.

C.41. The system of one or more of the above C examples, wherein the ratio of the amount of data originating at the individual device and/or transmitted for use by the individual device to the bandwidth available at the gateway is between 10% to 0.00001%, 5% to 0.0001%, 1% to 0.001%, 0.1% to 0.0001%, 0.003% to 0.012%, 0.0003% to 0.0012%, 1% to 0.0003% or 0.00003% to 0.0015%.

C.42. The system of one or more of the above C examples, wherein a ratio of an aggregated amount of data transmitted and/or received at the gateway to the available bandwidth at the gateway is at least 10%, 25%, 50%, 75%, 90%, 95%, 98%, 99%, 99.5%, 99.9%, 99.99% or 99.999%.

C.43. The system of one or more of the above C examples, wherein the available bandwidth is approximately equal to or at least 1/128, 1/64, 1/16, 1/8, 1/4, 1/2 or 1 of the total bandwidth.

C.44. The system of one or more of the above C examples, wherein the available bandwidth is between 0.4% to 100%, 0.8% to 100%, 1.5% to 100%, 3.1% to 100%, 6% to 100%, 12% to 100%, 25% to 100%, 50% to 100%, 75% to 100%, 90% to 100%, 25% to 75%, 0.4% to 12%, 3.1% to 25% or 6% to 50% of the total bandwidth.

C.45. The system of one or more of the above C examples, wherein at least one device of the plurality of devices extracts information that is transmitted for use at the at least one device by using one or more predefined offsets and/or one or more predefined amounts of data.

C.46. The system of one or more of the above C examples, wherein the substantial portion of the individual devices transmit and/or receive for a period of time.

C.47. The system of one or more of the above C examples, wherein the period of time is at least 1 nanosecond, 10 nanoseconds or 100 nanoseconds.

C.48. The system of one or more of the above C examples, wherein the period of time is at most 1 nanosecond, 10 nanoseconds or 100 nanoseconds.

C.49. The system of one or more of the above C examples, wherein the period of time is at least 1 microsecond, 10 microseconds or 100 microseconds.

C.50. The system of one or more of the above C examples, wherein the period of time is at most 1 microsecond, 10 microseconds or 100 microseconds.

C.51. The system of one or more of the above C examples, wherein the period of time is at least 1 millisecond, 10 milliseconds or 100 milliseconds.

C.52. The system of one or more of the above C examples, wherein the period of time is at most 1 millisecond, 10 milliseconds or 100 milliseconds C.53. The system of one or more of the above C examples, wherein the period of time is at least 1 second, 10 seconds or 100 seconds.

C.54. The system of one or more of the above C examples, wherein the period of time is at most 1 second, 10 seconds or 100 seconds.

C.55. The system of one or more of the above C examples, wherein the period of time is at least 1 millisecond, 10 milliseconds or 100 milliseconds and the at least one amount of data is variable.

C.56. The system of one or more of the above C examples, wherein the time period is predefined and the at least one amount of data is variable.

C.57. The system of one or more of the above C examples, wherein the at least one predefined resource is substantially predefined.

C.58. The system of one or more above C examples, wherein the at least one time is substantially predefined.

C.59. The system of one or more above C examples, wherein the at least one time is variable.

C.60. The system of one or more above C examples, wherein the at least one amount of data is substantially predefined.

C.61. The system of one or more above C examples, wherein the at least one amount of data is variable.

C.62. The system of one or more above C examples, wherein the at least one resource is substantially predefined.

C.63. The system of one or more above C examples, wherein the at least one resource is variable.

C.64. The system of one or more of the above C examples, wherein the substantial portion of the plurality of devices form a mesh network.

C.65. The system of one or more of the above C examples, wherein the plurality of devices form the mesh network.

C.66. The system of one or more of the above C examples, wherein the substantial portion of the plurality of devices are substantially fixed in their physical location.

C.67. The system of one or more of the above C examples, wherein the substantial portion of the plurality of devices are fixed in their physical location.

C.68. The system of one or more of the above C examples, wherein at least 40%, 60%, 80%, 90%, 95% or 98% of the plurality of devices are fixed in their physical location.

C.69. The system of one or more of the above C examples, wherein at least 40%, 60%, 80%, 90%, 95% or 98% of the plurality of devices are substantially fixed in their physical location.

D.1. A method of providing security to a system of devices, wherein:
(a) a substantial portion of the individual devices are individually assigned at least one initial seed value;
(b) a substantial portion of the individual devices form at least a two hop network;
(c) the at least one initial seed value assigned to the individual devices is used for generating onetime keys; and
(d) the one-time keys are used to encrypt and/or decrypt data as data is moved between the individual devices that form the at least two hop network.

D.2. A method of providing security to a plurality of devices, wherein:
(a) a portion of the individual devices are assigned at least one initial seed value;
(b) a portion of the individual devices form at least two hop network;
(c) the at least one initial seed value assigned to the individual devices is used for generating onetime keys; and
(d) the one-time keys are used to encrypt and/or decrypt data as data is moved between the individual devices that form the at least two hop network.

D.3. The method of one or more of the above D examples, wherein the portion of the individual devices is a substantial portion of the individual devices.

D.4. The method of one or more of the above D examples, wherein a sender and a receiver have synchronized deterministic random bit generators and the synchronized deterministic random bit generators generate a one-time random value for data sent by the sender and/or received at the receiver.

D.5. The method of one or more of the above D examples, wherein a deterministic random bit generator of the sender and a deterministic random bit generator of the receiver use identical, or substantially identical, initial seed value and the synchronized deterministic random bit generator generated a new random value for data sent by the sender and/or received at the receiver.

D.6. The method of one or more above D examples, wherein the least one initial seed value is shared by no more than a predefined number of individual devices.

D.7. The method of one or more above D examples, wherein data is forwarded from a first device to a second device in the at least two hop network and the second device receives data from the first device; and data that is forwarded from the second devices to a third device in the at least two hop network is one of the following: the received first set of data, the first set of received data and a second set of data generated at the second device, a modified first set of received data generated at the second device and the modified first set of received data and a second set data.

D.8. The method of one or more of the above D examples, wherein data previously received at an individual device is used to ascertain security of a communication link.

D.9. The method of one or more of the above D examples, wherein data previously received at the individual device is signed and a signature is used to ascertain security of the communication link.

D.10. The method of one or more of the above D examples, wherein a hash value of data previously received at the individual device is calculated and the hash value is used to ascertain security of the communication link.

D.11. The method of one or more of the above D examples, wherein data previously transmitted to the individual device is used to ascertain security of the communication link.

D.12. The method system of one or more of the above D examples, wherein data previously transmitted to the individual device is signed and the signature is used to ascertain security of the communication link.

D.13. The method of one or more of the above D examples, wherein the hash value of data previously transmitted to the individual device is calculated and the hash value is used to ascertain security of the communication link.

D.14. The method of one or more of the above D examples, wherein the data is signed and the signature is used to authenticate the sender.

D.15. The method of one or more of the above D examples, wherein the signature is divided into portions and the portions are transmitted one after another to a receiving device.

D.16. The method of one or more of the above D examples, wherein encrypted data is signed and the signature is used to authenticate the sender.

D.17. The method of one or more of the above D examples, wherein the received information at the individual device is validated based on successful reception of at least a predefined portion of the signature.

D.18. The method of one or more of the above D examples, wherein the received information at the individual device is rejected if at least one of the portions of the subsequently received signature is considered incorrect.

D.19. The method of one or more of the above D examples, wherein the one-time keys are generated at one or more substantially predefined times.

D.20. The method of one or more of the above D examples, wherein the one-time keys are generated at one or more substantially predefined times even if no data is received at the individual device.

D.21. The method of one or more of the above D examples, wherein the one-time new random value is used in chain block cypher.

D.22. The method of one or more of the above D examples, wherein the one-time random value is not transmitted between individual devices.

D.23. The method of one or more of the above D examples, wherein the individual devices keep records of the signature on latest data received.

D.24. The method of one or more of the above D examples, wherein latest data received at the individual device is comprised of at least 1, 2, 5, 10, 20 or 100 packets of historical data received.

D.25. The method of one or more of the above D examples, wherein latest data received at the individual device does not include received signatures.

D.26. The method of one or more of the above D examples, wherein the encryption is end-to-end between one or more of the following: at least two individual devices, at least one individual device and a central computer, at least one individual device and a processor, a substantial portion of individual devices and a central computer.

D.27. The method of one or more of the above D examples, wherein individual devices sign one or more of the following: data the individual device is about to transmit, data that was previously transmitted by the individual device and data that may be transmitted in the future by the individual device; and appends the signature to data to be transmitted and/or modifies the signature received so the length of the new signature is substantially the same as the length of the received signature.

D.28. The method of one or more of the above D examples, wherein the substantial portion of the individual devices signs one or more of the following: data the individual device is about to transmit, data that was previously transmitted by the individual device and data that may be transmitted in the future by the individual device; may and appends the signature to the data to be transmitted and/or modifies the signature received so the length of the new signature is substantially the same as the length of the received signature.

D.29. The method of one or more of the above D examples, wherein the substantial portion of the individual devices signs one or more of the following: data the individual device is about to transmit, data that was previously transmitted by the individual device and data that may be transmitted in the future by the individual device; may and the signature is denoted St, and the received signature is denoted Sr, and the signature appended to the data to be transmitted is denoted as Sf, and Sf is a function of St and/or Sr, and Length (Sf) substantially the same Length(Sr).

D.30. The method of one or more of the above D examples, wherein each device, or substantial portion of the devices, form a tree like network and share the same secret key.

D.31. The method of one or more of the above D examples, wherein none of the individual devices, or a substantially small portion of individual devices forming the tree like network is aware of the structure of network.

D.32. The method of one or more of the above D examples, wherein the central computer or other processor knows the initial seed values of all, or the substantial portion of, devices forming the network.

D.33. The method of one or more of the above D examples, wherein the a plurality of computer knows the initial seed values of all, or the substantial portion of, devices forming the network.

D.34. The method of one or more of the above D examples, wherein each individual device, or the substantial portion of individual devices, ceases to transmit and/or receive data after receiving a predefined number of invalid data packets.

D.35. The method of one or more of the above D examples, wherein each device, or the substantial portion of devices, ceases to perform an action based on the received information after receiving the predefined number of invalid data packets.

D.36. The method of one or more of the above D examples, wherein the invalid data packet is a data packet that contains an invalid signature.

D.37. The method of one or more of the above D examples, wherein the substantial portion of individual devices receive data from a previous individual device on the up-link, data contains the signature to authenticate the sender, and the individual device that received the data performs one or more of the following: forwards data; and appends new data-to-data received, modifies the signature, so that new signature includes the signature on new data and the length of the new signature is substantially the same as the length of the received signature, and then forwards data to another individual device.

D.38. The method of one or more of the above D examples, wherein the signature of last data received on the down link is also embedded in the signature sent on the up-link.

D.39. The method of one or more of the above D examples, wherein the central computer or other processor receives data transmitted from the substantial portion of the devices, or a portion of the devices, forming the tree like network, and keys used to sign data are also used to determine one or more broken links in the tree like network.

D.40. The method of one or more of the above D examples, wherein keys used to sign data are also used to determine one or more broken links in the network.

D.41. The method of one or more of the above D examples, wherein the signature received on the up-link is used to verify the integrity of the down link.

D.42. The method of one or more of the above D examples, wherein the information sent on the down link is followed by the signature on the sent data in subsequent transmissions.

D.43. The method of one or more of the above D examples, wherein at least one individual device ceases to transmit and/or receive data based on the received information after failing to receive and/or validate a predefined of portion of the signature on the previously received information.

D.44. The method of one or more of the above D examples, wherein at least one individual device ceases to perform an action based on the received information after failing to receive and/or validate the predefined of portion of the signature on the previously received information.

D.45. The method of one or more of the above D examples, wherein the substantial portion of the individual device cease to transmit and/or receive data based on the received information after failing to receive and/or validate the predefined of portion of the signature on the previously received information.

D.46. The method of one or more of the above D examples, wherein the substantial portion of the individual device cease to perform the action based on the received information after failing to receive and/or validate the predefined of portion of the signature on the previously received information.

D.47. The method of one or more of the above D examples, wherein the predefined number of individual devices sharing the initial seed value is 2, 3, 5 or 10.

E.1. A plurality of network systems comprising:

(a) at least a first network system comprising a first plurality of devices, wherein a substantial portion of the first plurality of devices are capable of transmitting and/or receiving data;

and no first network infrastructure devices or at least one first network infrastructure device;
(b) at least a second network system comprising a second plurality of devices, wherein a substantial portion of the second plurality of devices are capable of transmitting and/or receiving data; and no second network infrastructure devices or at least one second network infrastructure device; and
(c) wherein a ratio of a combined sum of the first and the second network infrastructure devices of the plurality of network systems to a combined sum of the first and second plurality of devices of the plurality of network systems is between 0 to 0.01.

E.2. A plurality of network systems comprising:
(a) at least a first network system comprising a first plurality of devices, wherein a substantial portion of the first plurality of devices are capable of transmitting and/or receiving data; and no first network infrastructure devices or at least one first network infrastructure device;
(b) at least a second network system comprising a second plurality of devices, wherein a substantial portion of the second plurality of devices are capable of transmitting and/or receiving data; and no second network infrastructure devices or at least one second network infrastructure device; and
(c) wherein a cost ratio of a combined cost sum of the first and the second network infrastructure devices of the plurality of network systems to a combined cost sum of the first and second plurality of devices of the plurality of network systems is between 0 to 0.01.

E.3. A plurality of network systems comprising:
(a) at least a first network system comprising a first plurality of devices, wherein a substantial portion of the first plurality of devices are capable of transmitting and/or receiving data, and no first network infrastructure devices or at least one first network infrastructure device;
(b) at least a second network system comprising a second plurality of devices, wherein a substantial portion of the second plurality of devices are capable of transmitting and/or receiving data, and no second network infrastructure devices or at least one second network infrastructure device;
(c) a combined sum of the first and second plurality of devices is greater than 50; and
(d) a ratio of a combined sum of the first and the second network infrastructure devices of the plurality, of network systems to the combined sum of the first and second plurality of devices is between 0 to 0.01.

E.4. The plurality of network systems of one or more of the E examples, wherein the combined sum of the plurality of devices is at least 25, 50, 100, 200, 500, 1000 or 10,000.

E.5. The plurality of network systems of one or more of the E examples, wherein the combined sum of the plurality of devices is at least 50,000, 200,000, 500,000, 1,000,000, 5,000,000, 10,000,000, 50,000,000 or 100,000,000.

E.6. The plurality of network systems of one or more of the E examples, wherein the combined sum of the plurality of devices is between 25 to 200, 25 to 1000, 25 to 10000, 100 to 10000 or 500 to 10000.

E.7. The plurality of network systems of one or more of the E examples, wherein the combined sum of the plurality of devices is between 200 to 20,000, 200 to 50,000, 200 to 100,000, 10,000 to 1,000,000 or 10,000 to Ser. No. 10/000,000.

E.8. The plurality of network systems of one or more of the E examples, wherein the combined sum of the plurality of devices is between 200 to 200,000, 200 to 500,000, 200 to 1,000,000, 10,000 to Ser. No. 10/000,000 or 10,000 to 1,000,000,000.

E.9. The plurality of network systems of one or more of the E examples, wherein a ratio of the combined sum of the first and the second network infrastructure devices of the plurality of network systems to the combined sum of the first and second plurality of devices of the plurality of network systems is between 0 to 0.005, between 0 to 0.001, between 0 to 0.0001, between 0 to 0.00001, between 0 to 0.000001 or between 0 to 0.0000001.

E.10. The plurality of network systems of one or more of the E examples, wherein a cost ration of the combined cost sum of the first and the second network infrastructure devices of the plurality of network systems to the combined cost sum of the first and second plurality of devices of the plurality of network systems is between 0 to 0.005, between 0 to 0.001, between 0 to 0.0001, between 0 to 0.00001, between 0 to 0.000001 or between 0 to 0.0000001.

E.11. The plurality of network systems of one or more of the E examples, wherein a portion of the first and/or the second network infrastructure devices of the plurality of network systems are access points.

E.12. The plurality of network systems of one or more of the E examples, wherein a substantial portion of the first and/or the second network infrastructure devices of the plurality of network systems are access points.

E.13. The plurality of network systems of one or more of the E examples, wherein a portion of the first and/or the second network infrastructure devices of the plurality of network systems are routers.

E.14. The plurality of network systems of one or more of the E examples, wherein a substantial portion of the first and/or the second network infrastructure devices of the plurality of network systems are routers.

E.15. The plurality of network systems of one or more of the E examples, wherein a substantial portion of the first and/or the second network devices of the plurality of network systems create a star topology network and at least one the individual network infrastructure device is in the middle region of the star topology network.

E.16. The plurality of network systems of one or more of the E examples, wherein the substantial portion of the first and/or the second network infrastructure devices of the plurality of network systems receive data, and based on the content of the received data forward substantially the same data to at least one other device.

E.17. The plurality of network systems of one or more of the E examples, wherein the substantial portion of the first and/or the second network infrastructure devices of the plurality of network systems receive data, and based on the content of the received data forward substantially the same data to at least one other network infrastructure device.

E.18. The plurality of network systems of one or more of the E examples, wherein the substantial portion of the first and/or the second network infrastructure devices of the plurality of network systems send an amount of data to at least one other network infrastructure device and the at least one other network infrastructure device receives the amount of data and the at least one other network infrastructure device uses the received data to obtain routing information.

E.19. The plurality of network systems of one or more of the E examples, wherein the substantial portion of the first and/or the second network infrastructure devices of the plurality of network systems receive a data packet and the data packet contains an address of the sender.

E.20. The plurality of network systems of one or more of the E examples, wherein the substantial portion of the first and/or the second network infrastructure devices of the plurality of network, systems receive a data packet and the data packet contains an address of an intended recipient.

E.21. The plurality of network systems of one or more of the E examples, wherein the substantial portion of the first and/or the second network infrastructure devices of the plurality of network systems receive a data packet and the data packet contains information about a route of the data packet.

E.22. The plurality of network systems of one or more of the E examples, wherein the substantial portion of the first and/or the second network infrastructure devices of the plurality of network systems receive the data packet and a data packet contains information about a number of hops in the route.

E.23. The plurality of network systems of one or more of the E examples, wherein the substantial portion of the first and/or the second network infrastructure devices of the plurality of network systems receive data and forward data to at least one other device and the received data contains address information and the forwarded data contains address information and the address information contained in the forwarded data is different from the address information contained in the received data.

E.24. The plurality of network systems of one or more of the E examples, wherein at least one of the devices of the first and the second network devices of the plurality of network systems perform a network infrastructure function.

E.25. The plurality of network systems of one or more of the E examples, wherein at least one of the devices of the first and the second network devices of the plurality of network systems is an access point and/or router.

E.26. The plurality of network systems of one or more of the E examples, wherein at least one of the devices of the first and the second network devices of the plurality of network systems perform a network infrastructure function and is treated as a network infrastructure device.

E.27. The plurality of network systems of one or more of the E examples, wherein the portion or the substantial portion of the first and/or the second network infrastructure devices of the plurality of network systems receive data from at least one of the devices and/or transmit data to the at least one of the other devices using at least one resource and then transmits the data and/or the received data to at least one other individual network infrastructure device using at least one other resource.

E.28. The plurality of network systems of one or more of the E examples, wherein a substantial portion of the first and the second network devices of the plurality of network systems have at most an 8 bit MPU.

E.29. The plurality of network systems of one or more of the E examples, wherein a substantial portion of the first and the second network devices of the plurality of network systems have an amount of RAM equal or less than 4 k byte, 8 k byte or 16 kbyte.

E.30. The plurality of network systems of one or more of the E examples, wherein a substantial portion first and the second network devices of the plurality of network systems have an amount of ROM or FLASH memory equal or less than 32 k bytes, 64 k bytes, 128 k bytes or 256 k bytes.

E.31. The plurality of network systems of one or more of the E examples, wherein a substantial portion of the first and the second network devices of the plurality of network systems operate at clock speed of no more than 16 MHz, 32 MHz or 64 MHz.

F.1. A system comprising:
a plurality of devices where a portion of the devices individually perform one or more of the following: transmit at predefined times a predefined amount of data using a predefined resource; receive at predefined times a predefined amount of data using a predefined resource; and transmit at predefined times a predefined amount of data using a predefined resource and receive at predefined times a predefined amount of data using a predefined resource; addressing and/or routing information is substantially absent in the data transmitted to the portion of the devices and/or received from the portion of the devices; and the portion of the devices are one or more of the following: a sensor and a controller.

F.2. A large area network management system comprising:
at least 1000 devices distributed over the large area network;
at least one route with at least 50 hops;
at least one or other processor computer that is capable of managing a substantial portion of the at least 1000 devices, a plurality of controllers that are associated with a plurality of a second plurality of devices, wherein the central computer is capable for the substantial portion of devices of one or more of the following: collecting information from a portion of the devices; using the information collected to instruct a portion of the devices to wirelessly optimize a set of constraints.

F.3. A system comprising:
one or more computers;
at least 1000 sensing devices that are capable of sensing a predefined set of parameters, and are capable of transmitting data regarding the predefined set of parameters to the central computer or other processor;
at least 1000 controllers associate with at least 1000 functional devices that are capable of changing the state of the system;
the at least 1000 controllers that are capable of receiving data from the one or more computers;
at least one route with at least 50 hops;
a set of constraints;
a set of parameters that need to be optimized; and
the one or more computers that is capable of optimizing the system based at least in part on the data received from the at least 1000 sensors and the set of constraints,
wherein the data sent from the one or more computers to the controller is less 8 bits, 16 bits or 32 bits; and
wherein the data sent from the at least 1000 sensors to the one or more computers is less 8 bits, 16 bits or 32 bits.

F.4. The systems of one or more F examples, wherein the data is received from sensors and/or controllers installed on a plurality of sites, and wherein the above data is used to perform one or more of the following: optimize energy use of one, portion of, a substantial portion of sites; optimize energy use with regard to entire plurality or a substantial portion of plurality of sites; minimize peak power and/or current consumption in entire plurality or a substantial portion of sites, portion of sites, individual sites.

F.5. The system of one or more F examples, wherein the received data is used to generate energy usage reports.

F.6. The system of one or more F examples, wherein the received data is used to determine occupancy in a portion or portions of individual site or a plurality of sites.

F.7. The system of one or more F examples, wherein the received data is used to create behavioral pattern for site occupants.

F.8. The system of one or more F examples, wherein the received data is used to predict the future energy use.

F.9. The system of one or more F examples, wherein the data received is used to optimize and/or adjust environmental conditions of individual site or a plurality of sites.

F.10. The system of one or more F examples, wherein the data received is used to learn about and/or create patterns of environmental preferences of occupants of individual site or a plurality of sites.

F.11. The system of one or more F examples, wherein the devices are installed along the pipeline and the data collected from those devices is used to perform one or more of the following: perform routine check, detect defects.

F.12. The system of one or more F examples, wherein the defect results in a leak from the pipe F.13. The system of one or more F examples, wherein the data set is raw data or substantially raw data.

F.14. The system of one or more F examples, wherein at least 90%, 95%, 98%, 99% or 99.5% of the devices are wireless only devices.

F.15. The system of one or more F examples, wherein the one or more computers is a central computer.

F.16. The system of one or more F examples, wherein the one or more computers is one or more of the following: the central computer, cloud resource or one or more processors.

G.1. A system comprised of:
at least one base station;
a plurality of devices, wherein a substantial portion of the plurality of devices are capable of transmitting data;
the at least one base station is capable of receiving the data from a substantial portion of the plurality of devices and the at least one base station is capable of transmitting data to a substantial portion of the plurality of devices which are capable of receiving the data;
the substantial portion of the devices individually perform one or more of the following: transmits at predefined times a predefined amount of data using a predefined resource; receives at predefined times a predefined amount of data using a predefined resource; and transmits at predefined times a predefined amount of data using a predefined resource and receives at predefined times a predefined amount of data using a predefined resource; and
the at least one base station performs one or more of the following: transmits at predefined times a predefined amount of data using a predefined resource; receives at predefined times a predefined amount of data using a predefined resource; and transmits at predefined times a predefined amount of data using a predefined resource and receives at predefined times a predefined amount of data using a predefined resource.

G.2. A system comprised of:
at least one base station;
a plurality of devices, wherein a substantial portion of the plurality of devices are capable of transmitting data;
the at least one base station is capable of receiving the data from a substantial portion of the plurality of devices and the at least one base station is capable of transmitting data to a substantial portion of the plurality of devices which are capable of receiving the data;
the substantial portion of the devices individually perform one or more of the following: transmits at predefined times an amount of data using a resource; receives at predefined times an amount of data using a resource; and transmits at predefined times an amount of data using a resource and receives at predefined times an amount of data using a resource; and
the at least one base station performs one or more of the following: transmits at predefined times an amount of data using a resource; receives at predefined times an amount of data using a resource; and transmits at predefined times an amount of data using a resource and receives at predefined times an amount of data using a resource.

G.3. A system comprised of:
at least one base station;
a plurality of devices, wherein a substantial portion of the plurality of devices are capable of transmitting data;
the at least one base station is capable of receiving the data from a substantial portion of the plurality of devices and the at least one base station is capable of transmitting data to a substantial portion of the plurality of devices which are capable of receiving the data;
the substantial portion of the devices individually perform one or more of the following: transmits at times a predefined amount of data using a resource; receives at times a predefined amount of data using a resource; and transmits at times a predefined amount of data using a resource and receives at times a predefined amount of data using a resource; and
the at least one base station performs one or more of the following: transmits at times a predefined amount of data using a resource; receives at times a predefined amount of data using a resource; and transmits at times a predefined amount of data using a resource and receives at times a predefined amount of data using a resource.

G.4. A system comprised of:
at least one base station;
a plurality of devices, wherein a substantial portion of the plurality of devices are capable of transmitting data;
the at least one base station is capable of receiving the data from a substantial portion of the plurality of devices and the at least one base station is capable of transmitting data to a substantial portion of the plurality of devices which are capable of receiving the data;
the substantial portion of the devices individually perform one or more of the following: transmits at predefined times a predefined amount of data using a resource; receives at predefined times a predefined amount of data using a resource; and transmits at predefined times a predefined amount of data using a resource and receives at predefined times a predefined amount of data using a resource; and
the at least one base station performs one or more of the following: transmits at predefined times a predefined amount of data using a resource; receives at predefined times a predefined amount of data using a resource; and transmits at predefined times a predefined amount of data using a resource and receives at predefined times a predefined amount of data using a resource.

G.5. A system comprised of:
at least one base station;
a plurality of devices, wherein a substantial portion of the plurality of devices are capable of transmitting data;
the at least one base station is capable of receiving the data from a substantial portion of the plurality of devices and the at least, one base station is capable of transmitting data to a substantial portion of the plurality of devices which are capable of receiving the data;
the substantial portion of the devices individually perform one or more of the following: transmit using a predefined set of resources; receive data using a predefined set of resources; and
the at least one base station performs one or more of the following: transmits data to the substantial portion of individual devices using a predefined set of resources; receives data from the substantial portion of individual devices using a predefined set of resources.

G.6. A system comprised of:
  at least one base station;
  a plurality of devices, wherein a substantial portion of the plurality of devices are capable of transmitting data;
  the at least one base station is capable of receiving the data from a substantial portion of the plurality of devices and the at least one base station is capable of transmitting data to a substantial portion of the plurality of devices which are capable of receiving the data;
  wherein addressing information is substantially absent in the data transmitted by a portion of the plurality of devices and/or received by the portion of the plurality devices; and the addressing information is substantially absent in the data transmitted by the at least one base station and/or received by the at least one base station.

G.7. The system of one or more of the G examples, wherein the at least one base station is a sub-base station.

G.8. The system of one or more of the G examples, wherein the base station may be one or more of the following: base station, gateway, access point and router.

G.9. The system of one or more of the G examples, wherein the sub-base station may be one or more of the following: sub-base station, gateway, access point and router.

G.10. The system of one or more of the G examples, wherein the predefined set of resources may contain one or more of the following: predefined time, predefined resource and predefine amount of data.

G.11. The system of one or more of the G examples, wherein the predefined set of resources is predefined time.

G.12. The system of one or more of the G examples, wherein the predefined set of resources is predefined amount of data.

G.13. The system of one or more of the G examples, wherein the predefined set of resources is predefined time and predefine amount of data.

G.14. The system of one or more of the G examples, wherein addressing information is substantially absent in the data transmitted by a portion of the plurality of devices and/or received by the portion of the plurality devices; and the addressing information is substantially absent in the data transmitted by the at least one base station and/or received by the at least one base station.

G.15. The system of one or more of the G examples, wherein code division modulation is used to transmit and/or receive the data.

G.16. The system of one or more of the G examples, wherein a data rate is variable.

G.17. The system of one or more of the G examples, wherein the data rate is predefined based on the quality of the RF link between the at least one base station and the at least one individual device.

G.18. The system of one or more of the G examples, wherein the predefined transmission time for the portion of the plurality of devices is substantially determined based on a quality of the RF link between the at least one base station and at least one individual device of the portion of the plurality of devices.

G.19. The system of one or more of the G examples, wherein the predefined transmission time for a portion of the plurality of devices is selected to substantially minimise the near-far effect.

G.20. The system of one or more of the G examples, wherein the predefined time is replaced with a predefined offset in CDMA pseudo-random sequence.

G.21. The system of one or more of the examples, wherein the portion of the plurality of devices are substantially fixed in their location or fixed in their location.

G.22. The system of one or more of the G examples, wherein the substantial portion of the plurality of devices are substantially fixed in their location or fixed in their location.

G.23. The system of one or more of the G examples, wherein the portion of the plurality of devices are capable of moving within a substantially predefined region.

G.24. The system of one or more of the G examples, wherein the substantial portion of the plurality of devices are capable of moving within a substantially predefined region.

G.25. The system of one or more of the G examples, wherein the substantially predefined region is determined by one or more of the following: quality of the up-link; quality of the down link; quality of the up-link and down link; predicted quality, of the up-link; predicted quality of the down link; predicted quality of the up-link and down link; calculated quality of the up-link; calculated quality of the down link; calculated quality of the up-link and down link; and distance between the at least one base station and the at least one individual device of the portion of the plurality of devices.

G.26. The system of one or more of the G examples, wherein the substantially predefined region is capable of being varied with time.

G.27. The system of one or more of the G examples, wherein the individual device may be one or more of the following: individual device, sub-base station, gateway, access point and router.

G.28. The system of one or more of the G examples, wherein the portion of the plurality of devices form a multi-hop mesh network.

G.29. The system of one or more of the G examples, wherein the multi-hop mesh network has at least one route that has at least 2, 5, 10, 50, 100 or 1000 hops.

G.30. The system of one or more of the G examples, wherein the portion of the plurality of devices form at least one multi-hop mesh network.

G.31. The system of one or more of the G examples, wherein the at least one multihop mesh network has at least one route that has at least 2, 5, 10, 50, 100 or 1000 hops.

G.32. The system of one or more of the G examples further comprising:
  a first portion of the plurality of devices that are capable of acting as sub-base stations and are capable of forming a sub-network;
  a second portion of the plurality of devices that function as devices; and/or
  a third portion of the plurality of devices that are capable of acting as gateways and are capable of forming at least one multi-hop sub-network.

G.33. The system of one or more of the G examples, wherein the at least one multihop mesh sub-network has at least one route that has at least 2, 5, 10, 50, 100 or 1000 hops.

G.34. The system of one or more of the G examples, wherein the first portion of the plurality of devices is at least 0.1%, 0.5%, 1%, 5%, 10%, 25% or 50% of the plurality of devices.

G.35. The system of one or more of the G examples, wherein the first portion of the plurality of devices is between 0.1% to 50%, 0.1% to 1%, 0.1% to 5%, 0.5.% to 2%, 0.5% to 5%, 1% to 5%, 1% to 10% or 25% to 50% of the plurality of devices.

G.36. The system of one or more of the G examples, wherein the third portion of the plurality of devices is at least 0.1%, 0.5%, 1%, 5%, 10%, 25% or 50% of the plurality of devices.

G.37. The system of one or more of the G examples, wherein the third portion of the plurality of devices is between 0.1% to 50%, 0.1% to 1%, 0.1% to 5%, 0.5.% to 2%, 0.5% to 5%, 1% to 5%, 1% to 10% or 25% to 50% of the plurality of devices.

G.38. The system of one or more of the examples, wherein the second portion of the plurality of devices has at least substantially the same functionality as the plurality of devices.

G.39. The system of one or more of the G examples, wherein the second portion of the plurality of devices is the same as the plurality of devices.

G.40. The system of one or more of the G examples, wherein the sub-network is one or more of the following: the one hop network and the multihop network.

G.41. The system of one or more of the G examples further comprising:
at least two base stations; and
a plurality of devices, wherein the predefined times and/or predefined resources are allocated so that the interference or the potential interference between at least one individual device and the at least one other individual device is substantially reduced.

G.42. The system of one or more of the G examples, wherein the at least one individual device is capable of communicating with at least one first based station using the set of predefined resources, and the at least one individual device is capable of communicating with at least one second base station using the set of predefined resources;
wherein the at least one first based station is one or more of the following: the at least one base station and the sub-base station; and
wherein the at least one second based station is one or more of the following: the at least one base station and the sub-base station.

G.43. The system of one or more of the G examples, wherein the at least one individual device is capable of communicating with the at least one first base station using the first set of predefined resources, and the least one individual device is capable of communicating with the at least one second base station using the second set of predefined resources.

G.44. The system of one or more of the G examples, wherein the plurality of the devices is at least 5, 10, 20, 50 or 500 devices.

G.45. The system of one or more of the G examples, wherein the portion of the devices is at least 5, 10, 20, 50 or 500 devices.

G.46. The system of one or more of the G examples, wherein the plurality of the devices is at least 5, 10, 20, 50 or 500 devices and the portion of the devices is at least 5, 10, 20, 50 or 500 devices.

G.47. The system of one or more of the G examples, wherein the address of individual devices is established and/or derived based on a set of information pertaining to at least a portion of the system, and the set of information includes one or more of the following: one or more predefined times, one or more predefined amounts of data and one or more predefined resources.

G.48. The system of one or more of the G examples, wherein one or more of the predefined times, one or more of the predefined amounts of data and/or one or more of the predefined resources is calculated using a set of rules and/or a set of instructions.

G.49. The system of one or more of the G examples, wherein one or more of the predefined times, one or more of the predefined amounts of data and/or one or more of the predefined resources is calculated using the set of rules and/or the set of instructions based at least in part on a initial state and/or a seed value.

G.50. The system of one or more of the G examples, wherein the set of rules is predefined.

G.51. The system of one or more of the G examples, wherein the set of instructions is predefined.

G.52. The system of one or more of the G examples, wherein the initial state is predefined.

G.53. The system of one or more of the G examples, wherein the seed value is predefined.

G.54. The system of one or more of the G examples, wherein the amount of data originating at the individual device is equal to or less than 1 bit, 8 bits, 16 bits or 48 bits.

G.55. The system of one or more of the G examples, wherein the amount of data originating at the individual device and/or transmitted for use by the individual device is equal to or less than 1 bit, 8 bits, 16 bits or 48 bits.

G.56. The system of one or more of the G examples, wherein the amount of data originating at the individual device and/or transmitted for use by the individual device is equal to or less than 1 byte, 4 bytes, 16 bytes or 48 bytes.

G.57. The system of one or more of the G examples, wherein the predefined amount of data originating at the individual device and/or transmitted for use by the individual device is equal to or more than 1 bit, 8 bits, 16 bits or 48 bits.

G.58. The system of one or more of the G examples, wherein the predefined amount of data originating at the individual device and/or transmitted for use by the individual device is equal to or more than 1 byte, 4 bytes, 0.16 bytes or 48 bytes.

G.59. The system of one or more of the G examples, wherein the predefined amount of data transmitted and/or received at the individual device is at least 100 bytes, 1000 bytes, 16,000 bytes or 48,000 bytes.

G.60. The system of one or more of the G examples, wherein a ratio of the amount of data originating at the individual device and/or transmitted for use by the individual device to a bandwidth available at the individual device is equal to or less than 10%, 5%, 1%, 0.1%, 0.01%, 0.0001% or 0.00001%.

G.61. The system of one or more of the G examples, wherein a ratio of the amount of data originating at the individual device and/or transmitted for use by the individual device to a bandwidth available at the individual device is between 10% to 0.00001%, 5% to 0.0001%, 1% to 0.001%, 0.1% to 0.0001%, 0.003% to 0.012%, 0.0003% to 0.0012%, 1% to 0.0003% or 0.00003% to 0.0015%.

G.62. The system of one or more of the G examples, wherein a ratio of the amount of data originating at the individual device and/or transmitted for use by the individual device to a bandwidth available at the at least one gateway is equal to or less than 10%, 5%, 1%, 0.1%, 0.01%, 0.0001% or 0.00001%.

G.63. The system of one or more of the G examples, wherein a ratio of the amount of data originating at the individual device and/or transmitted for use by the individual device to a bandwidth available at the at least one gateway is between 10% to 0.00001%, 5% to 0.0001%, 1% to 0.001%, 0.1% to 0.0001%, 0.003% to 0.012%, 0.0003% to 0.0012%, 1% to 0.0003% or 0.00003% to 0.0015%.

G.64. The system of one or more of the G examples, wherein the ratio of an aggregated amount of data transmitted and/or received at the at least one gateway to the available bandwidth at the at least one gateway is at least 10%, 25%, 50%, 75%, 90%, 95%, 98%, 99%, 99.5%, 99.9%, 99.99% or 99.999%

G.65. The system of one or more of the G examples, wherein the amount of data is predefined.

G.66. The system of one or more of the G examples, wherein the available bandwidth is approximately equal to or at least 1/128, 1/64, 1/16, 1/8, 1/4, 1/2, or 1 of the total bandwidth.

G.67. The system of one or more of the G examples, wherein the available bandwidth is between 0.4% to 100%, 0.8% to 100%, 1.5% to 100%, 3.1% to 100%, 6% to 100%, 12% to 100%, 25% to 100%, 50% to 100%, 75% to 100%, 90% to 100%, 25% to 75%, 0.4% to 12%, 3.1% to 25% or 6% to 50% of the total bandwidth.

G.68. The system of one or more of the G examples, wherein individual device, or the substantial portion of individual devices, extract information that is transmitted for use at the individual device by using one or more predefined offsets and/or one or more predefined amounts of data.

G.69. The system of one or more of the G examples, wherein a substantial portion of the individual devices transmit and/or receive for a predefined period of time.

G.70. The system of one or more of the G examples, wherein the predefined period of time is at least 1 nanosecond, 10 nanoseconds or 100 nanoseconds.

G.71. The system of one or more of the G examples, wherein the predefined period of time is at most 1 nanosecond, 10 nanoseconds or 100 nanoseconds.

G.72. The system of one or more of the G examples, wherein the predefined period of time is at least 1 microsecond, 10 microseconds or 100 microseconds.

G.73. The system of one or more of the G examples, wherein the predefined period of time is at most 1 microsecond, 10 microseconds or 100 microseconds.

G.74. The system of one or more of the G examples, wherein the predefined period of time is at least 1 millisecond, 10 milliseconds or 100 milliseconds.

G.75. The system of one or more of the G examples, wherein the predefined period of time is at most 1 millisecond, 10 milliseconds or 100 milliseconds.

G.76. The system of one or more of the G examples, wherein the predefined period of time is at least 1 second, 10 seconds or 100 seconds.

G.77. The system of one or more of the G examples, wherein the predefined period of time is at most 1 second, 10 seconds or 100 seconds.

G.78. The system of one or more of the G examples, wherein the predefined period of time is at least 1 millisecond, 10 milliseconds or 100 milliseconds and an amount of data is variable.

G.79. The system of one or more of the G examples, wherein the time period is predefined and the amount of data is variable.

G.80. The system of one or more of the G examples, wherein the amount of data is substantially the same and/or variable.

G.81. The system of one or more of the G examples, wherein a resource is substantially the same and/or variable.

G.82. The system of one or more of the G examples, wherein one or more of the following: the predefined time for a substantial portion of the plurality of devices, the predefined amount of data for a substantial portion of the plurality of devices, the predefined resources for a substantial portion of the plurality of devices are determined by a central computer, a cloud computing resource and/or a plurality of computing devices.

G.83. The system of one or more of the examples, wherein the plurality of computing devices are at least a portion of the plurality of devices.

G.84. The system of one or more of the G examples, wherein a substantial portion of the computing devices are capable of communicating with at least one other computing device.

H.1 A system comprised of:
a plurality of devices, wherein a portion of the plurality of devices are capable of transmitting data;
at least one device of the plurality of devices is capable of receiving data;
an individual device from the plurality of devices originates a payload and a signature of the payload; and
the at least one device of the plurality of devices is capable of determining the identity of a sender device based on a plurality of payloads originated by the portion of the plurality of devices and at least one signature.

H.2. The system of one or more of the H examples, wherein the at least one signature is one or more of the following:
an aggregation of the signatures of the portion of the plurality of devices;
a function of the signatures of the portion of the plurality of devices;
an partial aggregation of the signatures of the portion of the plurality of devices;
a partial function of the signatures of the portion of the plurality of devices;
an aggregation of at least a portion of the signatures of the portion of the plurality of devices; and
a function of at least a portion of the signatures of the portion of the plurality of devices.

H.3. The system of one or more of the H examples, wherein the at least one signature is a function of the signatures.

H.4. The system of one or more of the H examples, wherein the at least one signature is a function of the signatures of the portion of the plurality of devices and the function is XOR.

H.5. The system of one or more of the H examples, wherein the function of the signatures results in a second signature, wherein the length of the second signature is less than the length of the aggregated signatures.

H.6. The system of one or more of the H examples, wherein the function of the signatures, $Length(F(\{s_1, s_2, s_3, \ldots, s_n\})) < \Sigma_{i=1}^{n} Length(s_i)$, wherein F is a function of the signatures, $s_i$ are individual signatures, n is the number of signatures contributing to the function of signatures.

H.7. The system of one or more of the H examples, wherein the plurality of payloads from at least a second portion of the plurality of devices is aggregated and signatures on the payloads from at least a second portion of the plurality of devices are not aggregated.

H.8. The system of one or more of the H examples, wherein the plurality of payloads from at least a second portion of the plurality of devices may be aggregated and signatures on the payloads from at least a second portion of the plurality of devices may not be aggregated.

H.9. The system of one or more of the H examples, wherein the plurality of payloads from at least a second portion of the plurality of devices is at least partially aggregated and at least a portion of signatures on the payloads from at least a second portion of the plurality of devices are not aggregated.

H.10. The system of one or more of the H examples, wherein signatures on the payloads from at least a portion of the substantial portion of the plurality of devices are not aggregated by XORing signatures from the individual devices.

H.11. The system of one or more of the H examples, wherein a substantial portion of signatures is calculated using a payload, a substantially unique key and a substantially random value.

H.12. The system of one or more of the H examples, wherein the substantially random value is not transmitted.

H.13. The system of one or more of the H examples, wherein the substantial portion of signatures is calculated using a block cypher.

H.14. The system of one or more of the H examples, wherein the substantial portion of signatures is calculated using a hash function.

I.1. A device capable of transmitting and/or receiving data, wherein addressing and/or routing information is substantially absent in the data transmitted and/or received by the device.

I.2. A device capable of transmitting and/or receiving data packets, wherein addressing and/or routing information is substantially absent in the data transmitted and/or received by the device.

I.3. A device capable of transmitting and/or receiving data, wherein the device performs one or more of the following: transmit at predefined times a predefined amount of data using a predefined resource; receive at predefined times a predefined amount of data using a predefined resource; and transmit at predefined times a predefined amount of data using a predefined resource and receive at predefined times a predefined amount of data using a predefined resource; and addressing and/or routing information is substantially absent in the data transmitted and/or received by the device.

I.4. A device capable of transmitting and/or receiving data, wherein the device performs one or more of the following: transmits and/or receives information at one or more predefined times, transmits and/or receives one or more predefined amounts of data, and transmits and/or receives using one or more predefined resources, and addressing and/or routing information is substantially absent in the data transmitted and/or received by the device.

I.5. A device capable of transmitting and/or receiving data, wherein the device performs one or more of the following: transmit at predefined times a variable amount of data using a predefined resource; receive at predefined times a variable amount of data using a predefined resource; and transmit at predefined times a variable amount of data using a predefined resource and receive at predefined times a variable amount of data using a predefined resource; and addressing and/or routing information is substantially absent in the data transmitted and/or received by the device.

I.6. A device capable of transmitting and/or receiving data, wherein the device performs one or more of the following: transmit at predefined times a predefined amount of data using a variable resource; receive at predefined times a predefined amount of data using a predefined resource; and transmit at predefined times a predefined amount of data using a variable resource and receive at predefined times a predefined amount of data using a variable resource; and addressing and/or routing information is substantially absent in the data transmitted and/or received by the device.

I.7. A device capable of transmitting and/or receiving data, wherein the device performs one or more of the following: transmit at predefined times a variable amount of data using a variable resource; receive at predefined times a variable amount of data using a variable resource; and transmit at predefined times a variable amount of data using a variable resource and receive at predefined times a variable amount of data using a variable resource; and addressing and/or routing information is substantially absent in the data transmitted and/or received by the device.

I.8. A device capable of transmitting and/or receiving data, wherein the device performs one or more of the following: transmit at predefined times a variable amount of data using a predefined resource; receive at variable times a predefined amount of data using a predefined resource; and transmit at predefined times a variable amount of data using a predefined resource and receive at predefined times a variable amount of data using a predefined resource; and addressing and/or routing information is substantially absent in the data transmitted and/or received by the device.

I.9. A device capable of transmitting and/or receiving data, wherein the device performs one or more of the following; transmit at predefined times a predefined amount of data using a variable resource; receive at predefined times a predefined amount of data using a variable resource; and transmit at predefined times a predefined amount of data using a variable resource and receive at predefined times a predefined amount of data using a variable resource; and addressing and/or routing information is substantially absent in the data transmitted and/or received by the device.

I.10. A device capable of transmitting and/or receiving data, wherein the device performs one or more of the following: transmit at predefined times a variable amount of data using a variable resource; receive at predefined times a variable amount of data using a variable resource; and transmit at predefined times a variable amount of data using a variable resource and receive at predefined times a variable amount of data using a variable resource; and addressing and/or routing information is substantially absent in the data transmitted and/or received by the device.

I.11. A device capable of transmitting and/or receiving data, wherein the device performs one or more of the following: transmits at predefined times a variable amount of data using a predefined resource; receives at predefined times a variable amount of data using a predefined resource; and transmits at predefined times a variable amount of data using a predefined resource and receives at predefined times a variable amount of data using a predefined resource; and addressing and/or routing information is substantially absent in the data transmitted and/or received by the device.

I.12. A device capable of transmitting and/or receiving data, wherein the device performs one or more of the following: transmits at predefined times a predefined amount of data using a variable resource; receives at predefined times a predefined amount of data using a variable resource; and transmits at predefined times a predefined amount of data using a variable resource and receives at predefined times a predefined amount of data using a variable resource; and addressing and/or routing information is substantially absent in the data transmitted and/or received by the device.

I.13. A device capable of transmitting and/or receiving data, wherein the device performs one or more of the following: transmits at predefined times a variable amount of data using a variable resource; receives at predefined times a variable amount of data using a variable resource; and transmits at predefined times a variable amount of data using a variable resource and receives at predefined times a variable amount of data using a variable resource; and addressing and/or routing information is substantially absent in the data transmitted and/or received by the device.

I.14. A device of one or more of the above I examples, wherein the predefined resources are one or more of the following: frequency channel, spreading code sequence, starting position in spreading code, frequency hopping sequence, time slot and FDD bins.

I.15. A device of one or more of the above I examples, wherein the device has at most an 8 bit MPU.

I.16. A device of one or more of the above I examples, wherein the device is a wireless device.

I.17. A device of one or more of the above I examples, wherein the device is able to communicate with at least one other device within a network and at least one gateway within the network.

I.18. A device of one or more of the above I examples, wherein the device is a node.

I.19. A device of one or more of the above I examples, wherein the device is one a plurality of devices in a system; and wherein the system is capable of handling at least 50, 100, 200, 300, 500, 1000, 5000, 10,000 hops between the plurality of devices.

I.20. A device of one or more of the above I examples, wherein the device is one of a plurality of devices in the system;

wherein the distance between devices allows communication between at least one device and at least one other device; and wherein a substantial portion of the plurality of devices are able to communicate with at least one other device within the network and the minimum infrastructure required for at least one gateway to handle at least 100, 500, 2000, 10,000, 100,000 or 1,000,000 devices is substantially the same.

I.21. A device of one or more of the above I examples, wherein the device is one of the plurality of devices in the system; and wherein a substantial portion of the plurality of devices are able to communicate with at least one other device within the network and the at least one gateway within the network is capable of handling at least 100, 500, 2000, 10,000, 100,000 or 1,000,000 devices without the need for additional infrastructure.

I.22. A device of one or more of the above I examples, wherein the device is one of the plurality of devices in the system; and wherein there is at least 50, 100, 200, 300, 500, 1000, 5000, 10,000 hops between at least one device of the plurality of devices and at least one other device of the plurality of devices and a ratio of a number of hops to available data is more than 1/1000, 1/100, 1/25, 1/10 or 1.

I.23. A device of one or more of the above I examples, wherein the device is one of the plurality of devices in the system; and wherein the ratio of available bandwidth to the net pay load is between 200 to 250,000, 300 to 5000, 1000 to 100,000, 50,000 to 1 million or 500,000 to 10 million. As recited in example 1.23 the ability for the network to achieve the recited ratios may be attributable to the networks ability to route packets with limited headers (or no headers). By limiting and/or avoiding headers the overall amount of data that may be transmitted and/or received by the devices within the network is reduced so that the net available bandwidth for moving the data within the network is significantly increased.

I.24. A device of one or more of the above I examples, wherein the device is one of the plurality of devices in the system and at least 85%, 90%, 95%, 98%, 99%, 99.5% or 99.8% of the plurality of devices in the network are capable of interacting with at least one neighboring device.

I.25. A device of one or more of the above I examples, wherein the device is one of the plurality of devices in the system and a substantial portion of the plurality of devices in the network are relatively inexpensive and/or power efficient.

I.26. A device of one or more of the above I examples, wherein the device is one of the plurality of devices in the system and the substantial portion of the plurality of devices in the network cost less than 1 dollar, 3 dollars, 5 dollars, 10 dollars, 20 dollars or combinations thereof to manufacture.

I.27. A device of one or more of the above I examples, wherein the device is one of the plurality of devices in the system and the substantial portion of the plurality of devices in the network have an average current consumption that is less than 30 micro-amps, 20 micro-amps, 10 micro-amps, 5 micro-amps, 3 micro-amps, 1 micro-amps, 0.5 micro-amps or combinations thereof.

I.28. A device of one or more of the above I examples, wherein the device is one of the plurality of devices in the system the number of devices within, the system is between 1000 to 5000, 6000 to 15,000, 10,000 to 20,000, 25,000 to 500,000; 100,000 to 1 million, 250,000 to 600,000, 500,000 to 1 million; 500,000 to 2 million; 700,000 to 2 million, 800,000 to 5 million, 1 million to 10 million or 2 million to 15 million.

I.29. A device of one or more of the above I examples, wherein the device is one of the plurality of devices in the system the number of devices within the system is between 1000 to 5000, 60,000 to 15,000, 10,000 to 20,000, 25,000 to 500,000; 100,000 to 1 million, 250,000 to 600000, 500,000 to 1 million; 500,000 to 2 million; 700,000 to 2 million, 800,000 to 5 million, 1 million to 10 million or 2 million to 15 million. As recited in example 1.29 the ability within the network to accommodate such a large number of devices may be attributable to the networks ability to route packets with limited headers (or no headers).

I.30. A device of one or more of the above I examples, wherein the device is one of the plurality of devices in the system and the plurality of devices are one or more of the following: current sensors, light sensors, humidity sensors, pressure sensors, gas sensors, chemicals sensors, proximity sensors, movement sensors, magnetic sensors, radiation sensors, cameras, scanners, sprinkles, heater controllers, pump controllers, air-con controllers and water supply controllers.

I.31. A device of one or more of the above I examples, wherein the device is one of the plurality of devices in the system and the plurality of devices perform one or more of the following functions: measure one or more physical parameters, control another device, monitor one or more physical parameters, report measured data back, report anomalies, and accept and execute control commands.

I.32. A device of one or more of the above I examples, wherein the one or more physical parameters is selected from one or more of the following: temperature, one or more temperatures, one or more temperature ranges, one or more temperature regions, electrical current, one or more electrical currents, one or more electrical ranges, light, light level, one or more light levels, one or more light regions, humidity, humidity level, one or more humidity level regions, pressure, pressure level, one or more pressure levels, one or more pressure levels, one or more pressure level regions, gas, one or more gases, one or more gas levels, chemicals, one or more chemicals, one or more chemical levels, proximity, one or more levels of proximity, movement, one or more levels of movement, magnetic level, one or more magnetic levels, one or more regions of magnetic levels, radiation, one or more levels of radiation, one or more regions of radiation levels, images, one or more images, visible light images, one or more visible light images, infra red images, one or more infra red images, heat level images, one or more heat level images, sound, one or more levels of sound, sound images, one or more sound images, scanners, sprinkles, heater controllers, pump controllers, air-con controllers and water supply controllers.

I.33. A device of one or more of the above I examples, wherein the one or more physical parameters are temperature, light and movement.

I.34. A device of one or more of the above I examples, wherein the one or more physical parameters are temperature and light.

I.35. A device of one or more of the above I examples, wherein the one or more physical parameters are temperature, light and humidity.

I.36. A device of one or more of the above I examples, wherein the one or more physical parameters are temperature, light and movement.

I.37. A device of one or more of the above I examples, wherein the device is one of the plurality of devices in the system and a portion of the devices of the plurality of devices, a substantial portion of the devices of the plurality of devices or each device of the plurality of devices may be configured with its own configuration.

I.38. A device of one or more of the above I examples, wherein the device is one of the plurality of devices in the system and the net over head per device is less than 10%, 5%, 1%, 0.1% or 0.01%.

I.39. A device of one or more of the above I examples, wherein the device is one of the plurality of devices in the system and the system is capable of handling at least 50, 100, 200, 300, 500, 1000, 5000, 10,000 or 50,000 hops between the at least one gateway and the series of devices of the plurality of devices making up the at least one route without substantially increasing transmission overhead.

I.40. A device of one or more of the above I examples, wherein the device is one of the plurality of devices in the system and the system is for distributing digital data to and/or from the plurality of devices over a wireless mesh network comprising: (a) at least one electronic computing device for configuring the mesh network; (b) at least one gateway device; (c) a plurality of preconfigured routes within the network wherein the routes are comprised of one or more devices of the plurality of devices; and wherein the systems are configured such that a substantial portion of the plurality of preconfigured routes are capable of handling at least 50 hops between the at least one gateway and a series of devices making up a particular route.

I.41. A device of one or more of the above I examples, wherein the device is one of the plurality of devices in the system and the system comprises: (a) at least one electronic computing device for operating the network; (b) the plurality of devices capable of transmitting and/or receiving data; and wherein a substantial portion of the devices in the network are capable of interacting with at least one neighbouring device and forming a network with one or more of the following: no gateway and/or control point; a single gateway and/or control point; a single gateway and a plurality of control points; a plurality of gateways and a single control point; or a plurality of gateways and/or control points.

I.42. A device of one or more of the above I examples, wherein the device is one of the plurality of devices in the system and the system comprises:

the plurality of devices where a portion of the devices performs one or more of the following: transmits at predefined times a predefined amount of data using a predefined resource; receives at predefined times a predefined amount of data using a predefined resource; and transmits at predefined times a predefined amount of data using a predefined resource and receives at predefined times a predefined amount of data using a predefined resource; and addressing and/or routing information is substantially absent in the data transmitted to the portion of the devices, and/or received from the portion of the devices.

I.43. A device of one or more of the above I examples, wherein the device is one of the plurality of devices in the system and the system comprises: the plurality of devices where the portion of the devices performs one or more of the following: transmits at predefined times the predefined amount of data using the predefined resource; receives at predefined times the predefined amount of data using the predefined resource; transmits at predefined times the predefined amount of data using the predefined resource and receives at predefined times the predefined amount of data using the predefined resource; transmits at predefined times the predefined amount of data using the predefined resource and receives at predefined times the predefined amount of data using the predefined resource and transmits at predefined times the variable amount of data using the predefined resource and receives at predefined times the variable amount of data using the predefined resource; and addressing and/or routing information is substantially absent in the data transmitted to the portion of the devices and/or received from the portion of the devices.

I.44. A device of one or more of the above I examples, wherein the device is one of the plurality of devices in the system and addressing and/or routing information is substantially absent in the data transmitted to five or more devices and/or received from the five or more devices of the plurality of devices.

I.45. A device of one or more of the above I examples, wherein the device is one of the plurality of devices in the system and the system comprises: the plurality of devices capable of transmitting and/or receiving data, wherein each device performs one or more of the following: transmits and/or receives information at one or more predefined times, transmits and/or receives one or more predefined amounts of data, and transmits and/or receives using one or more predefined resources, wherein address and/or routing information is substantially absent in the data transmitted or received and the address of each device and/or the routing information is determined for each device by one or more of the following: the predefined times, the predefined amount of data and the predefined resources.

I.46. A device of one or more of the above I examples, wherein the device is one of the plurality of devices in the system and the system comprises: the plurality of devices, wherein a substantial portion of the individual devices perform one or more of the following: transmits data at one or more predefined times, receives data at one or more predefined times, transmits one or more predefined amounts of data, receives one or more predefined amounts of data, transmits using one or more predefined resources and receives using one or more predefined resources;

wherein address and/or routing information is substantially absent in the data transmitted and/or received, wherein the address of individual devices and/or the routing information is established and/or derived based on a set of information about, at least a portion of the system, and the set of information includes one or more of the following:

one or more predefined times, one or more predefined amounts of data and one or more predefined resources, and wherein the set of information is available for use at one or more of the following: individual devices, a central computer, a cloud computing resource and a plurality of computing devices.

I.47. A device of one or more of the above I examples, wherein the device is one of the plurality of devices in the system and the system comprises: the plurality of devices, wherein a substantial portion of the individual devices perform one or more of the following: transmit data at one or more predefined times, receive data at one or more predefined times, transmit one or more predefined amounts of data, receive one or more predefined amounts of data, transmit using one or more predefined resources and receive using one or more predefined resources;

wherein the predefined resources are one or more of the following: frequency channel, spreading code sequence, starting position in spreading code, frequency hopping sequence, time slot and FDD bins;

wherein address and/or routing information is substantially absent in the data transmitted and/or received, wherein the address of individual devices and/or the routing information is established and/or derived based on the set of information pertaining to at least the portion of the system, and the set of information includes one or more of the following: one or more predefined times, one or more predefined amounts of data and one or more predefined resources, and wherein the set of information is available for use at one or more of the following: individual devices, the central computer, the cloud computing resource and the plurality of computing devices.

I.48. A device of one or more of the above I examples, wherein the device is one of the plurality of devices in the system and the system comprises:

the plurality of devices where five or more of the devices perform one or more of the following: transmit at predefined times the variable amount of data using the predefined resource; receive at predefined times the variable amount of data using the predefined resource; and transmit at predefined times the variable amount of data using the predefined resource and receive at predefined times the variable amount of data using the predefined resource; and addressing and/or routing information is substantially absent in the data transmitted to the five or more devices and/or received from the five or more devices.

I.49. A device of one or more of the above I examples, wherein the device is one of the plurality of devices in the system and the system comprises:

the plurality of devices where five or more of the devices perform one or more of the following: transmit at predefined times the predefined amount of data using a variable resource; receive at predefined times the predefined amount of data using the predefined resource; and transmit at predefined times the predefined amount of data using the variable resource and receive at predefined times the predefined amount of data using the variable resource; and addressing and/or routing information is substantially absent in the data transmitted to the five or more devices and/or received from the five or more devices.

I.50. A device of one or more of the above I examples, wherein the amount of data originating at the device is equal to or less than 1 bit, 8 bits, 16 bits or 48 bits.

I.51. A device of one or more of the above I examples, wherein the amount of data originating at the device and/or transmitted for use by the device is equal to or less than 1 bit, 8 bits, 16 bits or 48 bits.

I.52. A device of one or more of the above I examples, wherein the amount of data originating at the device and/or transmitted for use by the device is equal to or less than 1 byte, 4 bytes, 16 bytes or 48 bytes.

I.53. A device of one or more of the above I examples, wherein the amount of data originating at the device and/or transmitted for use by the device is equal to or more than 1 bit, 8 bits, 16 bits or 48 bits.

I.54. A device of one or more of the above I examples, wherein the amount of data originating at the device and/or transmitted for use by the device is equal to or more than 1 byte, 4 bytes, 16 bytes or 48 bytes.

I.55. A device of one or more of the above I examples, wherein the amount of data transmitted and/or received at the device is at least 100 bytes, 1000 bytes, 16000 bytes or 48000 bytes.

I.56. A device of one or more of the above I examples, wherein the device is one of the plurality of devices in the system and the amount of data from a second device is appended to the data received from a first device and is transmitted to the third device.

I.57. A device of one or more of the above I examples, wherein the device is one of the plurality of devices in the system and the amount of data originating at the device is appended to the data received from at least 5, 25, 100, 500, 1000, 10000 or 1000000 other devices of the plurality of devices at the device and the aggregated data from the devices is transmitted to at least one next device.

I.58. A device of one or more of the above I examples, wherein the device is one of the plurality of devices in the system and the amount of data originating at the device is appended to the data received from at least 5, 25, 100, 500, 1000, 10,000 or 1,000,000 other devices of the plurality of devices at the device and the aggregated data from the devices is transmitted to at least one gateway.

I.59. A device of one or more of the above I examples, wherein the device is one of the plurality of devices in the system and the device originates amounts of data $\{D_k\}$, at times $\{T_k\}$, and the available data rate at the individual device is B, and $$R_t = \sum \frac{D_k}{T_{k+1} - T_k} / B,$$

and Rt is equal to or less than 10%, 5%, 1%, 0.1%, 0.01%, 0.0001% or 0.00001%.

I.60. A device of one or more of the above I examples, wherein $\{D_k\}$ are amounts of data transmitted for use by the device of the plurality of devices, at predefined times $\{T_k\}$, and the available data rate $\{R_r\}$ at the device is B, and $$R_r = \sum \frac{D_k}{T_{k+1} - T_k} / B,$$

and Rr is equal to or less than 10%, 5%, 1%, 0.1%, 0.01%, 0.0001% or 0.00001%.

I.61. A device of one or more of the above I examples, wherein Rt and/or Rr are between 10% to 0.00001%, 5% to 0.0001%, 1% to 0.001%, 0.1% to 0.0001%, 0.003% to 0.012%, 0.0003% to 0.0012%, 1% to 0.0003% or 0.00003% to 0.0015%.

I.62. A device of one or more of the above I examples, wherein the devices extract information that is transmitted for use at the device by using one or more predefined offsets and/or one or more predefined amounts of data.

I.63. A device of one or more of the above I examples, wherein the device transmit and/or receive for a predefined period of time.

I.64. A device of one or more of the above I examples, wherein the predefined period of time is at least 1 nanosecond, 10 nanoseconds or 100 nanoseconds.

I.65. A device of one or more of the above I examples, wherein the predefined period of time is at most 1 nanosecond, 10 nanoseconds or 100 nanoseconds.

I.66. A device of one or more of the above I examples, wherein the predefined period of time is at least 1 microsecond, 10 microseconds or 100 microseconds.

I.67. A device of one or more of the above I examples, wherein the predefined period of time is at most 1 microsecond, 10 microseconds or 100 microseconds.

I.68. A device of one or more of the above I examples, wherein the predefined period of time is at least 1 millisecond, 10 milliseconds or 100 milliseconds.

I.69. A device of one or more of the above I examples, wherein the predefined period of time is at most 1 millisecond, 10 milliseconds or 100 milliseconds.

I.70. A device of one or more of the above I examples, wherein the predefined period of time is at least 1 second, 10 seconds or 100 seconds.

I.71. A device of one or more of the above I examples, wherein the predefined period of time is at most 1 second, 10 seconds or 100 seconds.

I.72. A device of one or more of the above I examples, wherein the predefined period of time is at least 1 millisecond, 10 milliseconds or 100 milliseconds and an amount of data is variable.

I.73. A device of one or more of the above I examples, wherein the time period is predefined and the amount of data is variable.

I.74. A device of one or more of the above I examples, wherein the amount of data is substantially the same and/or variable.

I.75. A device of one or more of the above I examples, wherein a resource is substantially the same and/or variable.

I.76. A device of one or more of the above I examples, wherein one or more of the following: the predefined time for the device, the predefined amount of data for the device, the predefined resources the device is determined by the central computer, the cloud computing resource and/or the plurality of computing devices.

I.77. A device of one or more of the above I examples, wherein one or more of the following: the predefined time for the device, the predefined amount of data for the device, the predefined resources for the device is determined based on one or more of the following: required and/or desired periodicity of data to be transmitted for the device and required and/or desired amount of data to be transmitted and/or received for the device.

I.78. A device of one or more of the above I examples, wherein one or more of the following: the predefined time for the device, the predefined amount of data for the device, the predefined resources for the device is determined based on one or more of the following: required and/or desired periodicity of data to be transmitted for the device, required and/or desired amount of data to be transmitted and/or received for the device and required and/or desired resources for the device.

I.79. A device of one or more of the above I examples, wherein one or more of the following: the predefined time for the device, the predefined amount of data for the device, the predefined resources for the device is determined based on one or more of the following:

minimal latency and/or period of data to be received from the device;

minimal application specific latency and/or period of data to be received from the device;

minimal latency and/or period of data to be transmitted to the device;

minimal application specific latency and/or period of data to be transmitted to the device;

maximal latency and/or period of data to be received from the device;

maximal application specific latency and/or period of data to be received from the device;

maximal latency and/or period of data to be transmitted to the device;

maximal application specific latency and/or period of data to be transmitted to the device;

required amount of data to be transmitted and/or received for the device;

application specific amount of data to be transmitted and/or received for the device;

required resources for the device;

application specific resources for the device;

required functionality of the device; and application specific functionality of the device.

I.80. A device of one or more of the above I examples, wherein one or more of the following: the predefined time for the device, the predefined amount of data for the device, the predefined resources for the device is determined based on a physical location of the device within the system.

I.81. A device of one or more of the above I examples, wherein one or more of the following: the predefined time for the device, the predefined amount of data for the device, the predefined resources for the device is determined based on a relative location of the device within the system, wherein the location is relative to one or more of the following: gateway, access point, neighboring devices, intentional interferer and non-intentional interferer.

I.82. A device of one or more of the above I examples, wherein one or more of the following: the predefined time for the device, the predefined amount of data for the device, the predefined resources for the device is determined based on a quality of the RF link and/or available RF links between the device and one or more of the following: the plurality of devices, a plurality of neighboring devices, a plurality of access points, a plurality of gateways and a plurality of devices that within a particular route.

I.83. A device of one or more of the above I examples, wherein the quality of the RF link is determined by one or more of the following: measuring RSSI (received signal strength indicator), measuring BER (bit error rate), measuring SER (symbol error rate), measuring PER (packet error rate) and predicting link quality based on a mathematical model.

I.84. A device, of one or more of the above I examples, wherein the device is one of the plurality of devices in the system and the system forms a mesh network.

I.85. A device of one or more of the above I examples, wherein the device is a receiving device in the system and network maintenance data is embedded into transmitted data and detected by the receiving device.

I.86. A device of one or more of the above I examples, wherein the device is one of the plurality of devices in the system and the computer is capable of determining at least an approximate location of a portion of the device, wherein the location is determined based on one or more of the following: a location of at least one other device of the plurality of devices and a quality of links within a portion of the network formed by the plurality of devices.

I.87. A device of one or more of the above I examples, wherein the device is one or more of the following: feedback devices, sensors and controllers.

I.88. A device of one or more of the above I examples, wherein the device is one of the plurality of devices in the system and the data to be sent is created based on one or more of the following: the received data, the stored data, the calculated data, the external data and the result of analyzing the data.

I.89. A device of one or more of the above I examples, wherein the device is a sensor and/or controller and is installed along a portion of at least one pipeline.

I.90. A device of one or more of the above I examples, wherein the device is a sensor and/or controller and is are associated with a streetlight.

I.91. A device of one or more of the above I examples, wherein the sensor and/or controller is installed in an agricultural field.

I.92. A device of one or more of the above I examples, wherein the device is a sensor and/or controller and is installed in one or more of the following: forest, bush and farm.

I.93. A device of one or more of the above I examples, wherein the sensor and/or controller is distributed within a system comprising the plurality of devices and the distance between adjacent sensors and/or controllers is at most 20 m, 30 m, 50 m, 100 m, or 200 m.

I.94. A device of one or more of the above I examples, wherein the device is one of the plurality of sensors and/or controllers and the plurality of sensors and/or controllers are distributed by dropping of an aircraft.

I.95. A device of one or more of the above I examples, wherein the device is one of the plurality of devices in the system and wherein:

(a) a substantial portion of the devices of the plurality of devices are individually assigned at least one initial seed value;

(b) a substantial portion of the devices of the plurality of device form at least a two hop network;

(c) the at least one initial seed value assigned to the devices of the plurality of devices is used for generating onetime keys; and (d) the one-time keys are used to encrypt and/or decrypt data as data is moved between the devices of the plurality of devices that form the at least two hop network.

I.96. A device of one or more of the above I examples, wherein the device is one of the plurality of devices in the system and wherein:

(a) a portion of the devices of the plurality of devices are assigned at least one initial seed value;

(b) a portion of the devices of the plurality of devices form at least two hop network;

(c) the at least one initial seed value assigned to the devices of the plurality of device is used for generating onetime keys; and (d) the one-time keys are used to encrypt and/or decrypt data as data is moved between the devices of the plurality of device that form the at least two hop network.

I.97. A device of one or more of the above I examples, wherein the device is one of the plurality of devices in the system and wherein: data is forwarded from a first device of the plurality of devices to a second device of the plurality of device in the at least two hop network and the second device receives data from the first device; and data that is forwarded from the second devices to a third device of the plurality of devices in the at least two hop network is one of the following: the received first set of data, the first set of received data and a second set of data generated at the second device, a modified first set of received data generated at the second device and the modified first set of received data and a second set data.

I.98. A device of one or more of the above I examples, wherein the device is one of the plurality of devices in the system and wherein: data previously received at the device is used to ascertain security of a communication link.

I.99. A device of one or more of the above I examples, wherein the device is one of the plurality of devices in the system and wherein: data previously received at the device is signed and a signature is used to ascertain security of the communication link.

I.100. A device of one or more of the above I examples, wherein the device is one of the plurality of devices in the system and wherein: a hash value of data previously received at the device is calculated and the hash value is used to ascertain security of the communication link.

I.101. A device of one or more of the above I examples, wherein the device is one of the plurality of devices in the system and wherein: data previously transmitted to the device is used to ascertain security of the communication link.

I.102. A device of one or more of the above I examples, wherein the device is one of the plurality of devices in the system and wherein: data previously transmitted to the device is signed and the signature is used to ascertain security of the communication link.

I.103. A device of one or more of the above I examples, wherein the device is one of the plurality of devices in the system and wherein: the hash value of data previously transmitted to the device is calculated and the hash value is used to ascertain security of the communication link.

I.104. A device of one or more of the above I examples, wherein the device is one of the plurality of devices in the system and wherein: the data is signed and the signature is used to authenticate the sender.

I.105. A device of one or more of the above I examples, wherein the device is one of the plurality of devices in the system and wherein: the signature is divided into portions and the portions are transmitted one after another to a receiving device which is one of the plurality of devices.

I.106. A device of one or more of the above I examples, wherein the device is one of the plurality of devices in the system and wherein: encrypted data is signed and the signature is used to authenticate the sender.

I.107. A device of one or more of the above I examples, wherein the device is one of the plurality of devices in the system and wherein: the received information at the device is validated based on successful reception of at least a predefined portion of the signature.

I.108. A device of one or more of the above I examples, wherein the device is one of the plurality of devices in the system and wherein: the received information at the device is rejected if at least one of the portions of the subsequently received signature is considered incorrect.

I.109. A device of one or more of the above I examples, wherein the device is one of the plurality of devices in the system and wherein: the one-time keys are generated at one or more substantially predefined times even if no data is received at the device.

I.110. A device of one or more of the above I examples, wherein the device is one of the plurality of devices in the system and wherein: the one-time new random value is used in chain block cypher.

I.111. A device of one or more of the above I examples, wherein the device is one of the plurality of devices in the system and wherein: the one-time random value is not transmitted between devices.

I.112. A device of one or more of the above I examples, wherein the device is one of the plurality of devices in the system and wherein: the device keep records of the signature on latest data received.

I.113. A device of one or more of the above I examples, wherein the device is one of the plurality of devices in the system and wherein: the latest data received at the device is comprised of at least 1, 2, 5, 10, 20 or 100 packets of historical data received.

I.114. A device of one or more of the above I examples, wherein the device is one of the plurality of devices in the system and wherein: the latest data received at the device does not include received signatures.

I.115. A device of one or more of the above I examples, wherein the device is one of the plurality of devices in the system and wherein: the encryption is end-to-end between one or more of the following: at least two devices, at least one device and a central computer, at least one device and a processor, a substantial portion of the devices and a central computer.

I.116. A device of one or more of the above I examples, wherein the device is one of the plurality of devices in the system and wherein: the device sign one or more of the following: data the device is about to transmit, data that was previously transmitted by the device and data that may be transmitted in the future by the device; and appends the signature to data to be transmitted and/or modifies the signature received so the length of the new signature is substantially the same as the length of the received signature.

I.117. A device of one or more of the above I examples, wherein the device is one of the plurality of devices in the system and wherein: the substantial portion of the devices signs one or more of the following: data the device is about to transmit, data that was previously transmitted by the device and data that may be transmitted in the future by the device; and the signature is denoted St, and the received signature is denoted Sr, and the signature appended to the data to be transmitted is denoted as Sf, and Sf is a function of St and/or Sr, and Length(Sf) substantially the same Length(Sr).

I.118. A device of one or more of the above I examples, wherein the device is one of the plurality of devices in the system and wherein: the device is part of a tree like network and share the same secret key.

I.119. A device of one or more of the above I examples, wherein the device is one of the plurality of devices in the system and wherein: the device is not aware of the structure of network.

I.120. A device of one or more of the above I examples, wherein the device is one of the plurality of devices in the system and wherein: the device ceases to transmit and/or receive data after receiving a predefined number of invalid data packets.

I.121. A device of one or more of the above I examples, wherein the device is one of the plurality of devices in the system and wherein: the device ceases to perform an action based on the received information after receiving the predefined number of invalid data packets.

I.122. A device of one or more of the above I examples, wherein the device is one of the plurality of devices in the system and wherein: the invalid data packet is a data packet that contains an invalid signature.

I.123. A device of one or more of the above I examples, wherein the device is one of the plurality of devices in the system and wherein: the device receive data from a previous device on the up-link, data contains the signature to authenticate the sender, and the device that received the data performs one or more of the following: forwards data; and appends new data to data received, modifies the signature, so that new signature includes the signature on new data and the length of the new signature is substantially the same as the length of the received signature, and then forwards data to another device.

I.124. A device of one or more of the above I examples, wherein the device is one of the plurality of devices in the system and wherein: the signature of last data received on the down link is also embedded in the signature sent on the up-link.

I.125. A device of one or more of the above I examples, wherein the device is one of the plurality of devices in the system and wherein: the device ceases to transmit and/or receive data based on the received information after failing to receive and/or validate a predefined of portion of the signature on the previously received information.

J.1. A method for distributing digital data to and/or from a plurality of devices over a network comprising:
deploying a plurality of devices capable of transmitting and/or receiving data; and
configuring at least a portion of the plurality of devices to individually perform one or more of the following: transmit at predefined times a predefined amount of data using a predefined resource; receive at predefined times a predefined amount of data using a predefined resource; and transmit at predefined times a predefined amount of data using a predefined resource and receive at predefined times a predefined amount of data using a predefined resource; wherein addressing and/or routing information is substantially absent in the data transmitted and/or received.

J.2 A method for distributing digital data to and/or from a plurality of devices over a network comprising:
deploying a plurality of devices capable of transmitting and/or receiving data; and
configuring at least a portion of the plurality of devices to individually perform one or more of the following: transmit at predefined times a predefined amount of data using a predefined resource; receive at predefined times a predefined amount of data using a predefined resource; transmit at predefined times a predefined amount of data using a predefined resource and receive at predefined times a predefined amount of data using a predefined resource; transmit at predefined times a predefined amount of data using a predefined resource and receive at predefined times a predefined amount of data using a predefined resource and transmit at predefined times a variable amount of data using a predefined resource and receive at predefined times a variable amount of data using a predefined resource;

wherein addressing and/or routing information is substantially absent in the data transmitted and/or received.

J.3 A method for distributing digital data to and/or from a plurality of devices over a network comprising:
deploying a plurality of devices capable of transmitting and/or receiving data; and
determining routes or interconnections within at least a substantial portion of the plurality of devices, based on one or more of the following:
quality of the available RF links between the substantial portion of the devices making up the network;
quality of the available RF links between the substantial portion of the devices on at least one route;
required battery life for the individual devices, or the substantial portion of individual devices;
acceptable battery life for the individual devices, or the substantial portion of individual devices;
whether the individual devices, or the substantial portion of individual devices is battery powered or have a constant supply of power;
the number of hops between the individual devices, or the substantial portion of individual devices, and the at least one gateway;
the number of hops in the selected or potential route;
aggregated bandwidth in the selected or potential route;
peak aggregated bandwidth in the selected or potential route;
minimal application specific period and/or latency in the selected or potential route;
minimal required period and/or latency in the selected or potential route;
maximal application specific period and/or latency in the selected or potential route;
maximal required period and/or latency in the selected or potential route; and availability of alternative route; and
configuring at least a portion of the plurality of devices to individually perform one or more of the following: transmit at predefined times a predefined amount of data using a predefined resource; receive at predefined times a predefined amount of data using a predefined resource; transmit at predefined times a predefined amount of data using a predefined resource and receive at predefined times a predefined amount of data using a predefined resource; transmit at predefined times a predefined amount of data using a predefined resource and receive at predefined times a predefined amount of data using a predefined resource and transmit at predefined times a variable amount of data using a predefined resource and receive at predefined times a variable amount of data using a predefined resource; wherein addressing and/or routing information is substantially absent in the data transmitted and/or received.

J.4. A method of one or more of J examples, wherein one or more of the following: the predefined time for the substantial portion of the plurality of devices, the predefined amount of data for the substantial portion of the plurality of devices, the predefined resources for the substantial portion of the plurality of devices is determined based on one or more of the following:
minimal latency and/or period of data to be received from each device or the substantial portion of the plurality of devices;
minimal application specific latency and/or period of data to be received from each device or the substantial portion of the plurality of devices;
minimal latency and/or period of data to be transmitted to each device or the substantial portion of the plurality of devices;
minimal application specific latency and/or period of data to be transmitted to each device or the substantial portion of the plurality of devices;
maximal latency and/or period of data to be received from each device or the substantial portion of the plurality of devices;
maximal application specific latency and/or period of data to be received from each device or the substantial portion of the plurality of devices;
maximal latency and/or period of data to be transmitted to each device or the substantial portion of the plurality of devices;
maximal application specific latency and/or period of data to be transmitted to each device or the substantial portion of the plurality of devices;
required amount of data to be transmitted and/or received for each device or the substantial portion of the plurality of devices;
application-specific amount of data to be transmitted and/or received for each device or the substantial portion of the plurality of devices;
required resources for each device or the substantial portion of the plurality of devices;
application specific resources for each device or the substantial portion of the plurality of devices;
required functionality of each device or the substantial portion of the plurality of devices; and
application specific functionality of each device or the substantial portion of the plurality of devices.

J.5. A method of one or more of J examples, wherein one or more of the following: the predefined time for the substantial portion of the plurality of devices, the predefined amount of data for the substantial portion of the plurality of devices, the predefined resources for the substantial portion of the plurality of devices is determined based on a physical location of each device or the substantial portion of the plurality of devices.

J.6. A method of one or more of J examples, wherein one or more of the following: the predefined time for the substantial portion of the plurality of devices, the predefined amount of data for the substantial portion of the plurality of devices, the predefined resources for the substantial portion of the plurality of devices is determined based on a relative location of each device or the substantial portion of the plurality of devices, wherein the location is relative to one or more of the following: gateway, access point, neighboring devices, intentional interferer and non-intentional interferer.

J.7. A method of one or more of J examples, wherein one or more of the following: the predefined time for the substantial portion of the plurality of devices, the predefined amount of data for the substantial portion of the plurality of devices, the predefined resources for the substantial portion of the plurality of devices is determined based on a quality of the RF link and/or available RF links between the individual, device and one or more of the following: the plurality of devices, a plurality of neighboring devices, a plurality of access points, a plurality of gateways and a plurality of devices that within a particular route.

J.8. A method of one or more of J examples, wherein the quality of the RF link is determined by one or more of the following: measuring RSSI (received signal strength indicator), measuring BER (bit error rate), measuring SER (symbol error rate), measuring PER (packet error rate) and predicting link quality based on a mathematical model.

J.9. A method of one or more of J examples, wherein the mathematical model is one or more of the following: RF propagation model, 3D RF propagation model, HATA propagation model, Okumura-HATA propagation model, two-ray propagation model, ground wave propagation model, sky wave propagation model, environmental attenuation model, point to point propagation model, terrain propagation model, city propagation model, ITU model, DAH model, amd Walfisch and Bertoni model.

J.10. A method of one or more of J examples, wherein one or more of the following: the predefined time for the substantial portion of the plurality of devices, the predefined amount of data for the substantial portion of the plurality of devices, the predefined resources for the substantial portion of the plurality of devices are allocated to substantially maximize a ratio of a net system throughput to an available system throughput, wherein one or more of the following: the at least one time, the at least one amount of data and the at least one resource is substantially predefined, predefined or variable; and wherein a ratio of an amount of data originating at an individual device and/or transmitted for use by the individual device to a bandwidth available at the individual device is equal to or less than 10%, 5%, 1%, 0.1%, 0.01%, 0.0001% or 0.00001%.

K.1. A method for determining the identity of a sender device comprised of:

deploying a plurality of devices, wherein a portion of the plurality of devices are capable of transmitting data, wherein at least one individual device from the plurality of devices originates a payload and a signature of the payload;

receiving the data originated at the at least one individual device from the plurality of devices, wherein the data is one or more of the following: payload and a signature of the payload, portion of the payload and a signature of the payload, portion of the payload and a portion of signature of the payload, first portion of the payload and a first portion of signature of the payload, first portion of the payload and a second portion of signature of the payload, a second portion of the payload and the first portion of signature of the payload; and determining the identity of a sender device based on a plurality of payloads originated by the portion of the plurality of devices and at least one signature by performing one or more of the following:

signing a portion or at least a portion of received data and producing a first signature; verifying that the first signature is contained or substantially contained in the received signature; and signing all the portions of received data or substantially all the portions of received data, producing a plurality of second signatures, and producing a third signature wherein the third signature is a function of at least a portion of the plurality of second signatures, and verifying that the third signature matches or substantially matches at least a portion of the received signature.

K.2. A method of one or more of the K examples, wherein the received signature is one or more of the following:

an aggregation of the signatures of the portion of the plurality of devices;

a function of the signatures of the portion of the plurality of devices;

an partial aggregation of the signatures of the portion of the plurality of devices;

a partial function of the signatures of the portion of the plurality of devices;

an aggregation of at least a portion of the signatures of the portion of the plurality of devices; and a function of at least a portion of the signatures of the portion of the plurality of devices.

K.3. A method of one or more of the K examples, wherein the function of at least a portion of the plurality of second signatures is XOR.

K.4. A method of one or more of the K examples, wherein the length of the third signature is less than the aggregated length of the plurality of second signatures.

K.5. A method of one or more of the K examples, wherein payloads from the portion of the plurality of devices are aggregated and signatures on the payloads from the portion of the plurality of devices are not aggregated.

K.6. A method of one or more of the K examples, wherein payloads from the portion of the plurality of devices may be aggregated and signatures on the payloads from the portion of the plurality of devices may not be aggregated K.7. A method of one or more of the K examples, wherein a substantial portion of signatures is calculated using a payload, a substantially unique key and a substantially random value.

K.8. A method of one or more of the K examples, wherein the substantially random value is not transmitted.

K.9. A method of one or more of the K examples, wherein the substantial portion of signatures is calculated using a block cypher.

K.10. A method of one or more of the K examples, wherein the substantial portion of signatures is calculated using a hash function.

L1. A system comprising:

a plurality of devices where a portion of the devices performs at least one predefined action; wherein the at least one predefined action is one or more of the following: transmit a predefined amount of data using a predefined resource; receive a predefined amount of data using a predefined resource; transmit a predefined amount of data using a predefined resource and receive a predefined amount of data using a predefined resource; sleep for a predefined amount of time; and addressing and/or routing information is substantially absent in the data transmitted to the portion of the devices and/or received from the portion of the devices.

L.2. A system comprising: a plurality of devices where a portion of the devices performs at least one predefined action; wherein the at least one predefined action is one or more of the following: transmit a predefined amount of data using a predefined resource; receive a predefined amount of data using a predefined resource; transmit a predefined amount of data using a predefined resource and receive a predefined amount of data using a predefined resource; sleep for a predefined amount of time; and transmit a variable amount of data using a predefined resource and receive a variable amount of data using a predefined resource; and addressing and/or routing information is substantially absent in the data transmitted to the portion of the devices and/or received from the portion of the devices.

L.3. A system comprising: a plurality of devices where five or more of the devices perform at least one predefined action; wherein the at least one predefined action is one or more of the following: transmit a predefined amount of data using a predefined resource; receive a predefined amount of data using a predefined resource; transmit a predefined amount of data using a predefined resource and receive a predefined amount of data using a predefined resource; sleep for a predefined amount of time; and addressing and/or routing information is substantially absent in the data transmitted to the five or more devices and/or received from the five or more devices.

L.4. A system comprising: a plurality of devices where a portion of the devices individually perform at least one predefined action; wherein the at least one predefined action is one or more of the following: transmit a predefined amount of data using a predefined resource; receive a predefined amount of data using a predefined resource; transmit a predefined amount of data using a predefined resource and receive a predefined amount of data using a predefined resource; sleep for a predefined amount of time; and addressing and/or routing information is substantially absent in the data transmitted to the portion of the devices and/or received from the portion of the devices.

L.5. A system comprising: a plurality of devices where a substantial portion of the devices individually perform at least one predefined action; wherein the at least one predefined action is one or more of the following: transmit a predefined amount of data using a predefined resource; receive a predefined amount of data using a predefined resource; transmit a predefined amount of data using a predefined resource and receive a predefined amount of data using a predefined resource; sleep for a predefined amount of time; and addressing and/or routing information is substantially absent in the data transmitted to the portion of the devices and/or received from the portion of the devices.

L.6. A system comprising: a plurality of devices where each device performs at least one predefined action; wherein the at least one predefined action is one or more of the following: transmit a predefined amount of data using a predefined resource; receive a predefined amount of data using a predefined resource; transmit a predefined amount of data using a predefined resource and receive a predefined amount of data using a predefined resource; sleep for a predefined amount of time; and addressing and/or routing information is substantially absent in the data transmitted to each device and/or received from each device.

L.7. A system comprising: at least 5, 10, 20 or 50 devices capable of transmitting and/or receiving data, wherein a substantial portion of the individual devices perform at least one predefined action; wherein the at least one predefined action is one or more of the following: transmit a predefined amount of data using a predefined resource; receive a predefined amount of data using a predefined resource; transmit a predefined amount of data using a predefined resource and receive a predefined amount of data using a predefined resource; sleep for a predefined amount of time; and an addressing and/or routing information is substantially absent in the data transmitted to each device and/or received from each device.

L.8. A system comprising: at least 5, 10, 20 or 50 devices of the system are capable of transmitting and/or receiving data, wherein each of those devices perform at least one predefined action; wherein the at least one predefined action is one or more of the following: transmit a predefined amount of data using a predefined resource; receive a predefined amount of data using a predefined resource; transmit a predefined amount of data using a predefined resource and receive a predefined amount of data using a predefined resource; sleep for a predefined amount of time; and an addressing and/or routing information is substantially absent in the data transmitted to each device and/or received from each device.

L.9. A system comprising: a plurality of devices that are capable of transmitting and/or receiving data, wherein five or more of the devices perform at least one predefined action; wherein the at least one predefined action is one or more of the following: transmit a predefined amount of data using a predefined resource; receive a predefined amount of data using a predefined resource; transmit a predefined amount of data using a predefined resource and receive a predefined amount of data using a predefined resource; sleep for a predefined amount of time; and addressing and/or routing information is substantially absent in the data transmitted to the five or more devices and/or received from the five or more devices.

L.10. A system comprising: a plurality of devices that are capable of transmitting and/or receiving data, wherein three or more of the devices perform at least one predefined action; wherein the at least one predefined action is one or more of the following: transmit a predefined amount of data using a predefined resource; receive a predefined amount of data using a predefined resource; transmit a predefined amount of data using a predefined resource and receive a predefined amount of data using a predefined resource; sleep for a predefined amount of time; wherein address and/or routing information is substantially absent in the data transmitted or received.

L.11. A system comprising: a plurality of devices capable of transmitting and/or receiving data, wherein each device performs at least one predefined action; wherein the at least one predefined action is one or more of the following: transmit a predefined amount of data using a predefined resource; receive a predefined amount of data using a predefined resource; transmit a predefined amount of data using a predefined resource and receive a predefined amount of data using a predefined resource; sleep for a predefined amount of time; wherein address and/or routing information is substantially absent in the data transmitted or received.

L.12. A system comprising: a plurality of devices capable of transmitting and/or receiving data, wherein each device performs at least one predefined action; wherein the at least one predefined action is one or more of the following: transmit a predefined amount of data using a predefined resource; receive a predefined amount of data using a predefined resource; transmit a predefined amount of data using a predefined resource and receive a predefined amount of data using a predefined resource; sleep for a predefined amount of time; wherein address and/or routing information is substantially absent in the data transmitted or received and the address of each device and/or the routing information is determined for each device by one or More of the following: the predefined actions, the predefined amount of data and the predefined resources.

L.13. A system comprising: a plurality of devices, wherein a substantial portion of the individual devices perform at least one predefined action; wherein the at least one predefined action is one or more of the following: transmit a predefined amount of data using a predefined resource; receive a predefined amount of data using a predefined resource; transmit a predefined amount of data using a predefined resource and receive a predefined amount of data using a predefined resource; sleep for a predefined amount of time;

wherein address and/or routing information is substantially absent in the data transmitted and/or received, wherein the address of individual devices and/or the routing information is established and/or derived based on a set of information about at least a portion of the system, and the set of information includes one or more of the following: one or more predefined actions, one or more predefined amounts of data and one or more predefined resources, and wherein the set of information is available for use at one or more of the following: individual devices, a central computer, a cloud computing resource and a plurality of computing devices.

L.14. A system comprising: a plurality of devices, wherein a substantial portion of the individual devices perform at least one predefined action; wherein the at least one predefined action is one or more of the following: transmit a predefined amount of data using a predefined resource; receive a predefined amount of data using a predefined resource; transmit a predefined amount of data using a predefined resource and receive a predefined amount of data using a predefined resource; sleep for a predefined amount of time;

wherein the predefined resources are one or more of the following: frequency channel, spreading code sequence, starting position in spreading code, frequency hopping sequence, time slot and FDD bins;

wherein address and/or routing information is substantially absent in the data transmitted and/or received, wherein the address of individual devices and/or the routing information is established and/or derived based on a set of information pertaining to at least a portion of the system, and the set of information includes one or more of the following: one or more predefined actions, one or more predefined amounts of data and one or more predefined resources, and wherein the set of information is available for use at one or more of the following: individual devices, a central computer, a cloud computing resource and a plurality of computing devices.

L.15. A system comprising:

at least 5, 25, 50, 100, 500 or 1000 of devices, wherein a substantial portion of individual devices perform at least one predefined action; wherein the at least one predefined action is one or more of the following: transmit a predefined amount of data using a predefined resource; receive a predefined amount of data using a predefined resource; transmit a predefined amount of data using a predefined resource and receive a predefined amount of data using a predefined resource; sleep for a predefined amount of time;

wherein address and/or routing information is substantially absent in the data transmitted and/or received, wherein the address of the individual devices and/or the routing information is established and/or derived based on a set of information about at least a portion of the system, and the set of information includes one or more of the following: one or more predefined actions, one or more predefined amounts of data and one or more predefined resources, and wherein the set of information is available for use at one or more of the following: individual devices, a central computer, a cloud computing resource and a plurality of computing devices.

L.16. A system comprising:

at least 500, 5000, 20,000 or 100,000 of devices, wherein a substantial portion of individual devices perform at least one predefined action; wherein the at least one predefined action is one or more of the following: transmit a predefined amount of data using a predefined resource; receive a predefined amount of data using a predefined resource; transmit a predefined amount of data using a predefined resource and receive a predefined amount of data using a predefined resource; sleep for a predefined amount of time;

wherein address and/or routing information is substantially absent in the data transmitted and/or received;

wherein the address of the individual devices and/or the routing information is established and/or derived based on a set of information about at least a portion of the system, and the set of information includes one or more of the following: one or more predefined actions, one or more predefined amounts of data and one or more predefined resources; and wherein the set of information is available for use at one or more of the following: individual devices, a central computer, a cloud computing resource and a plurality of computing devices.

L.17. A system comprising:

at least 50,000, 500,000, 1 million or 5 million devices, wherein a substantial portion of individual devices perform at least one predefined action; wherein the at least one predefined action is one or more of the following: transmit a predefined amount of data using a predefined resource; receive a predefined amount of data using a predefined resource; transmit a predefined amount of data using a predefined resource and receive a predefined amount of data using a predefined resource; sleep for a predefined amount of time;

wherein address and/or routing information is substantially absent in the data transmitted and/or received;

wherein the address of the individual devices and/or the routing information is established and/or derived based on a set of information about at least a portion of the system, and the set of information includes one or more of the following: one or more predefined actions, one or more predefined amounts of data and one or more predefined resources; and wherein the set of information is available for use at one or more of the following: individual devices, a central computer, a cloud computing resource and a plurality of computing devices.

L.18. A system comprising:

a plurality of devices where five or more of the devices perform at least one predefined action; wherein the at least one predefined action is one or more of the following: transmit a variable amount of data using a predefined resource; receive a variable amount of data using a predefined resource; and transmit a variable amount of data using a predefined resource and receive a variable amount of data using a predefined resource; and addressing and/or routing information is substantially absent in the data transmitted to the five or more devices and/or received from the five or more devices.

L.19. A system comprising:

a plurality of devices where five or more of the devices perform at least one predefined action; wherein the at least one predefined action is one or more of the following: transmit a predefined amount of data using a variable resource; receive a predefined amount of data using a predefined resource; and transmit a predefined amount of data using a variable resource and receive a predefined amount of data using a variable resource; and addressing and/or routing information is substantially absent in the data transmitted to the five or more devices and/or received from the five or more devices.

L.20. A system comprising:

a plurality of devices where five or more of the devices perform at least one predefined action; wherein the at least one predefined action is one or more of the following: transmit a variable amount of data using a variable resource; receive a variable amount of data using a variable resource; and transmit a variable amount of data using a variable resource and receive a variable amount of data using a variable resource; and addressing and/or routing information is substantially absent in the data transmitted to the five or more devices and/or received from the five or more devices.

L.21. A system comprising:

a plurality of devices where a portion of the devices individually perform at least one predefined action; wherein the at least one predefined action is one or more of the following: transmit a variable amount of data using a predefined resource; receive at variable times a predefined amount of data using a predefined resource; and transmit a variable amount of data using a predefined resource and receive a variable amount of data using a predefined resource; and addressing and/or routing information is substantially absent in the data transmitted to the portion of the devices and/or received from the portion of the devices.

L.22. A system comprising:
a plurality of devices where a portion of the devices individually perform at least one predefined action; wherein the at least one predefined action is one or more of the following: transmit a predefined amount of data using a variable resource; receive a predefined amount of data using a variable resource; and transmit a predefined amount of data using a variable resource and receive a predefined amount of data using a variable resource; and addressing and/or routing information is substantially absent in the data transmitted to the portion of the devices and/or received from the portion of the devices.

L.23. A system comprising:
a plurality of devices where a portion of the devices individually perform at least one predefined action; wherein the at least one predefined action is one or more of the following: transmit a variable amount of data using a variable resource; receive a variable amount of data using a variable resource; and transmit a variable amount of data using a variable resource and receive a variable amount of data using a variable resource; and addressing and/or routing information is substantially absent in the data transmitted to the portion of the devices and/or received from the portion of the devices.

L.24. A system comprising:
a plurality of devices where each device performs at least one predefined action; wherein the at least one predefined action is one or more of the following: transmits a variable amount of data using a predefined resource; receives a variable amount of data using a predefined resource; and transmits a variable amount of data using a predefined resource and receives a variable amount of data using a predefined resource; and addressing and/or routing information is substantially absent in the data transmitted to each device and/or received from each device.

L.25. A system comprising:
a plurality of devices where each device performs at least one predefined action; wherein the at least one predefined action is one or more of the following: transmits a predefined amount of data using a variable resource; receives a predefined amount of data using a variable resource; and transmits a predefined amount of data using a variable resource and receives a predefined amount of data using a variable resource; and addressing and/or routing information is substantially absent in the data transmitted to each device and/or received from each device.

L.26. A system comprising:
a plurality of devices where each device performs at least one predefined action; wherein the at least one predefined action is one or more of the following: transmits a variable amount of data using a variable resource; receives a variable amount of data using a variable resource; and transmits a variable amount of data using a variable resource and receives a variable amount of data using a variable resource; and addressing and/or routing information is substantially absent in the data transmitted to each device and/or received from each device.

L.27. A system comprising:
a plurality of devices that are capable of transmitting and/or receiving data; and the plurality of devices communicate within the network via multiple hops; wherein addressing and/or routing information is substantially absent in the data transmitted to the portion of the devices and/or received from the portion of the devices.

L.28. The system of one or more of the above L examples, wherein the plurality of devices comprise: sensor devices and controller devices.

L.29. The system of one or more of the above L examples, wherein the plurality of the devices is at least 5, 10, 20, 50 or 500 devices.

L.30. The system of one or more of the above L examples, wherein the portion of the devices is at least 5, 10, 20, 50 or 500 devices.

L.31. The system of one or more of the above L examples, wherein the plurality of the devices is at least 5, 10, 20, 50 or 500 devices and the portion of the devices is at least 5, 10, 20, 50 or 500 devices.

L.32. The system of one or more of the above L examples, wherein the routing information is determined for the individual devices by one or more of the following: the predefined actions, the predefined amount of data and the predefined resources.

L.33. The system of one or more of the above L examples, wherein the address of individual devices and/or the routing information is established and/or derived based on a set of information about at least a portion of the system, and the set of information includes one or more of the following: one or more predefined actions, one or more predefined amounts of data and one or more predefined resources.

L.34. The system of one or more of the above L examples, wherein the system further comprises a computer and the computer is one or more of the following: individual devices, a central computer, a cloud computing resource and a plurality of computing devices.

L.35. The system of one or more of the above L examples, wherein the predefined resources are one or more of the following: frequency channel, spreading code sequence, starting position in spreading code, frequency hopping sequence, time slot and FDD bins.

L.36. The system of one or more of the above L examples, wherein the address of individual devices and/or the routing information is established and/or derived based on a set of information pertaining to at least a portion of the system, and the set of information includes one or more of the following: one or more predefined actions, one or more predefined amounts of data and one or more predefined resources.

L.37. The system of one or more of the above L examples, wherein the plurality of the devices is at least 5, 25, 50, 100, 500 or 1000 devices, and the substantial portion of individual devices perform at least one predefined action; wherein the at least one predefined action is one or more of the following: transmit a predefined amount of data using a predefined resource; receive a predefined amount of data using a predefined resource; and transmit a predefined amount of data using a predefined resource and receive a predefined amount of data using a predefined resource; and addressing and/or routing information is substantially absent in the data transmitted to the substantial portion of the devices and/or received from the substantial portion of the devices.

L.38. The system of one or more of the above L examples, wherein the plurality of the devices is at least 500, 5000, 20,000 or 100,000 of devices and the substantial portion of individual devices perform at least one predefined action;

wherein the at least one predefined action is one or more of the following: transmit a predefined amount of data using a predefined resource; receive a predefined amount of data using a predefined resource; and transmit a predefined amount of data using a predefined resource and receive a predefined amount of data using a predefined resource; and addressing and/or routing information is substantially absent in the data transmitted to the substantial portion of the devices and/or received from the substantial portion of the devices.

L.39. The system of one or more of the above L examples, wherein the plurality of the devices is at least 50,000, 500,000, 1 million or 5 million devices and the substantial portion of individual devices perform at least one predefined action; wherein the at least one predefined action is one or more of the following: transmit a predefined amount of data using a predefined resource; receive a predefined amount of data using a predefined resource; and transmit a predefined amount of data using a predefined resource and receive a predefined amount of data using a predefined resource; and addressing and/or routing information is substantially absent in the data transmitted to the substantial portion of the devices and/or received from the substantial portion of the devices.

L.40. The system of one or more of the above L examples, wherein one or more of the predefined actions, one or more of the predefined amounts of data and/or one or more of the predefined resources is calculated using a predefined set of rules and/or a predefined set of instructions.

L.41. The system of one or more of the above L examples, wherein one or more of the predefined actions, one or more of the predefined amounts of data and/or one or more of the predefined resources is calculated using the predefined set of rules and/or the predefined set of instructions based at least in part on a predefined initial state and/or a seed value.

L.42. The system of one or more of the above L examples, wherein the amount of data originating at the individual device is equal to or less than 1 bit, 8 bits, 16 bits or 48 bits.

L.43. The system of one or more of the above L examples, wherein the amount of data originating at the individual device and/or transmitted for use by the individual device is equal to or less than 1 bit, 8 bits, 16 bits or 48 bits.

L.44. The system of one or more of the above L examples, wherein the amount of data originating at the individual device and/or transmitted for use by the individual device is equal to or less than 1 byte, 4 bytes, 16 bytes or 48 bytes.

L.45. The system of one or more of the above L examples, wherein the amount of data originating at the individual device and/or transmitted for use by the individual device is equal to Or more than 1 bit, 8 bits, 16 bits or 48 bits.

L.46. The system of one or more of the above L examples, wherein the amount of data originating at the individual device and/or transmitted for use by the individual device is equal to or more than 1 byte, 4 bytes, 16 bytes or 48 bytes.

L.47. The system of one or more of the above L examples, wherein the amount of data transmitted and/or received at the individual device is at least 100 bytes, 1000 bytes, 16,000 bytes or 48,000 bytes.

L.48. The system of one or more of the above L examples, wherein the amount of data from a second device is appended to the data received from a first device and is transmitted to the third device.

L.49. The system of one or more of the above L examples, wherein the amount of data originating at a device is appended to the data received from at least 5, 25, 100, 500, 1000, 10,000 or 1,000,000 other devices at the device and the aggregated data from the devices is transmitted to at least one next device.

L.50. The system of one or more of the above L examples, wherein the amount of data originating at a device is appended to the data received from at least 5, 25, 100, 500, 1000, 10,000 or 1,000,000 other devices at the device and the aggregated data from the devices is transmitted to at least one gateway.

L.51. The system of one or more of the above L examples, wherein the predefined amounts of data intended for a selected portion of the devices on the network is transmitted from the gateway to at least one first device, and the at least one first device performs one or more of the following: forwards the predefined amounts of data to at least one second device; extracts a predefined amount of data and forwards the predefined amounts of data to at least one second device; extracts a predefined amount of data, extracts a portion of the predefined amount of data and forwards the remaining portion of the predefined amounts of data to at least a second device; extracts a portion of the predefined amount of data and forwards at least a first, second or third portion of the remaining predefined amounts of data to at least a second, third or fourth device; extracts a portion of the predefined amount of data and forwards to one or more of the at least a first, second or third portions of the remaining predefined amounts of data to one or more other devices, wherein the structure and sequencing of the predefined amounts of data is modified.

L.52. The system of one or more of the above L examples, wherein a ratio of the amount of data originating at the individual device and/or transmitted for use by the individual device to a bandwidth available at the individual device is equal to or less than 10%, 5%, 1%, 0.1%, 0.01%, 0.0001% or 0.00001%.

L.53. The system of one or more of the above L examples, wherein a ratio of the amount of data originating at the individual device and/or transmitted for use by the individual device to a bandwidth available at the individual device is between 10% to 0.00001%, 5% to 0.0001%, 1% to 0.001%, 0.1% to 0.0001%, 0.003% to 0.012%, 0.0003% to 0.0012%, 1% to 0.0003% or 0.00003% to 0.0015%.

L.54. The system of one or more of the above L examples, wherein a ratio of the amount of data originating at the individual device and/or transmitted for use by the individual device to a bandwidth available at the at least one gateway is equal to or less than 10%, 5%, 1%, 0.1%, 0.01%, 0.0001% or 0.00001%.

L.55. The system of one or more of the above L examples, wherein a ratio of the amount of data originating at the individual device and/or transmitted for use by the individual device to a bandwidth available at the at least one gateway is between 10% to 0.00001%, 5% to 0.0001%, 1% to 0.001%, 0.1% to 0.0001%, 0.003% to 0.012%, 0.0003% to 0.0012%, 1% to 0.0003% or 0.00003% to 0.0015%.

L.56. The system of one or more of the above L examples, wherein the individual device originates amounts of data {Dk}, at times {Tk}, and the available data rate {Rt} at the individual device is B, and $$R_t = \sum \frac{D_k}{T_{k+1} - T_k} / B,$$

and Rt is equal to or less than 10%, 5%, 1%, 0.1%, 0.01%, 0.0001% or 0.00001%.

L.57. The system of one or more of the above L examples, wherein {Dk} are amounts of data transmitted for use by the individual device, {Tk}, and the available data rate {Rr} at the individual device is B, and $$R_r = \sum \frac{D_k}{T_{k+1} - T_k} / B,$$

and Rr is equal to or less than 10%, 5%, 1%, 0.1%, 0.01%, 0.0001% or 0.00001%.

L.58. The system of one or more of the above L examples, wherein Rt and/or Rr are between 10% to 0.00001%, 5% to 0.0001%, 1% to 0.001%, 0.1% to 0.0001%, 0.003% to 0.012%, 0.0003% to 0.0012%, 1% to 0.0003% or 0.00003% to 0.0015%.

L.59. The system of one or more of the above L examples, wherein B is bandwidth available at the at least one gateway, and Rt and/or Rr are equal to or less than 10%, 5%, 1%, 0.1%, 0.01%, 0.0001% or 0.00001%.

L.60. The system of one or more of the above L examples, wherein B is bandwidth available at the at least one gateway, and Rt and/or Rr are between 10% to 0.00001%, 5% to 0.0001%, 1% to 0.001%, 0.1% to 0.0001%, 0.003% to 0.012%, 0.0003% to 0.0012%, 1% to 0.0003% or 0.00003% to 0.0015%.

L.61. The system of one or more of the above L examples, wherein the ratio of an aggregated amount of data transmitted and/or received at the at least one gateway to the available bandwidth at the at least one gateway is at least 10%, 25%, 50%, 75%, 90%, 95%, 98%, 99%, 99.5%, 99.9%, 99.99% or 99.999%.

L.62. The system of one or more of the above L examples, wherein the available bandwidth is approximately equal to or at least 1/128, 1/64, 1/16, 1/8, 1/4, 1/2 or 1 of the total bandwidth.

L.63. The system of one or more of the above L examples, wherein the available bandwidth is between 0.4% to 100%, 0.8% to 100%, 1.5% to 100%, 3.1% to 100%, 6% to 100%, 12% to 100%, 25% to 100%, 50% to 100%, 75% to 100%, 90% to 100%, 25% to 75%, 0.4% to 12%, 3.1% to 25% or 6% to 50% of the total bandwidth.

L.64. The system of one or more of the above L examples, wherein each device or the substantial portion of individual devices extract information that is transmitted for use at the individual device by using one or more predefined offsets and/or one or more predefined amounts of data.

L.65. The system of one or more of the above L examples, wherein a substantial portion of the individual devices transmit and/or receive for a predefined period of time.

L.66. The system of one or more of the above L examples, wherein the predefined period of time is at least 1 nanosecond, 10 nanoseconds or 100 nanoseconds.

L.67. The system of one or more of the above L examples, wherein the predefined period of time is at most 1 nanosecond, 10 nanoseconds or 100 nanoseconds.

L.68. The system of one or more of the above L examples, wherein the predefined period of time is at least 1 microsecond, 10 microseconds or 100 microseconds.

L.69. The system of one or more of the above L examples, wherein the predefined period of time is at most 1 microsecond, 10 microseconds or 100 microseconds.

L.70. The system of one or more of the above L examples, wherein the predefined period of time is at least 1 millisecond, 10 milliseconds or 100 milliseconds.

L.71. The system of one or more of the above L examples, wherein the predefined period of time is at most 1 millisecond, 10 milliseconds or 100 milliseconds.

L.72. The system of one or more of the above L examples, wherein the predefined period of time is at least 1 second, 10 seconds or 100 seconds.

L.73. The system of one or more of the examples, wherein the predefined period of time is at most 1 second, 10 seconds or 100 seconds.

L.74. The system of one or more of the above L examples, wherein the predefined period of time is at least 1 millisecond, 10 milliseconds or 100 milliseconds and an amount of data is variable.

L.75. The system of one or more of the above L examples, wherein the time period is predefined and the amount of data is variable.

L.76. The system of one or more of the above L examples, wherein the amount of data is substantially the same and/or variable.

L.77. The system of one or more of the above L examples, wherein a resource is substantially the same and/or variable.

L.78. The system of one or more of the above L examples, wherein one or more of the following: the predefined action for a substantial portion of the plurality of devices, the predefined amount of data for a substantial portion of the plurality of devices, the predefined resources for a substantial portion of the plurality of devices are determined by the central computer, the cloud computing resource and/or the plurality of computing devices.

L.79. The system of one or more of the above L examples, wherein the plurality of computing devices are at least a portion of the plurality of devices.

L.80. The system of one or more of the above L examples, wherein a substantial portion of the plurality of computing devices are capable of communicating with at least one other computing device.

L.81. The system of one or more of the above L examples, wherein one or more of the following: the predefined action for the substantial portion of the plurality of devices, the predefined amount of data for the substantial portion of the plurality of devices, the predefined resources for the substantial portion of the plurality of devices is determined based on one or more of the following: required and/or desired periodicity of data to be transmitted for each device or the substantial portion of the plurality of devices, required and/or desired amount of data to be transmitted and/or received for each device or the substantial portion of the plurality of devices required and/or desired resources for each device or the substantial portion of the plurality of devices.

L.82. The system of one or more of the above L examples, wherein one or more of the following: the predefined action for the substantial portion of the plurality of devices, the predefined amount of data for the substantial portion of the plurality of devices, the predefined resources for the substantial portion of the plurality of devices is determined based on one or more of the following: required and/or desired latency of data to be received from and/or transmitted to each device or the substantial portion of the plurality of devices, required and/or desired amount of data to be transmitted and/or received for each device or the substantial portion of the plurality of devices, required and/or desired resources for each device or the substantial portion of the plurality of devices.

L.83. The system of one or more of the above L examples, wherein one or more of the following: the predefined action for the substantial portion of the plurality of devices, the predefined amount of data for the substantial portion of the plurality of devices, the predefined resources for the substantial portion of the plurality of devices is determined based on one or more of the following:

minimal latency and/or period of data to be received from each device or the substantial portion of the plurality of devices;

minimal application specific latency and/or period of data to be received from each device or the substantial portion of the plurality of devices;

minimal latency and/or period of data to be transmitted to each device or the substantial portion of the plurality of devices;

minimal application specific latency and/or period of data to be transmitted to each device or the substantial portion of the plurality of devices;

maximal latency and/or period of data to be received from each device or the substantial portion of the plurality of devices;

maximal application specific latency and/or period of data to be received from each device or the substantial portion of the plurality of devices;

maximal latency and/or period of data to be, transmitted to each device or the substantial portion of the plurality of devices;

maximal application specific latency and/or period of data to be transmitted to each device or the substantial portion of the plurality of devices;

required amount of data to be transmitted and/or received for each device or the substantial portion of the plurality of devices;

application specific amount of data to be transmitted and/or received for each device or the substantial portion of the plurality of devices;

required resources for each device or the substantial portion of the plurality of devices;

application specific resources for each device or the substantial portion of the plurality of devices;

required functionality of each device or the substantial portion of the plurality of devices; and application specific functionality of each device or the substantial portion of the plurality of devices.

L.84. The system of one or more of the above L examples, wherein one or more of the following: the predefined action for the substantial portion of the plurality of devices, the predefined amount of data for the substantial portion of the plurality of devices, the predefined resources for the substantial portion of the plurality of devices is determined based on a physical location of each device or the substantial portion of the plurality of devices.

L.85. The system of one or more of the above L examples, wherein one or more of the following: the predefined action for the substantial portion of the plurality of devices, the predefined amount of data for the substantial portion of the plurality of devices, the predefined resources for the substantial portion of the plurality of devices is determined based on a relative location of each device or the substantial portion of the plurality of devices, wherein the location is relative to one or more of the following: gateway, access point, neighboring devices, intentional interferer and non-intentional interferer.

L.86. The system of one or more of the above L examples, wherein one or more of the following: the predefined action for the substantial portion of the plurality of devices, the predefined amount of data for the substantial portion of the plurality of devices, the predefined resources for the substantial portion of the plurality of devices is determined based on a quality of the RF link and/or available RF links between the individual device and one or more of the following: the plurality of devices, a plurality of neighboring devices, a plurality of access points, a plurality of gateways and a plurality of devices that within a particular route.

L.87. The system of one or more of the above L examples, wherein the quality of the RF link is determined by one or more of the following: measuring RSSI (received signal strength indicator), measuring BER (bit error rate), measuring SER (symbol error rate), measuring PER (packet error rate) and predicting link quality based on a mathematical model.

L.88. The system of one or more of the above L examples, wherein the mathematical model is one or more of the following: RF propagation model, 3D RF propagation model, HATA propagation model, Okumura-HATA propagation model, two-ray propagation model, ground wave propagation model, sky wave propagation model, environmental attenuation model, point to point propagation model, terrain propagation model, city propagation model, ITU model, DAH model, amd Walfisch and Bertoni model.

L.89. The system of one or more of the above L examples, wherein the substantial portion of the plurality of devices form a mesh network.

L.90. The system of one or more of the above L examples, wherein the plurality of devices form a mesh network.

L.91. The system of one or more of the above L examples, wherein the substantial portion of the plurality of devices are substantially fixed in their physical location.

L.92. The system of one or more of the above L examples, wherein the substantial portion of the plurality of devices are fixed in their physical location.

L.93. The system of one or more of the above L examples, wherein at least 40%, 60%, 80%, 90%, 95% or 98% of the plurality of devices are fixed in their physical location.

L.94. The system of one or more of the above L examples, wherein a portion the plurality of devices is configured to form a short loop sub-network and the first device in the short loop sub-network may replace portion of the data received on the down-link with new data and send the modified data, and a second device in the short loop sub-network may retrieve the data sent by the first device.

L.95. The system of one or more of the above L examples, wherein the first device in the short loop sub-network encrypts the new data and the second device in the short loop sub-network decrypts the new data.

L.96. The system of one or more of the above L examples, wherein the first device in the short loop sub-network uses substantially dedicated DRBG to encrypt the new data and the second device in the short loop sub-network uses substantially dedicated DRBG to decrypt the new data.

L.97. The system of one or more of the above L examples, wherein the first device in the short loop sub-network appends signature on the new data and the second device in the short loop sub-network verifies the signature on the new data.

L.98. The system of one or more of the above L examples, wherein the first device in the short loop sub-network appends signature on the new data and sends at least a portion of the appended signature in at least one of the following frames.

L.99. The system of one or more of the above L examples, wherein portion of the devices is configured to use a predefined resource based on mathematical formula.

L.100. The system of one or more of the above L examples, wherein portion of the devices is configured to use a predefined resource based on mathematical formula and mathematical formula includes cycle number.

L.101. The system of one or more of the above L examples, wherein portion of the devices is configured to use a predefined resource based on mathematical formula and mathematical formula includes time slot number.

L.102. The system of one or more of the above L examples, wherein portion of the devices is configured to use a predefined resource based on mathematical formula and mathematical formula includes cycle number and time slot number.

L.103. The system of one or more of the above L examples, wherein at least a substantial portion of the interconnections within the network are determined by one or more of the following: the central computer, the cloud computing resource, manually, and the plurality of computing devices.

L.104. The system of one or more of the above L examples, wherein a substantial portion of a plurality of the routes within the network are determined by one or more of the following: the central computer, the cloud computing resource manually, and the plurality of computing devices.

L.105. The system of one or more of the above L examples, wherein at least a substantial portion of the interconnections within the network are determined by one or more of the following: the plurality of computing devices where none of the plurality of computing devices are in communication other computing devices; the plurality of computing devices where a substantial portion of the plurality of computing devices are in communication with a substantial portion of other computing devices; the plurality of computing devices where a portion of the plurality of computing devices are in communication with a portion of other computing devices; and the plurality of computing devices where the substantial portion of the plurality of computing devices are not in communication with other computing devices.

L.106. The system of one or more of the above L examples, wherein at least a substantial portion of the interconnections within the network are determined by one or more of the following: the central computer, at least two central computers, the central computer in communication with at least one other computer and at least two computers in communication with at least one other computer.

L.107. The system of one or more of the above L examples, wherein at least a substantial portion of the routes within the network are determined by one or more of the following: the plurality of computing devices where none of the plurality of computing devices are in communication other computing devices; the plurality of computing devices where the substantial portion of the plurality of computing devices are in communication with a substantial portion of other computing devices; the plurality of computing devices where a portion of the plurality of computing devices are in communication with a portion of other computing devices; and the plurality of computing devices where a substantial portion of the plurality of computing devices are not in communication with other computing devices.

L.108. The system of one or more of the above L examples, wherein at least a substantial portion of the routes within the network are determined by one or more of the following: the central computer, at least two central computers, the central computer in communication with at least one other computer and at least two computers in communication with at least one other computer.

L.109. The system of one or more of the above L examples, wherein at least one central computer and/or computing device is the cloud computing resource L.110. The system of one or more of the above L examples, wherein interconnections within at least a substantial portion of the network, are determined based on one or more of the following:
quality of the available RF links between the substantial portion of the devices making up the network;
quality of the available RF links between the substantial portion of the devices on at least one route;
required battery life for the individual devices, or the substantial portion of individual devices;
acceptable battery life for the individual devices, or the substantial portion of individual devices;
whether the individual devices, or the substantial portion of individual devices is battery powered or have a constant supply of power;
the number of hops between the individual devices, or the substantial portion of individual devices, and the at least one gateway;
the number of hops in the selected or potential route;
aggregated bandwidth in the selected or potential route;
peak aggregated bandwidth in the selected or potential route;
minimal application specific period and/or latency in the selected or potential route;
minimal required period and/or latency in the selected or potential route;
maximal application specific period and/or latency in the selected or potential route;
maximal required period and/or latency in the selected or potential route; and availability of alternative route.

L.111. The system of one or more of the above L examples, wherein routes within at least a substantial portion of the network are determined based on one or more of the following:
quality of the available RF links between the substantial portion of the devices making up the network;
quality of the available RF links between the substantial portion of the devices on at least one route;
required battery life for the individual devices, or the substantial portion of individual devices;
acceptable battery life for the individual devices, or the substantial portion of individual devices;
whether the individual devices, or the substantial portion of individual devices is battery powered or have a constant supply of power;
the number of hops between the individual devices, or the substantial portion of individual devices, and the at least one gateway;
the number of hops in the selected or potential route;
aggregated bandwidth in the selected or potential route;
peak aggregated bandwidth in the selected or potential route;
minimal desired period and/or latency in the selected or potential route;
minimal required period and/or latency in the selected or potential route;
maximal application specific period and/or latency in the selected or potential route;
maximal required period and/or latency in the selected or potential route; and
availability of alternative route.

L.112. The system of one or more of the above L examples, wherein network maintenance data is embedded into transmitted data and detected by the at least one receiving device.

L.113. The system of one or more of the above L examples, wherein network maintenance data is directed to one or more of the following: the individual device; at least one individual device; a portion of the individual devices; a substantial portion of the individual devices; individual devices on a particular route; individual devices on a portion of a particular routes; individual devices on at least a portion of the plurality of routes; and individual devices on a substantial portion of the plurality of routes.

L.114. The system of one or more of the above L examples, wherein in substantial amount of occasions a broken link is fixed by changing routing and/or updating configuration of one, two or substantially small number of devices.

L.115. The system of one or more of the above L examples, wherein substantially small number of devices is less than 10, 9, 8, 7, 6, 5, 4 or 3.

L.116. The system of one or more of the above L examples, wherein resources are allocated so that a broken link is avoided by rerouting and/or reconfiguring one or more devices in close proximity to the broken link.

L.117. The system of one or more of the above L examples, wherein the devices in close proximity to the broken link are no more than 10, 5, 3, 2, 1 or zero hops from the broken link.

L.118. The system of one or more of the above L examples, wherein the system includes at least one gateway.

L.119. The system of one or more of the above L examples, wherein the system includes one gateway.

L.120. The system of one or more of the above L examples, wherein the system includes at least one gateway that is configured by one or more of the following: the central computer, at least two central computers, the central computer in communication with at least one other computer and at least two computers in communication with at least one other computer.

L.121. The system of one or more of the above L examples, wherein the system includes at least one gateway and the at least one device in communication with the at least one gateway are configured by one or more of the following: the central computer, at least two central computers, the central computer in communication with at least one other computer and at least two computers in communication with at least one other computer.

L.122. The system of one or more of the above L examples, wherein the system includes at least one gateway and the plurality of devices in direct or indirect communication with the at least one gateway are configured by one or more of the following: the central computer, at least two central computers, the central computer in communication with at least one other computer and at least two computers in communication with at least one other computer.

L.123. The system of one or more of the above L examples, wherein the system includes at least two networks; the first at least one network includes at least one first gateway and a first collection of a plurality of devices in direct or indirect communication with the at least one first gateway; and the second at least one network includes at least one second gateway and a second collection of a plurality of devices in direct or indirect communication with the at least one second gateway; and the first at least one network and the second at least one network are configured by one or more of the following: the central computer, at least two central computers, the central computer in communication with at least one other computer and at least two computers in communication with at least one other computer such that interference between the first at least one network and the second at least one network is substantially reduced or eliminated.

L.124. The system of one or more of the above L examples, wherein the computer is capable of determining at least an approximate location of at least one first device of the plurality of devices, wherein the location is determined based on one or more of the following: a location of at least one second device of the plurality of devices and a quality of links within a portion of the network formed by the plurality of devices.

L.125. The system of one or more of the above L examples, wherein the computer is capable of determining at least an approximate location of a portion of the individual devices of the plurality of devices, wherein the location is determined based on one or more of the following: a location of at least one other device of the plurality of devices and a quality of links within a portion of the network formed by the plurality of devices.

L.126. The system of one or more of the above L examples, wherein the computer is capable of determining at least an approximate location of a substantial portion of the individual devices of the plurality of devices, wherein the location is determined based on one or more of the following: a location of at least one other device of the plurality of devices and a quality of links within a portion of the network formed by the plurality of devices.

L.127. The system of one or more of the above L examples, wherein the portion of the plurality of devices are one or more of the following: feedback devices, sensors and controllers.

L.128. The system of one or more of the above L examples, wherein the portion of the plurality of devices are associated with one or more of the following: feedback devices, sensors and controllers.

L.129. The system of one or more of the above L examples, wherein the substantial portion of the plurality of devices are one or more of the following: feedback devices, sensors and controllers.

L.130. The system of one or more of the above L examples, wherein the substantial portion of the plurality of devices are associated with one or more of the following: feedback devices, sensors and controllers.

L.131. The system of one or more of the above L examples, wherein the computer is capable of one or more of the following:
receiving data, wherein a received data is one or more of the following: a data originated by at least one sensor from a plurality of sensors, a data originated by at least one controller from a plurality of controllers, a collection of data originated by a portion of sensors from the plurality of sensors and a collection of data originated by a portion of controllers from the plurality of controllers;
creating a data to be sent to one or more of the following: a plurality of sensors and a plurality of controllers; and
sending data to one or more of the following: a plurality of sensors and a plurality of controllers.

L.132. The system of one or more of the above L examples, wherein the computer is capable of performing one or more of the following: storing the received data, calculating data based on one or more of the following: the received data, the stored data, an external data and calculated data; analyzing one or more of the following: the received data, the stored data, the external data and the calculated data.

L.133. The system of one or more of the above L examples, wherein the data to be sent is created based on one or more of the following: the received data, the stored data, the calculated data, the external data and the result of analyzing the data.

L.134. The system of one or more of the above L examples, wherein the plurality of sensors and/or controllers are installed in at least one site.

L.135. The system of one or more of the above L examples, wherein the plurality of sensors and/or controllers are installed in a plurality of sites.

L.136. The system of one or more of the above L examples, wherein the system is used to manage energy of one or more of the following: individual sites, a plurality of sites, and a portion of the plurality of sites.

L.137. The system of one or more of the above L examples, wherein the system is used to manage energy of one or more of the following: a building, a portion of a building, a structure, a portion of a structure, an infra-structure, a portion of an infra-structure, a plurality of buildings, a plurality of structures, a plurality of infra-structures, a city, a portion of a city, a region, a portion of a region.

L.138. The system of one or more of the above L examples, wherein the computer improves energy efficiency of one or more of the following: individual sites, the plurality of sites, and the portion of the plurality of sites.

L.139. The system of one or more of the above L examples, wherein the computer improves energy efficiency of one or more of the following: a building, a portion of a building, a structure, a portion of a structure, an infra-structure, a portion of an infra-structure, a plurality of buildings, a plurality of structures, a plurality of infra structures, a city, a portion of a city, a region, a portion of a region.

L.140. The system of one or more of the above L examples, wherein the computer improves an aggregated energy efficiency of the portion of the plurality of sites.

L.141. The system of one or more of the above L examples, wherein the energy efficiency is improved during peak hours.

L.142. The system of one or more of the above L examples, wherein the computer reduces one or more of the following: peak energy consumption and peak current consumption, of one or more of the following: individual sites, the plurality of sites and the portion of the plurality of sites.

L.143. The system of one or more of the above L examples, wherein the computer reduces one or more of the following: peak energy consumption and peak current consumption, of one or more of the following: a building, a portion of a building, a structure, a portion of a structure, an infra-structure, a portion of an infra-structure, a plurality of buildings, a plurality of structures, a plurality of infra-structures, a city, a portion of a city, a region, a portion of a region.

L.144. The system of one or more of the above L examples, wherein the computer reduces one or more of the following: aggregated peak energy consumption and aggregated peak current consumption of the portion of the plurality of sites.

L.145. The system of one or more of the above L examples, wherein the computer generates instructions to a portion of the controllers that result in reduction of one or more of the following: aggregated peak energy consumption and aggregated peak current consumption, of the portion of the plurality of sites during peak hours.

L.146. The system of one or more of the above L examples, wherein the computer generates energy usage reports of one or more of the following: individual sites, the plurality of sites and the portion of the plurality of sites.

L.147. The system of one or more of the above L examples, wherein the computer generates energy usage reports of one or more of the following: a building, a portion of a building, a structure, a portion of a structure, an infra-structure, a portion of an infra-structure, a plurality of buildings, a plurality of structures, a plurality of infra-structures, a city, a portion of a city, a region, a portion of a region.

L.148. The system of one or more of the above L examples, wherein the computer monitors energy and/or current consumption in one or more of the following: individual sites, the plurality of sites and the portion of the plurality of sites.

L.149: The system of one or more of the above L examples, wherein the computer monitors energy and/or current consumption in one or more of the following: a building, a portion of a building, a structure, a portion of a structure, an infra-structure, a portion of an infra-structure, a plurality of buildings, a plurality of structures, a plurality of infra-structures, a city, a portion of a city, a region, a portion of a region.

L.150. The system of one or more of the above L examples, wherein the computer determines occupancy in one or more of the following: individual sites, the plurality of sites and the portion of the plurality of sites.

L.151. The system of one or more of the above L examples, wherein the computer determines occupancy in one or more of the following: a building, a portion of a building, a structure, a portion of a structure, an infra-structure, a portion of an infra-structure, a plurality of buildings, a plurality of structures, a plurality of infra-structures, a city, a portion of a city, a region, a portion of a region.

L.152. The system of one or more of the above L examples, wherein the computer creates at least one behavioral pattern for site occupants in one or more of the following: individual sites, the plurality of sites and the portion of the plurality of sites.

L.153. The system of one or more of the above L examples, wherein the computer creates at least one behavioral pattern for site occupants in one or more of the following: a building, a portion of a building, a structure, a portion of a structure, an infra-structure, a portion of an infra-structure, a plurality of buildings, a plurality of structures, a plurality of infra-structures, a city, a portion of a city, a region, a portion of a region.

L.154. The system of, one or more of the above L examples, wherein the computer creates at least one pattern of environmental preferences of occupants one or more of the following: individual sites, the plurality of sites and the portion of the plurality of sites.

L.155. The system of one or more of the above L examples, wherein the computer creates at least one pattern of environmental preferences of occupants one or more of the following: a building, a portion of a building, a structure, a portion of a structure, an infra-structure, a portion of an infra-structure, a plurality of buildings, a plurality of structures, a plurality of infra-structures, a city, a portion of a city, a region, a portion of a region.

L.156. The system of one or more of the above L examples, wherein the data to be sent is created based on one or more of the following: the at least one behavioral pattern and the at least one pattern of environmental preferences.

L.157. The system of one or more of the above L examples, wherein the computer adjusts the energy consumption in one or more of the following: individual sites, the plurality of sites and the portion of the plurality of sites, based at least on a portion of the external data.

L.158. The system of one or more of the above L examples, wherein the computer adjusts the energy consumption in one or more of the following: a building, a portion of a building, a structure, a portion of a structure, an infra-structure, a portion of an infra-structure, a plurality of buildings, a plurality of structures, a plurality of infra-structures, a city, a portion of a city, a region, a portion of a region based at least on a portion of the external data.

L.159. The system of one or more of the above L examples, wherein the computer provides instructions to one or more devices of the plurality of device to adjust one or more physical outputs of the energy consumption in one or more of the following: individual sites, the plurality of sites and the portion of the plurality of sites, based at least on a portion of the external data.

L.160. The system of one or more of the above L examples, wherein the computer provides instructions to one or more devices of the plurality of device to adjust one or more physical outputs of the energy consumption in one or more of the following: a building, a portion of a building, a structure, a portion of a structure, an infra-structure, a portion of an infra-structure, a plurality of buildings, a plurality of structures, a plurality of infra-structures, a city, a portion of a city, a region, a portion of a region, based at least on a portion of the external data.

L.161. The system of one or more of the above L examples, wherein the external data may be one or more of the following: price, peak price, future price, meteorological forecast and occupancy forecast.

L.162. The system of one or more of the above L examples, wherein the plurality of sensors and/or controllers are installed along at least one pipeline.

L.163. The system of one or more of the above L examples, wherein the plurality of sensors and/or controllers are installed in a plurality of pipelines.

L.164. The system of one or more of the above L examples, wherein the computer detects defects in the pipeline.

L.165. The system of one or more of the above L examples, wherein the computer detects leaks in the pipeline.

L.166. The system of one or more of the above L examples, wherein the plurality of sensors and/or controllers are associated with streetlights.

L.167. The system of one or more of the above L examples, wherein the plurality of sensors and/or controllers are installed in a plurality of streetlights.

L.168. The system of one or more of the above L examples, wherein the computer manages the plurality of streetlights.

L.169. The system of one or more of the above L examples, wherein the computer manages the plurality of streetlights based on one or more of the following: ambient light at individual streetlight, ambient light in a region, energy price, meteorological forecast and visibility of the moon and time of the day.

L.170. The system of one or more of the above L examples, wherein the computer detects faults in the plurality of streetlights.

L.171. The system of one or, more of the above L examples, wherein the computer manages the plurality of streetlights along the highway.

L.172. The system of one or more of the above L examples, wherein the computer detects a vehicle and turn the lights on in front of the vehicle.

L.173. The system of one or more of the above L examples, wherein the computer detects absence of the vehicle and turns the lights off in the absence of the vehicle.

L.174. The system of one or more of the above L examples, wherein the computer manages the plurality of streetlights based on one or more of the following: presence of humans in a street and presence of animals in the street.

L.175. The system of one or more of the above L examples, wherein the plurality of sensors and/or controllers are installed in agricultural field.

L.176. The system of one or more of the above L examples, wherein the plurality of sensors and/or controllers are installed in a plurality of agricultural fields.

L.177. The system of one or more of the above L examples, wherein the computer determines one or more of the following: amount of water, amount of nutrients and amount of chemical that are needed for at least a region in the agricultural field.

L.178. The system of one or more of the above L examples, wherein the computer determines one or more of the following: moisture, amount of nutrients and amount of chemical that are present in at least a region in the agricultural field.

L.179. The system of one or more of the above L examples, wherein one or more of the following: amount of water, amount of nutrients and amount of chemical that are needed for the at least region in the agricultural field is determined based on one or more of the following: one or more of the following: moisture, amount of nutrients, and amount of chemical, present in at least a region in the agricultural field, meteorological conditions, meteorological forecast, time of year, time of the day, type of soil, and type of crop.

L.180. The system of one or more of the above L examples, wherein the computer detects faults in irrigation system.

L.181. The system of one or more of the above L examples, wherein the computer determines at least an approximate location of a potential fire.

L.182. The system of one or more of the above L examples, wherein the plurality of sensors and/or controllers are installed in one or more of the following: forest, bush and farm.

L.183. The system of one or more of the above L examples, wherein a portion of the plurality of sensors and/or controllers are distributed so that the distance between adjacent sensors and/or controllers is at most 20 m, 30 m, 50 m, 100 m, or 200 m.

L.184. The system of one or more of the above L examples, wherein the plurality of sensors and/or controllers are distributed by dropping of an aircraft.

L.185. The system of one or more of the above L examples, wherein the plurality of sensors and/or controllers are installed in one or more of the following: car parks, at parking spots on a street, and along a road.

L.186. The system of one or more of the above L examples, wherein the computer determines occupancy of an individual parking spot.

L.187. The system of one or more of the above L examples, wherein the computer determines utilization of one or more of the following: car park, portion of the car park, region in the car park, and plurality of car parks.

L.188. The system of one or more of the above L examples, wherein the computer uses parking spot occupancy to assist in finding an available parking spot.

L.189. The system of one or more of the above L examples, wherein the computer adjusts the energy consumption based at least on a portion of the external data in one or more of the following: individual sites, the plurality of sites, and the portion of the plurality of sites.

L.190. The system of one or more of the above L examples, wherein the external data may be one or more of the following: price, peak price, future price, meteorological forecast and occupancy forecast.

L.191. The system of one or more of the above L examples, wherein the plurality of sensors, feedback devices and/or controllers are installed in at least one site.

L.192. A method of controlling a plurality of water heaters in substantially real time comprising: collecting temperature data on a substantial portion of the water heaters in substantially real time; collecting data on energy grid load; and based on the collected information instructing one or more of the plurality of water heaters to perform one or more of the following functions: increase heating to one or more of the plurality of water heaters, decreasing heating to one or more of the plurality of water heaters and increase heating to a portion of the plurality of water heaters.

Additionally, the disclosure has been described with reference to particular embodiments. However, it may be readily apparent to those skilled in the art that it is possible to embody the disclosure in specific forms other than those of the embodiments described above. The embodiments are merely illustrative and should not be considered restrictive. The scope of the disclosure is given by the appended claims, rather than the preceding description, and all variations and equivalents that fall within the range of the claims are intended to be embraced therein.

The invention claimed is:

1. A network system comprising:
(a) a plurality of devices wherein a substantial portion of the plurality of devices are capable of one or more of the following: transmitting data and receiving data;
(b) at least one gateway that is capable of one or more of the following: transmitting data to at least one of the plurality of devices; receiving data from at least one of the plurality of devices; transmitting data to at least one electronic computing device; and receiving data from at least one electronic computing device; and
(c) a substantial portion of the devices are arranged such that the distance between devices allows wireless communication between at least one device and at least one other device; wherein the cost of deploying and maintaining the network of at least 100, 500, 2000, 10,000, 100,000, 500,000, 1,000,000 or 5,000,000 devices is substantially proportion to the cost of the individual devices.

2. A network system comprising:
(a) a plurality of devices wherein a substantial portion of the plurality of devices are capable of one or more of the following: transmitting data and receiving data; and
(b) at least one gateway that is capable of one or more of the following: transmitting data to at least one of the plurality of devices; receiving data from at least one of the plurality of devices; transmitting data to at least one electronic computing device; and receiving data from at least one electronic computing device; wherein the distance between devices allows communication between at least one device and at least one other device; and
wherein a substantial portion of the plurality of devices are able to communicate with at least one other device within the network and the at least one gateway within the network is capable of handling at least 100, 500, 2000, 10,000, 100,000 or 1,000,000 devices without the need for additional infrastructure.

3. A network system comprising:
(a) a plurality of devices wherein a substantial portion of the plurality of devices are capable of one or more of the following: transmitting data and receiving data; and
(b) at least one gateway that is capable of one or more of the following: transmitting data to at least one of the plurality of devices; receiving data from at least one of the plurality of devices; transmitting data to at least one electronic computing device; and receiving data from at least one electronic computing device;
wherein the at least one of the plurality of devices is positioned within a distance from the at least one gateway such that the distance allows communication between the at least one gateway and the at least one of the plurality of devices;
wherein the distance between devices allows communication between at least one device and at least one other device;
wherein transmission overhead is reduced by suppressing one or more of the following: source headers, destination headers and request-channel allocation-transmission overhead; and
wherein the ratio of available bandwidth to the net pay load is between 200 to 250,000, 300 to 5000, 1000 to 100,000, 50,000 to 1 million or 500,000 to 10 million.

4. A network system comprising:
(a) a plurality of devices wherein a substantial portion of the plurality of devices are capable of one or more of the following: transmitting data and receiving data; and
(b) at least one gateway that is capable of one or more of the following: transmitting data to at least one of the plurality of devices; receiving data from at least one of the plurality of devices; transmitting data to at least one electronic computing device; and receiving data from at least one electronic computing device;
wherein the at least one of the plurality of devices is positioned within a distance from the at least one gateway such that the distance allows communication between the at least one gateway and the at least one of the plurality of devices;
wherein the distance between devices allows communication between at least one device and at least one other device;
wherein transmission overhead is reduced by suppressing one or more of the following: source headers, destination headers and request-channel allocation-transmission overhead; and
wherein the ratio of channel capacity to the net pay load is between 200 to 250,000, 300 to 5000, 1000 to 100,000, 50,000 to 1 million or 500,000 to 10 million.

5. A network system comprising:
(a) a plurality of devices wherein a substantial portion of the plurality of devices are capable of one or more of the following: transmitting data and receiving data; and
(b) at least one gateway that is capable of one or more of the following: transmitting data to at least one of the plurality of devices; receiving data from at least one of the plurality of devices; transmitting data to at least one electronic computing device; and receiving data from at least one electronic computing device;

wherein the at least one of the plurality of devices is positioned within a distance from the at least one gateway such that the distance allows communication between the at least one gateway and the at least one of the plurality of devices;

wherein the distance between devices allows communication between at least one device and at least one other device;

wherein transmission overhead is reduced by suppressing one or more of the following: source headers, destination headers and request-channel allocation-transmission overhead; and wherein the ratio of transmit plus receive time to idle time is between 100 to 300,000, 100 to 500, 200 to 1000, 500 to 2000, 1000 to 10,000, 1000 to 5000, 10,000 to 50,000, 40,000 to 120,000, 50,000 to 140,000, 80,000 to 200,000, 120,000 to 300,000 or 160,000 to 350,000.

6. A network system comprising:

(a) a plurality of devices wherein a substantial portion of the plurality of devices are capable of one or more of the following: transmitting data and receiving data; and (b) at least one gateway that is capable of one or more of the following: transmitting data to at least one of the plurality of devices; receiving data from at least one of the plurality of devices; transmitting data to at least one electronic computing device; and receiving data from at least one electronic computing device;

wherein the at least one of the plurality of devices is positioned within a distance from the at least one gateway such that the distance allows communication between the at least one gateway and the at least one of the plurality of devices;

wherein the distance between devices allows communication between at least one device and at least one other device;

wherein transmission overhead is reduced by suppressing one or more of the following: source headers, destination headers and request-channel allocation-transmission overhead; and wherein the number of devices within the network is between 25,000 to 500,000; 100,000 to 1,000,000, 250,000 to 600,000, 500,000 to 1 million; 500,000 to 2 million; 700,000 to 2 million 800,000 to 5 million, 1 million to 10 million or 2 million to 15 million.

* * * * *